United States Patent

Miyashita et al.

[11] Patent Number: 5,937,030
[45] Date of Patent: Aug. 10, 1999

[54] OFF-HOOK SIGNAL AND DIAL PULSE GENERATING CIRCUIT AND A METHOD FOR DRIVING THE SAME CIRCUIT

[75] Inventors: Tokio Miyashita; Tokuo Nakamura; Toshihiko Kotaka, all of Tokyo, Japan

[73] Assignee: Oki Electric Industry Co., Ltd., Tokyo, Japan

[21] Appl. No.: 08/936,897

[22] Filed: Sep. 25, 1997

[30] Foreign Application Priority Data

Oct. 16, 1996 [JP] Japan ................................ 8-273466
Aug. 19, 1997 [JP] Japan ................................ 9-222246

[51] Int. Cl.$^6$ ............................ H04M 1/24; H04M 3/08; H04M 3/22
[52] U.S. Cl. .................................. 379/1; 379/27; 379/31; 379/399
[58] Field of Search ................................ 379/1, 27, 28, 379/29, 31, 387, 391, 399

[56] References Cited

U.S. PATENT DOCUMENTS 5,652,575  7/1997  Pryor et al. ............................... 379/27
5,768,341  6/1998  Pryor et al. ............................... 379/27

FOREIGN PATENT DOCUMENTS 4-349761  12/1992  Japan .
7-162549  6/1995  Japan .

OTHER PUBLICATIONS

Toshio Hayasaka et al., "Type 600 Telephone Set" Jul. 1964, pp. 129–133.

Primary Examiner—Curtis A. Kuntz
Assistant Examiner—Binh K. Tieu
Attorney, Agent, or Firm—Venable; Robert J. Frank

[57] ABSTRACT

An off-hook signal and dial pulse generating circuit which has a smaller number of switching devices having a high withstand current characteristic and has a less surge voltage than up to now. A dial pulse circuit and a switch block circuit are connected in parallel with the output side of a full-wave rectifying circuit. The circuit comprises an impedance circuit and a first switch circuit to be turned on/off by a signal. The impedance circuit operates in a state where it has an inductance component in case that a signal synchronized with a signal is off and operates in a state where it has no inductance in case that the signal is on, and an electric current flowing therethrough is turned on/off by the first switch circuit. The circuit comprises a series circuit composed of second and third switch circuits. The second switch circuit is turned on/off in response to a signal synchronized with the signal (where this circuit is off when the signal is on). The third switch circuit is turned on/off in response to the signal.

82 Claims, 68 Drawing Sheets

Waiting state

Off-hook signal generation

Dial pulse generation (in an off-hook state)

Return into a waiting state

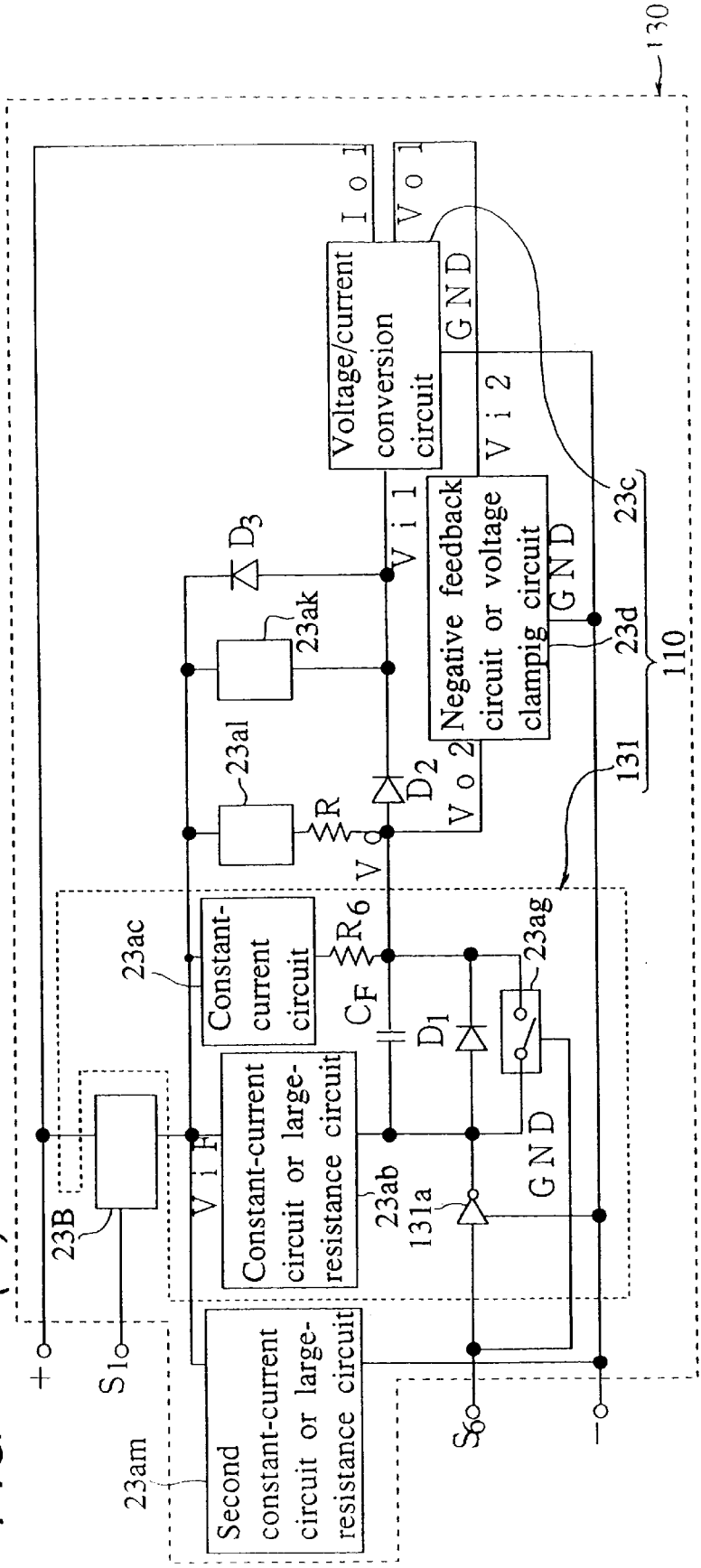
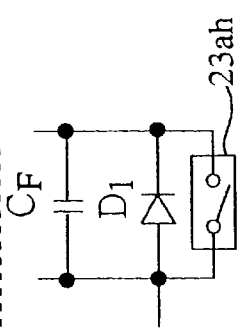
FIG. 63(A)
FIG. 63(B)

OFF-HOOK SIGNAL AND DIAL PULSE GENERATING CIRCUIT AND A METHOD FOR DRIVING THE SAME CIRCUIT

BACKGROUND OF THE INVENTION

1. Field of the Invention

The present invention relates to a circuit which is built in a communication terminal unit or the like for using a telephone line to perform communication and which generates an off-hook signal or dial pulses corresponding to a dial number.

2. Description of the Related Art

A conventional circuit for generating an off-hook signal and dial pulses has been disclosed, for example, in a reference material ("Type 600 Telephone Set", pp. 129, issued by Telecommunications Association (Jul. 15, 1964)). FIG. 53 is a block diagram showing a fundamental configuration of the conventional circuit 13 for an off-hook signal and dial pulses together with a telephone line (hereinafter also simply referred to as a line) 11 and a communication terminal transformer (hereinafter also simply referred to as a transformer). This circuit 13 is provided with a full-wave rectifying circuit 13a, a first switch block 13b connected in series with the + output terminal of the full-wave rectifying circuit 13a, a parallel circuit of a second switch block 13c and inductance for forming a loop current connected between the first switch block 13b and the − output terminal of the full-wave rectifying circuit 13a. In FIG. 53, C is a capacitor for cutting a direct current signal to a transformer L. In case of sending an off-hook signal (a line connection request signal) to a telephone office side from the circuit 13, first, a first control signal S1 is sent from a control circuit inside or outside a terminal unit to the first switch block 13b and the first switch block 13b is closed. Hereupon, an electric current limited by an internal resistance of the circuit 13 and a line resistance flows through the line 11, and this is transmitted to the office side as an off-hook signal. An off-hook signal reception response signal is returned from the unillustrated office side.

After confirming the off-hook signal reception response signal, a second control signal S2 is sent from the control circuit to the second switch block 13c, and the second switch block 13c is closed. Closing of the second switch block 13c protects the inductance 13d for forming a loop current and the transformer L so that a dial pulse signal which is a great-amplitude signal cannot flow through them. Subsequently, a signal which is turned off/on by the number of times corresponding to a dial number is sent from said control circuit to the first switch block 13b as a first control signal. Responding to this, dial pulses of intermittent line current are transmitted to the unillustrated office side. After the dial pulses have been transmitted, a control signal S2 is sent to the second switch block 13c from said control circuit and the control signal S2 opens the second switch block 13c and cancels said protected state. Thus the circuit 13 comes to be into a communicable state. After end of communication, a control signal S1 is sent from the control circuit to the switch block 13b and brings this circuit 13 into an open state, namely, a waiting state.

The inductance 13d for forming a loop current is provided for two purposes, as generally known. That is to say, the two purposes are roles of making an electric current of several tens milliamperes flow in order to let an office side recognize an off-hook state and of making no alternating current signal (no speech signal) flow in order to prevent occurrence of a speech loss caused by that a speech signal flows through said inductance during talking.

A waveform deterioration or a surge voltage is caused by letting a pulse current (concretely a dial pulse current) flow through this inductance 13d. Therefore, a configuration has been adopted in which a dial pulse current flows through the second switch block 13c by short-circuiting both ends of this inductance 13d with the second switch block 13c before generating the dial pulses. Accordingly, when generating the dial pulses, an electric current of the same in intensity results in flowing through the first switch block 13b and the second switch block 13c. Furthermore, the current flowing when generating dial pulses becomes sometimes about 80 mA or more, for example. Therefore, in a conventional circuit for generating an off-hook signal and dial pulses, there has been a first problem that the first and second switch blocks need to be respectively provided with switching devices (also called small power devices) capable of letting such a large current flow through them. The small power device is too large-sized to be built in a monolithic IC. Accordingly, it is necessary to externally attach such switching devices respectively to the first and the second switch block. Since this is not desirable in order to make a communication terminal smaller in size and higher in reliability, this is desired to be improved.

In a conventional circuit, due to a positional relation of arrangement of the switch blocks, connection/disconnection between a communication terminal transformer and a telephone line is performed in a short time by turning on/off the first switch block or the second switch block. Thereupon, there has been a second problem that there is a possibility that a surge voltage of a differential shape occurs at the time of said connection/disconnection. Since such a surge voltage may cause an erroneous communication response for example, it is desirable to be improved.

SUMMARY OF THE INVENTION

In order to solve the above-mentioned first and second problems, according to a first gist of the present invention, an off-hook signal and dial pulse generating circuit is provided between a telephone line and a communication terminal transformer. The circuit sends an off-hook signal or dial pulses through the telephone line to a telephone office side in case that a first control signal for generating an off-hook signal or dial pulses has been inputted in it and which forms a state where the communication terminal transformer is protected from input in case that a second control signal has been inputted. The circuit comprises circuits (A) to (C) described in the following:

(A) a full-wave rectifying circuit for rectifying in full wave the line voltage of a telephone line, (B) a dial pulse circuit connected between the output terminals of the full-wave rectifying circuit and including an impedance circuit and a first switch circuit which is turned on/off by a first control signal, wherein the impedance circuit operates in a state where it has an inductance component in case that a fourth control signal is off which is given synchronously with the second control signal and is obtained by converting the signal level of the second control signal into a level adaptive to the dial pulse circuit, and the impedance circuit operates in a state where it has no inductance in case that the fourth control signal is on, and an electric current to flow through the impedance circuit is turned on/off by the first switch circuit, and (C) a switch block circuit comprising a serial circuit which is connected in parallel with the output side of the full-wave rectifying circuit and is composed of a second switch circuit and a third switch circuit and having a communication terminal transformer connected between a connecting point of the second and third switch circuits and one end of the output terminals of the full-wave rectifying circuit, wherein the second switch circuit is turned on/off according to a third control signal which is synchronized with the first control signal and has a level adaptive to the switch block circuit (where the second switch circuit is preferentially turned off in case that the second control signal is on), and the third switch circuit is turned on/off according to the second control signal.

An off-hook signal and dial pulse generating circuit according to the present invention comprises an impedance circuit whose operating state is changed over between a state where it has an inductance component and a state where it has no inductance by a fourth control signal. Accordingly, since a dial pulse itself can be made flow through the impedance circuit in a state of no inductance, dial pulses can be sent to the office side without being deteriorated in waveform. Since this means that a great current can be made flow only through the dial pulse circuit, it can do that a single small power device is used in the dial pulse circuit side (for example it can do that a single transistor Q5 is used in a circuit example of FIG. 4). Thus, the number of small power devices can be reduced more than required up to now.

The second switch circuit makes it possible to disconnect a telephone line and a communication terminal transformer from each other on demand. Thereupon, a voltage drop is generated in a line resistor or the like by first turning on the dial pulse circuit. After lowering the line voltage at the terminal side as utilizing this voltage drop, the second switch circuit is turned on or off. This on or off operation makes it possible to perform connection/disconnection between the communication terminal transformer and the telephone line always in a state in which the line voltage at the terminal side has been lowered. In case that connection/disconnection between the line and the transformer can be performed in a state where the line voltage is low, a surge voltage to enter the communication terminal transformer can be reduced to that extent.

The third switch circuit makes it possible to short-circuit the input side of the communication terminal transformer on demand. Usually, a capacitor for cutting a direct current signal is generally provided on a communication terminal transformer. When a communication terminal transformer and a line is disconnected from each other by the second switch circuit, and the input side of the communication terminal transformer is short-circuited by the third switch circuit, a discharge current is generated transiently from the capacitor. However, since this discharge current is slowly discharged through a current limiting resistor (generally provided) of the third switch circuit, occurrence of a surge voltage to a communication system can be prevented.

When putting the present invention into practice, it is preferable that a circuit means (concretely a serial circuit of a resistor and a capacitor, or the like) is provided on a switch means which is turned on/off by the second control signal in a first level conversion circuit provided on the switch block circuit. The circuit means is capable of making an electric current flow transitorily after the switch means has been turned off. Although in detail described later, when doing so, the second and third switch circuits are not instantly changed over when the second control signal is turned off. That is to say, since the third switch circuit is slowly turned off and the second switch circuit is slowly turned on, the communication terminal transformer is slowly connected with the line through transient resistances of the second and third switch circuits. This prevents occurrence of a surge voltage at the time of connection of the line and the transformer.

In case that a power feeding system at the office side is a constant-voltage constant-resistance system and a telephone line has a line distance through which the line voltage can be kept at a certain value or higher, instead of using the above-mentioned dial pulse circuit (B) a dial pulse circuit may be used which comprises a constant-current circuit block which is connected in parallel with a full-wave rectifying circuit and in which a constant current flows when a voltage is applied to it and a first switch circuit which is turned on/off by a first control signal, and which dial pulse circuit turns on/off the first switch circuit with an electric current flowing through the constant-current circuit block. Although in detail described later, when the power feeding system and the line length satisfy the said conditions, since the dial pulse circuit performs a constant-current circuit operation capable of being turned on/off at the time of an off-hook operation, it is possible to let flow a direct current showing an off-hook state, send a dial pulse current of good waveform, and make a higher impedance to a speech alternating current.

According to a second gist of the present invention, a method for driving an off-hook signal and dial pulse generating circuit, the method comprises, following steps of processing the first and second control signals which are in an off state when said circuit is in a waiting state;

in order to generate an off-hook signal, three steps composed of a first step of turning on the second control signal and keeping it in the on state for a specified time, a second step of turning on the first control signal, and keeping it in the on state for a specified time and then a third step of turning off the second control signal, in order to generate dial pulses in an off-hook state, three steps composed of a first step of turning on the second control signal and keeping it in the on state for a specified time, a second step of turning off/on the first control signal by times corresponding to the number of dial pulses and finally leaving it in the on state, and then a third step of turning off the second control signal and keeping it in the off state for a specified time, and in order to return the circuit into a waiting state, three steps composed of a first step of turning on the second control signal and keeping it in the on state for a specified time, a second step of turning off the first control signal, and then a third step of turning off the second control signal at a specified time after turning off the first control signal in the second step.

According to this driving method, respectively when connecting a line and a communication terminal transformer with each other and when disconnecting them from each other, an electric current is first made flow through a dial pulse circuit. Therefore, the line voltage is lowered by an influence of a line resistance to that extent. And the communication terminal transformer is connected to the line in a state where the line voltage has been lowered in such a way, or the communication terminal transformer is disconnected from the line in a state where the line voltage has been lowered in such a way. Therefore, a surge voltage to be generated at the time of connection/disconnection can be reduced by that extent to which the line voltage has been lowered.

According to a third gist of the present invention, an off-hook signal and dial pulse generating circuit which is provided between a telephone line and a transformer part having a communication terminal transformer and a capacitor which is connected in series with this transformer and cuts off a direct current, and sends an off-hook signal or dial pulses to the office side through said telephone line in case that a first control signal for forming an off-hook signal or dial pulses is inputted, said off-hook signal and dial pulse generating circuit comprises following circuits (X) to (Z).

(X) A full-wave rectifier circuit for full-wave rectifying the line voltage of a telephone line.

(Y) A dial pulse circuit which is connected between the output terminals of the full-wave rectifier circuit and comprises an impedance circuit and a first switch circuit turned on/off by the first control signal. Here, the impedance circuit operates in a state where it has an inductance component in case that a sixth control signal which is synchronized with a fifth control signal and is obtained by converting the signal level of this fifth control signal into a level fitted for this dial pulse circuit is in an on state, and operates in a state of non-inductance in case that the sixth control signal is in an off state. And an electric current which flows in the impedance circuit is turned on/off by the first switch circuit.

(Z) A switch block circuit comprising a series circuit which is connected between the output terminals of the full-wave rectifier circuit and is composed of a fourth switch circuit and a fifth switch circuit. Here, the transformer part is connected in parallel with the fifth switch circuit. And the fourth switch circuit is turned on and connects the transformer part and the telephone line with each other in case that the fifth control signal is inputted into the fourth switch circuit. And the fifth switch circuit makes a bias current which guarantees an alternating current operation of the communication terminal transformer flow in the fourth switch circuit in case that a seventh control signal is inputted into the fifth switch circuit and the fifth control signal is inputted into the fourth switch circuit, and short-circuits the input terminals of the transformer part with each other in case that the seventh control signal is inputted into the fifth switch circuit and the fifth control signal is not inputted into the fourth switch circuit.

According to an off-hook signal and dial pulse generating circuit of the third invention, first, the same action and effect as obtained by an off-hook signal and dial pulse generating circuit of the first invention can be obtained.

That is to say, an off-hook signal and dial pulse generating circuit of the present invention is provided with an impedance circuit whose operation state is changed over by the sixth control signal between a state of inductance and a state of non-inductance. Accordingly, since it is possible to make a dial pulse itself flow in the impedance circuit in a state of non-inductance, it is possible to send the dial pulse to the office side without deteriorating the dial pulse in waveform or the like. Since this means that it is possible to make a large current flow only in the dial pulse circuit, it can do to use one small power element in the dial pulse circuit side (for example, to use a transistor Q5 as a small power element in a circuit example in FIG. 67 or 68). Therefore, the number of small power elements can be reduced in comparison with the prior art.

Furthermore, the fourth switch circuit makes it possible to disconnect the telephone line and the communication terminal transformer from each other according to demand. Thanks to this, by an operation of turning on or off the fourth switch circuit after first turning on the dial pulse circuit and then lowering the line voltage at the terminal side as utilizing a voltage drop due to a line resistance or the like, it is possible to connect/disconnect the communication terminal transformer and the telephone line with/from each other always in a state where the line voltage at the terminal side is lowered. When it is possible to connect/disconnect the line and the transformer with/from each other in a state where the line voltage is lowered, thanks to this, it is possible to reduce a surge voltage entering the input side of the communication terminal transformer.

The fifth switch circuit makes it possible to short-circuit the input side of the communication terminal transformer according to demand. The communication terminal transformer is provided with a capacitor for cutting off a direct current signal. When the communication terminal transformer and the telephone line are disconnected from each other by the fourth switch circuit and the input side of the communication terminal transformer is short-circuited by the fifth switch circuit, a discharge current flows transiently from the capacitor. However, since this discharge current slowly discharges through a constant-current characteristic of the fifth switch circuit and a current limiting resistor (generally provided), it is possible to prevent that a surge voltage enters the communication system.

Moreover, the above-mentioned off-hook signal and dial pulse generating circuit of the third invention brings a new action and effect as described in the following in comparison with the already-mentioned circuit of the first invention.

While in case of the circuit of the first invention the impedance circuit is in a state of inductance when a control signal (the fourth control signal) is in an off state, in case of the circuit of the third invention the impedance circuit is in a state of non-inductance when a control signal (the sixth control signal) is in an off state. That is to say, in case of the circuit of the third invention, the impedance circuit is normally in a state of non-inductance.

In order to make an impedance circuit non-inductive, each of the preferred embodiments of the first and third inventions of this application, as described later in detail, makes a capacitor CF built in the impedance circuit and brings this capacitor CF into a state where the ground side terminal of this capacitor CF is disconnected from the ground. In order to attain such a state in the circuit of the third invention, it can do to connect the ground side terminal of the capacitor CF to the input terminal of a NOT circuit and use the input terminal of this NOT circuit as an input terminal for a control signal (the sixth control signal). On the other hand, in case of the circuit of the first invention, it is necessary to connect the ground side terminal of the capacitor CF to the output terminal of a circuit (positive logic circuit) having NOT circuits connected in two stages and use the input terminal of this positive logic circuit as an input terminal for a control signal (the fourth control signal). Comparing both of them, the circuit of the third invention can be made smaller in circuit size by one stage of the NOT circuit.

And the circuit of the third invention makes the fifth switch circuit have a function to make a bias current flow in the fourth switch circuit. Therefore, its circuit size can be made smaller in comparison with a case of providing separately a circuit having a bias function.

The reason why the bias current is needed is as follows.

In order to make an off-hook signal and dial pulse generating circuit into an IC or small-sized, it is desirable to make a switch block circuit of a semiconductor device. However, a semiconductor device can make an electric current flow only in one direction. On the other hand, a capacitor for cutting off a direct current is connected with a communication terminal transformer. Accordingly, only alternating current signals flow in the transformer. Hereupon, since the fourth switch circuit composed of a semiconductor device does not pass a part of alternating current signals to flow through the transformer if no measure is taken, the alternating current signals are distorted in waveform. In order to avoid this, it can do to make a bias direct current larger than the maximum amplitude of the alternating current flow in advance in the fourth switch circuit. The bias current is for the purpose of this.

BRIEF DESCRIPTION OF THE DRAWINGS

The foregoing and other objects, features and advantages of the present invention will be better understood from the following description taken in connection with the accompanying drawings, in which:

FIG. 17, comprising

FIG. 18, comprising

FIG. 19, comprising

FIG. 63, comprising FIGS. 63(A) and 63(B), is an explanatory figure of another example of the third invention;

FIG. 64, comprising

FIG. 65, comprising

DESCRIPTION OF THE PREFERRED EMBODIMENTS

Embodiments of an off-hook signal and dial pulse generating circuit and of a method for driving the circuit of the present invention are described in the following with reference to drawings. The drawings used for explanation are shown only so roughly as to understand the present invention. Some duplicated descriptions are omitted by giving the same numbers to components corresponding to each other in the respective drawings.

Figure 1:
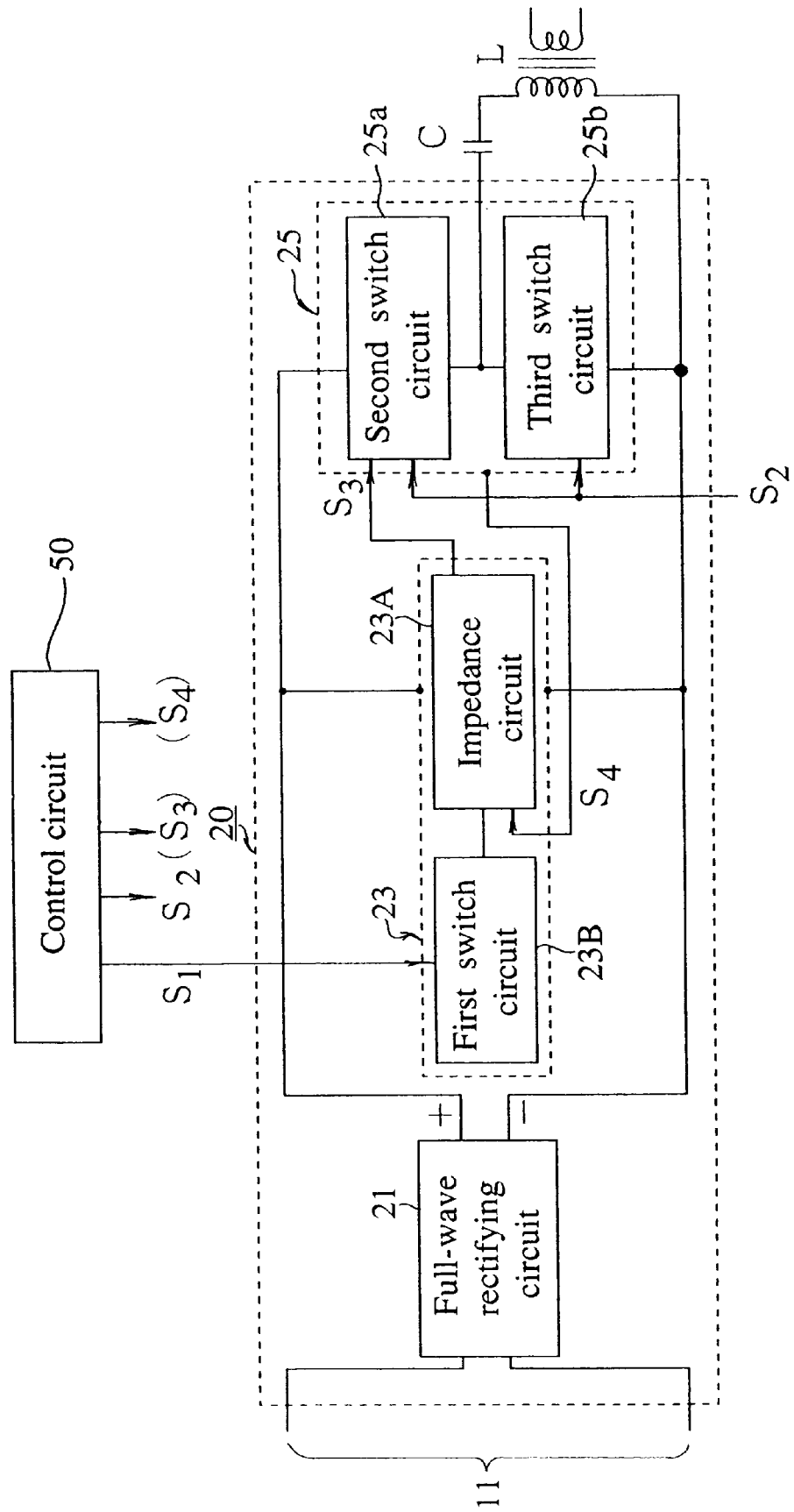
FIG. 1 is a figure for explaining a fundamental constitution of an off-hook signal and dial pulse generating circuit according to a first embodiment of the invention.

1. FIRST EMBODIMENT 1-1. Description of a fundamental constitution and description of its operation FIG. 1 is a block diagram showing a fundamental constitution of an off-hook signal and dial pulse generating circuit 20 according to a first embodiment of the present invention (hereinafter also referred to as a signal generating circuit 20 of the first embodiment). FIG. 1 also shows together a telephone line 11, a communication terminal transformer L, and a control circuit 50 for controlling the circuit 20. For the circuit 20 installed at a telephone set, the control circuit 50 will be installed, for example, in the telephone set. For the circuit 20 installed at a non-ringing communication terminal unit, the control circuit 50 will be installed, for example, in the unit.

In FIG. 1, S1 shows a first control signal and S2 shows a second control signal. The first control signal S1 is generated in a form suitable for forming an off-hook signal or dial pulses. On the other hand, the second control signal S2 is generated for protecting the communication terminal transformer L at such a time when dial pulses are generated, or the like. These first and second control signals are generated by the control circuit 50, for example, when a person operates a telephone set, namely, when a person takes up a handset (or handiest) or inputs a telephone number. And in case of using a non-ringing communication terminal unit (not illustrated) connected with a telephone line, these first and second control signals are generated by the controller 50 provided in this communication terminal unit.

The signal generating circuit 20 of the first embodiment is provided with a full-wave rectifying circuit 21, a dial pulse circuit 23, and a switch block circuit 25.

The full-wave rectifying circuit 21 rectifies in full wave the line voltage of the telephone line 11 and supplies always a voltage of the same polarity to the respective circuits of the latter stages. This can be composed of a publicly known circuit.

The dial pulse circuit 23 is connected between the output terminals of the full-wave rectifying circuit 21, and comprises an impedance circuit 23A and a first switch circuit 23B turned on/off by the first control signal S1.

The impedance circuit 23A operates in a state where it has an inductance component in case that a fourth control signal S4 synchronized with the second control signal S2 is off, and operates in a state where it has no inductance in case that the fourth control signal S4 is on. Furthermore, the impedance circuit 23A is a circuit in which an electric current flowing through the impedance circuit 23A is turned on/off by the first switch circuit 23B. A concrete circuit configuration of this impedance circuit 23A is described later. The fourth control signal S4 is a signal obtained by converting the second control signal S2 into a signal of a level adaptive to the dial pulse circuit 23. Although it is assumed that the fourth control signal S4 is generated by the switch block circuit 25 in this embodiment (in detail described later), the signal S4 may be generated by another means such as the control circuit 50 of the communication terminal unit.

The switch block circuit 25 is connected in parallel with the output side of the full-wave rectifying circuit 21 and comprises a series circuit composed of a second switch circuit 25a and a third switch circuit 25b. A communication terminal transformer L is connected between a connecting point of the second switch circuit 25a and the third switch circuit 25b and one end (a negative pole in FIG. 1) of the output side of the full-wave rectifying circuit 21. Furthermore, the second switch circuit 25a is a circuit which performs an on/off operation in response to the third control signal S3 synchronized with the first control signal S1. In case that the second control signal S2 is on, however, this switch circuit 25a operates so as to preferentially come into an off state (this operation is in detail described later). The third switch circuit 25b is a circuit which performs an on/off operation in response to the second control signal S2. A concrete circuit configuration of the switch block circuit 25 is in detail described later. Said third control signal S3 is a signal obtained by converting the first control signal S1 into a signal of a level adaptive to the switch block circuit 25. Although it is assumed that the third control signal S3 is generated by the dial pulse circuit 23 in this embodiment (in detail described later), the signal S3 may be generated by another means such as the control circuit 50.

The signal generating circuit 20 of this first embodiment makes possible a communication using a telephone line by being driven in the following manner. This is described with reference to FIGS. 1 and 2. Here, FIG. 2 is a timing chart of the first and second control signals S1 and S2 when driving the signal generating circuit 20 of the first embodiment.

Figure 2A:
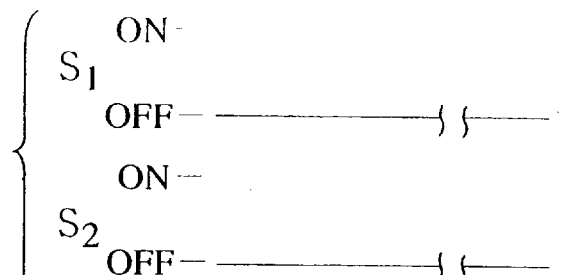
FIGS. 2(A) to 2(D) are timing charts for explaining a driving method of the invention.

In a state where the signal generating circuit 20 is waiting for communication, both of the first control signal S1 and the second control signal S2 from the control circuit 50 are in an off state (see FIG. 2(A)). Accordingly, since all of the first switch circuit 23B, the second switch circuit 25a, and the third switch circuit 25b come into an off state, an electric current of the dial pulse circuit 23 is off and the input side of the transformer and the line are disconnected from each other, and the transformer input terminals are open between them.

Figure 2B:
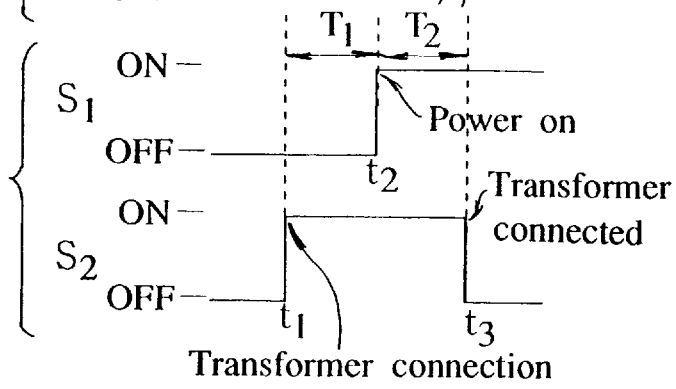

When an operator takes up a handiest to perform an off-hook operation (or when a non-ringing communication terminal unit performs a line connection request operation), in response to this operation the control circuit 50 first turns on the second control signal S2 to the switch block circuit 25 (see t1 of S2 of FIG. 2(B)). Then, since the third switch circuit 25b is a circuit which is turned on/off in response to an on/off operation of the S2, the third switch circuit 25b is turned on. On the other hand the second switch circuit 25a is kept in an off state (namely, as it is). Accordingly, the input terminals of the transformer are short-circuited with each other and the disconnected state between the input terminals of the transformer and the line is kept as it is. And since the fourth control signal S4 is also turned on in response to that the second control signal S2 is turned on, the impedance circuit 23A of the dial pulse circuit 23 is operated in a state where it has no inductance.

At a certain time T1 after the above-mentioned operation has finished, that is, after the second control signal S2 is turned on, the control circuit 50 turns off the first control signal S1 to the dial pulse circuit 23 (see t2 of S1 of FIG. 2(B)). Hereupon, since the first switch circuit 23B comes into an on state, an electric current flows through the dial pulse circuit 23. Here, the short-circuited state between the input terminals of the transformer is kept as it is and the disconnected state between the input terminals of the transformer and the line is also kept as it is, and an electric current flows through the dial pulse circuit 23 in a state where the impedance circuit 23A has no inductance.

At a certain time T2 after the above-mentioned operation has finished, that is, after the first control signal S1 is turned on, the control circuit 50 returns the second control signal S2 to the switch block circuit 25 into an off state (see t3 of S2 of FIG. 2(B)). As a result, since the fourth control signal S4 returns into an off state, the impedance circuit 23A of the dial pulse circuit 23 comes into a state where the impedance circuit 23A has an inductance component. That is to say, the impedance circuit 23A becomes a circuit which operates so as to have a high-impedance characteristic to an alternating current signal. And in response to that the second control signal S2 is returned into an off state, (a): since the on state of the first control signal S1 becomes effective again, the second switch circuit 25a comes into an on state, and (b): since the third switch circuit 25b comes into an off state, the transformer input side and the line are connected with each other and the transformer input terminals are disconnected from each other, and thus an off-hook state is formed.

The circuit 20 comes into an off-hook state from a waiting state also by sending the first control signal S1 to only the dial pulse circuit 23 from the control circuit 50. In this method, however, although for an instant, a line voltage (an open voltage of a power feeding system at the office side) at a waiting time is applied to the input terminals of the transformer and a surge voltage may occur at the output terminals of the transformer. By going through the three steps as described above, however, the input terminals of the transformer and the line are connected with each other (see t3 in FIG. 2(B)) in a state where the line voltage has been lowered by making in advance an electric current flow through the dial pulse circuit 23 (see t2 in FIG. 2(B)), and to that extent a surge voltage can be reduced.

Figure 2C:
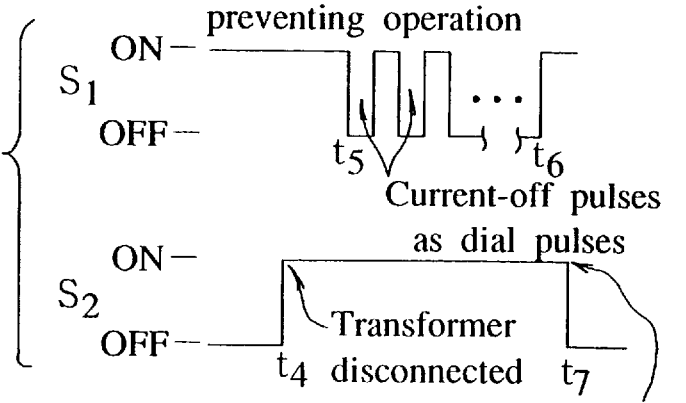

Furthermore, when the operator performs a dialing operation, the control circuit 50 first turns on the second control signal S2 to the switch block circuit 25 (see t4 of S2 in FIG. 2(C)). Thus, the input terminals of the transformer are short-circuited with each other and the input terminals of the transformer and the line are disconnected from each other, and moreover the impedance circuit 23A of the dial pulse circuit 23 comes into a state where it operates as having no inductance.

Next, the first control signals S1 turned off/on according to the number of dial pulses are sent to the dial pulse circuit (see t5 of S1 of FIG. 2(C)), and finally the first control signal is brought into an on state (see t6 of S1 of FIG. 2(C)). Dial pulses are generated by that the line current is turned off/on according to the number of dial pulses through the off/on operation of the first control signal. These dial pulses are transmitted to the office side through the impedance circuit in an operating state of no inductance. Therefore, the dial pulses are protected from being deteriorated in waveform or the like.

When the above-mentioned operations have finished, the control circuit 50 returns the second control signal S2 to the switch block circuit 25 into an off state (see t7 of S2 of FIG. 2(C)). As a result, an electric current to the dial pulse circuit 23 is kept on, but since the dial pulse circuit 23 is made again so as to have a high impedance to an alternating current signal and the input terminals of the transformer and the line are connected with each other and furthermore the short-circuited state between the input terminals of the transformer is canceled, the signal generating circuit 20 is returned into an off-hook state and comes into a speakable state. A telephone conversation is performed according to demand.

Figure 2D:
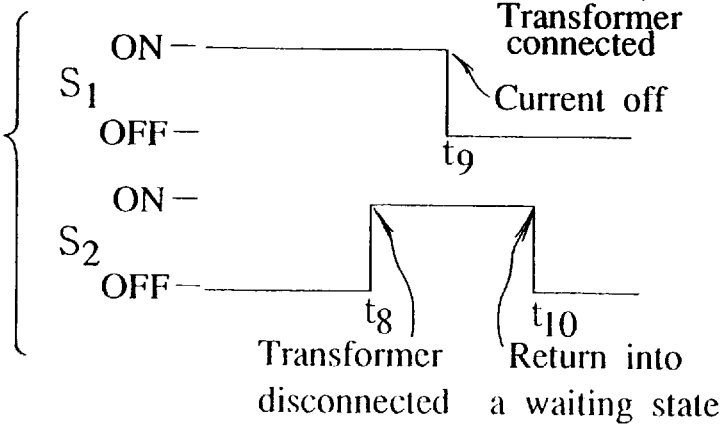

When the operator performs an on-hook operation after the telephone conversation has ended, the control circuit 50 again turns on the second control signal S2 to the switch block circuit 25 (see t8 of S2 of FIG. 2(D)). As the result, the input terminals of the transformer are short-circuited with each other and the input terminals of the transformer and the line are disconnected from each other. The impedance circuit 23A of the dial pulse circuit 23 is in a circuit state where the impedance circuit 23A operates with no inductance as keeping an electric current on. Next, the control circuit 50 turns off the control signal S1 (see t9 of S1 of FIG. 2(D)), and turns off the current flowing through the dial pulse circuit 23. Subsequently, the control circuit 50 returns the second control signal S2 also into an off state (see t10 of S2 of FIG. 2(D)). Thus the signal generating circuit 20 returns into a waiting state.

Although the signal generating circuit can return into a waiting state even by turning off the control signal S1 immediately after a telephone conversation has ended, a surge voltage can be made smaller by returning the circuit into a waiting state as going through the three steps as described with reference to FIG. 2(D). That is to say, thanks to the operations at times t8 to t9 of FIG. 2(D), since the line and the communication transformer are first disconnected from each other in a state where the line voltage is low (see time t8 of FIG. 2(D)), and it can be avoided for the open line voltage to be applied to the communication transformer, a surge voltage can be made small.

According to an off-hook signal and dial pulse generating circuit of the present invention, the following effects are obtained.

(1) Only an electric current equivalent to a bias current (a current of this value is turned off/on when dial pulses are sent) for compensating an alternating current operation of the communication transformer flows through the switch block circuit, while the main portions of the dial pulse current and the off-hook signal current flow through the dial pulse circuit. Therefore, since a small power device for letting a great current flow is not necessary for the switch block circuit but is necessary only for the dial pulse circuit, one small power device can do.

(2) Since such a driving method as described with reference to FIG. 2 can be adopted, a surge voltage can be reduced.

1-2. Description of concrete examples of the dial pulse circuit

Next, some concrete examples and operations of the dial pulse circuit 23 and detailed circuit examples of the dial pulse circuit 23 are respectively described.

1-2-1. A first example of a dial pulse circuit

Figure 3:
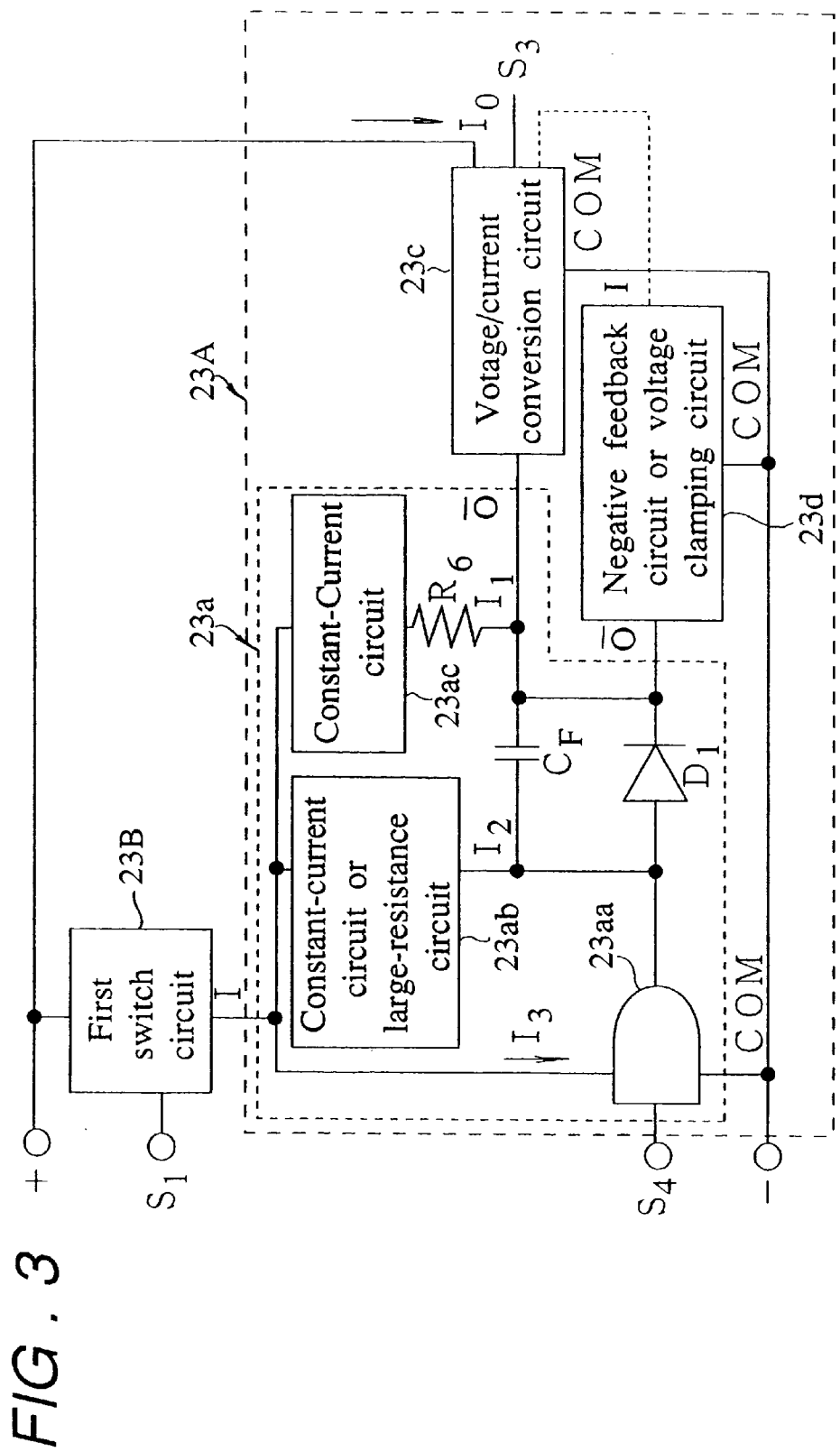
FIG. 3 shows a first example of a dial pulse circuit used in the off-hook signal and dial pulse generating circuit according to the invention.

FIG. 3 shows the first example of the dial pulse circuit. FIG. 3 shows a circuit example which operates using a negative terminal (shown with "−" in the figure, and hereinafter also referred to as the − power source terminal) of the output side of a full-wave rectifying circuit as a ground terminal and using a positive terminal (shown with "+" in the figure, and hereinafter also referred to as the + power source terminal) of the output side of the full-wave rectifying circuit as a line input terminal. It is a matter of course that the circuit can operate using the + power source terminal as a ground terminal and using the − power source terminal as a line input terminal by performing necessary changes in the polarity of a diode used in the dial pulse circuit, the current direction, and the like.

The first embodiment of the dial pulse circuit 23 is composed of a filter circuit 23a, a first switch circuit 23B performing an on/off control between the line input terminal and the input terminal of the filter circuit 23a in response to a first control signal S1, a voltage/current conversion circuit 23c which connects a common terminal (COM) to the ground (− power source terminal) terminal, connects its input terminal to the output terminal of the filter circuit 23a, connects its output terminal to the line input (+ power source terminal) terminal, and outputs an electric current according to an input voltage, and a negative feedback circuit which connects a common terminal to the − power source terminal, applies a negative feedback to the input side of the voltage/current conversion circuit 23c from the inside of the voltage/current conversion circuit 23c and operates so as to keep the output current of the voltage/current conversion circuit 23c at a certain value or less, or a voltage clamping circuit which limits the output current of the voltage/current conversion circuit 23c to a certain value or less and operates so as to keep the output current of the voltage/current conversion circuit 23c at a certain value or less (hereinafter also referred to as a negative feedback circuit or voltage clamping circuit 23d). An impedance circuit 23A is composed of the filter circuit 23a, the voltage/current conversion circuit 23c (including a resistor R3), and the negative feedback circuit or voltage clamping circuit 23d, out of these circuits. The voltage/current conversion circuit 23c outputs an electric current according to its input voltage as well as outputs a third control signal S3 for controlling the switch block circuit 25 (in detail described with reference to FIG. 4 or FIG. 38).

Furthermore, the filter circuit 23a is provided with a positive logic circuit 23aa, a constant-current or large-resistance circuit 23ab, a constant-current circuit 23ac, a resistor R6, a capacitor CF, and a diode D1.

The positive logic circuit 23aa is provided with a COM terminal connected to the ground terminal of the dial pulse circuit, a power source terminal connected to the input terminal of the filter circuit 23a, an input terminal for receiving a control signal (a fourth control signal S4 called in the present invention) from the unillustrated switch block circuit 25, and an open-collector output terminal. And in the positive logic circuit 23aa, an impedance between the power source terminal and the ground has a constant-current characteristic or a high-resistance characteristic. The constant-current or large-resistance circuit 23ab is connected between the input terminal of the filter circuit 23a and the output terminal of the positive logic circuit 23aa, and operates as a load onto the positive logic circuit 23aa. The constant-current circuit 23ac has a current input terminal connected to the input terminal of the filter circuit 23a. The resistor R6 is connected between the output terminal of the filter circuit 23a and the current output terminal of the constant-current circuit 23ac. The capacitor CF is the output terminal of the filter circuit 23a and the output terminal of the positive logic circuit 23aa. The diode D1 has its cathode connected to the output terminal of the filter circuit 23a and its anode connected to the output terminal of the positive logic circuit 23aa.

Detailed circuit configurations of the above-mentioned component circuits 23a, 23aa to 23ac, 23b, 23c, and 23d are described later, and the dial pulse circuit of the first example operates in the following manner.

A direct current as a power fed from the office side to a terminal side and an alternating current as a transmitted or received signal connecting the office side and the terminal side with each other exist as being superposed on each other on the line.

Therefore, an on/off operation of the first switch circuit 23B results in turning on/off both of the supplied power and an alternating current signal for the filter circuit 23a.

The negative feedback circuit or voltage clamping circuit 23d performs a limiting operation only in case that an electric current equal to or greater than a specified value is going to flow through the output side of the voltage/current conversion circuit 23c.

In case that the first control signal S1 from the control circuit 50 is in an off state (input is "0"), the first switch circuit 23B comes into an off state. At that time, since both the power source voltage and a signal are not supplied to the filter circuit 23a, its output comes to be a voltage of zero. As a result, the voltage/current conversion circuit 23c also outputs an output current of zero corresponding to the input voltage of zero. As a result, no current flows all over the dial pulse circuit 23 (in a waiting state).

Next, the filter circuit 23a when the first control signal S1 comes into an on state (input is "1") and the first switch circuit 23B is turned on is described in the following.

The filter circuit 23a having both of the power voltage and a signal supplied to it, starts its original operation. The constant-current or large-resistance circuit 23ab in the filter circuit 23a makes a direct current of a certain value flow through the output side of the positive logic circuit 23aa and operates as a load resistance which is a high impedance to an alternating current signal. The positive logic circuit 23aa having the power supplied comes also into an operating state.

In case that the fourth control signal S4 from the switch block circuit 25 is in an off state (input is "0"), since the output of the positive logic circuit 23aa comes to be at a low logic level "L", a connecting point between the capacitor CF and the anode of the diode D1 is short-circuited with the ground. At this time, since a reverse bias voltage is applied to the diode D1, the diode D1 comes equivalently into an open state. Accordingly, the filter circuit 23a becomes a low-pass filter composed of a capacitor CF and a series circuit of the constant-current circuit 23ac and the resistor R6.

On the other hand, in case that the fourth control signal S4 is in an on state (input is "1"), since the output of the positive logic circuit 23aa comes to be at a high logic level "H", a connecting point between the capacitor CF and the anode of the diode D1 is disconnected from the ground. Hereupon, since an electric current flowing through the constant-current or large-resistance circuit 23ab flows through the diode D1 onto the output terminal of the filter circuit 23a, the terminals of the capacitor CF are short-circuited with each other by a forward bias impedance of the diode D1.

As a result, since a series circuit of the constant-current circuit 23ac and the resistor R6, and a series circuit of the constant-current or large-resistance circuit 23ab and the diode D1 are connected in parallel between the input and output terminals of the filter circuit 23a, this filter circuit 23a comes to have a broad-band characteristic.

On the assumption that the filter circuit 23a has the two characteristics (a low-pass characteristic and a broadband characteristic), its operation as the dial pulse circuit is described.

A case is described in which the fourth control signal S4 is off (input is "1"), the filter circuit 23a has a low-pass filter characteristic, the first control signal S1 is on (input is "1"), and the first switch circuit 23B is on.

A direct current bias voltage is supplied to the input point of the voltage/current conversion circuit 23c through the constant-current circuit 23ac and the resistor R6. At this time, when the line voltage is high enough, a constant current limited by the constant-current circuit 23ac flows into the input point of the voltage/current conversion circuit 23c. In response to this, the voltage/current conversion circuit 23c attempts to let a great output current Io flow. Thereupon, the negative feedback circuit or voltage clamping circuit 23d operates so as to keep the output current Io of the voltage/current conversion circuit 23c at a certain value (an off-hook signal current). In case that the line voltage is slightly changed (is superposed with an alternating current signal) in this state, the line current is not changed thanks to said negative feedback or voltage clamping operation, and the dial pulse circuit 23 or the impedance circuit 23A comes to have a high impedance to the superposed alternating current signal.

When continuing to lower the line voltage in this state, a voltage between the terminals of the constant-current circuit 23ac is first lowered, and soon the voltage comes into a saturated operation range in which the constant-current circuit 23ac cannot keep a constant current, and the current value of the constant-current circuit 23ac begins to drop. In a line voltage range in which the negative feedback or voltage clamping circuit 23d adequately operates, the circuit operation is a little more deteriorated than the case in which the line voltage is not lowered. Fundamentally, however, the output current To of the voltage/current conversion circuit 23c is kept at a constant value (an off-hook signal current) by the operations, and the dial pulse circuit 23 or the impedance circuit 23A can keep a high impedance to the superposed alternating current signal.

When continuing to lower the line voltage further, the voltage comes into a range (cut-off range) in which the negative feedback or voltage clamping circuit 23d cannot operate. In this voltage range, the following phenomena happen.

(1) The constant-current circuit 23ac is in a short-circuited state, and a change in direct current voltage on the line appears directly as a voltage change in the input voltage to the voltage/current conversion circuit 23c, and a direct current change nearly proportioned to the line direct-current voltage occurs in the dial pulse circuit current, and a low direct-current resistance appears in an off-hook signal generation and between the dial pulse circuit terminals.

(2) On the other hand, since the resistor R6 and the capacitor CF act as a low-pass filter to an alternating voltage on the telephone line, the alternating input voltage of the voltage/current conversion circuit 23c is damped and as its frequency becomes higher, the alternating input voltage of the voltage/current conversion circuit 23c is delayed in phase by 90 degrees from the applied line voltage and becomes lower in level (in this case a pseudo-inductance appears where only a direct current flows). Accordingly, an alternating impedance between the terminals of the dial pulse circuit 23 or the impedance circuit 23A comes to be an impedance made by that a pseudo-inductance composed of the resistor R6, the capacitor CF and the voltage/current conversion circuit 23c, and an impedance obtained by including the constant-current circuit or large-resistance circuit 23ab and the power source of the positive logic circuit 23aa are connected in parallel with each other, and as a result a great impedance can be secured.

As understood from the above description, when the fourth control signal S4 is off (input is "0"), the filter circuit 23a has a low-pass filter characteristic, and when the first control signal S1 is on (input is "1") and the first switch circuit 23B is on, the dial pulse circuit 23 attains an off-hook state where a direct current is on and an alternating current impedance between the terminals is large (the dial pulse circuit 23 generates an off-hook signal).

Next, a case is described in which the fourth control signal S4 is on (input is "1"), the filter circuit 23a has a broad-band characteristic, the first control signal S1 is on (input is "1"), and the first switch circuit 23B is on.

In this case, since a series circuit of the constant-current circuit 23ac and the resistor R6 and a series circuit of the constant-current circuit or large-resistance circuit 23ab and the diode D1 are connected in parallel with each other and they are connected between the line input (+ power source terminal) terminal and the input terminal of the voltage/current conversion circuit 23c, if considering a parallel-connected constant-current circuit as a single constant-current circuit, description of a direct current corresponding to the line voltage level is nearly the same as a case of the above-mentioned off-hook signal generation and so the description is omitted.

By means of the first control signal S1 from the control circuit 50, the first switch circuit 23B can be turned on/off, and the electric current of the whole dial pulse circuit can be switched. Thereupon, when the fourth control signal S4 is on (input is "1"), the capacitor CF is short-circuited by the diode D1, and charge and discharge to hinder the switching operation do not occur, and so a quick switching operation can be performed. Accordingly, clear dial pulses can be generated.

The dial pulse circuit of this proposal, by combining together the fourth control signal S4 and the first control signal S1, can satisfy letting a direct current as an off-hook signal flow and having a high impedance to an alternating current signal at the time of an off-hook operation, and switching quickly the direct current at the time of generating dial pulses, and can generate an off-hook signal and a dial pulse signal.

Next, detailed circuit examples to realize a dial pulse circuit of the first example shown in FIG. 3 are described in the following.

Figure 4:
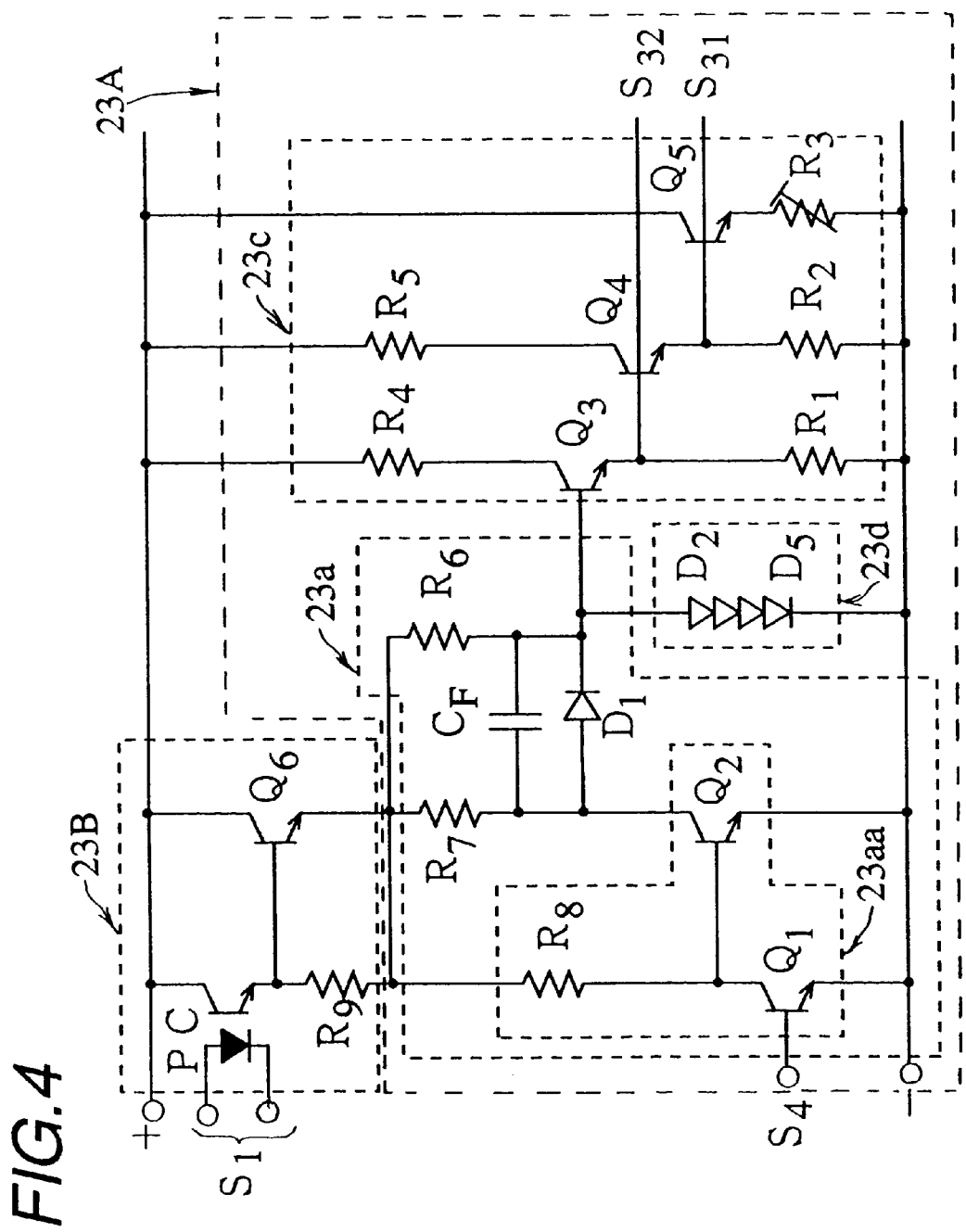
FIG. 4 shows a first detailed circuit belonging to the first example of the dial pulse circuit.

FIG. 4 shows a first detailed circuit example of a dial pulse circuit of the first example. In case of the first circuit example shown in FIG. 4, the switch circuit 23B is composed of a photocoupler PC in which its collector is connected to the + power source terminal and the first control signal S1 is inputted into its input terminal, a transistor Q6 in which its collector is connected to the + power source terminal, its base is connected to the emitter of the photocoupler, and its emitter is connected to the input terminal of the filter circuit 23a, and a resistor R9 in which its one end is connected to the base of the transistor Q6 and the other end is connected to the input terminal of the filter circuit 23a. And the voltage/current conversion circuit 23c is composed of transistors Q3, Q4 and Q5 which are Darlington-connected with one another, and resistors R1 to R5. The base of the transistor Q3 is connected to the output terminal of the filter circuit 23a. The negative feedback or voltage clamping circuit 23d is composed of a voltage clamping circuit in which diodes D2 to D5 are connected in series with one another (a Zener diode Dz may be used instead of a series of diodes).

The positive logic circuit 23aa of the filter circuit 23a is composed of a transistor Q1 in which the fourth control signal S4 is inputted to its base and its emitter is connected to the power source terminal, a transistor Q2 in which its base is connected to the collector of the transistor Q1 and its emitter is connected to the power source terminal, and a resistor R8 connected between the collector of the transistor Q1 and the input terminal of the filter circuit 23a. That is to say, the positive logic circuit 23aa is composed of NOT circuits of two stages. The constant-current circuit or large-resistance circuit 23ab is composed of a resistor R7, and a resistor R6 which is one component of a low-pass filter acts also as the constant-current circuit 23ac. As a concrete circuit example in case of providing separately the constant-current circuit 23ac, a constant-current circuit 23af composed of transistors Q9 to Q12 and a resistor R7, for example, shown in FIG. 12 can be mentioned.

Signals S31 and S32 in the dial pulse circuit shown in FIG. 4 are respectively equivalent to a third control signal S3 called in the present invention (the same also in the dial pulse circuits in the following other examples). Any of the signals S31 and S32 is a third control signal S3 outputted in the form of voltage. And the signals S31 and the S32 are signals of voltage output different in level from each other. These signals respectively are properly used according to the circuit type of a switch block circuit 25 (described later).

Figure 5:
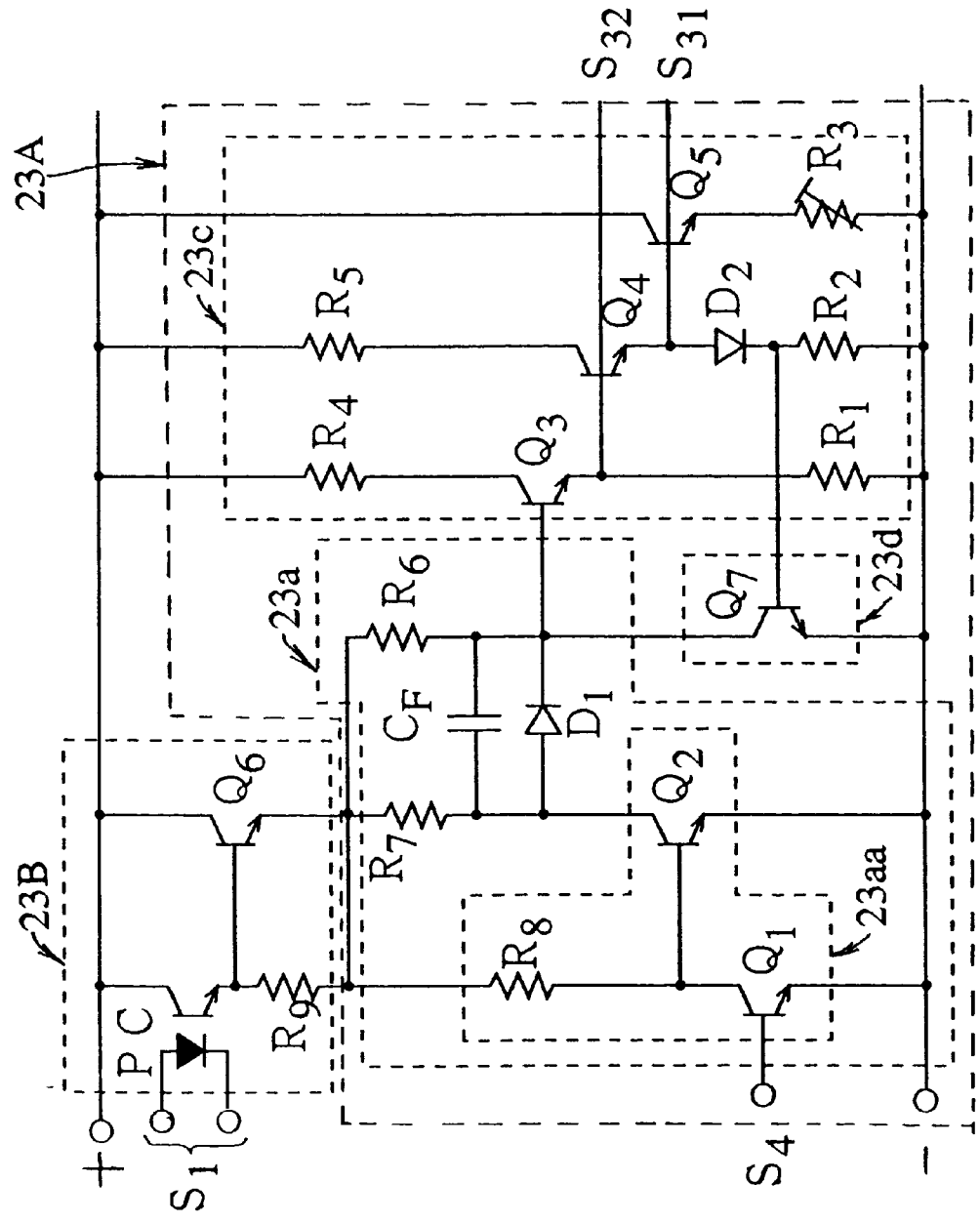
FIG. 5 shows a second detailed circuit belonging to the first example of the dial pulse circuit.

FIG. 5 shows a second detailed circuit belonging to the first example of the dial pulse circuit. In case of the circuit shown in FIG. 5, the voltage/current conversion circuit 23c is composed of transistors Q3, Q4 and Q5 which are Darlington-connected with one another, resistors R1 to R5, and a diode D2 in which its anode is connected to the emitter of the transistor Q4 and its cathode is connected to the resistor R2. And the negative feedback or voltage clamping circuit 23d is composed of a negative feedback circuit composed of a transistor Q7. Except those, this dial pulse circuit is composed in the same way as the circuit shown in FIG. 4.

1-2-2. A second example of the dial pulse circuit

Figure 6:
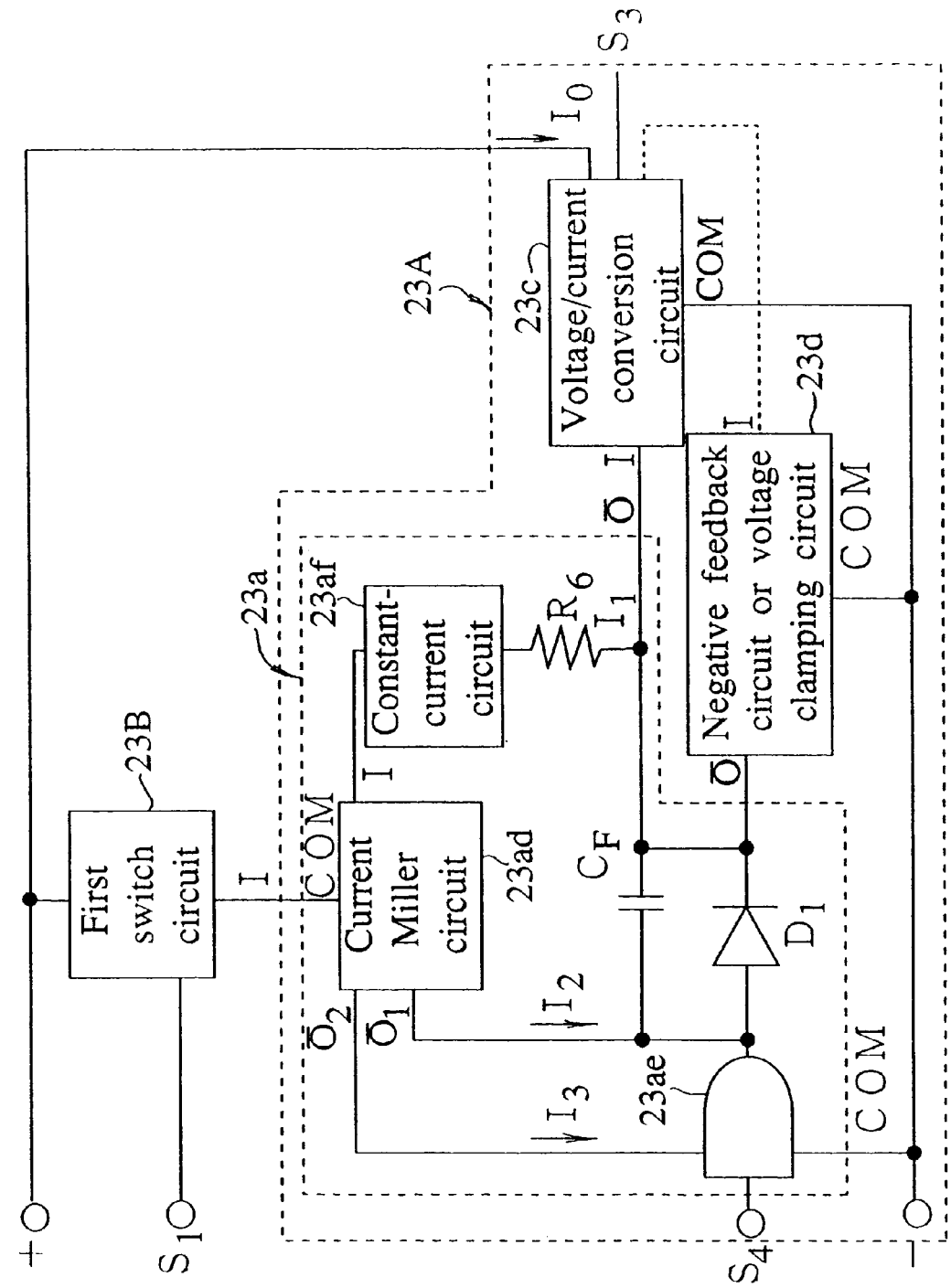
FIG. 6 shows a first circuit belonging to a second example of the dial pulse circuit.

FIG. 6 shows a circuit configuration example (a first circuit example) belonging to a second example of the dial pulse circuit. The second example of the dial pulse circuit is different in configuration of the filter circuit 23a from the first example (FIG. 3).

The filter circuit 23a in this case is composed of a current Miller circuit 23ad which has a common terminal (COM) connected to the input terminal of the filter circuit 23a, and has an input terminal, a first current output terminal and a second current output terminal, a positive logic circuit 23ae which has an input terminal to receive the fourth control signal S4 from the switch block circuit 25 and a ground terminal connected to the ground of the dial pulse circuit and which is composed of two stages of NOT circuits using the first and the second current output of the current Miller circuit 23ad as loads onto the first and the second stage NOT circuit, a constant-current circuit 23af whose current input terminal is connected to the input terminal of the current Miller circuit 23ad, a resistor R6 connected between the output terminal of the filter circuit 23a and the current output terminal of the constant-current circuit 23af, a capacitor CF connected between the output terminal of the filter circuit 23a and the output terminal of the positive logic circuit 23ae, and a diode D1 in which its cathode is connected to the output terminal of the filter circuit 23a and its anode is connected to the output terminal of the positive logic circuit 23ae.

The second example of the dial pulse circuit shown in FIG. 6, after all, can be said to be a circuit obtained by changing configuration of the dial pulse circuit of the above-mentioned first example (FIG. 3) in the following manner. In the dial pulse circuit of the first example shown in FIG. 3, it is thought that the positive logic circuit 23aa in the filter circuit 23a uses a constant-current circuit as the first stage load and is composed of NOT circuits of two stages. Thinking together the constant-current or high-resistance circuit 23ab and the constant-current circuit 23ac, there are three constant-current circuits for turning on/off the power source in the first example of the dial pulse circuit. A circuit configuration in which any one circuit portion of these three constant-current circuits is connected to the input terminal of the current Miller circuit 23ad as a reference constant-current circuit and the other two circuit portions use the output of the current Miller circuit is equivalent to the three constant-current circuits. Thereupon, in the example shown in FIG. 6, the dial pulse circuit of the second example shown in FIG. 6 has been composed by that the constant-current circuit 23af (the constant-current circuit 23ac in the example of FIG. 3) is connected to the input side of the current Miller circuit 23ad as a reference constant-current circuit and another constant-current circuit is realized by using the output of the current Miller circuit 23ad.

Figure 7:
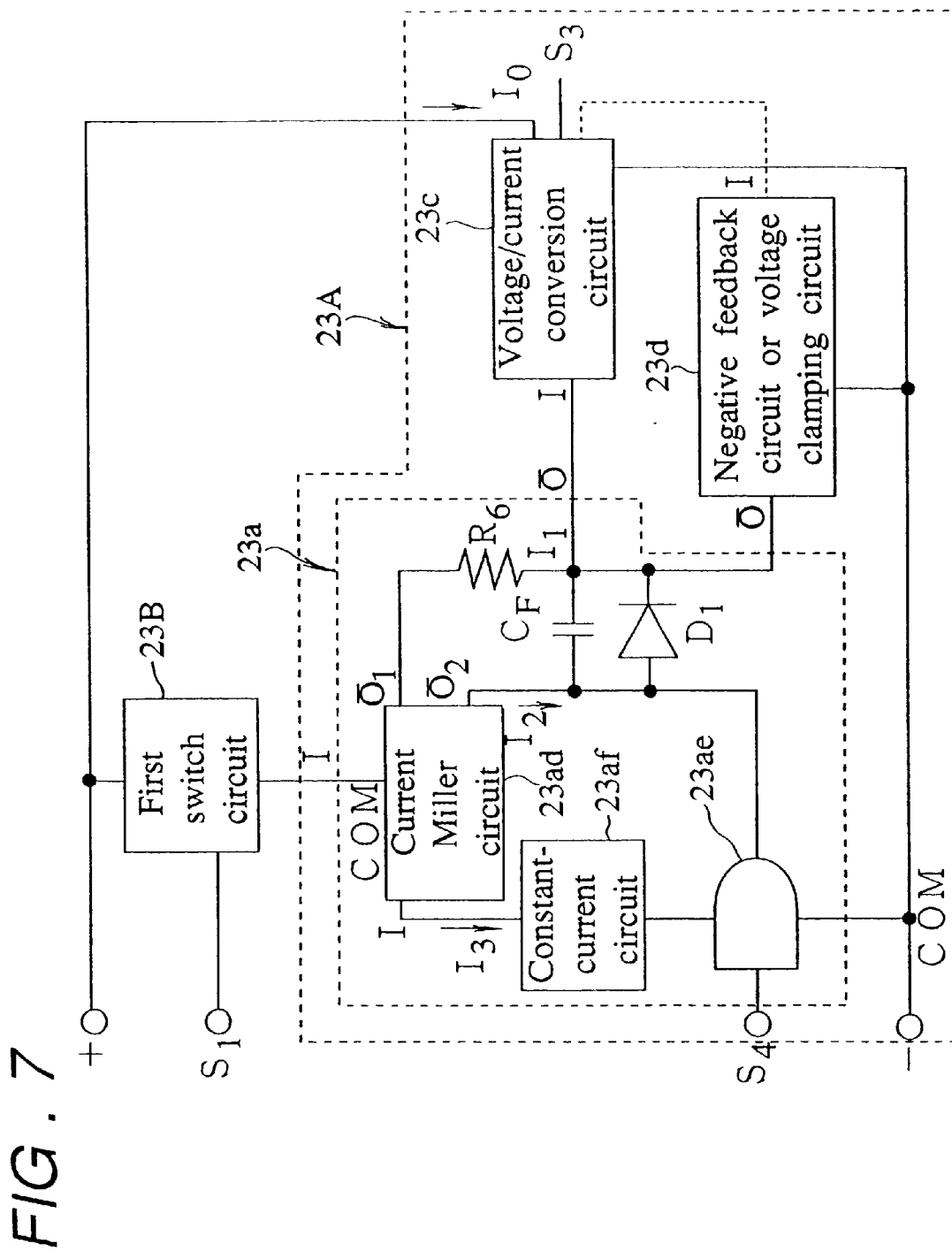
FIG. 7 shows a second circuit belonging to the second example of the dial pulse circuit.

FIG. 7 shows another circuit configuration example (a second circuit example) of the second example of a dial pulse circuit. The circuit shown in FIG. 7 is a circuit example which uses the constant-current circuit 23af shown in FIG. 6 as the first stage load of the positive logic circuit 23ae and connects the positive logic circuit 23ae to the input terminal of the current Miller circuit 23ad as a reference current, and realizes another constant-current portion by means of the output terminal of the current Miller circuit 23ad. Additionally, it is possible also to use the constant-current circuit 23af as the output load (the second stage load) of the positive logic circuit 23ae and connect the constant-current circuit 23af to the input terminal of the current Miller circuit 23ad as a reference constant current, and use the output of the current Miller circuit 23ad as another constant-current portion.

This dial pulse circuit of the second example can be composed of components less in number than the dial pulse circuit of the first example (FIG. 3) by using a current Miller circuit.

These dial pulse circuits of the second example operate in the same way as the circuit of the first example since they are only different in constant-current circuit portions from the circuit of the first example (FIG. 3). Therefore, description of operation of the dial pulse circuits of the second example is omitted.

Next, detailed circuit configuration examples of the first circuit example of a dial pulse circuit of the second example are respectively shown in FIGS. 8 to 11.

Figure 8:
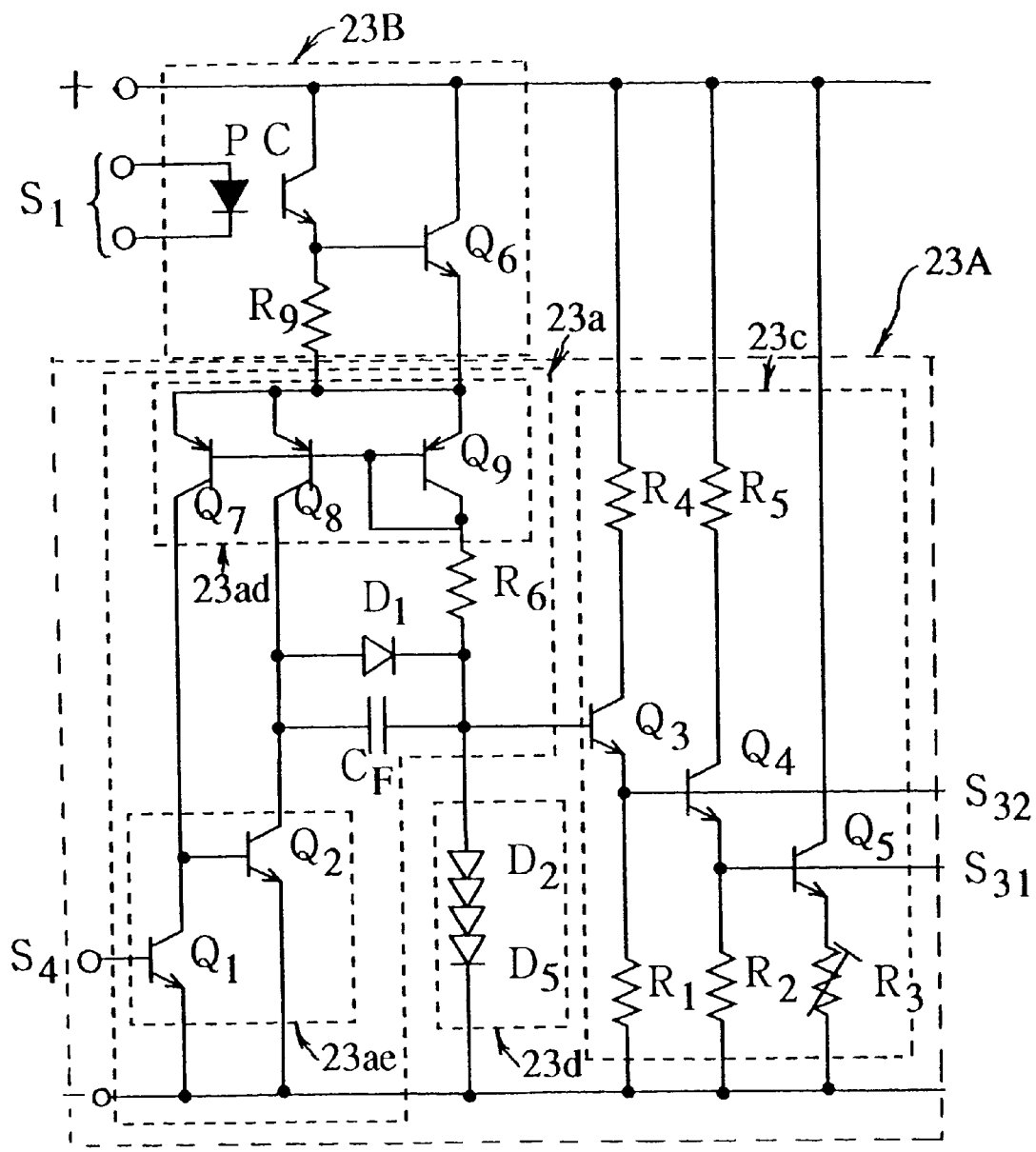
FIG. 8 shows a first detailed circuit belonging to the first circuit example of the second example of the dial pulse circuit.
Figure 9:
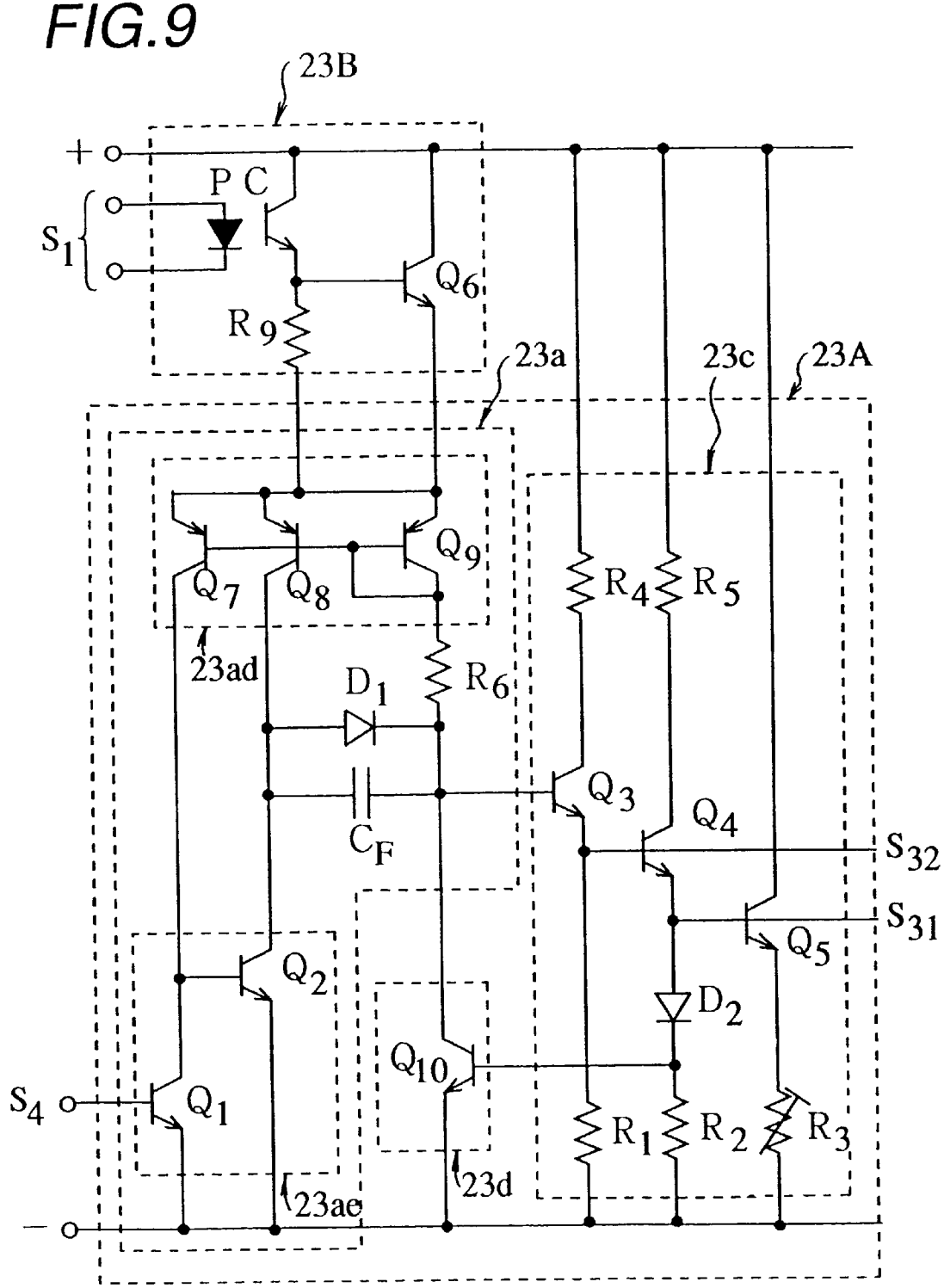
FIG. 9 shows a second detailed circuit belonging to the first circuit example of the second example of the dial pulse circuit.

A first and a second detailed circuit respectively shown in FIGS. 8 and 9 are circuit examples in which the current Miller circuit 23ad is composed of transistors Q7 to Q9, and R6 is a high resistance and acts also as the constant-current circuit 23af. Except those, the circuit shown in FIG. 8 is composed in the same way as FIG. 4, and the circuit shown in FIG. 9 is composed in the same way as FIG. 5.

Figure 10:
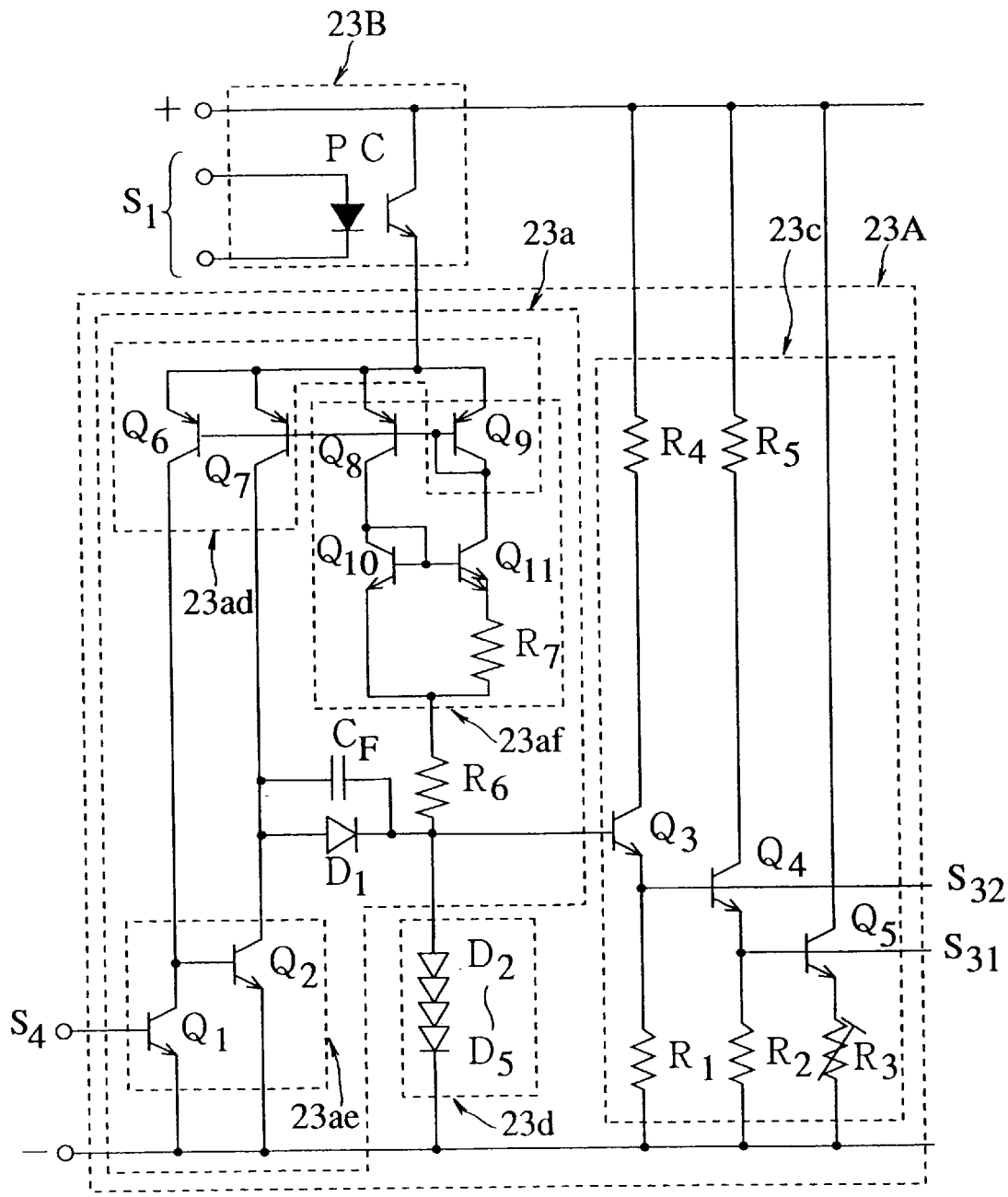
FIG. 10 shows a third detailed circuit belonging to the first circuit example of the second example of the dial pulse circuit.
Figure 11:
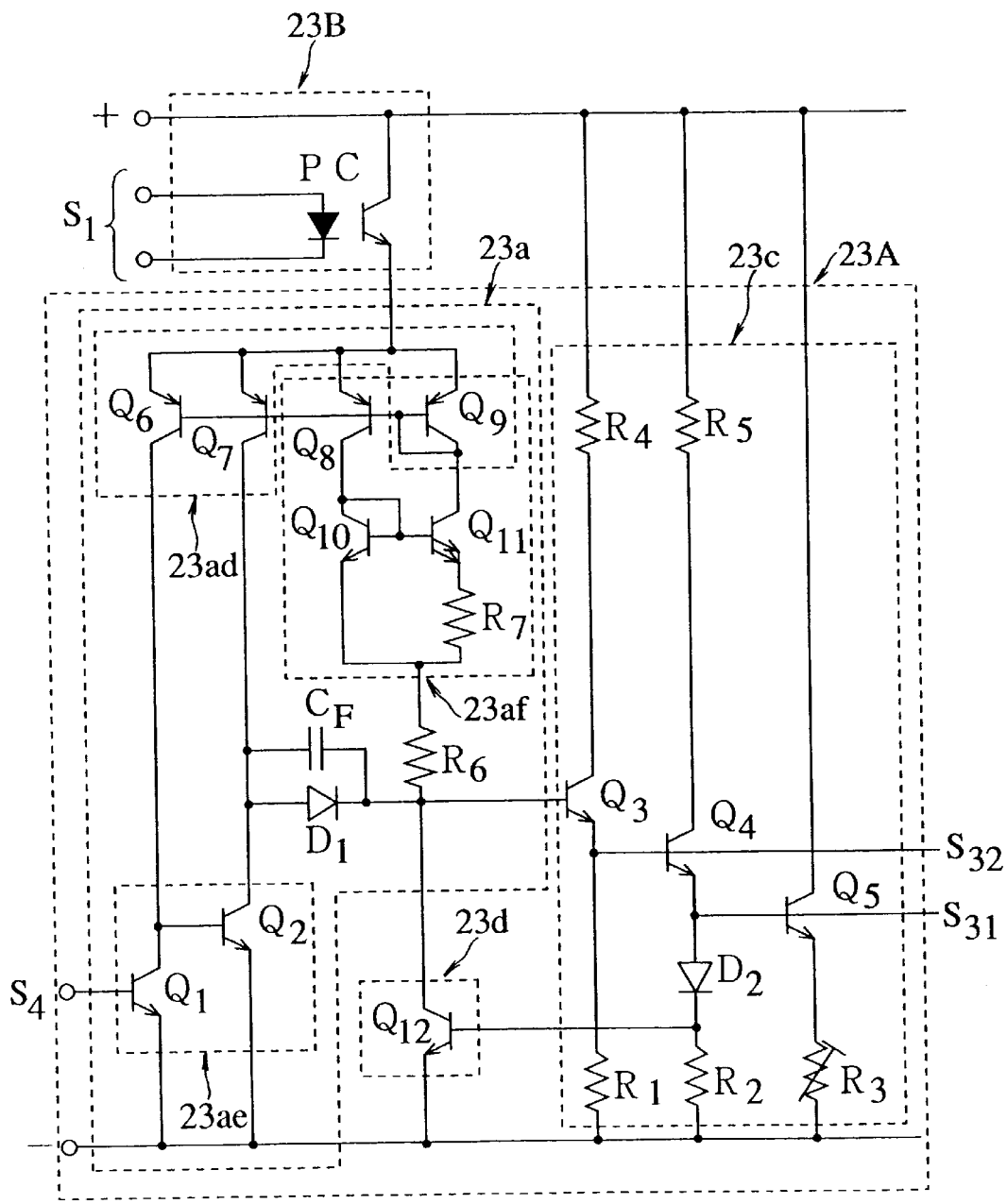
FIG. 11 shows a fourth detailed circuit belonging to the first circuit example of the second example of the dial pulse circuit.

A third and a fourth detailed circuit respectively shown in FIGS. 10 and 11 are circuit examples in which the current Miller circuit 23ad is composed of transistors Q6, Q7 and Q9, and the constant-current circuit 23af is composed of a resistor R7 and transistors Q8 to Q11. Except those, fundamentally the circuit shown in FIG. 10 is composed in the same way as FIG. 4, and the circuit shown in FIG. 11 is composed in the same way as FIG. 5.

Detailed circuit examples of the second circuit example of the dial pulse circuit of the second example described with reference to FIG. 7 are respectively shown in FIGS. 12 and 13.

Figure 12:
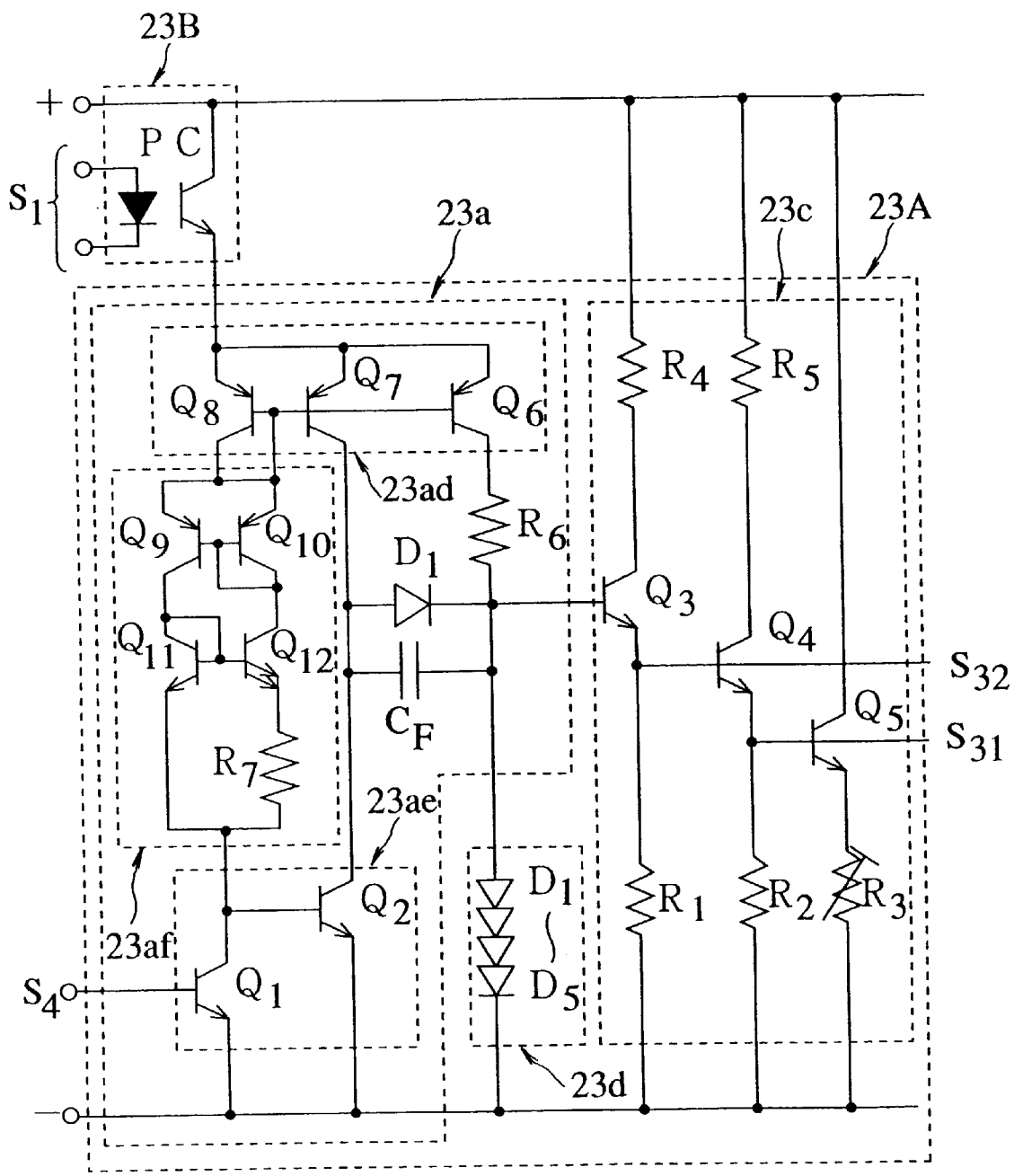
FIG. 12 shows a first detailed circuit belonging to the second circuit example of the second example of the dial pulse circuit.
Figure 13:
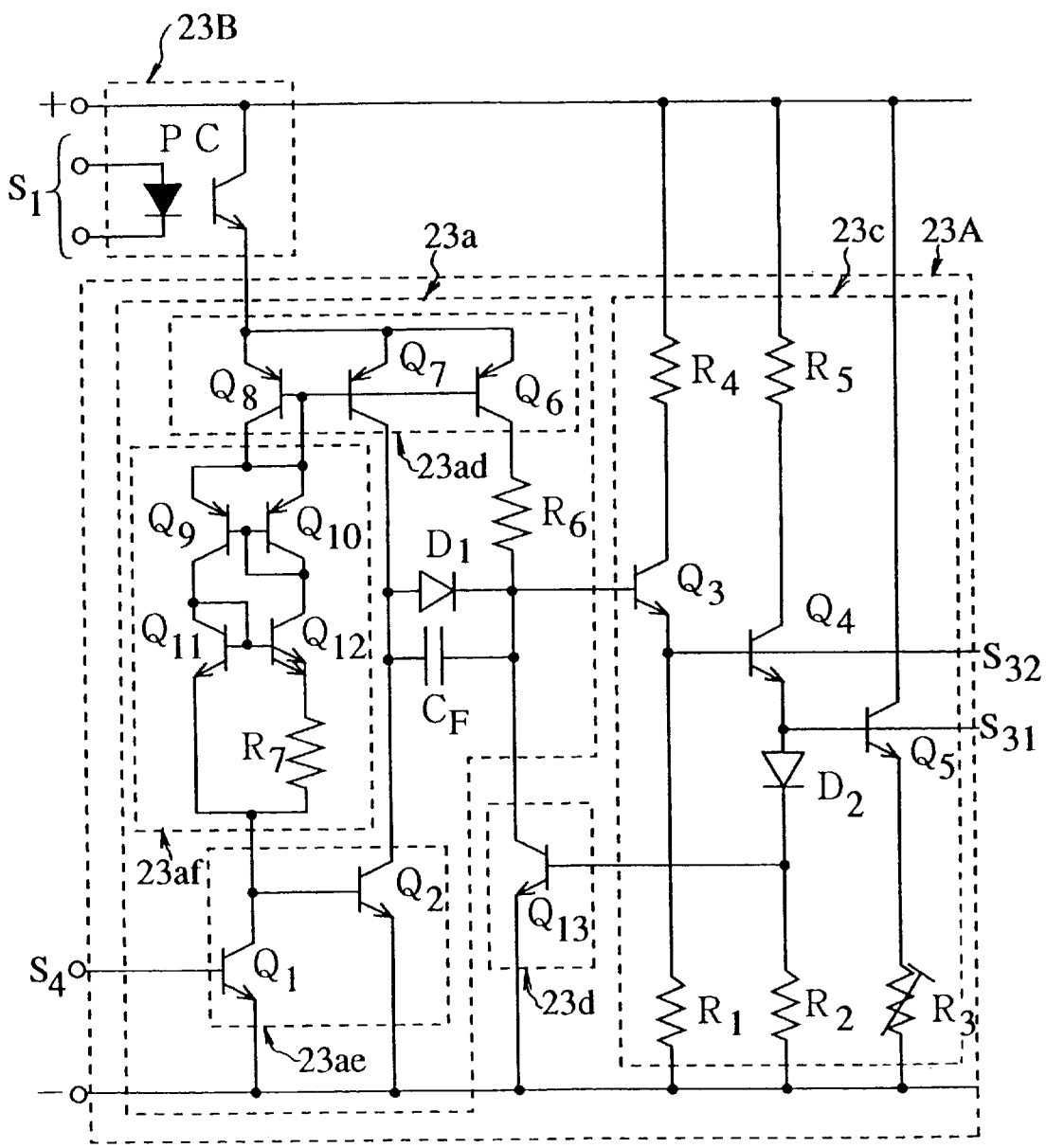
FIG. 13 shows a second detailed circuit belonging to the second circuit example of the second example of the dial pulse circuit.

A first and a second detailed circuit respectively shown in FIGS. 12 and 13 are circuit examples in which the current Miller circuit 23ad is composed of transistors Q6 to Q8, and the constant-current circuit 23af as the first stage load of the positive logic circuit 23ae is composed of a resistor R7 and transistors Q9 to Q12. Except those, fundamentally the circuit shown in FIG. 12 is composed in the same way as FIG. 4, and the circuit shown in FIG. 13 is composed in the same way as FIG. 5.

In the respective circuit examples of FIGS. 10 to 13, since the reference constant-current circuit 23af (for which a high resistance can be substituted in practice) is incorporated without being omitted and an electric current to flow through the first switch circuit 23b does not increase even when the line voltage becomes high (a constant current is secured), a buffer transistor (transistor Q6 shown in FIGS. 4, 5, 8 and 9) of the first switch circuit 23b is not necessary and can be removed.

1-2-3. A third example of the dial pulse circuit

Figure 14:
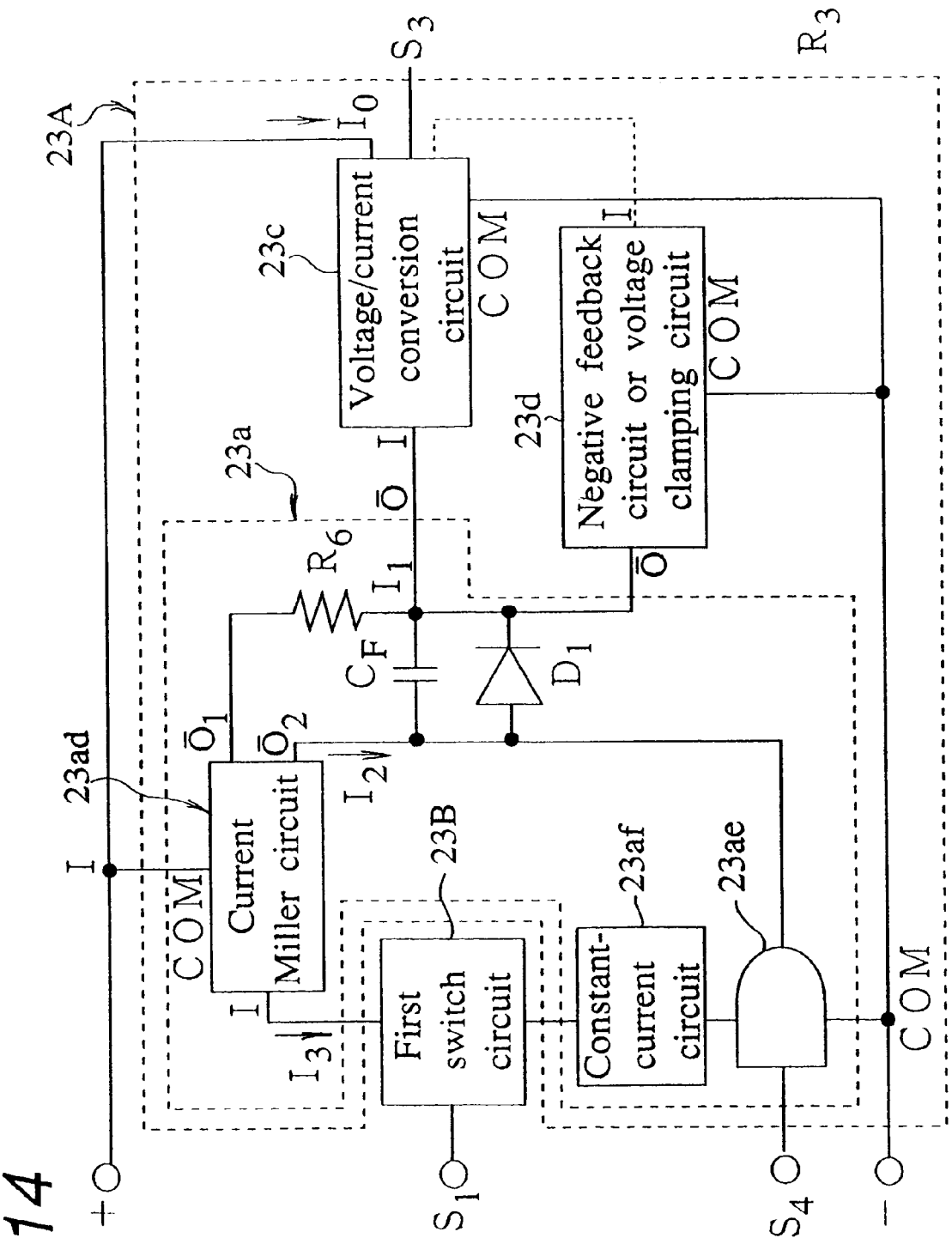
FIG. 14 shows a third example of the dial pulse circuit.

FIG. 14 shows a third example of a dial pulse circuit. This dial pulse circuit is an circuit example which a concept of the third example is applied to and which operates using the − power source terminal as a ground terminal and the + power source terminal as a line input terminal. By reversing the diode polarity, the current direction and the like, this dial pulse circuit can be also operated using the + power source terminal as a ground terminal.

In the dial pulse circuits of the second example, an electric current to flow through the common terminal (COM) of the current Miller circuit 23ad is turned on/off. However, the current Miller circuit can be also operated so as to perform on/off-control of the current flowing through the output terminal and the common terminal (COM) by turning on/off the current of the input terminal. And by doing so, the whole current can be turned on/off by turning on/off a smaller current and a switch system (the first switch circuit 23B in this case) can be made smaller in size. Thereupon, in the dial pulse circuit of the third example, the first switch circuit 23B is provided at an optional position which is in a circuit system connected to the input terminal of the current Miller circuit 23ad and at which an electric current to be inputted to the input terminal can be turned on/off. Details are described in the following.

The dial pulse circuit of the third example shown in FIG. 14 is composed of a filter circuit 23a connecting its input terminal to the + power source terminal, a first switch circuit 23B which receives the first control signal S1 from an unillustrated control circuit and turns on/off between the input of a current Miller circuit 23ad in the filter circuit 23a and a constant-current circuit 23af as the first stage load of a positive logic circuit 23ae in the filter circuit 23a, a voltage/current conversion circuit 23c already described, and a negative feedback circuit or voltage clamping circuit 23d already described. In the circuit example shown in FIG. 14, the first switch circuit 23B is provided between the current Miller circuit 23ad and the constant-current circuit 23af, and alternatively, the first switch circuit 23B may be provided between the current output terminal of the constant-current circuit 23af and the first stage load connecting terminal of the positive logic circuit 23ae (see FIG. 16). And the concept of the third example may be applied to the circuit shown in FIG. 6. That is to say, although the first switch circuit 23B is provided between the + power source terminal and the input terminal of the filter circuit 23a in FIG. 6, the + power source terminal and the input terminal of the filter circuit 23a may be connected directly with each other and the first switch circuit 23B may be provided between the current Miller circuit 23ad and the constant-current circuit 23af or between the constant-current circuit 23af and the resistor R6, or between the resistor R6 and the output terminal of the filter circuit 23a.

Since the dial pulse circuit of the third example is different in a driving point for turning on/off an electric current from the dial pulse circuits of the second embodiment, its operation itself is the same as the second circuit example. Hereupon, description of its operation is omitted.

Figure 15:
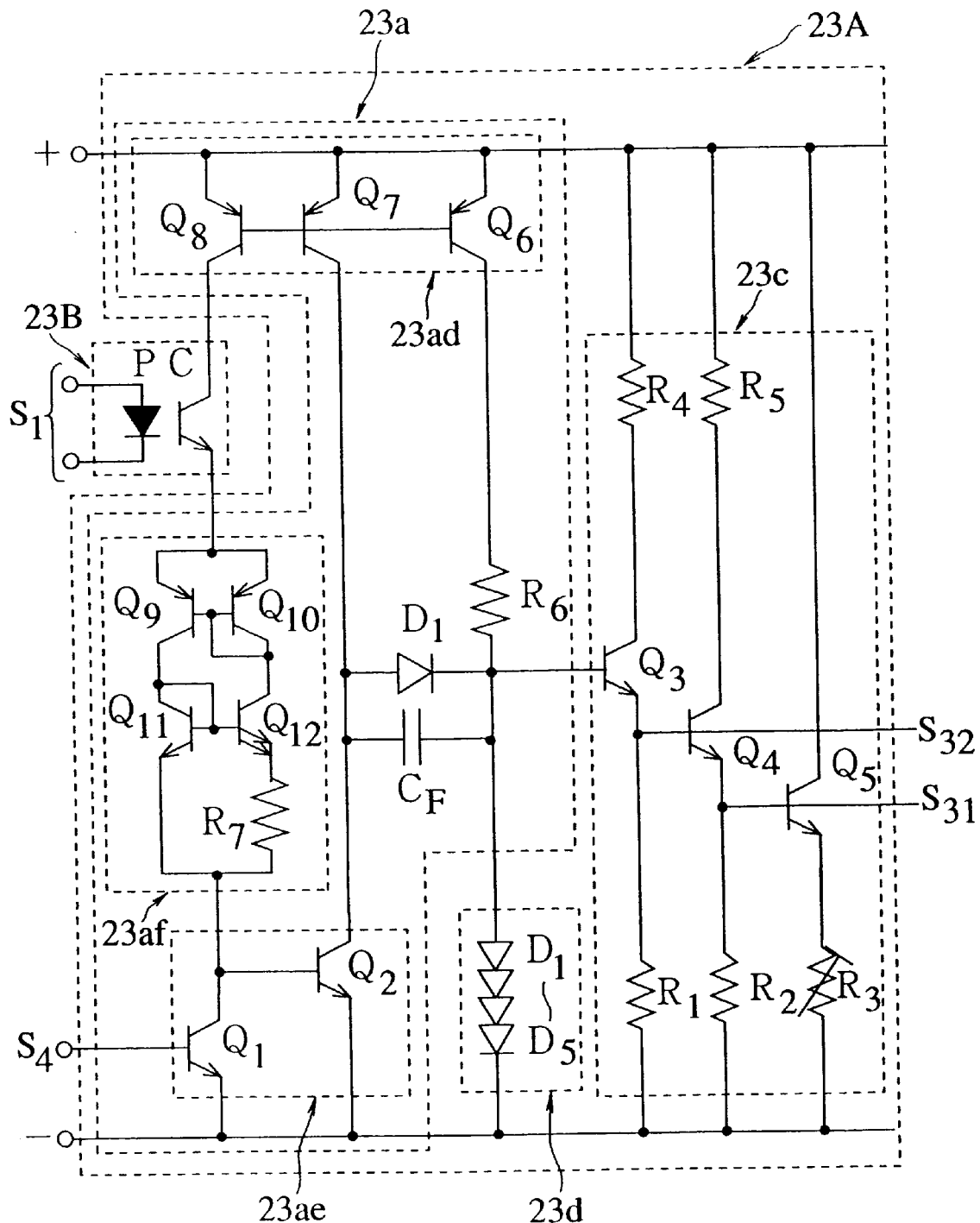
FIG. 15 shows a first detailed circuit belonging to the third example of the dial pulse circuit.
Figure 16:
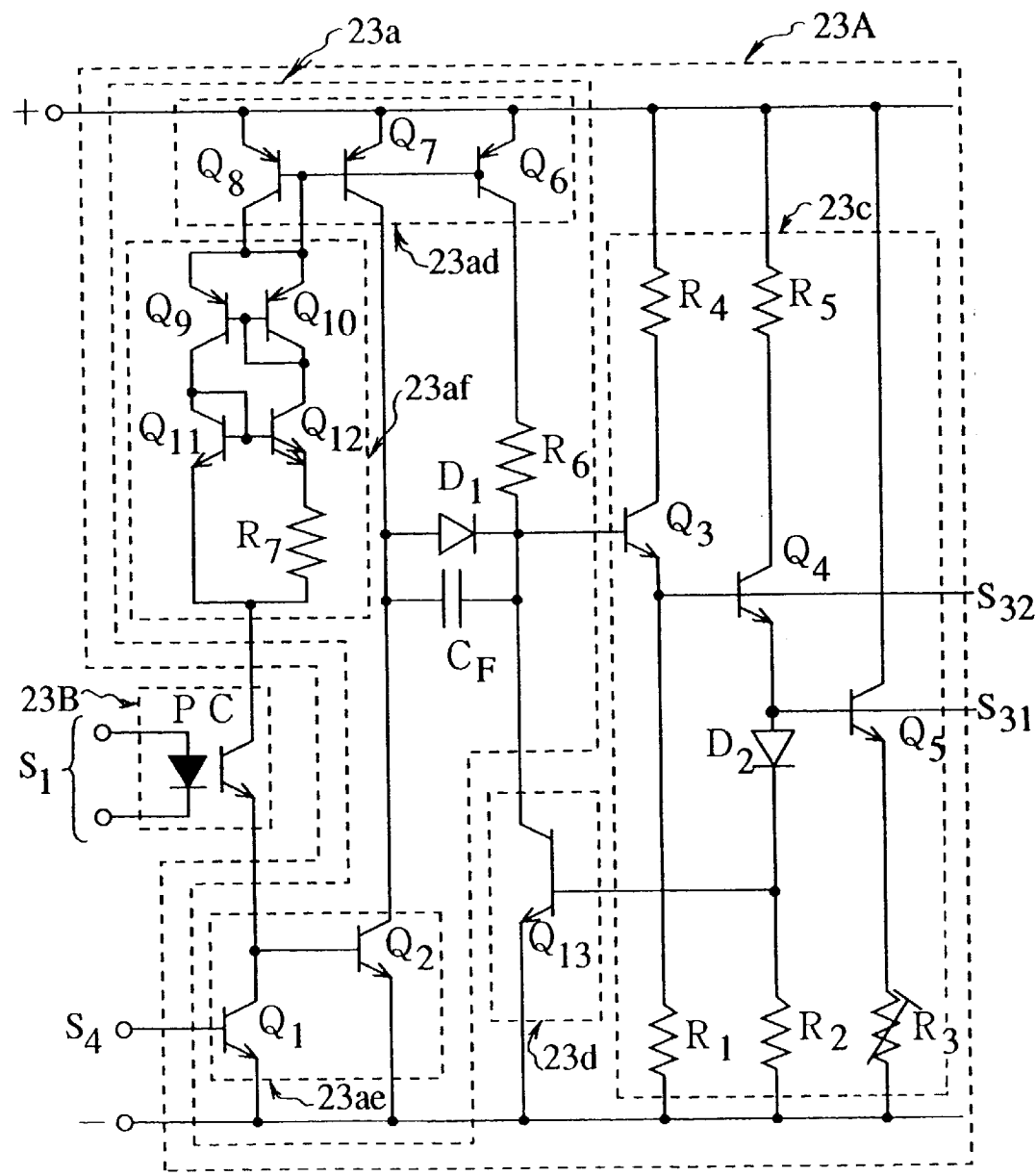
FIG. 16 shows a second detailed circuit belonging to the third example of the dial pulse circuit.

A first and a second detailed circuit belonging to the third example of the dial pulse circuit are respectively shown in FIGS. 15 and 16. In comparison with the circuit example of FIG. 12, the circuit example shown in FIG. 15 has changed the position of the photocoupler PC as the first switch circuit 23b to a position between the current Miller-circuit 23ad and the constant-current circuit 23af, and had changed so as to connect the common terminal of the current Miller circuit 23ad with the + power source terminal. In comparison with the circuit example shown in FIG. 13, the circuit example shown in FIG. 16 has changed the position of the photo-coupler PC as the first switch circuit 23b to a position between the constant-current circuit 23*af* and the transistor Q1 of the positive logic circuit 23*ae*, and had changed so as to connect the common terminal of the current Miller circuit 23*ad* with the + power source terminal.

According to the dial pulse circuit belonging to the third example, since the first switch circuit 23*b* does with an operating current less than the circuit examples of the second example, the first switch circuit 23*b* can be made smaller to that extent.

1-2-4. A fourth embodiment of the dial pulse circuit

As understood from description of the above-mentioned first to third examples, the dial pulse circuit 23 of the first example is a circuit capable of changing the characteristics of a filter circuit 23*a* by making the ground side terminal of the capacitor CF in the filter circuit 23*a* built in it be connected to the ground or be neutral.

That is to say, this dial pulse circuit 23 can make the filter circuit 23*a* come into an inductive state by connecting the ground side terminal of the capacitor CF to the ground and can make the filter circuit 23*a* come into a non-inductive state by bringing the ground side terminal into a neutral state.

Furthermore, this dial pulse circuit 23 brings the filter circuit 23*a* into an inductive state when a communication terminal is in an off-hook state, and brings the filter circuit 23*a* into a non-inductive state when a communication terminal generates dial pulses.

Therefore, in case that a communication terminal generates dial pulses, this dial pulse circuit 23 brings the filter circuit 23*a* into a non-inductive state by changing over of the state of the ground side terminal of the capacitor CF from a grounded state to a neutral state. And then it turns off/on the first switch circuit 23B at a number of times corresponding to a dial number.

In the above-mentioned first to third dial pulse circuits, however, even when it is thought to have changed over the state of the ground side terminal of the capacitor CF from a grounded state to a neutral state, if the dial pulse circuits perform a dial pulse generating operation (namely, an on/off operation of the first switch circuit 23B) before the electric charge which has been charged up in the capacitor CF is completely discharged, a period of time in which the electric potential of the ground side terminal of the capacitor CF comes to be equal to or lower than the ground potential is made by a voltage generated by some electric charge (residual charge) remaining in the capacitor CF.

In general, the potential equal to or lower than the ground potential does not save the off-state output of a positive logic circuit formed by semiconductor devices. This means that the voltage across the capacitor CF will be clamped based on a lower potential equal to or lower than the ground potential. Thus, an input voltage to the voltage/current conversion circuit 23*c* will be clamped to a positive voltage and accordingly will not reach the ground potential. The resultant residual out current from the circuit 23*c* will output undesirable dial pulses.

Hereupon, the fourth example of the dial pulse circuit adds a discharge circuit to the capacitor CF in series with it, as described in the following.

Figure 17A:
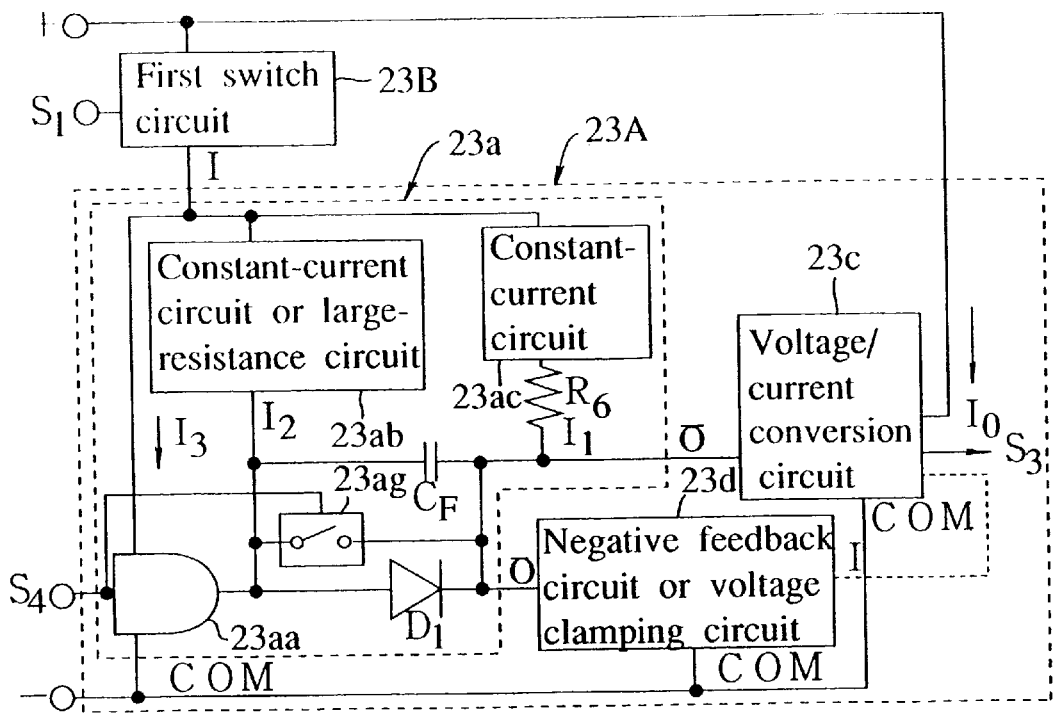
FIGS. 17(A)–17(C), shows a fourth example of the dial pulse circuit.

FIG. 17(A) shows a composition example belonging to the fourth example of the dial pulse circuit. This is just a figure where a discharge circuit 23*ag* which is a feature of the fourth embodiment has been added to the dial pulse circuit explained with reference to FIG. 3.

This discharge circuit 23*ag* operates so as to discharge electric charge of the capacitor CF when the fourth control signal S4 is brought into an on state (high-level state).

So long as the discharge circuit 23*ag* operates in such a way as this, its circuit composition is not limited in particular. Although not illustrated, for example, a circuit provided with a switch element of a normally-off type which is turned on when the fourth control signal S4 comes into a high-level state and a discharge resistor means connected in series with this element can be mentioned as a composition example of the discharge circuit 23*ag*.

Figure 17B:
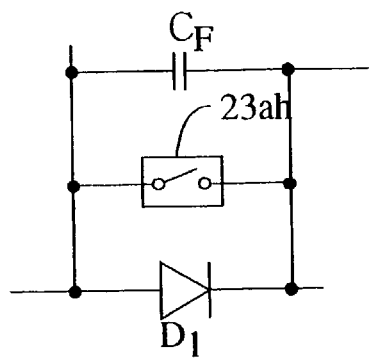

FIG. 17(B) shows an example of another discharge circuit 23*ah*. This discharge circuit 23*ah* comes into a conduction state when the electric potential of the ground side terminal of the capacitor CF comes to be lower by a set potential difference or more in comparison with the ground potential of the filter circuit 23*a*, regardless of an input state of the fourth control signal S4.

Figure 17C:
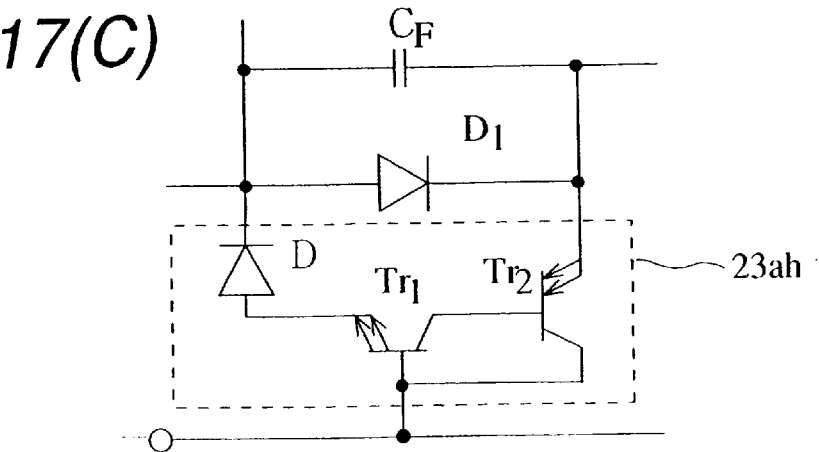

FIG. 17(C) shows a concrete circuit example of the discharge circuit 23*ah*. The discharge circuit 23*ah* shown in FIG. 17(C) is provided with a diode D, an NPN transistor Tr1, and a PNP transistor Tr2.

The diode D and the transistors Tr1 and Tr2 are connected in the following. The cathode of the diode D is connected to the ground side terminal of the capacitor CF and the anode of it is connected to the emitter of the NPN transistor Tr1. The collector of the NPN transistor Tr1 is connected to the base of the PNP transistor Tr2. The emitter of the PNP transistor Tr2 is connected to the other terminal (the terminal opposite to the ground side terminal) of the capacitor CF. The base of the NPN transistor Tr1 and the collector of the PNP transistor Tr2 are respectively connected to the ground (the line to which a "−" sign is given in FIG. 17(C)) of the filter circuit 23*a*.

This discharge circuit 23*ah* comes into an on state and discharges electric charge of the capacitor CF when the electric potential of the ground side terminal of the capacitor CF comes to be lower by a voltage higher than a forward voltage between the diode D and a diode formed between the base and the emitter of the NPN transistor Tr1 in comparison with the ground potential of the filter circuit 23*a*.

This dial pulse circuit of the fourth embodiment rapidly discharges residual charge of the capacitor CF through the discharge circuit 23*ag* or 23*ah* when the ground side terminal of the capacitor CF is brought into a neutral state. Accordingly, since an influence of residual charge of the capacitor CF can be removed when generating dial pulses, it can be prevented to generate erroneous dial pulses.

Although, in the fourth example, an example in which the discharge circuit 23*ag* or 23*ah* is added to the dial pulse circuit of FIG. 3 has been explained, the idea of adding a discharge circuit can be applied also in the same way, respectively, to the dial pulse circuit of the second example described with reference to FIGS. 6 and 7, and the dial pulse circuit of the third example described with reference to FIG. 14.

1-2-5. A fifth example of the dial pulse circuit

Since the above-mentioned dial pulse circuit of the fourth example is provided with a discharge circuit, it can first discharge residual charge of the capacitor CF when generating dial pulses. Therefore, it can reduce the risk of generating erroneous dial pulses.

Hereupon, after the dial pulse circuit has finished generating dial pulses, a voltage across the capacitor CF is near to 0 V. Therefore, in case that the dial pulse circuit forms a speakable state by connecting the ground side terminal of the capacitor CF to the ground of the filter circuit 23*a* after it has finished generating dial pulses, if no measure is taken, the input voltage of the voltage/current conversion circuit 23*c* is low until a certain degree of electric charge is charged up into the capacitor CF. When the input voltage is low in such a way, a period of time in which the output current of the voltage/current conversion circuit 23c does not have a current value corresponding to an off-hook state but has an electric current value corresponding to an on-hook state appears. When the period of time in which the output current of the voltage/current conversion circuit 23c has an electric current value corresponding to an on-hook state is long, the switching system judges the state to be a communication interrupt and disconnects the line connection. Thereupon, in spite of hoping to speak, the speaking cannot be performed.

In order to avoid this problem, by shortening the charging time of the capacitor CF, it is good not to substantially form the above-mentioned on-hook state or it is good to shorten the time during which the above-mentioned on-hook state is formed to a degree where the switching system does not judge the state to be a communication interrupt.

Figure 18A:
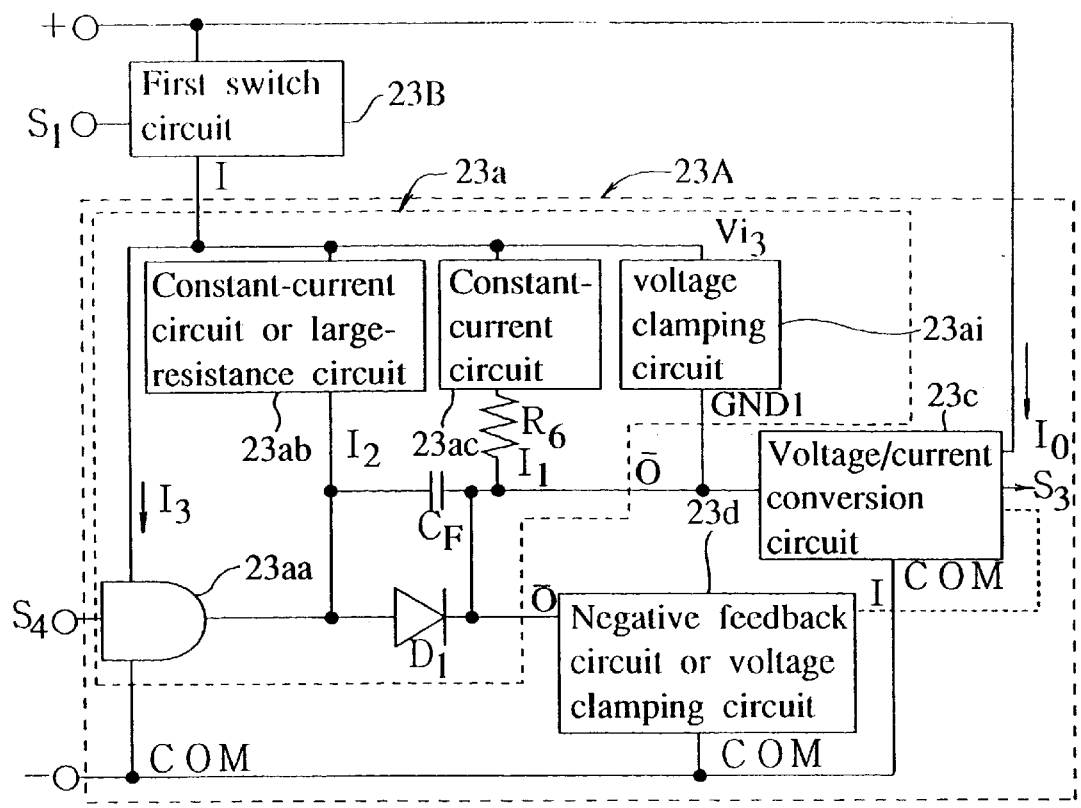
FIGS. 18(A) and 18(B), shows a fifth example of the dial pulse circuit.

Thereupon, as shown in FIG. 18(A), a dial pulse circuit of the fifth example is provided with a voltage clamping circuit 23ai which is a voltage clamping circuit of a two-terminal type having an input terminal Vi3 and a ground terminal GND1 and which forms a conduction state between the input terminal and the ground terminal and clamps the voltage between these terminals to a set voltage when a voltage between the input terminal and the ground terminal comes to be equal to or higher than the set voltage.

This voltage clamping circuit 23ai connects its input terminal Vi3 to a voltage input terminal I of the filter circuit 23a and connects its ground terminal GND1 to an input terminal of the voltage/current conversion circuit 23c.

The above-mentioned set voltage of the voltage clamping circuit 23ai is set at a voltage where the voltage clamping circuit 23ai does not come into a conduction state at the time of communication using such an alternating current signal as a speech signal, a MODEM signal, or the like.

Figure 18B:
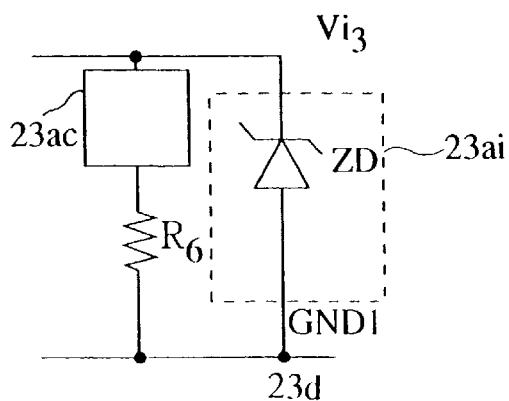

The voltage clamping circuit 23ai can be composed of a Zener diode ZD, for example. In this case, as shown in FIG. 18(B), the cathode of the Zener diode ZD is connected to the voltage input terminal I of the filter circuit 23a, and the anode of it is connected to the input terminal of the voltage/current conversion circuit 23c.

Next, operation of the dial pulse circuit shown in FIG. 18 mainly in relation to the voltage clamping circuit 23ai is described in the following.

When the fourth control signal S4 is brought into a low level from a high level as keeping the first switch circuit 23B in an on state (a state where an off-hook current flows) (when the ground side terminal of the capacitor CF is brought into a grounded state from a neutral state), a charging current flows into the capacitor CF.

During the charging, since the input voltage of the voltage/current conversion circuit 23c is low, the output current I0 of the voltage/current conversion circuit 23c has a low value. When the current I0 is lowered in such a way, since the line voltage rises, the electric potential of the voltage input terminal I of the filter circuit 23a (accordingly, the input terminal Vi3 of the voltage clamping circuit 23ai) rises. On the other hand, rising of the electric potential of the ground terminal GND1 of the voltage clamping circuit 23ai is suppressed by the capacitor CF. Thanks to these, a voltage between the terminals of the voltage clamping circuit 23ai, namely, a voltage between the input terminal Vi3 and the ground terminal GND1 rises. And when the inter-terminal voltage of the voltage clamping circuit 23ai comes to be equal to or higher than a set voltage set in advance, the voltage clamping circuit 23ai comes into a conduction state. Furthermore, the voltage clamping circuit 23ai clamps a voltage between the input/output terminals of the filter circuit 23a to this set voltage.

While the inter-terminal voltage of the voltage clamping circuit 23ai is equal to or higher than the above-mentioned set voltage, an electric current flows into the capacitor CF through the resistance of a series circuit composed of the first switch circuit 23B, the voltage clamping circuit 23ai, and the positive logic circuit 23aa. Accordingly, while the inter-terminal voltage of the voltage clamping circuit 23ai is equal to or higher than the above-mentioned set voltage, the capacitor CF is charged up by an electric current flowing through the filter circuit 23a and an electric current flowing through the voltage clamping circuit 23ai. And the resistance of the series circuit composed of the voltage claming circuit 23ai and the positive logic circuit 23aa is lower enough than the resistance between the input/output terminals of the filter circuit 23a. Accordingly, since the capacitor CF is charged up by a great current, a charging time of the capacitor CF is shortened in comparison with a case where the voltage clapping circuit 23ai is not provided. Therefore, it can be substantially prevented that an on-hook state is formed at the time of an off-hook operation. Or a period of time during which an on-hook state is formed at the time of an off-hook operation can be shortened to a degree where the switching system does not judge the on-hook state to be a communication interrupt.

The input voltage of the voltage/current conversion circuit 23c when the voltage clamping circuit 23ai has come into a conduction state is almost determined by the ratio of the resistance of a circuit portion composed of the first switch circuit 23B and the voltage clamping circuit 23ai to the resistance of the positive logic circuit 23aa. Accordingly, lowering of the input voltage of the voltage/current conversion circuit 23c when the voltage clamping circuit 23ai has come into a conduction state can be made less by designing the circuit system so that the resistance of a circuit portion composed of the first switch circuit 23B and the voltage clamping circuit 23ai is lower enough in comparison with the resistance of the positive logic circuit 23aa. This is preferable from a viewpoint of keeping an off-hook current.

Although, in the fifth example, an example in which a voltage clamping circuit is added to the dial pulse circuit of FIG. 3 has been explained, the idea of adding a voltage clamping circuit can be applied also in the same way, respectively, to the dial pulse circuit of the second example described with reference to FIGS. 6 and 7, the dial pulse circuit of the fourth embodiment described with reference to FIG. 17, or other like circuit including therein a first switch circuit 23B connected between a power source and a voltage input terminal of a filter circuit 23a.

1-2-6. A sixth example of the dial pulse circuit

The above-mentioned dial pulse circuit of the fifth embodiment has used the voltage clamping circuit 23ai of a two-terminal type as a voltage clamping circuit. Accordingly, an electric current when the voltage clamping circuit 23ai comes into a conduction state and the capacitor CF is charged up flows also through the first switch circuit 23B in the same way.

Therefore, in case that this charging current is great, a control system requires large current. Therefore, a battery used as a power source in the control system for a non-ringing telecommunication is short life.

This sixth example proposes a dial pulse circuit capable of preventing the first switch circuit 23B from being large-sized.

Thereupon, a dial pulse circuit of the sixth example uses a voltage clamping circuit having a current buffering function as a voltage clamping circuit.

Figure 19A:
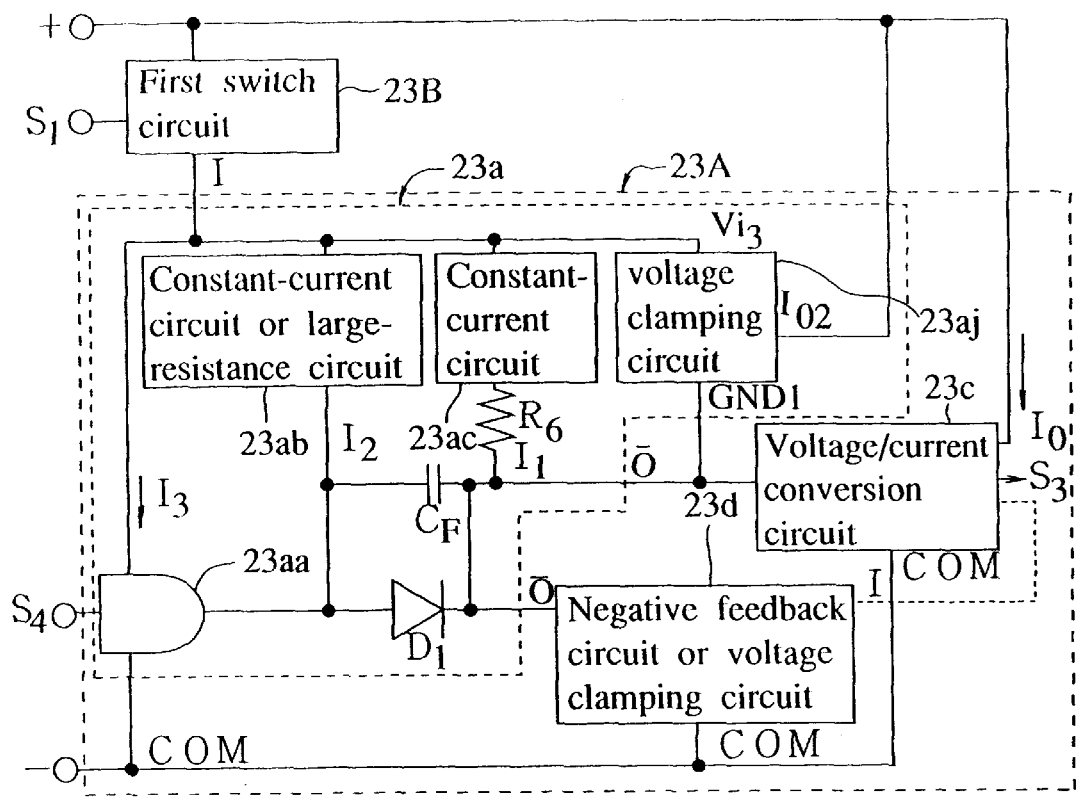
FIGS. 19(A) and 19(B), shows a sixth example of the dial pulse circuit.
Figure 19B:
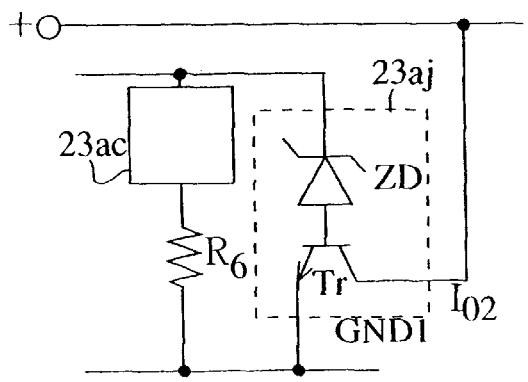

FIG. 19(A) shows a composition example of a dial pulse circuit of the sixth example, and FIG. 19(B) is a figure for explaining a concrete circuit example of a voltage clamping circuit 23aj having a current buffering function.

The dial pulse circuit of the sixth example, as shown in FIG. 19(A), is provided with a voltage clamping circuit 23aj. The voltage clamping circuit 23aj has an input terminal Vi3, a ground terminal GND1, and a buffer current output terminal I02. The circuit 23aj produces a conduction state between the butter current output terminal I02 and the ground terminal GND1 and moreover clamps the voltage between the input terminal and the ground terminal to a set voltage, when the voltage between the input/output terminals and the ground terminal GND1 comes to be equal to or higher than the set voltage.

The input terminal Vi3 of the voltage clamping circuit 23aj is connected with the voltage input terminal I of the filter circuit 23a, the ground terminal GND1 of it is connected with the input terminal of the voltage/current conversion circuit 23c, and the current output terminal I02 of it is connected with the positive terminal of the full-wave rectifier circuit 21 (see FIG. 1).

The set voltage of the voltage clamping circuit 23aj is set at a voltage which does not bring this voltage clamping circuit 23aj into a conduction state at the time of communication using an alternating current signal such as a speech signal, a MODEM signal, or the like.

This voltage clamping circuit 23aj, as shown in FIG. 19(B) for example, can be composed of a Zener diode ZD and an NPN transistor Tr. That is to say, this voltage clamping circuit 23aj can be composed of a Zener diode ZD in which its cathode is connected to the voltage input terminal I of the filter circuit 23a and its anode is connected to the base of an NPN transistor Tr, and the NPN transistor Tr in which its collector is connected to the positive terminal of the full-wave rectifier circuit 21 (see FIG. 1) and its emitter is connected to the input terminal of the voltage/current conversion circuit 23c.

Next, operation of the dial pulse circuit of the sixth example shown in FIG. 19 mainly in relation to the voltage clamping circuit 23aj is described in the following.

When the fourth control signal S4 is brought into a low level from a high level as keeping the first switch circuit 23B in an on state (a state where an off-hook current flows) (when the ground side terminal of the capacitor CF is brought into a grounded state from a neutral state), a charging current flows into the capacitor CF.

During this charging, the same phenomenon as the above-mentioned fifth example happens in this dial pulse circuit. That is to say, since the input voltage of the voltage/current conversion circuit 23c is low, the output current Io of the voltage/current conversion circuit 23c has a low value. When the current Io is lowered in such a way, since the line voltage rises, the electric potential of the voltage input terminal I of the filter circuit 23a (accordingly, the input terminal Vi3 of the voltage clamping circuit 23aj) rises. On the other hand, rising of the electric potential of the ground terminal GND1 of the voltage clamping circuit 23aj is suppressed by the capacitor CF. Thanks to these, the inter-terminal voltage of the voltage clamping circuit 23aj rises. And when the interterminal voltage of the voltage clamping circuit 23aj comes to be equal to or higher than a set voltage set in advance for this voltage clamping circuit, a conduction state happens between the buffer current terminal I02 and the ground terminal GND1 of the voltage clamping circuit 23aj. Moreover, the voltage clamping circuit 23aj clamps a voltage between the input/output terminals of the filter circuit 23a to said set voltage.

While the voltage clamping circuit 23aj is in a conduction state, an electric current flows into the capacitor CF from the positive terminal of the full-wave rectifier circuit 21 through the resistance of a series circuit composed of a circuit portion by way of the buffer current terminal I02 and the ground terminal GND1 of the voltage clamping circuit 23aj, and the positive logic circuit 23aa. Accordingly, while the inter-terminal voltage of the voltage clamping circuit 23aj is equal to or higher than said set voltage, the capacitor CF is charged up by an electric current flowing through the filter circuit 23a and an electric current flowing through the voltage clamping circuit 23aj. And the resistance of the series circuit composed of the voltage clamping circuit 23aj and the positive logic circuit 23aa is lower enough than the resistance between the input/output terminals of the filter circuit 23a. Therefore, since the capacitor CF is charged up by a great current, the charging time of the capacitor CF is shortened in comparison with a case where the voltage clamping circuit 23aj is not provided. Therefore, it can be substantially prevented that an on-hook state is formed at the time of an off-hook operation. Or a period of time during which an on-hook state is formed at the time of an off-hook operation can be shortened to a degree where the switching system does not judge the on-hook state to be a communication interrupt.

Furthermore, in case of the dial pulse circuit of the sixth embodiment, a charging current supplied to the capacitor CF through the voltage clamping circuit 23aj flows only into the capacitor CF from the positive terminal of the full-wave rectifier circuit 21 through the buffer current terminal I02 and the ground terminal GND1 of the voltage clamping circuit 23aj and does not flow in the first switch circuit 23B. That is to say, said transient charging current does not flow in the first switch circuit 23B but a smaller current in comparison with said charging current flows in it. Thanks to this, the first switch circuit 23B can do with a circuit of low current resistivity. This results in a small current load in the control system.

The input voltage of the voltage/current conversion circuit 23c when the voltage clamping circuit 23aj has come into a conduction state, is almost determined by the ratio of the resistance between the buffer current terminal I02 and the ground terminal of the voltage clamping circuit 23aj to the resistance of the positive logic circuit 23aa. Accordingly, lowering of the input voltage of the voltage/current conversion circuit 23c when the voltage clamping circuit 23aj has come into a conduction state can be made less by designing the circuit system so that the resistance between the current output terminal I02 and the ground terminal of the voltage clamping circuit 23aj is lower enough in comparison with the resistance of the positive logic circuit 23aa. This is preferable from a viewpoint of keeping an off-hook current.

Although, in the sixth example, an example in which the voltage clamping circuit having a current buffering function is added to the dial pulse circuit of FIG. 3 has been explained, the idea of adding a voltage clamping circuit having a current buffering function can be applied also in the same way, respectively, to the dial pulse circuit of the second example described with reference to FIGS. 6 and 7, and the dial pulse circuit of the third example described with reference to FIG. 14 and the dial pulse circuit of the fourth example described with reference to FIG. 17.

1-2-7. A seventh embodiment of the dial pulse circuit

According to the above-mentioned dial pulse circuits of the fifth and sixth examples, since they are provided with the voltage clamping circuit 23ai or the voltage clamping circuit 23aj, they can rapidly charge up the capacitor CF by bringing the ground side terminal of the capacitor CF into a grounded state from a neutral state.

However, although a voltage clamping circuit is provided, a voltage between the terminals of the capacitor CF at the time of starting to charge up is low until electric charge is accumulated in the capacitor CF. Accordingly, in the dial pulse circuits of the fifth and sixth examples, the input voltage of the voltage/current conversion circuit 23c is also low at the time of starting to charge up. Thereupon, the output current of the voltage/current conversion circuit 23c is also small. Therefore, immediately after bringing the ground side terminal of the capacitor CF into a grounded state from a neutral state, an off-hook current becomes small (there is a possibility that an off-hook state cannot be kept).

As a method for avoiding this problem, in the dial pulse circuit of the fifth example, it has been explained that it is good to design the circuit system so that the resistance of the circuit portion composed of the first switch circuit 23B and the voltage clamping circuit 23ai is lower enough in comparison with the resistance of the positive logic circuit 23aa, and in the sixth example, it has been explained that it is good to design the circuit system so that the resistance between the buffer current terminal I02 and the ground terminal of the voltage clamping circuit 23aj is lower enough in comparison with the resistance of the positive logic circuit 23aa. However, a method making it possible to simply and securely keep an off-hook current is desired.

Figure 20:
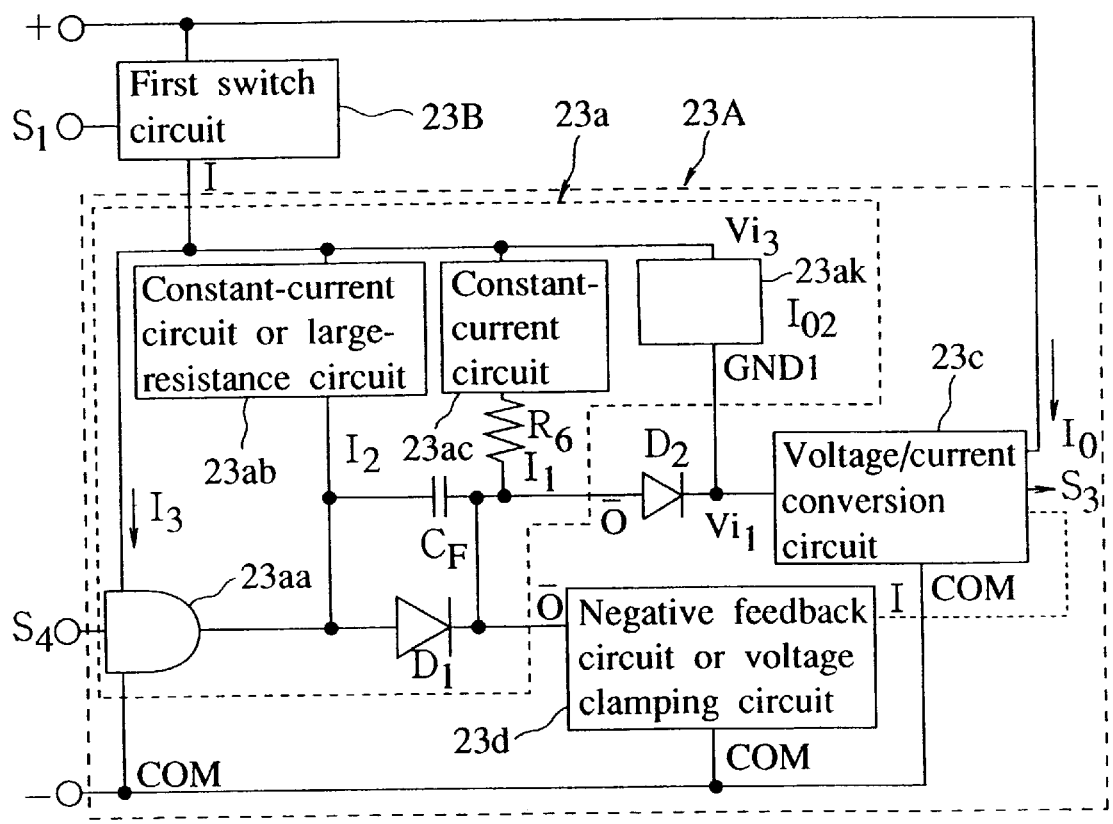
FIG. 20 shows a first circuit example belonging to a seventh example of the dial pulse circuit.

Thereupon, a dial pulse circuit of the seventh embodiment has the following composition. That is to say, as shown in FIG. 20, a diode D2 is provided between the output terminal $\overline{O}$ of the filter circuit 23a and the input terminal Vi1 of the voltage/current conversion circuit 23c in the direction where the voltage of the input terminal Vi1 is not lowered. Concretely, the diode D2 is provided so that its anode is connected to the output terminal $\overline{O}$ of the filter circuit 23a and its cathode is connected to the input terminal Vi1 of the voltage/current conversion circuit 23c. And a voltage clamping circuit 23ak is provided between the input terminal I of the filter circuit 23a and the input terminal Vi1 of the voltage/current conversion circuit 23c.

This voltage clamping circuit 23ak can be composed, for example, of a two-terminal circuit like the voltage clamping circuit 23ai described in the fifth example. Or this can be composed of a circuit having a current buffering function like the voltage clamping circuit 23aj described in the sixth example. However, since this voltage clamping circuit 23ak is provided with the diode D2, this circuit does not have a role of charging up the capacitor CF (in detail described later).

Next, in order to more deeply understand the dial pulse circuit of the seventh example, operation of the dial pulse circuit of the seventh example shown in FIG. 20 mainly in relation to the voltage clamping circuit 23ak and the diode D2 is described in the following.

In case of charging up the capacitor CF, the interterminal voltage of the capacitor CF is low until electric charge is accumulated to some degree in the capacitor CF. However, in case of this dial pulse circuit of the seventh example, the input terminal Vi1 of the voltage/current conversion circuit 23c and the output terminal $\overline{O}$ of the filter circuit 23a are separated by action of the diode D2. Accordingly, even when charging up the capacitor CF is started, the input voltage of the voltage/current conversion circuit 23c comes to be a voltage obtained by subtracting a clamping voltage of the voltage clamping circuit 23ai from the electric potential of the input terminal I of the filter circuit 23a. Accordingly, since the input voltage of the voltage/current conversion circuit 23c can be secured without being influenced by the ratio of the resistance in the voltage clamping circuit 23ak to the resistance in the positive logic circuit 23aa even when charging up the capacitor CF is started, the output current of the voltage/current conversion circuit 23c (off-hook current) can be kept.

Furthermore, in case of the dial pulse circuit of the seventh example, the capacitor CF is charged up by an electric current flowing through a series circuit composed of the first switch circuit 23B and the filter circuit 23a. This electric current is smaller than the charging current flowing through the voltage clamping circuit 23ai or 23aj in the fifth or sixth examples.

Thanks to this, the dial pulse circuit of the seventh example can attain to keep an off-hook current in comparison with the fifth and sixth examples.

In case of the dial pulse circuit explained with reference to FIG. 20, however, since the capacitor CF is charged up by an electric current flowing through the first switch circuit 23B and the filter circuit 23a, the charging is performed by a comparatively small current. Therefore, a charging time of the capacitor CF is longer in comparison with the fifth and sixth examples.

Figure 21:
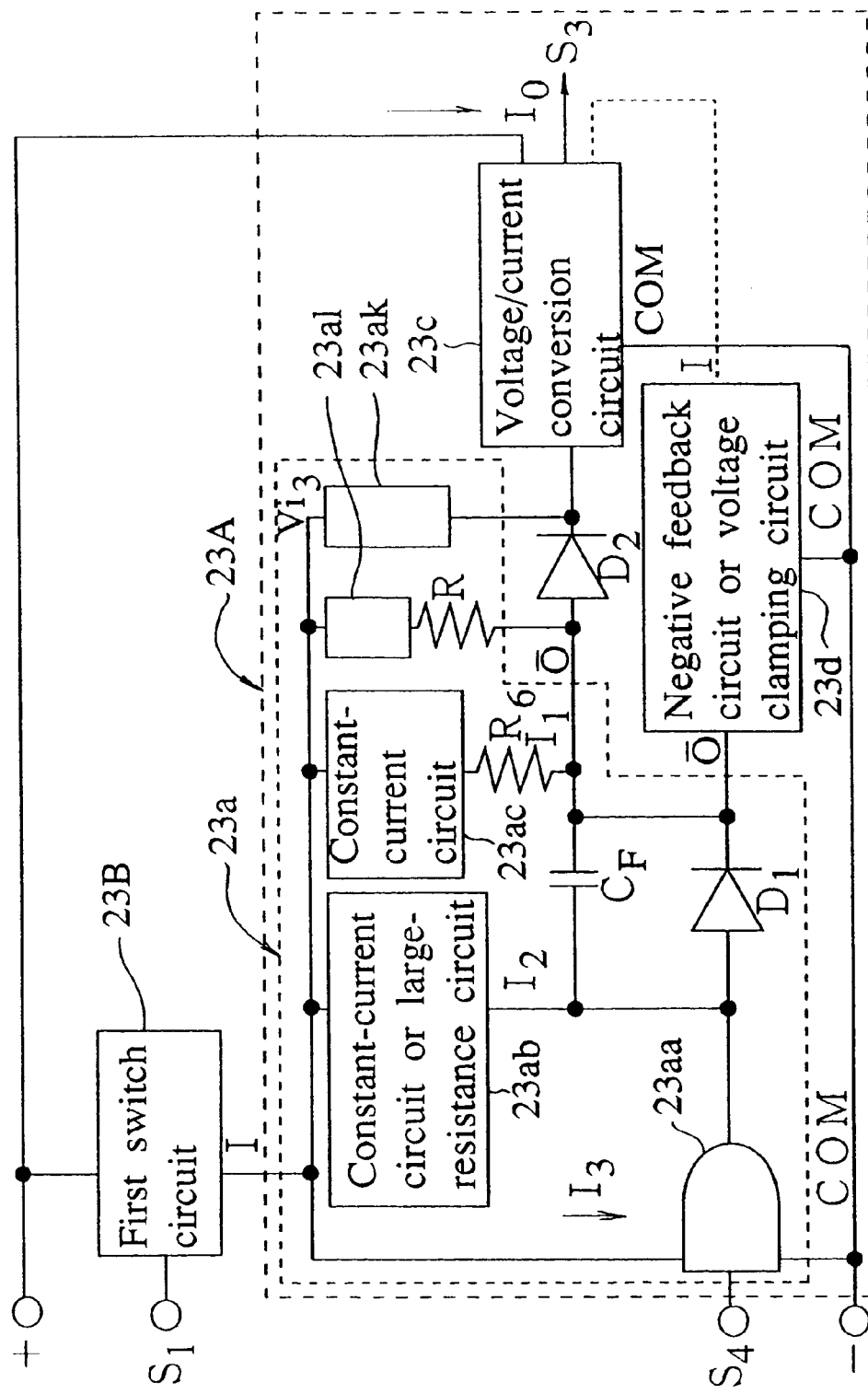
FIG. 21 shows a second circuit example belonging to the seventh example of the dial pulse circuit.

In order to avoid this problem, as shown in FIG. 21, in addition to the composition of FIG. 20 a series circuit composed of a second voltage clamping circuit 23al and a current limiting means R (a current limiting resistor in FIG. 21) may be provided between the input terminal and the output terminal of the filter circuit 23a.

This second voltage clamping circuit 23al can be composed, for example, of a two-terminal circuit like the voltage clamping circuit 23ai described in the fifth example. Or it can be composed of a circuit having a current buffering function like the voltage clamping circuit 23aj explained in the sixth example.

According to the dial pulse circuit explained with reference to FIG. 21, the capacitor CF can be charged up using the second voltage clamping circuit 23al. And a charging current in this case can be adjusted by adjusting a current limiting resistance value of the current limiting means R. Accordingly, the dial pulse circuit explained with reference to FIG. 21 is easier to properly adjust a charging current and a charging time of the capacitor CF in comparison with the dial pulse circuit explained with reference to FIG. 20.

Although, in the seventh example, an example in which the diode D2 and the voltage clamping circuit 23ak and, additionally to them if circumstances require, the second voltage clamping circuit 23al are added to the dial pulse circuit of FIG. 3, has been explained, the idea of the seventh example can be applied also in the same way, respectively, to the dial pulse circuit of the second example described with reference to FIGS. 6 and 7, the dial pulse circuit of the fourth example described with reference to FIG. 17, or other like circuit where the first switch circuit 23B is connected between the power source and the voltage input terminal of the filter circuit.

1-2-8. An eighth example of the dial pulse circuit

The more the number of circuits added to the input terminal of the voltage/current conversion circuit 23c is, the more the stray capacity near the input terminal increases. When the stray capacity is increased, an operation speed for making zero the output current of the voltage/current conversion circuit 23c is made slow. Thereupon, deterioration in waveform of a dial pulse happens. The eighth example proposes a dial pulse circuit capable of solving this problem.

Figure 22:
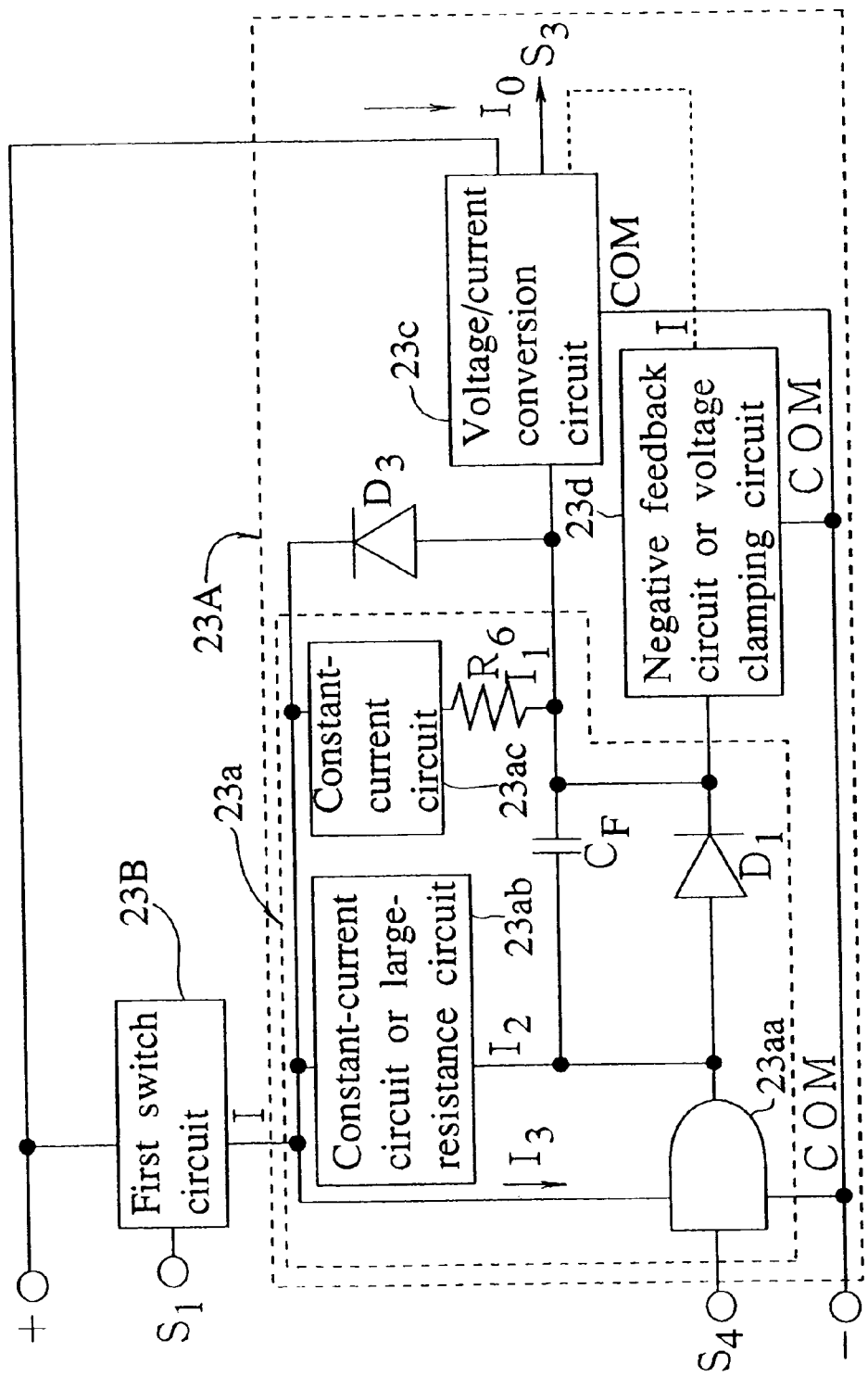
FIG. 22 shows a first circuit example belonging to a eighth example of the dial pulse circuit.

FIG. 22 shows a circuit composition (a first circuit example) of a dial pulse circuit of the eighth example.

A dial pulse circuit of the first circuit example belonging to the eighth example is a circuit obtained by adding a diode D3 to the input terminal of the voltage/current conversion circuit of the first example so that the forward direction of the diode D3 may be a direction for lowering the voltage of the input terminal of the voltage/current conversion circuit 23c. That is to say, the first circuit example belonging to the eighth example of the dial pulse circuit is provided with a diode D3 in which its anode is connected to the input terminal of the voltage/current conversion circuit 23c and its cathode is connected to a terminal (a terminal at the first switch circuit 23B side in this case) connected with the power source of the positive logic circuit 23aa, of a constant-current circuit or a large-resistance circuit 23ab in the filter circuit 23a.

Next, operation of the first circuit example of the eighth example of the dial pulse circuit described with reference to FIG. 22 mainly in relation to the diode D3 is described in the following.

In case that the dial pulse circuit of the first circuit example of the eighth example generates dial pulses in a state where the first switch circuit 23B is in an on state, an electric current flowing through the constant-current circuit or the large-resistance circuit 23ab becomes a part of a dial pulse current. At this time, however, since said diode D3 is biased in the reverse direction, the diode D3 is in a non-conduction state.

Next, when the first switch circuit 23B is brought into an off state, the constant-current circuit or the large-resistance circuit 23ab does not receive a voltage through the first switch circuit 23B. Hereupon, the diode D3 is biased in the forward direction. And an electric current I3 is flowing through a NOT circuit (not illustrated) of the first stage of the positive logic circuit 23aa. Therefore, this NOT circuit of the first stage of the positive logic circuit 23aa acts so as to lower the voltage of the input terminal of the voltage/current conversion circuit 23c. That is to say, this current I3 acts so as to discharge electric charge of a stray capacity existing near the input terminal of the voltage/current conversion circuit 23c. Accordingly, a response speed at which the output current of the voltage/current conversion circuit 23c is turned off when the first switch circuit 23B has been turned off is faster in comparison with a case where the diode D3 is not used. Thanks to this, dial pulses can be improved in waveform.

Figure 23:
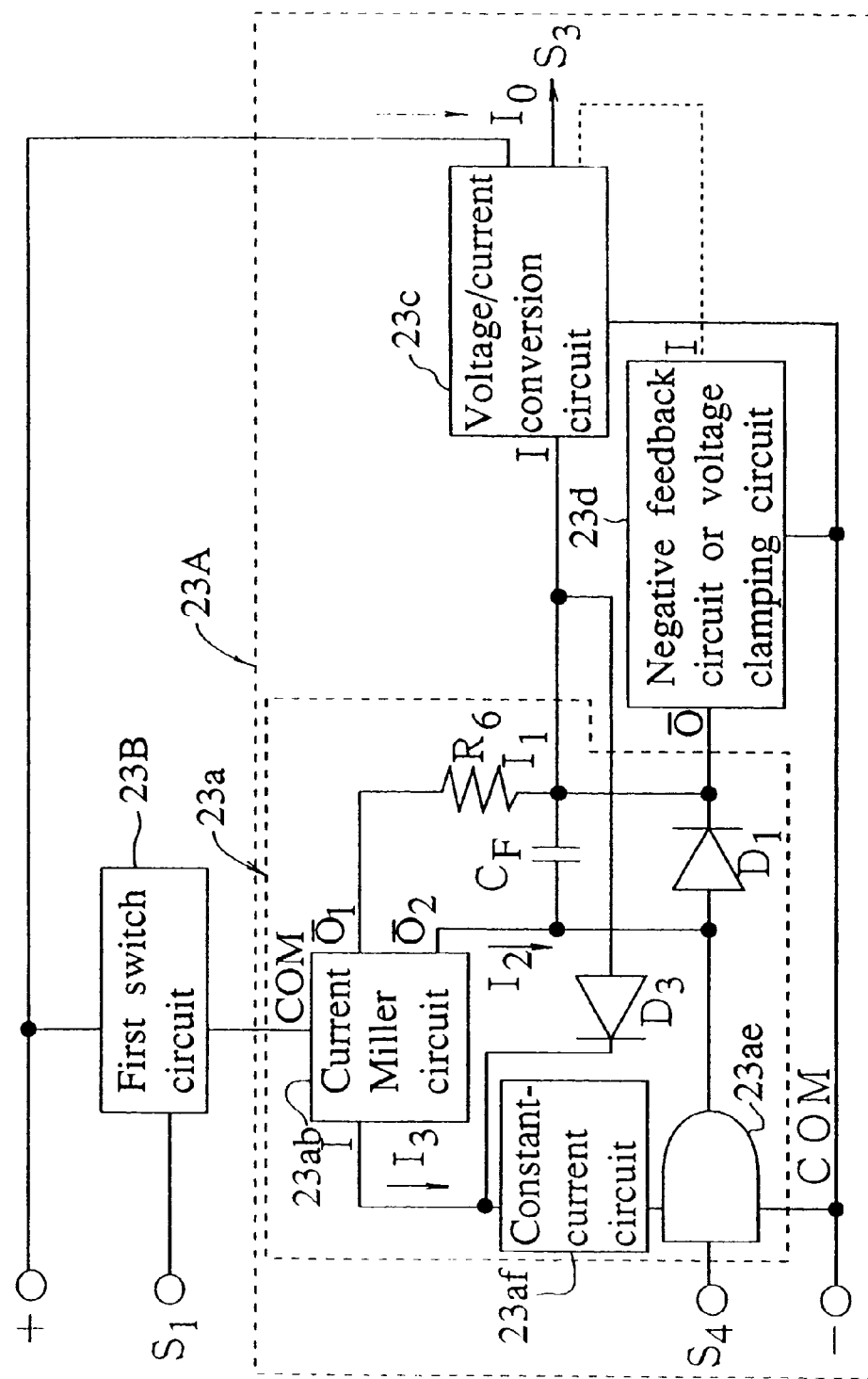
FIG. 23 shows a second circuit example belonging to the eighth example of the dial pulse circuit.

FIG. 23 shows another circuit composition (a second circuit example) belonging to the eighth example of the dial pulse circuit.

A dial pulse circuit of the second circuit example of the eighth example is a circuit obtained by adding a diode D3 to the input terminal of the voltage/current conversion circuit 23c of the dial pulse circuit of the second circuit example of the second example so that the forward direction of the diode D3 may be a direction for lowering the voltage of the input terminal of the voltage/current conversion circuit 23c. That is to say, the dial pulse circuit of the second circuit example of the eighth example is provided with a diode D3 in which its anode is connected to the input terminal of the voltage/current conversion circuit 23c and its cathode is connected to a terminal, connected with a current Miller circuit 23ad, of a constant-current circuit 23af in the filter circuit 23a.

In case that the second circuit example belonging to the eighth example of the dial pulse circuit generates dial pulses in a state where the first switch circuit 23B is in an on state, an electric current flowing through the constant-current circuit 23af becomes a part of a dial pulse current. At this time, however, since the diode D3 is biased in the reverse direction, the diode D3 is in a non-conduction state.

Next, when the first switch circuit 23B is brought into an off state, the constant-current circuit 23af does not receive an electric current through the current Miller circuit 23ad. However, it receives a voltage of the input terminal of the voltage/current conversion circuit 23c through the diode D3. Due to this, since the constant-current circuit 23af attempts to continue making the electric current flow, it acts so as to lower the voltage of the input terminal of the voltage/current conversion circuit 23c. That is to say, this current acts so as to discharge electric charge of a stray capacity existing near the input terminal of the voltage/current conversion circuit 23c. Accordingly, a response speed at which the output current of the voltage/current conversion circuit 23c is turned off when the first switch circuit 23B has been turned off is faster in comparison with a case where the diode D3 is not used. Thanks to this, dial pulses can be improved in waveform.

1-3. Description of concrete examples of a switch block circuit

Some concrete examples and operations of the switch block circuit 25, and detailed circuit examples of the switch block circuit are respectively described in the following.

1-3-1. A first example of the switch block circuit

Figure 24:
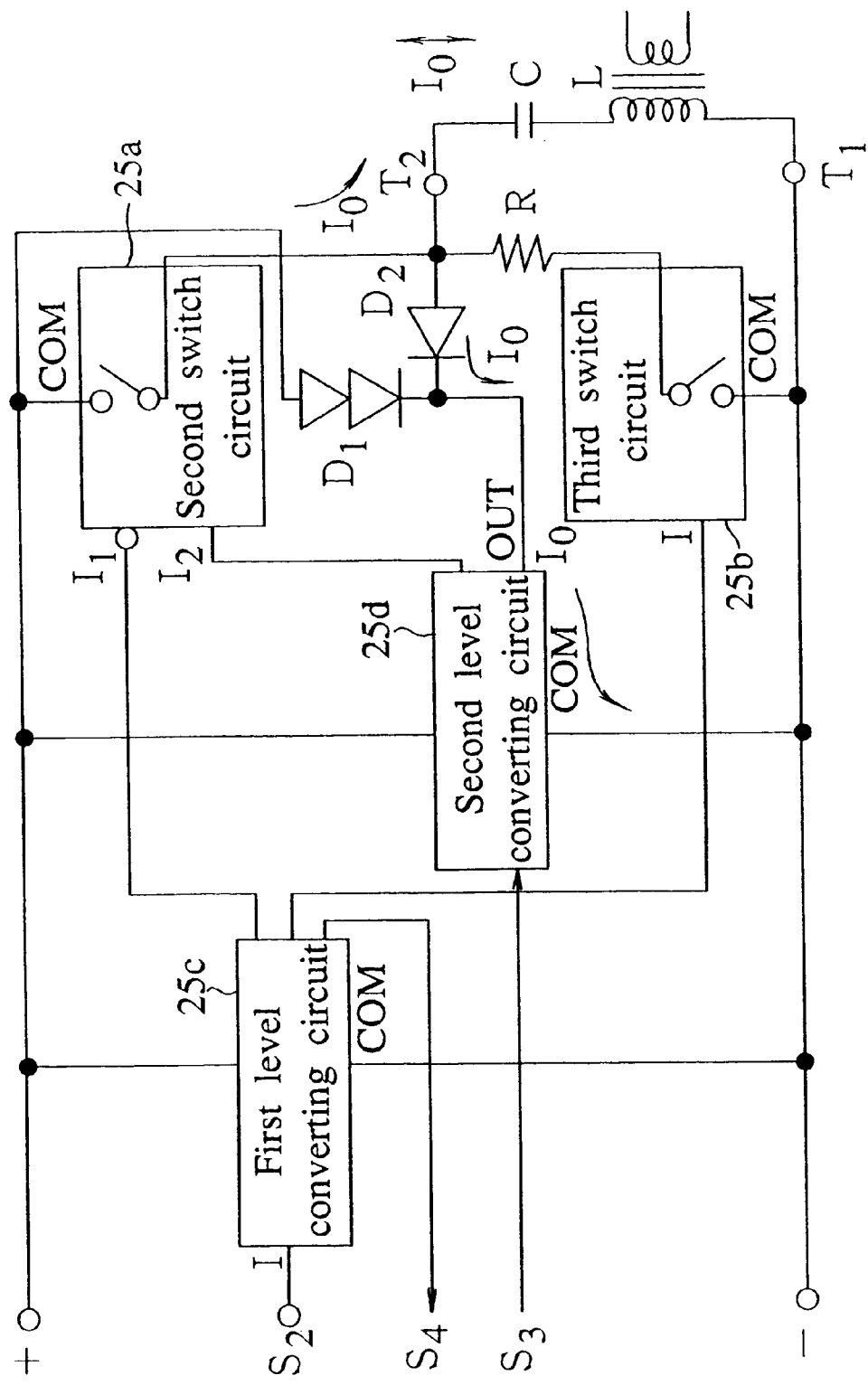
FIG. 24 shows a first circuit example belonging to a first example of a switch block circuit.

FIG. 24 shows a first embodiment of the switch block circuit 25. This case shows a circuit example which operates using the − power source terminal for grounding and the + power source terminal for a line input. It is a matter of course that the circuit can be operated by the reverse power source polarity when reversing the diode polarity in use and the current direction.

The switch block circuit of the first example shown in FIG. 24 is composed of a first level converting circuit 25c which generates a first off signal (a first current signal I1 in the figure) for turning off a second switch circuit 25a in case that the second control signal S2 from an unillustrated control circuit is on, a first on signal (a current signal I in the figure) for turning on a third switch circuit 25b, and a fourth control signal S4 to the dial pulse circuit 23 (FIG. 1 and the like), a second level converting circuit 25d which generates a second on signal (a second current signal I2 in the figure) for turning on the second switch circuit 25a in case that a third control signal S3 from the dial pulse circuit is on, and a dial pulse assisting current at the time of generating dial pulses and a bias current for compensating an alternating current operation of the communication transformer L at the time of an off-hook operation (hereinafter also referred to as an assisting current or a bias current), the second switch circuit 25a which is turned on by the second on signal of the second level converting circuit 25d and turned off by the first off signal of the first level converting circuit 25c (which is turned off in case that these control signals are inputted at the same time from the first and second level converting circuits), the third switch circuit 25b which is turned on by the first on signal of the first level converting circuit, a current limiting resistor R, a first diode D1, and a second diode D2. A common terminal (COM) of the second switch circuit 25a is connected to the + power source terminal, and the output terminal is connected to the output terminal (a point connected with the third switch circuit 25b) as the switch block circuit 25. Moreover, a common terminal (COM) of the third switch circuit 25b is connected to the − power source terminal, and the output terminal is connected to the output terminal (a point connected with the second switch circuit 25a) as the switch block circuit 25 through the current limiting resistor R. And the first diode D1 is connected, so as to have its anode connected to the + power source terminal side, between the + power source terminal and an assisting current or bias current output terminal OUT of the second level converting circuit 25d. And further, the second diode D2 is connected, so as to have its anode connected to the output side of the switch block circuit 25, between the output terminal as the switch block circuit 25 and an assisting current or bias current output terminal OUT of the second level converting circuit 25d. As for relation between the diode D1 and the diode D2 in this switch block circuit, a forward voltage of the first diode D1 is set at a higher level than a forward voltage of the second diode D2 so that the output current of the second level converting circuit 25d can flow concentratedly through the second diode D2 when the second switch circuit 25a is on. This can be realized by using a circuit in which the number of diodes D1 connected in series with one another is more than the number of the diodes D2.

The first example of the switch block circuit described with reference to FIG. 24, operates in the following manner.

The input to the communication input transformer whose direct current component has been cut off by means of a capacitor C is connected between the output terminal of the switch block circuit 25 and the line ground (− power source) terminal.

In a waiting state, the second control signal S2 from the control circuit 50 and the third control signal S3 from the dial pulse circuit 23 are both in an off state (input is "0"). Responding to this, outputs of the first and second level converting circuits 25c and 25d become also zero. In response to the zero outputs of the first and second level converting circuits 25c and 25d, the second and third switch circuits 25a and 25b also come into an off state (open state). As a result, the input to the transformer L comes into a "disconnected" or "floating" state (the ground side is connected).

When the second control signal S2 from the control circuit 50 comes into an on state (input is "1"), the second switch circuit 25a is kept in an off state and the third switch circuit 25b is turned on. As a result, the input terminal of the transformer L is disconnected from the line and the input terminals of the transformer are short-circuited through the current limiting resistor R. And from the first level converting circuit 25c, the fourth control signal S4 which is a signal for controlling an operating state of the impedance circuit is outputted to the positive logic circuit of the unshown dial pulse circuit.

In such a state, when the third control signal S3 from the dial pulse circuit comes into an on state (input is "1");

the second switch circuit 25a is kept in an off state since it is governed by a preferential operation according to the on state of the second control signal S2 (this preferential operation is described later with reference to a detailed circuit shown in FIG. 27), the third switch circuit 25b is kept in an on state since it has no relation with the third control signal S3, and the assisting current or bias current output OUT (constant current) of the second level converting circuit 25d comes to be on. This current passes the first diode D1 from the line input (+ power source) terminal and flows to the line ground (− power source) terminal. On the other hand, since the third switch circuit 25b is on, the anode of the second diode D2 is at the ground potential and so no current flows through the second diode D2 (reverse bias).

When sending dial pulses, the second control signal S2 from the control circuit 50 is turned on (input is "1"), the input terminal of the transformer L is disconnected from the line and the transformer input terminals are short-circuited through the current limiting resistor R. Furthermore, by turning off/on the third control signal S3 from the dial pulse circuit, the output current OUT is turned on/off through the line (namely, is synchronized with the on/off current of the dial pulse circuit at the same phase). This on/off current becomes a portion of the dial pulse current (assistant current).

When the third control signal S3 from the dial pulse circuit is turned on (input is "1") in a state where the second control signal S2 from the control circuit 50 is off (input is "0"), since the first level converting circuit 25c has no output in response to an off state of the S2, the third switch circuit 25b is turned off. On the other hand, the second level converting circuit 25d has output in response to an on state of the S3. As the result, the second switch circuit 25a comes into an on state and the second assistant current or bias current output OUT of the second level converting circuit makes an electric current pass the second diode D2 from the output point of the switch block circuit 25 and flow to the line ground (− power source terminal). At this time, since the anodes of these two diodes D1 and D2 are short-circuited with each other by an on state of the second switch circuit 25a, an electric current of the first diode D1 having a higher forward voltage becomes zero.

This control state is equivalent to an off-hook state, since it is a state in which the input terminal of the transformer L is connected to the line (short-circuit between the input terminals is canceled) and a bias current flows from the output terminal of the switch block circuit 25 to the ground.

Hereupon, the reason why a bias constant current is necessary is described. In case of making an off-hook signal and dial pulse generating circuit into an IC or smaller in size, it is desired to form a switch block circuit out of a semiconductor device. On the other hand, since the direct current component of the input to the transformer L is cut off by the capacitor C, only an alternating current flows through the transformer L. And when the polarity of the circuit is as shown in FIG. 24, the + half-wave alternating current to flow in the direction from the line input (+ power source terminal) terminal to the transformer L flows through the second switch circuit 25a. Further, in that case, the sum of a constant current flowing through the second diode D2 and the + half-wave alternating current flowing through the transformer L flows through the second switch circuit 25a. However, in case of forming the switching device portion of the second switch circuit 25a out of a semiconductor device, it is not possible to make the − half-wave alternating current to flow out from the transformer L pass the second switch circuit 25a in the backward direction and flow toward the line input (+ power source terminal).

Thereupon, this current portion is made flow through the second diode D2. As a result, since a difference between the constant current flowing through the second diode D2 and the − half-wave alternating current flowing through the transformer L flows through the second switch circuit 25a, the assistant current or bias current output from the second level converting circuit 25d has to be set at a higher level than the maximum amplitude of the alternating current flowing through the transformer 1. In order to prevent the alternating current flowing through the transformer L from being distorted. The above-mentioned operations may be considered as operations for preventing occurrence of an actual backward current to flow to the second switch circuit 25a by making flow in advance a direct-current bias current greater than the amplitude value of the alternating current to flow through the transformer L.

The reason why the first and second level converting circuits 25c and 25d are provided is as follows.

The respective ground levels of the second control signal S2 from the control circuit 50, the third control signal S3 from the unillustrated dial pulse circuit, and the switch block circuit generally do not coincide with one another. Control signals are in the form of voltage or current at one time or another, and are various in level or power. The first and second level converting circuits 25c and 25d are provided as interface circuits which match with one another the signals different in ground level, signal form, and signal level or power and generate switch driving signals and necessary bias currents.

Therefore, the first and second level converting circuits 25c and 25d are respectively composed by combining with one another a voltage/current conversion circuit, a current/voltage conversion circuit, a voltage amplifying circuit, a current amplifying circuit, a current Miller circuit as a current loop-back circuit, a constant-current circuit, a constant-voltage circuit, a photocoupler, and the like properly according to required signal forms. Some concrete circuit examples of the first and second level converting circuits 25c and 25d are described together with detailed circuit examples of the switch block circuit described later.

Figure 25:
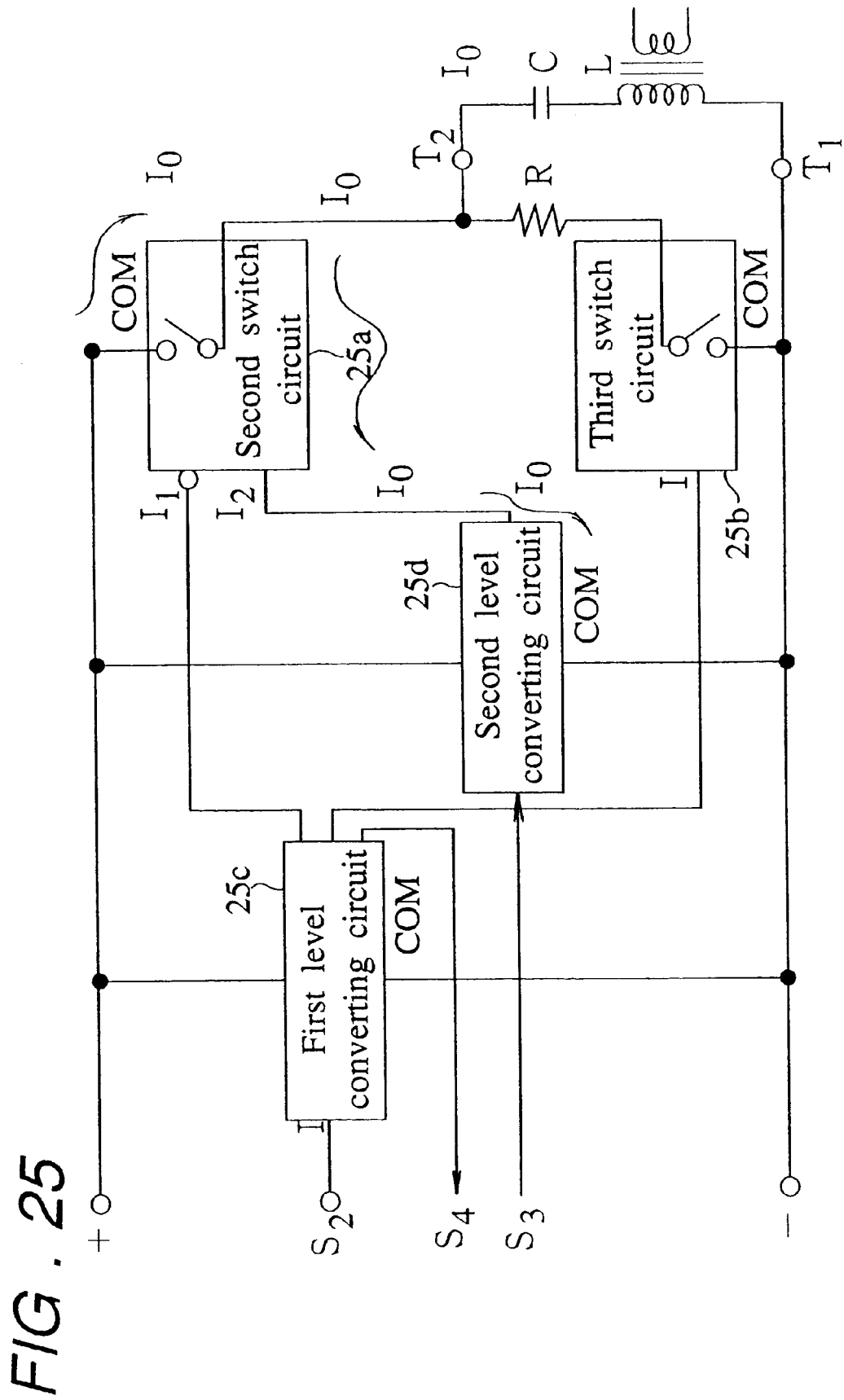
FIG. 25 shows a second circuit example belonging to the first example of the switch block circuit.

The first example of the switch block circuit described with reference to FIG. 24 may be composed as described in the following with reference to FIG. 25. That is to say, as shown in FIG. 25 (in detail, for example, in FIG. 29), a switch device of the second switch circuit 25a is composed of a bipolar transistor. Hereupon, the base of the bipolar transistor can be used as the input terminal for turning on the second switch circuit 25a, such a configuration is adopted. And a base current I2 supplied from the second level converting circuit 25d for turning on the bipolar transistor is set at a large value, and is made have also a role of a dial pulse assisting current or a bias current I0 for compensating an alternating current operation of the communication terminal transformer. Furthermore, the base-collector junction of the bipolar transistor is made have a role of the second diode D2 for letting a bias current flow, and a circuit portion (in detail, for example, a portion composed of a resistor R1 and a transistor Q2 in FIG. 29) for turning off the bipolar transistor by short-circuiting with each other the base and the emitter of the bipolar transistor by means of a signal II from the first level converting circuit 25c is made have also a role of the first diode D1 to let a dial pulse assisting current flow. In such a way, a circuit having a function equivalent to the circuit of FIG. 24 can be realized without using the diodes D1 and D2.

Next, some concrete examples of the switch block circuit (example-1) of the first embodiment described with reference to FIG. 24 and some concrete examples of the switch block circuit (example-2) of the first embodiment described with reference to FIG. 25 are respectively described in the following manner.

Figure 26:
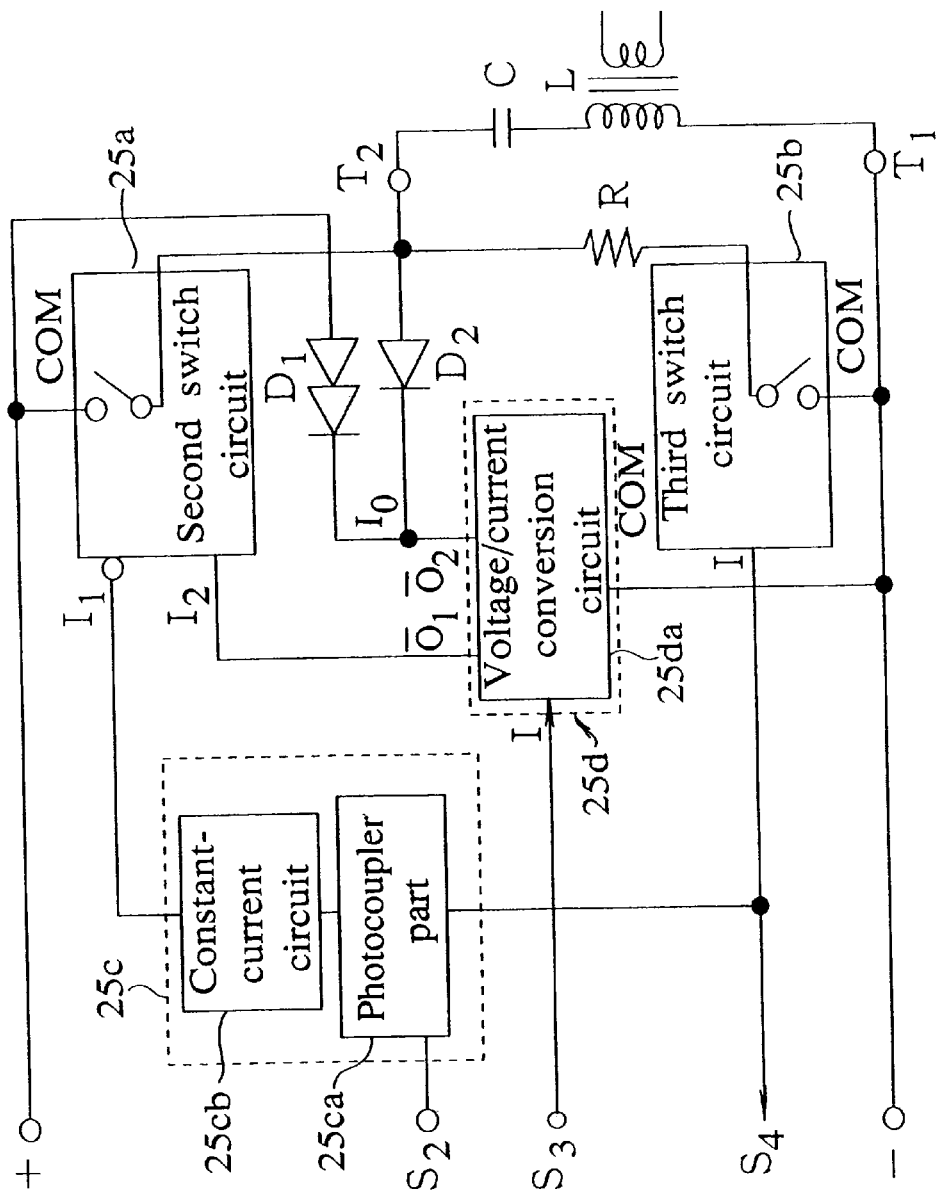
FIG. 26 is a block diagram showing a first concrete example belonging to the first circuit example of the switch block circuit of the first example.
Figure 27:
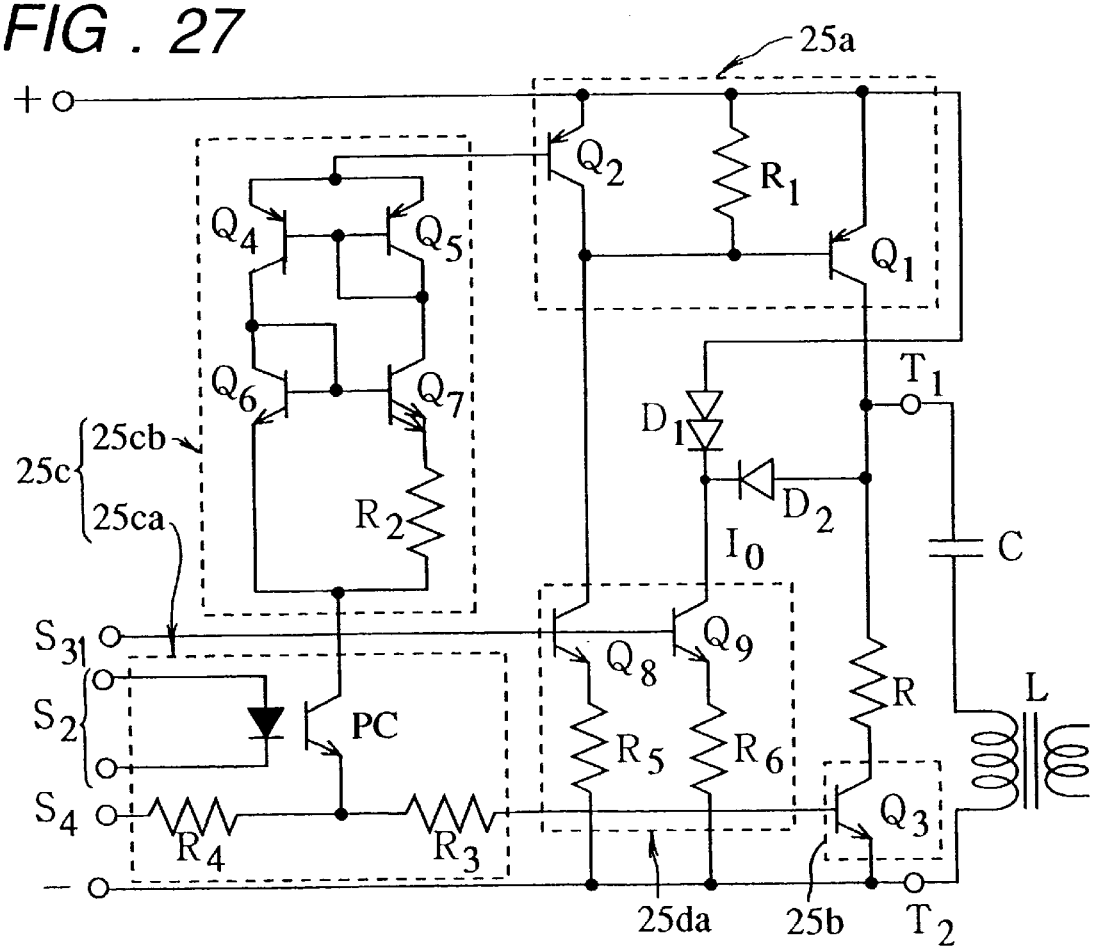
FIG. 27 shows a first detailed circuit example belonging to the first circuit example of the switch block circuit of the first example.

FIG. 26 is a block circuit diagram of a switch block circuit (example-1) of the first embodiment described with reference to FIG. 24, and FIG. 27 is a detailed circuit diagram of it.

In the switch block circuit shown in FIG. 26, the first level converting circuit 25c is composed of a photocoupler 25ca as a switch means turned on/off by the second control signal S2 and a constant-current circuit 25cb turned on/off by this switch means. And the second level converting circuit 25d is composed of a voltage/current conversion circuit 25da. With reference to FIG. 27, a circuit configuration or arrangement of the switch block circuit is described in detail in the following. The second switch circuit 25a is composed of a transistor Q1 in which its emitter is connected to the + power source terminal and its collector is connected to the output of the switch block circuit 25 and an on signal of the second level converting circuit 25d is inputted to its base, a circuit portion composed of a transistor Q2 for turning off the transistor Q1 and a resistor R1. Here, the emitter of the transistor Q2 is connected to the + power source terminal and the collector of the transistor Q2 is connected to the base of the transistor Q1 and the base of the transistor Q2 is connected to the current input terminal of the constant-current circuit 25cb. The resistor R1 is connected between the + power source terminal and the base of the transistor Q1. The third switch circuit 25b is composed of a transistor Q3 in which its emitter is connected to the power – source terminal and its collector is connected through a current limiting resistor R to the output terminal of the switch block circuit 25. And a photocoupler part 25ca included in the first level converting circuit 25c is composed of a photocoupler PC, a resistor R3 and a resistor R4. Here, the collector of the photocoupler PC is connected to the current output terminal of the constant-current circuit 23cb, the emitter of it is connected to one end of each of the resistors R3 and R4, the other end of the resistor R3 is connected to the base of the transistor Q3, and the other end of the resistor R4 is set as an output terminal for outputting the fourth control signal S4. The constant-current circuit 25cb is composed of transistors Q4 to Q7 and a resistor R2. And the voltage/current conversion circuit 25da forming the second level converting circuit 25d is composed of transistors Q8 and Q9 and resistors R5 and R6. Here, the third control signal S3 (here, a control signal S31 in the form of voltage) is inputted to the respective bases of the transistors Q8 and Q9, the collector of the transistor Q8 is connected to the base of the transistor Q1, the collector of the transistor Q9 is connected to the respective cathodes of the first and second diodes D1 and D2, the emitter of the transistor Q8 is connected through the resistor R5 to the – power source terminal, and the emitter of the transistor Q9 is connected through the resistor R6 to the – power source terminal. The anode of the diode D1 is connected to the + power source terminal and the anode of the diode D2 is connected to the output terminal of the switch block circuit 25.

By using the photocoupler PC as an on/off switch, this first level converting circuit 25c electrically separates the ground level of the second control signal S2, secures the degree of freedom of the input current value and keeps its output as a constant current not depending upon the line voltage.

The second level converting circuit 25d, which is a circuit of a voltage/current conversion system 25da, assumes a voltage signal (here, S31) of 1 to 2 volts which is grounded by the – power source terminal as the third control signal S3 to be inputted. And it is assumed that the output of the switch block circuit is grounded by the – power source terminal. (Preferential operation in a state where the second control signal S2 is on state)

Here it is described that an off-hook signal and dial pulse generating circuit of the present invention operates so as to bring the second switch circuit 25a preferentially into an off state when the second control signal S2 is on. How this is realized is described as using a circuit example shown in FIG. 27. When the third control signal S3 (here, S31) in an on state is inputted into the switch block circuit described with reference to FIG. 27, the transistor Q8 is turned on and as the result, the transistor Q1 is turned on. In this state, when the second control signal S2 is inputted and the photocoupler PC is turned on, an electric current set by the constant-current circuit 25cb flows through the base of the transistor Q2 and the transistor Q2 is turned on. Hereupon, since the emitter and the base of the transistor Q1 are short-circuited with each other, the transistor Q1 is turned off. Therefore, when the second control signal S2 is turned on, the second switch circuit 25a is preferentially turned off.

Figure 28:
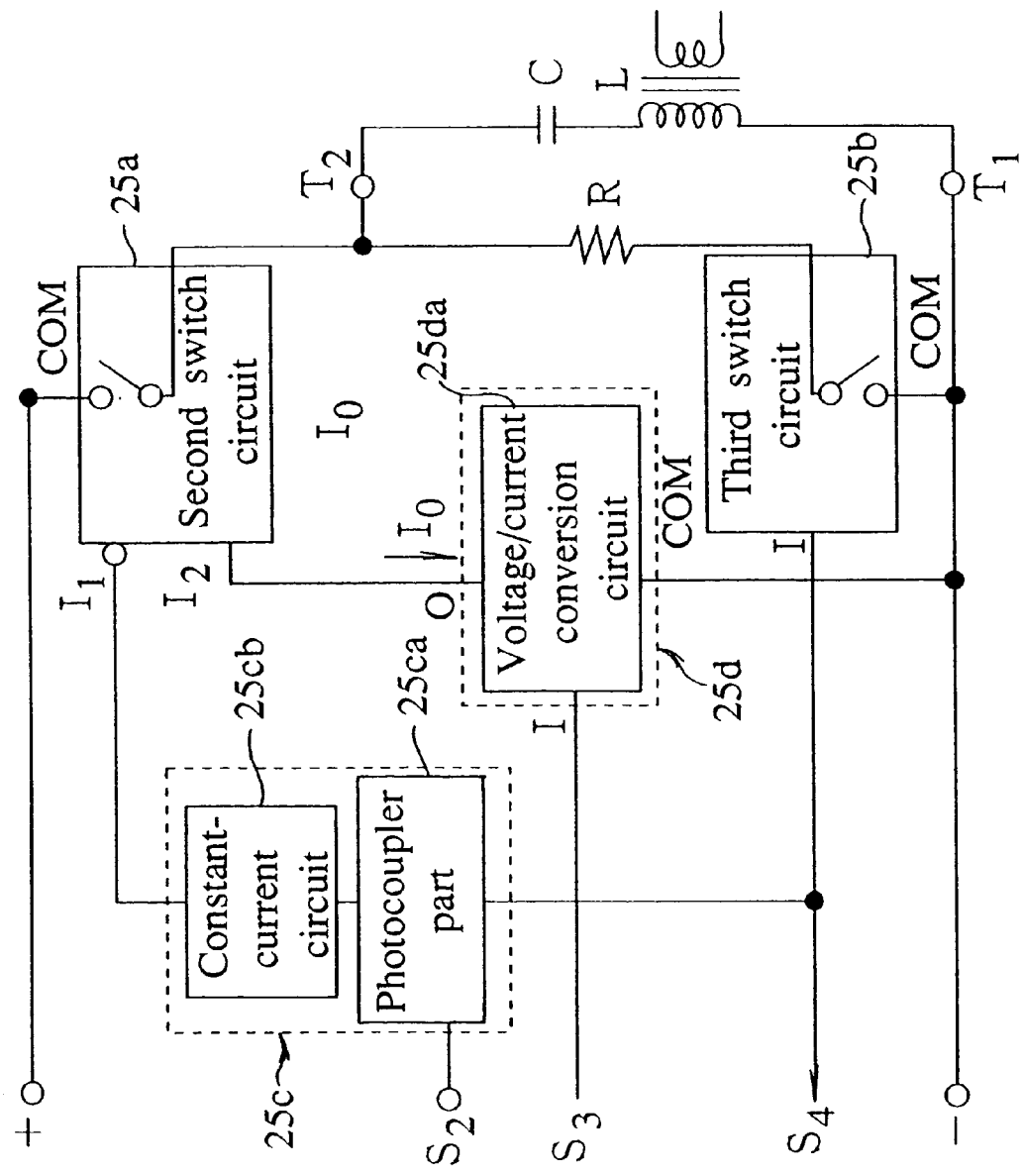
FIG. 28 is a block diagram showing a first concrete example belonging to the second circuit example of the switch block circuit of the first example.
Figure 29:
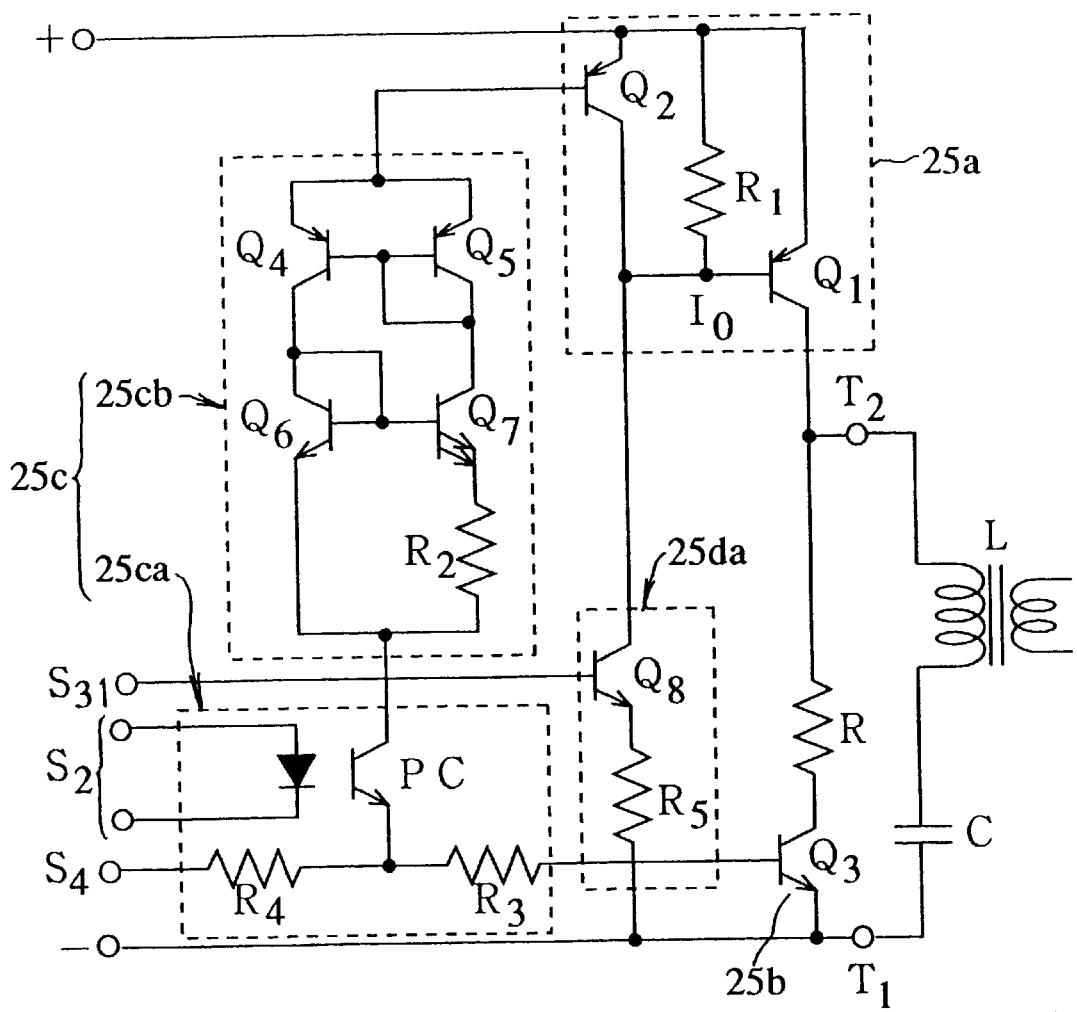
FIG. 29 shows a first detailed circuit example belonging to the second circuit example of the switch block circuit of the first example.

FIG. 28 is a block circuit diagram of the switch block circuit (example-2) of the first embodiment described with reference to FIG. 25, and FIG. 29 is a detailed circuit diagram of it.

In a circuit shown in FIGS. 28 and 29, particularly as shown in FIG. 29, the second level converting circuit 25d is composed of a voltage/current conversion circuit 25da composed of a transistor Q8 and a resistor R5. Furthermore, this circuit substitutes a part of the second switch circuit 25a for the diodes D1 and D2 used in the circuit of FIGS. 26 and 27, as already described with reference to FIG. 25. Except these points, the circuit shown in FIGS. 28 and 29 is composed fundamentally in the same way as the circuit described with reference to FIGS. 26 and 27.

Figure 30:
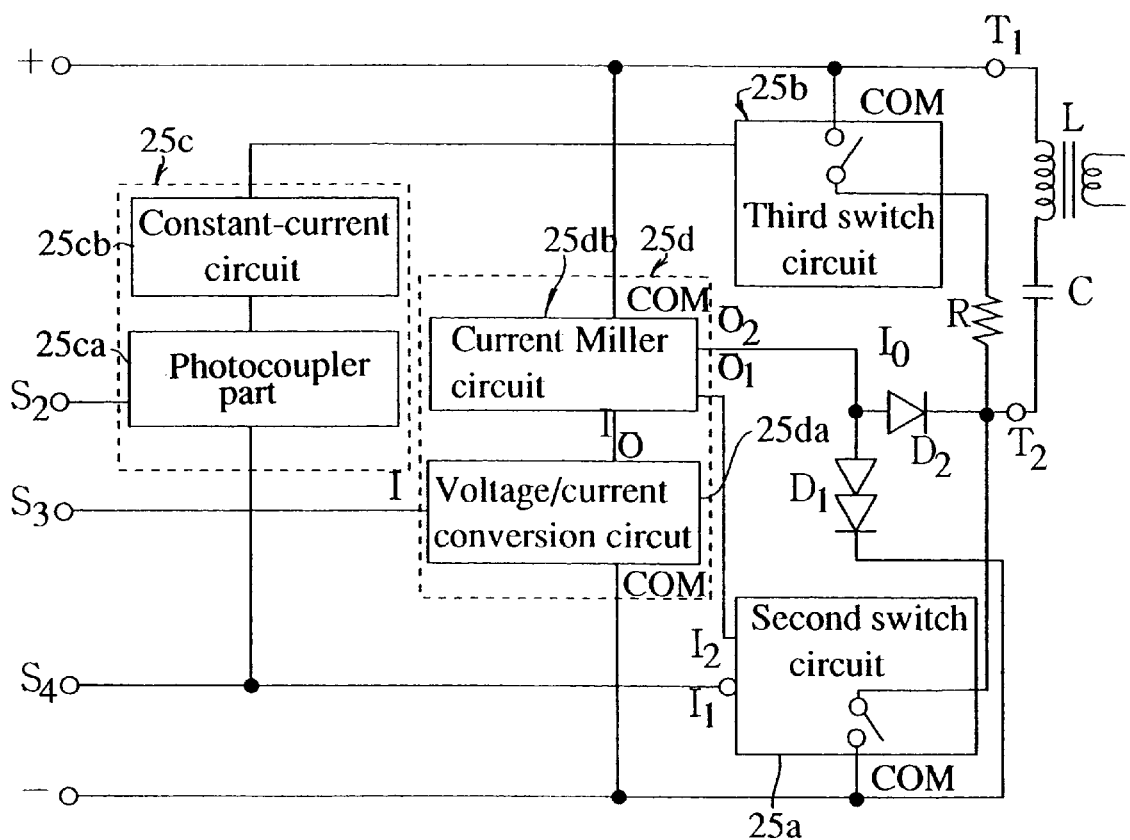
FIG. 30 is a block diagram showing a second concrete example belonging to the first circuit example of the switch block circuit of the first example.
Figure 31:
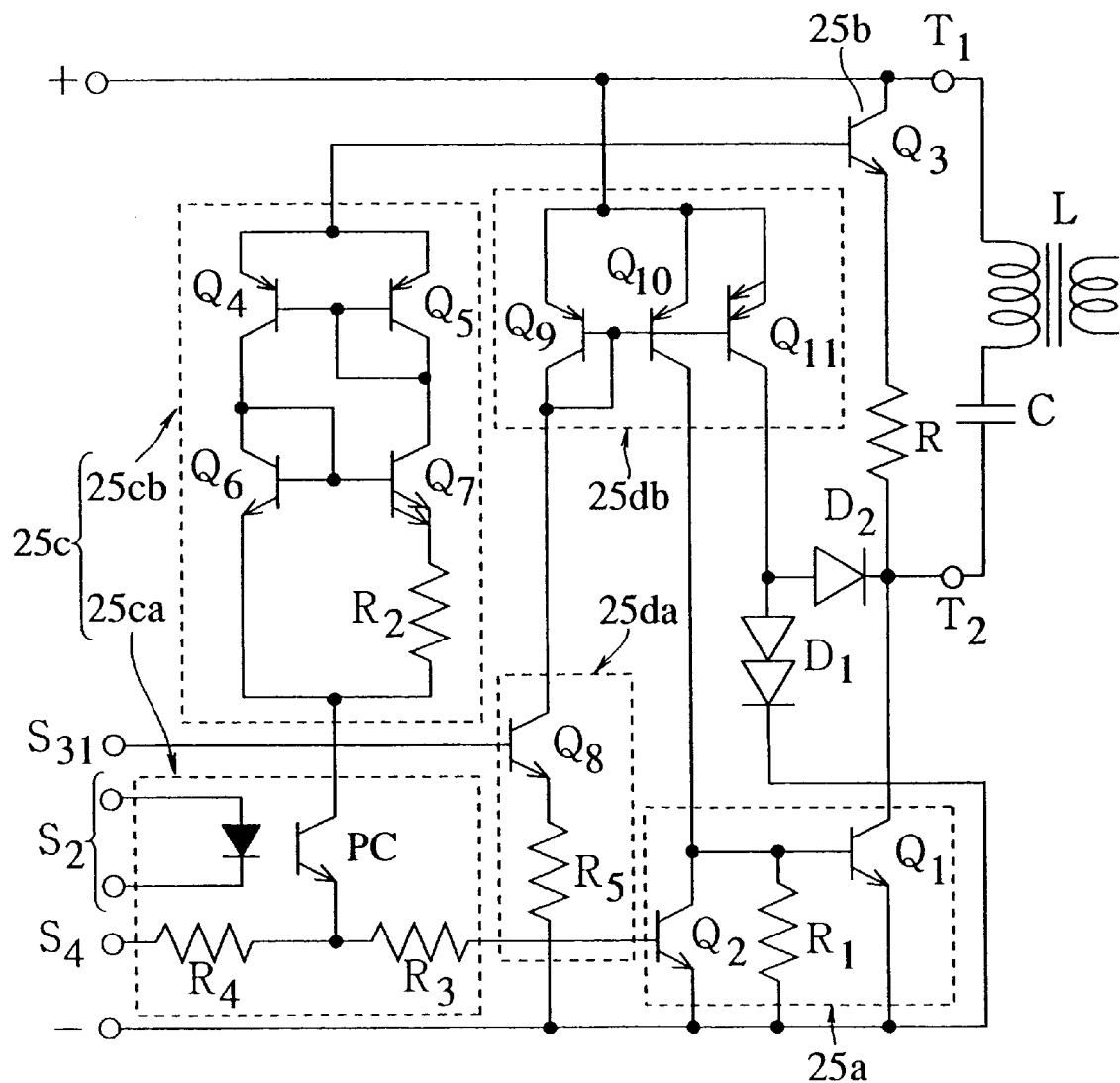
FIG. 31 shows a second detailed circuit example belonging to the first circuit example of the switch block circuit of the first example.

Next, FIG. 30 is a block circuit diagram of the switch block circuit (example-1) of the first example described with reference to FIG. 24, and FIG. 31 is a detailed circuit diagram of it.

In a circuit shown in FIGS. 30 and 31, particularly as shown in FIG. 31, the second level converting circuit 25d is composed of a voltage/current conversion circuit 25da and a current Miller circuit 25db. And since an example in which the switch block circuit is grounded at the + power source side is shown, the connecting direction of the diodes D1 and D2, and the junction type such as NPN type, PNP type, and the like of the transistors provided on the second and third switch circuits 25a and 25b are different from those in FIG. 27. Except those, this circuit is composed fundamentally in the same way as the circuit shown in FIG. 27. And as shown in FIG. 31, the above-mentioned voltage/current conversion circuit 25da is composed of a transistor Q8 and a resistor R5, and the current Miller circuit 25db is composed of transistors Q9 to Q11. The voltage/current conversion circuit 25da assumes a voltage signal of 1 to 2 volts which is grounded by the − power source terminal as the third control signal S3. Since the switch block circuit itself is grounded by the + power source terminal, this circuit example-2 is a circuit in which a current loop-back operation is performed by the current Miller circuit.

Figure 32:
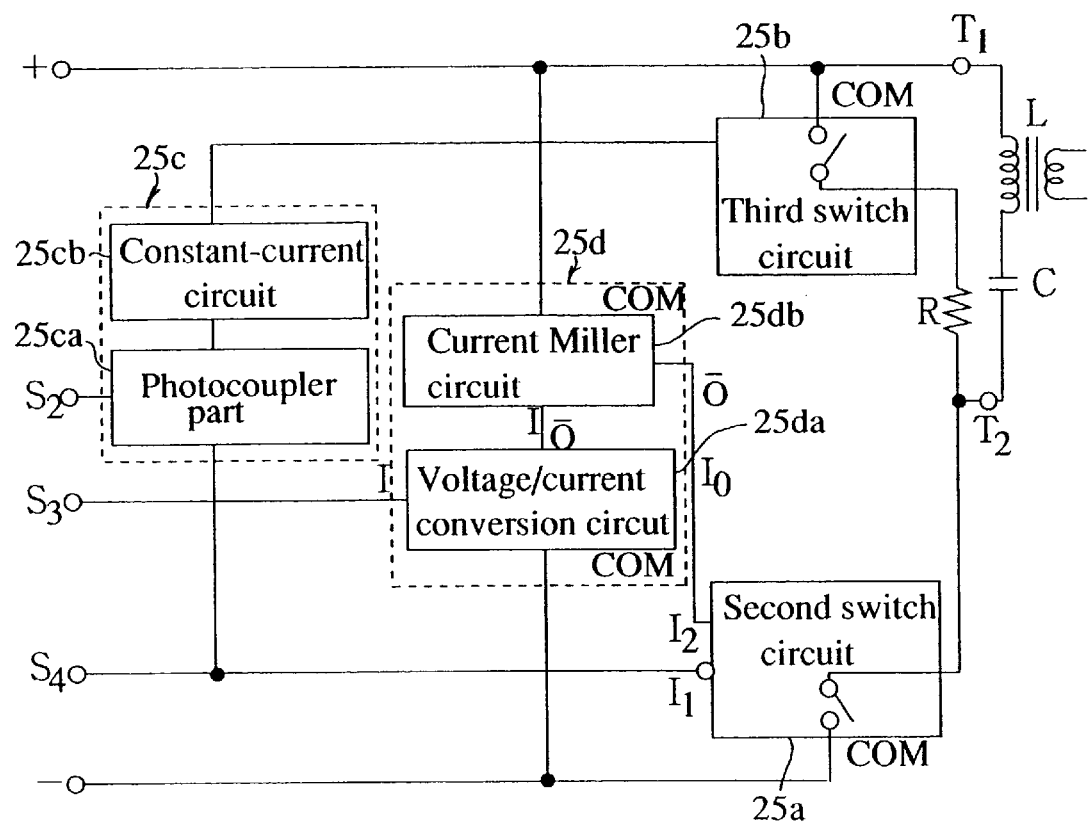
FIG. 32 is a block diagram showing a second concrete example belonging to the second circuit example of the switch block circuit of the first example.
Figure 33:
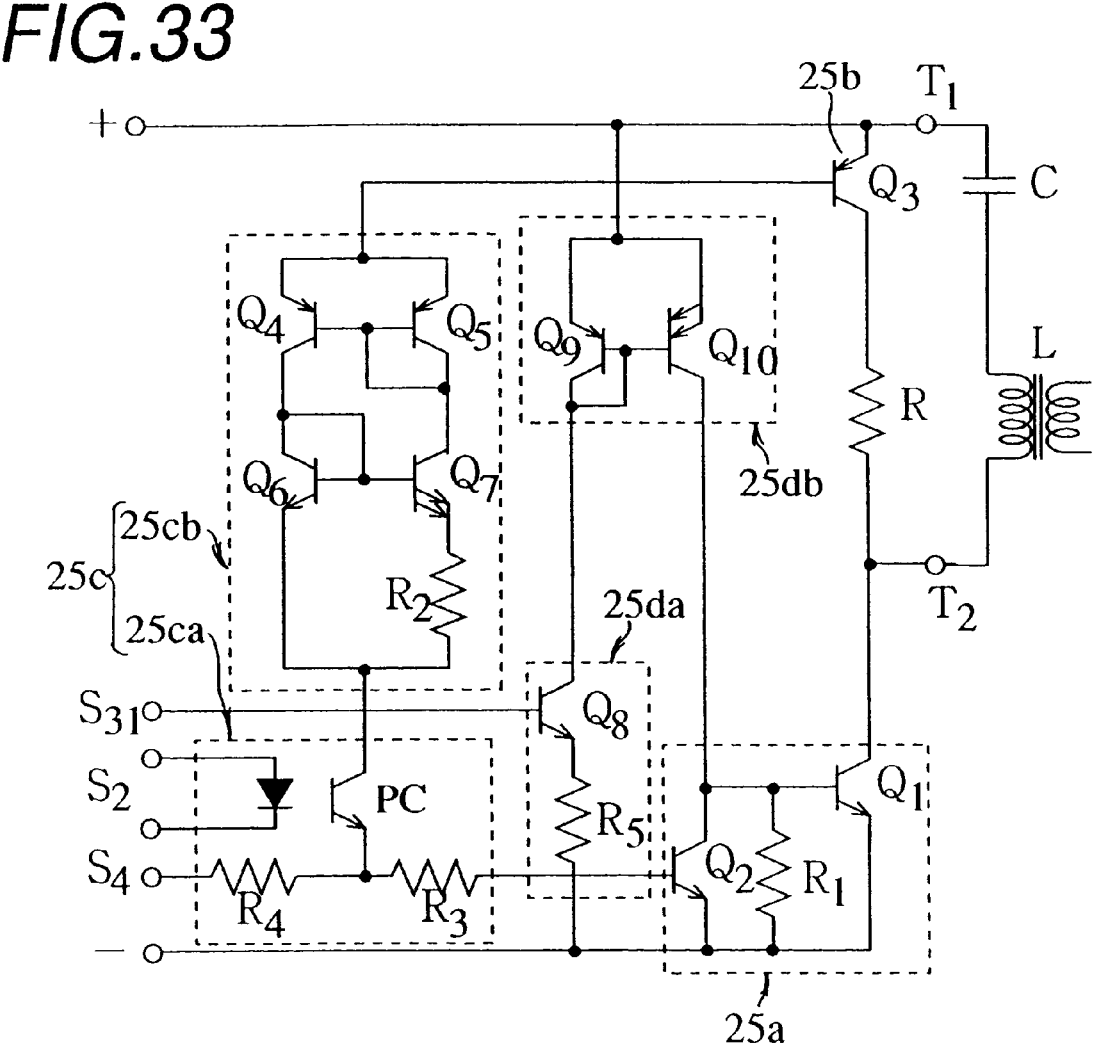
FIG. 33 shows a second detailed circuit example belonging to the second circuit example of the switch block circuit of the first example.

Next, FIG. 32 is a block circuit diagram of the switch block circuit (example-2) of the first example described with reference to FIG. 25, and FIG. 33 is a detailed circuit diagram of it.

A circuit shown in FIGS. 32 and 33 is different in a point of making a part of the second switch circuit 25a have also a role of the diodes D1 and D2, as already described with reference to FIG. 25, from the circuit described with reference to FIGS. 30 and 31. Corresponding to this different point, the current Miller circuit db is composed of transistors Q9 and Q10, as shown in FIG. 33.

Figure 34:
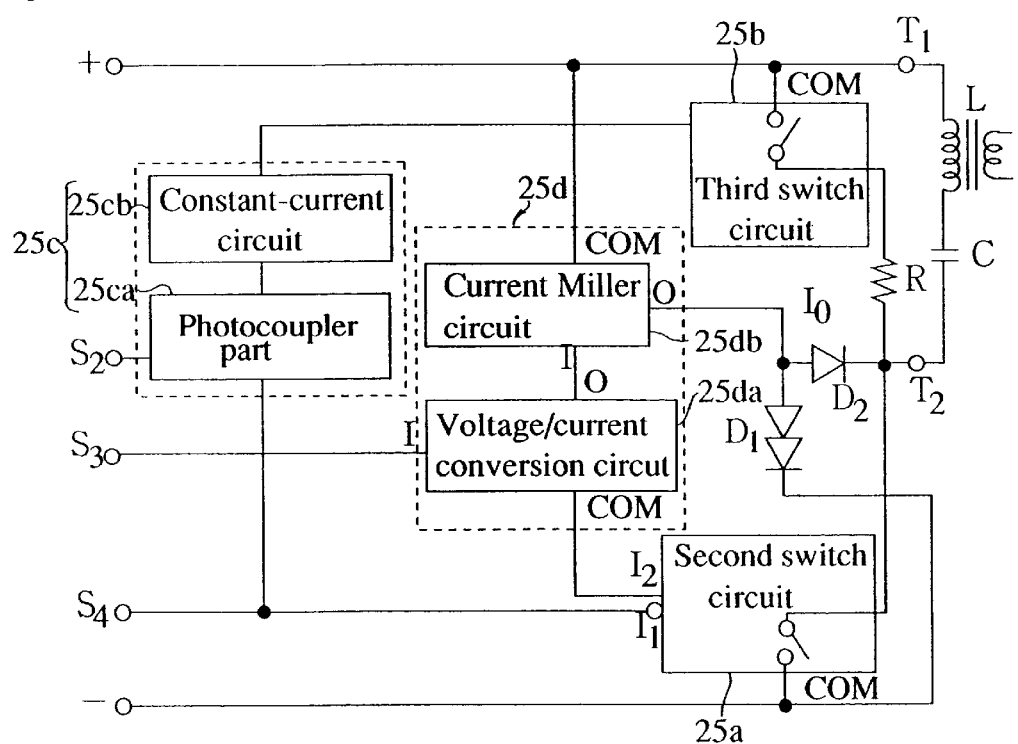
FIG. 34 is a block diagram showing a third concrete example belonging to the first circuit example of the switch block circuit of the first example.
Figure 35:
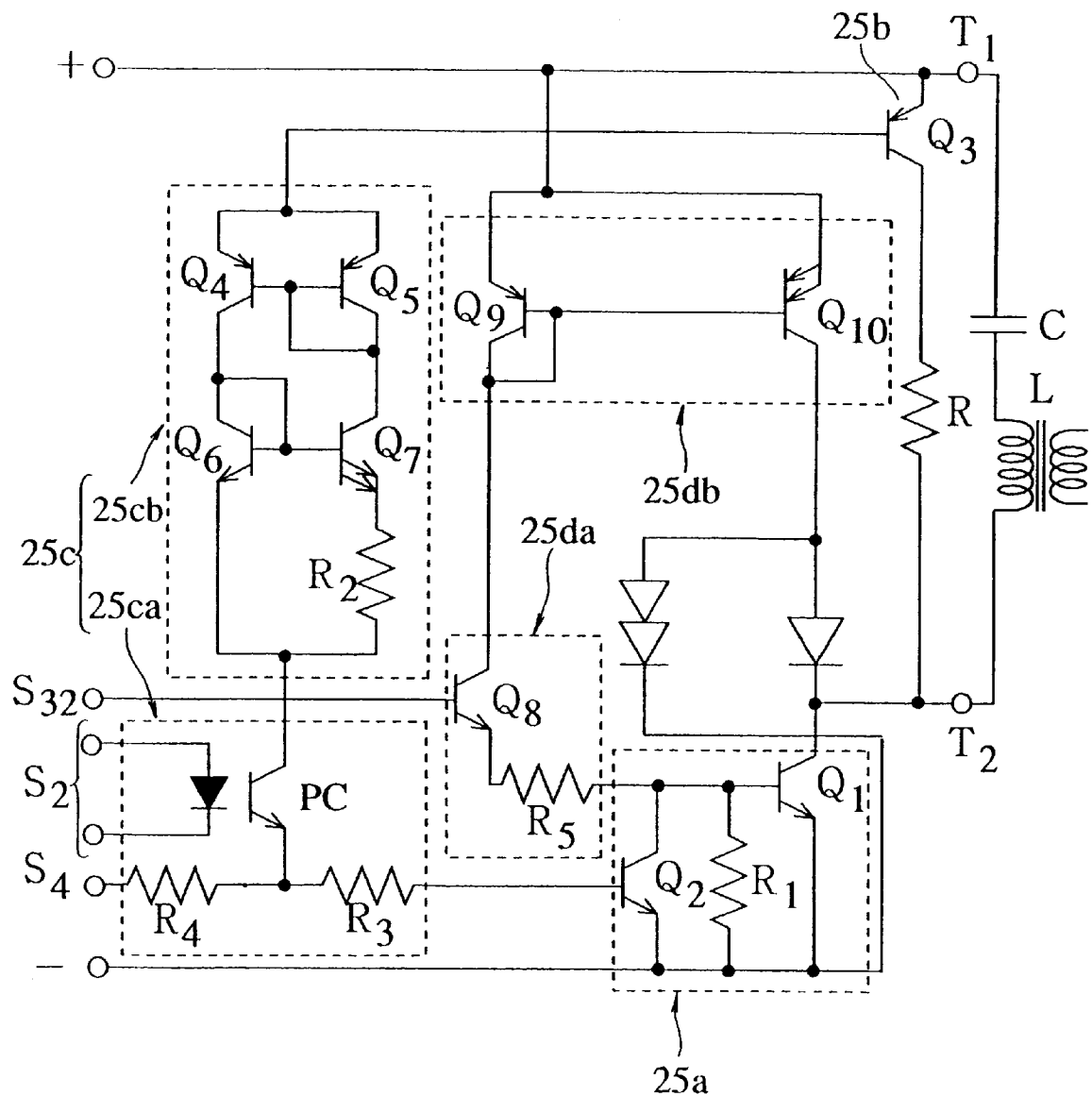
FIG. 35 shows a third detailed circuit example belonging to the first circuit example of the switch block circuit of the first example.

Next, FIG. 34 is a block circuit diagram of the switch block circuit (example-1) of the first example described with reference to FIG. 24, and FIG. 35 is a detailed circuit diagram of it.

The circuit shown in FIGS. 34 and 35 is different in configuration of the second level converting circuit 25d and in connection between the second level converting circuit 25d and the second switch circuit 25a from the circuit described with reference to FIGS. 30 and 31. That is to say, while the current Miller circuit 25db in the second level converting circuit 25d is composed of transistors Q9 to Q11 in the circuit described with reference to FIGS. 30 and 31, the current Miller circuit 25db is composed of transistors Q9 and Q10 (Q9 and Q10 in FIG. 31) in the circuit described with reference to FIGS. 34 and 35. And while the output terminal of the current Miller circuit 25db and the base of the transistor Q1 of the second switch circuit 25a are connected with each other in the circuit described with reference to FIGS. 30 and 31, the emitter output of the voltage/current conversion circuit 25da is connected to the base of the transistor Q1 of the second switch circuit 25a in the circuit described with reference to FIGS. 34 and 35. The second level converting circuit in this case assumes a voltage signal of 1.5 to 2.5 volts (control signal S32) which is grounded by the − power source terminal as the third control signal S3. The circuit described with reference to FIGS. 34 and 35 can more reduce the number of components in comparison with the circuit described with reference to FIGS. 30 and 31.

Figure 36:
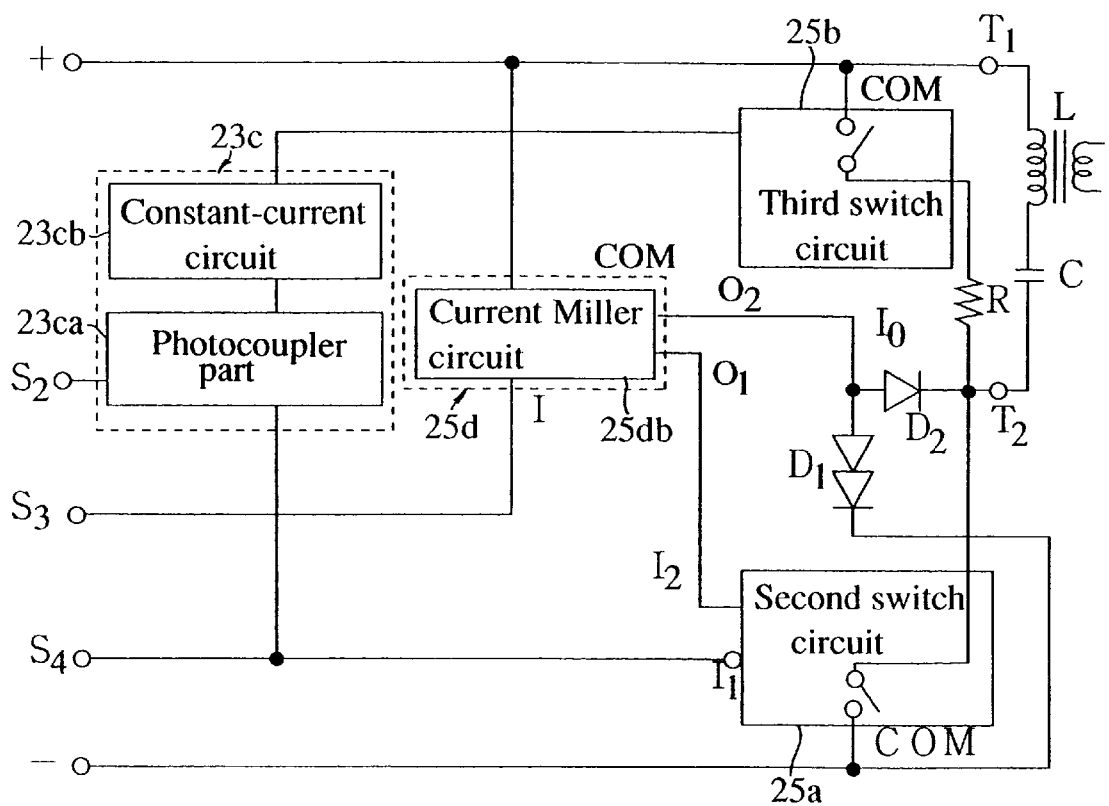
FIG. 36 is a block diagram showing a fourth concrete example belonging to the first circuit example of the switch block circuit of the first example.
Figure 37:
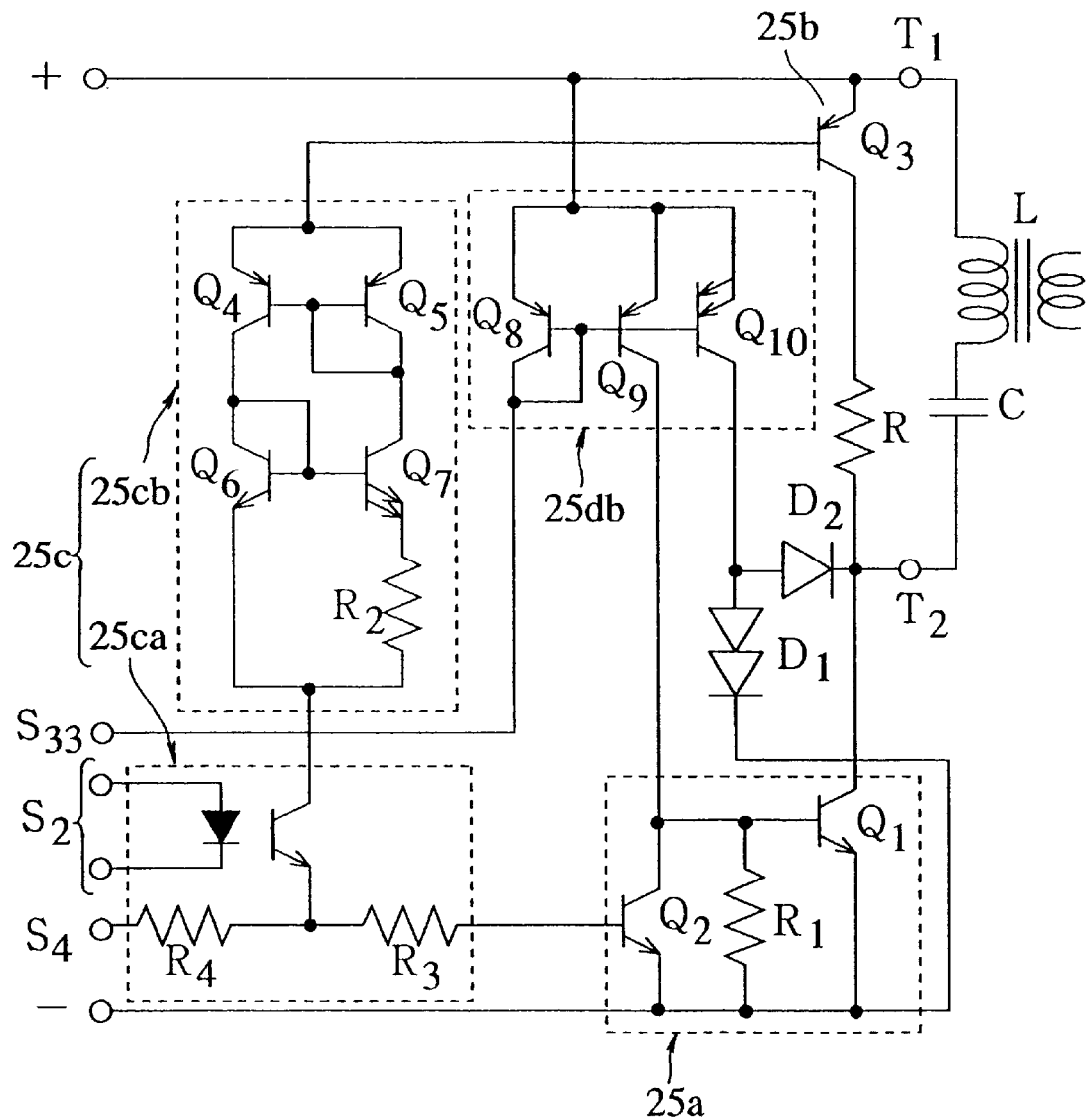
FIG. 37 shows a fourth detailed circuit example belonging to the first circuit example of the switch block circuit of the first example.

Next, FIG. 36 is a block circuit diagram of the switch block circuit (example 1) of the first embodiment described with reference to FIG. 25, and FIG. 37 is a detailed circuit diagram of it.

In the circuit example shown in FIGS. 36 and 37, it is assumed that the third control signal S3 is a control signal in the form of current. In case that the third control signal S3 is in the form of current, this is represented by S33 in the figure. The third control signal S3 in the form of current dispenses with the voltage/current conversion circuit 25da which is required in the former circuit examples. Furthermore, since this is an example in which the switch block circuit is grounded at the + power source side, the third control signal S3 can do only by being received by the current Miller circuit. FIG. 37 shows an example in which the voltage/current conversion circuit 25da is removed from the circuit example shown in FIG. 31. The current Miller circuit 25db current-amplifies an input signal according to its input current level.

Figure 38:
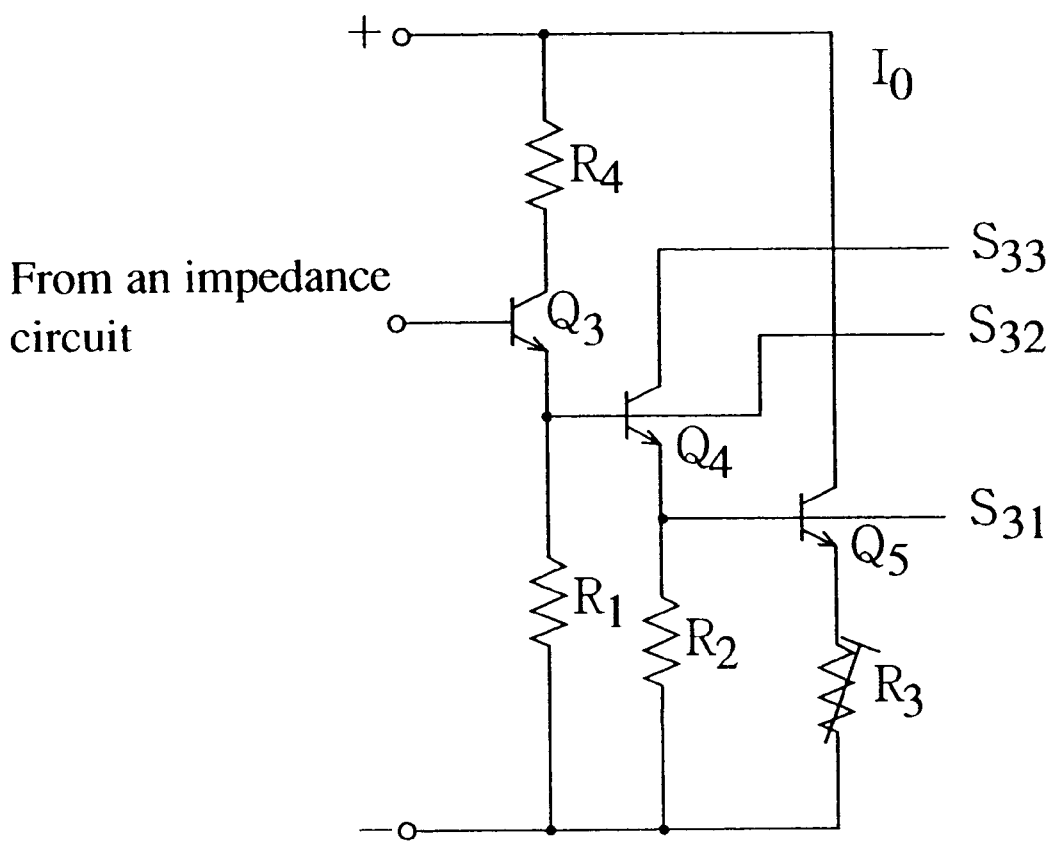
FIG. 38 shows a second circuit example of a voltage/current conversion circuit of a dial pulse circuit.

A circuit to obtain the third control signal S33 in the form of current can be obtained by using the voltage/current conversion circuit 23c for example shown in FIG. 38 as a voltage/current conversion circuit in the dial pulse circuit. That is to say, this circuit, which has fundamentally the configuration of the voltage/current conversion circuit 23c already described, can do by using the collector of the second stage transistor Q4 as the output point of the third control signal S33 in the form of current without connecting this collector to the + power source terminal. The voltage/current conversion circuit shown in FIG. 38 can give the third control signals S31 to S33 respectively in the forms of current and voltage.

Figure 39:
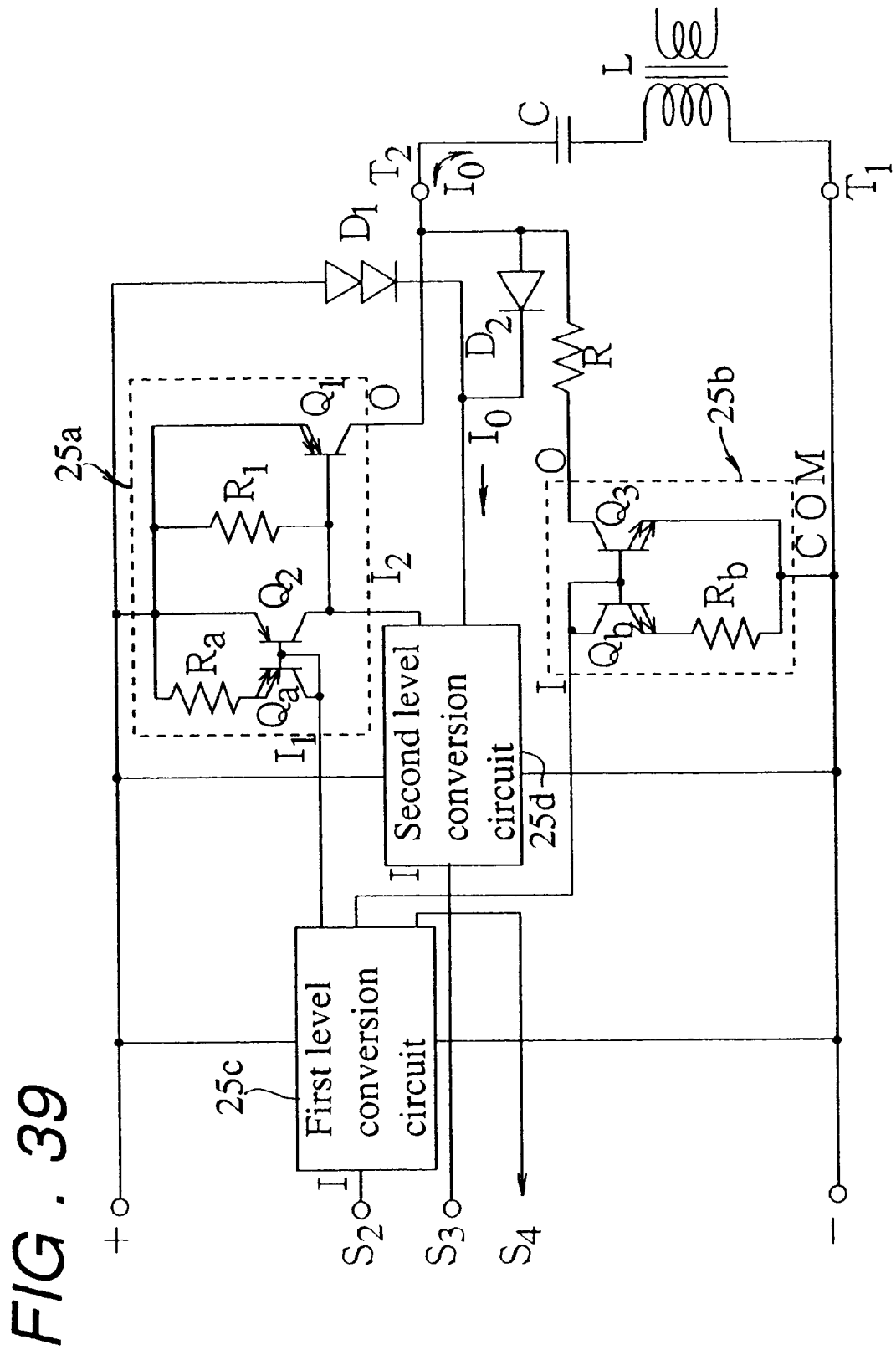
FIG. 39 shows a fifth detailed circuit example belonging to the first circuit example of the switch block circuit of the first example.

Next, FIG. 39 is a concrete circuit diagram belonging to the first example of the switch block circuit (example-1) described with reference to FIG. 25.

A circuit example shown in FIG. 39 is a fifth detailed circuit example of the switch block circuit (example-1). Concretely, in the circuit example shown in FIG. 39, the second switch circuit 25a is composed of resistors R1 and Ra and transistors Q1, Q2, and Qa (where transistor Qa can be omitted by using the resistor Ra of great resistance). That is to say, this configuration is obtained by adding the resistor Ra and the transistor Qa to the second switch circuit 25a described up to now. Here, in the transistor Qa, its emitter is connected through the resistor Ra to the + power source terminal, and its base and collector are connected to the base of the transistor Q2. The third switch circuit 25b is composed of a resistor Rb and transistors Q3 and Qb. That is to say, this configuration is obtained by adding the resistor Rb and the transistor Qb to the third switch circuit 25b described up to now. Here, in the transistor Qb, its emitter is connected through the resistor Rb to the − power source terminal, and its base and collector are connected to the base of the transistor Q3. Except those, this circuit is composed in the same way as the first embodiment of the first switch block circuit (example-1) described with reference to FIGS. 26 and 27. It is a matter of course that by reversing the polarity of the diodes D1 and D2 and the P-N polarity of the transistors in the second and third switch circuits 25a and 25b, and using the + power source terminal as the ground, the first and second level converting circuits respectively shown by the second detailed circuit example shown in FIG. 31, the third detailed circuit example shown in FIG. 35, or the fourth detailed circuit example shown in FIG. 37 may be used as the first and second level converting circuits.

An erroneous operation of the first switch circuit 25c caused by a leak current of the first output terminal when the first level converting circuit 25c outputs "0" can be prevented by adding the resistor Ra and the transistor Qa (the transistor Qa may be omitted by making the resistor Ra greater in resistance) to the second switch circuit 25a. The first and second switch circuits are made sharp in their switching operation by adding the resistors Ra and Rb and the transistors Qa and Qb to the first and second switch circuits.

On the assumption of the point described in FIG. 25, namely, of the configuration which makes a part of the second switch circuit 25a have also a role of the diodes D1 and D2, it is a matter of course that the circuit configuration of the first and second switch circuits described with reference to FIG. 39 can be also applied to the first circuit example (see FIG. 29), the second circuit example (see FIG. 33) and the like of the switch block circuit (example-2) of the first example.

However, the above-mentioned method of adding resistors Ra and Rb and transistors Qa and Qb cannot be applied to examples of the second and third switch block circuits as described later which attempt to prevent occurrence of a surge voltage by adding capacitor and resistor elements and making the second and third switch circuits perform slowly their switching operation.

The above-mentioned switch block circuits of the first example respectively can form an off-hook signal and dial pulse generating circuit by connecting them in parallel with said dial pulse circuit and the telephone line. According to these switch block circuits, the following effects can be obtained.

(1) Since the input to the transformer L can be properly cut off from the line, the main part of a great current bearing an off-hook signal or a dial pulse signal does not flow through this switch block circuit. Accordingly, the second and third switch circuits can do without using a small power device (the circuit is easy to make into a monolithic IC).

(2) Since the input to the transformer L can be properly connected with and disconnected from the line, the input to the transformer L can be properly connected with and disconnected from the line in a state where the dial pulse circuit is turned on and the line voltage is lowered. Accordingly, a surge voltage to enter the input to the transformer can be reduced.

(3) In case of short-circuiting the input side of the transformer L, the capacitor C for cutting an input direct current to the transformer L can be slowly discharged through a current limiting resistor R. Accordingly, a surge voltage to enter the input to the transformer can be reduced.

1-3-2. A second example of the switch block circuit

A second example of the switch block circuit is described in the following. A switch block circuit of the second example is characterized by the first level converting circuit 25c.

Figure 40:
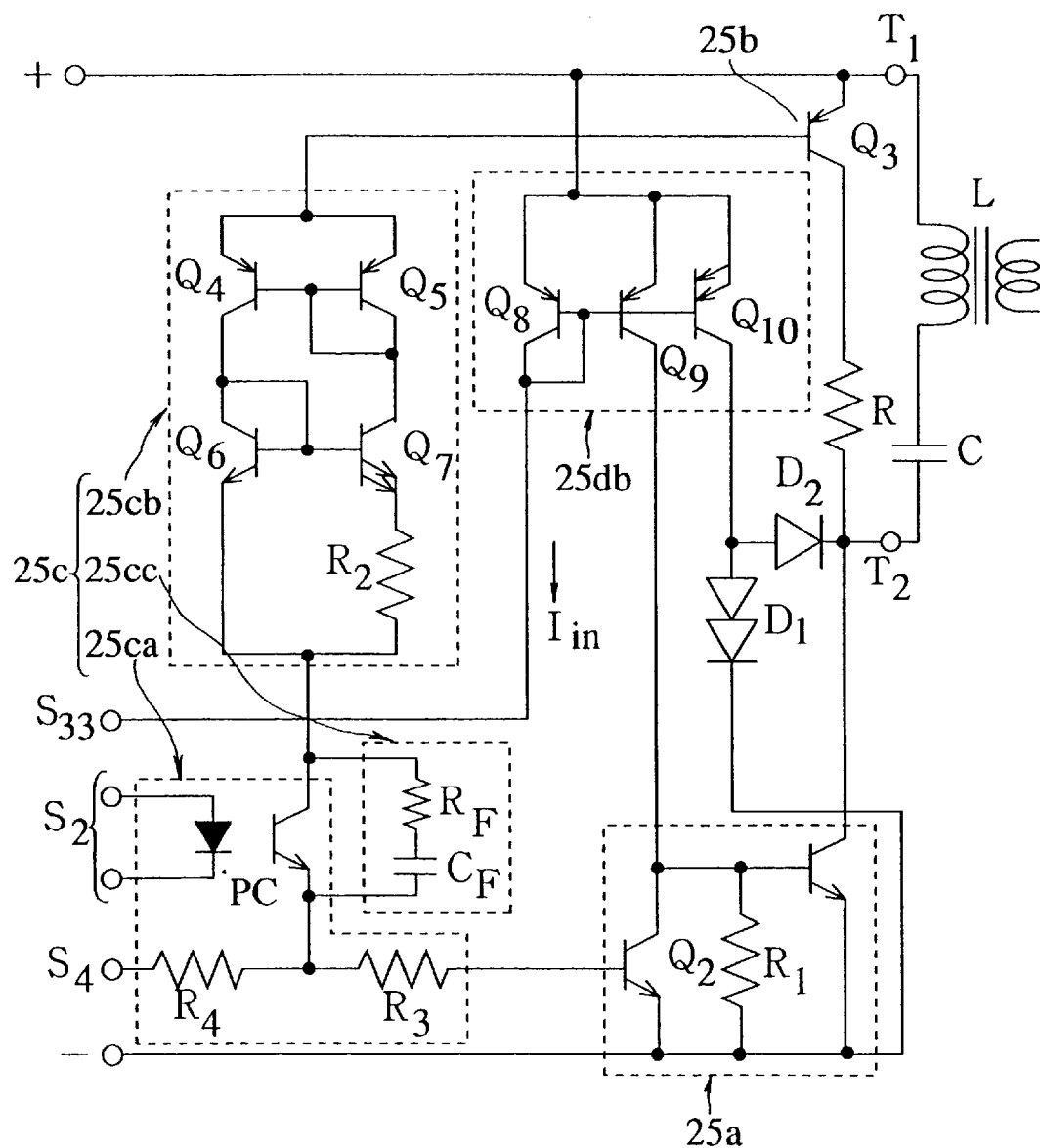
FIG. 40 shows a detailed circuit example belonging to a second example of a switch block circuit.

FIG. 40 shows a detailed circuit example belonging to the second example of the switch block circuit. Here, a circuit configuration example is shown in which the first level converting circuit 25c in the fourth detailed circuit described with reference to FIG. 37 has been modified. That is to say, in the circuit of FIG. 40, a series circuit 25cc of a capacitor CF and a resistor RF is connected in parallel between the output terminals (between the collector and the emitter) of a photocopier PC which is a switching device of a photocoupler part 25ca. Here, although an example in which a series circuit of the capacitor CF and the resistor RF is added to the circuit described with reference to FIG. 37 is explained, this idea can be applied to any of the respective switch block circuits described with reference to FIGS. 26 to 35.

The switch block circuit of the second example has the following effects. In case of the switch block circuit of the first example, when disconnecting the input terminal of the transformer L from the line and short-circuiting between the input terminals, it is possible to keep low the discharge current transiently flowing of the capacitor C by means of the current limiting resistor R, and prevent a surge voltage from entering the communication system. However, at the time of a transient operation of canceling the short-circuit between the input terminals of the transformer L and connecting the input terminals of the transformer L to the line, the current limiting resistor R does not become a current path and the input terminals of the transformer L are connected directly to the line capacitance charged by the line voltage and there is a possibility that a surge voltage to the communication system is caused by a great charge current.

On the other hand, in the switch block circuit of the second example, when a capacitor-resistor circuit is connected between the output terminals of the on/off switch 25ca (here, photocoupler PC) and the on/off switch 25ca is turned off, namely, the second control signal S2 is brought into an off state, an electric current which has been flowing through the on/off switch 25ca up to this time comes to flow through this added capacitor-resistor circuit 25cc. Although an electric current to flow through the added capacitor-resistor circuit 25cc is initially determined by the above-mentioned constant-current circuit 25cb, this current becomes soon a damping current determined by a capacitor-resistor time constant which the added capacitor and resistor have and so the output current of the first level converting circuit 25c also is damped according to said damping current. As the result, in comparison with the case of adding no capacitor-resistor circuit 25cc, the second switch circuit 25a is more slowly turned on and the third switch circuit 25b is more slowly turned off. Accordingly, since the input to the transformer is slowly connected to the line in a transient time through the transient resistances of the first and second switch circuits, occurrence of a surge voltage can be prevented.

1-3-3. A third example of the switch block circuit

Figure 41:
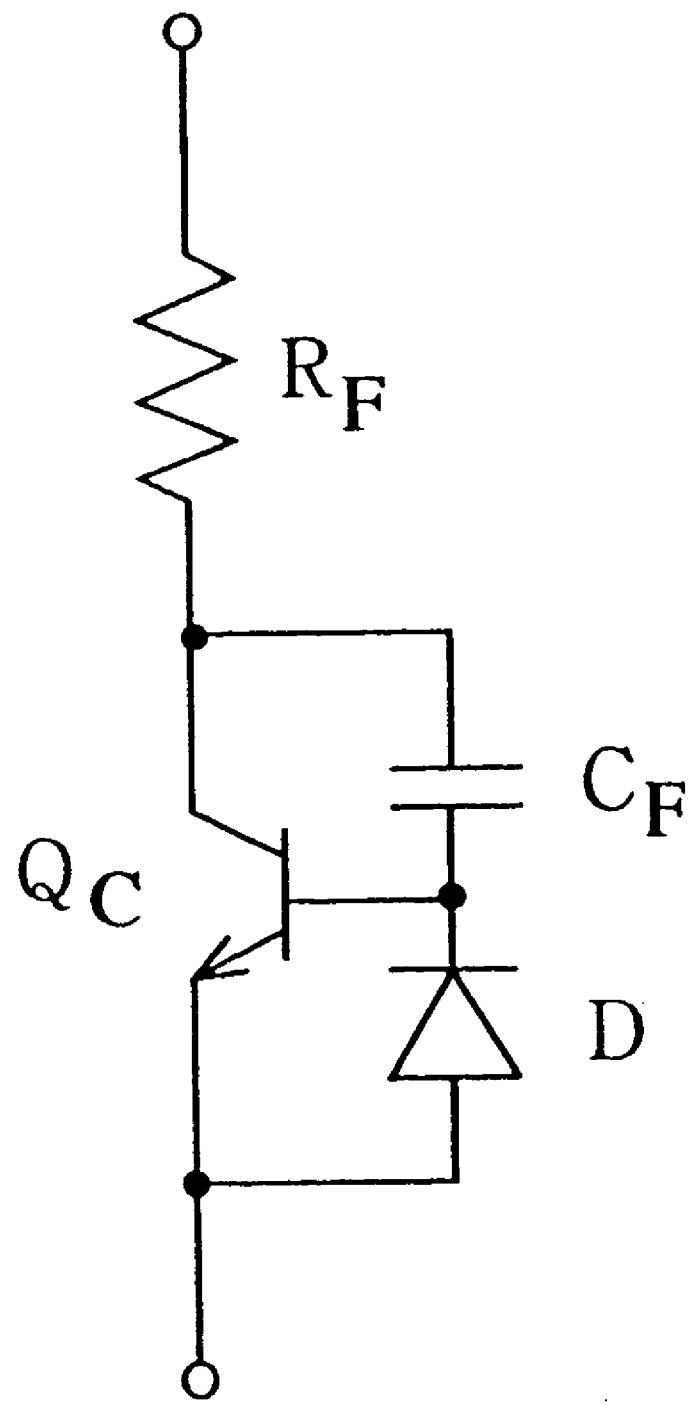
FIG. 41 shows a capacitor-resistor circuit using a Miller capacitor.

Although in the switch block circuit of the second example, a series circuit of a capacitor and a resistor is provided between the output terminals of a photocoupler PC, instead of this, a series circuit composed of a resistor RF and a Miller capacitor composed of a transistor Qc and a diode D and a capacitor CF, as shown in FIG. 41, may be provided between the output terminals (the collector and the emitter) of the photocoupler PC. This case also brings the same effects as the switch block circuit of the second example. By making the capacitor part into a Miller circuit, the capacitor CF can be reduced in capacitance to $1/\beta$. Here, $\beta$ is a grounded-emitter current amplification factor of the transistor Qc.

1-3-4. A fourth embodiment of the switch block circuit

Figure 42:
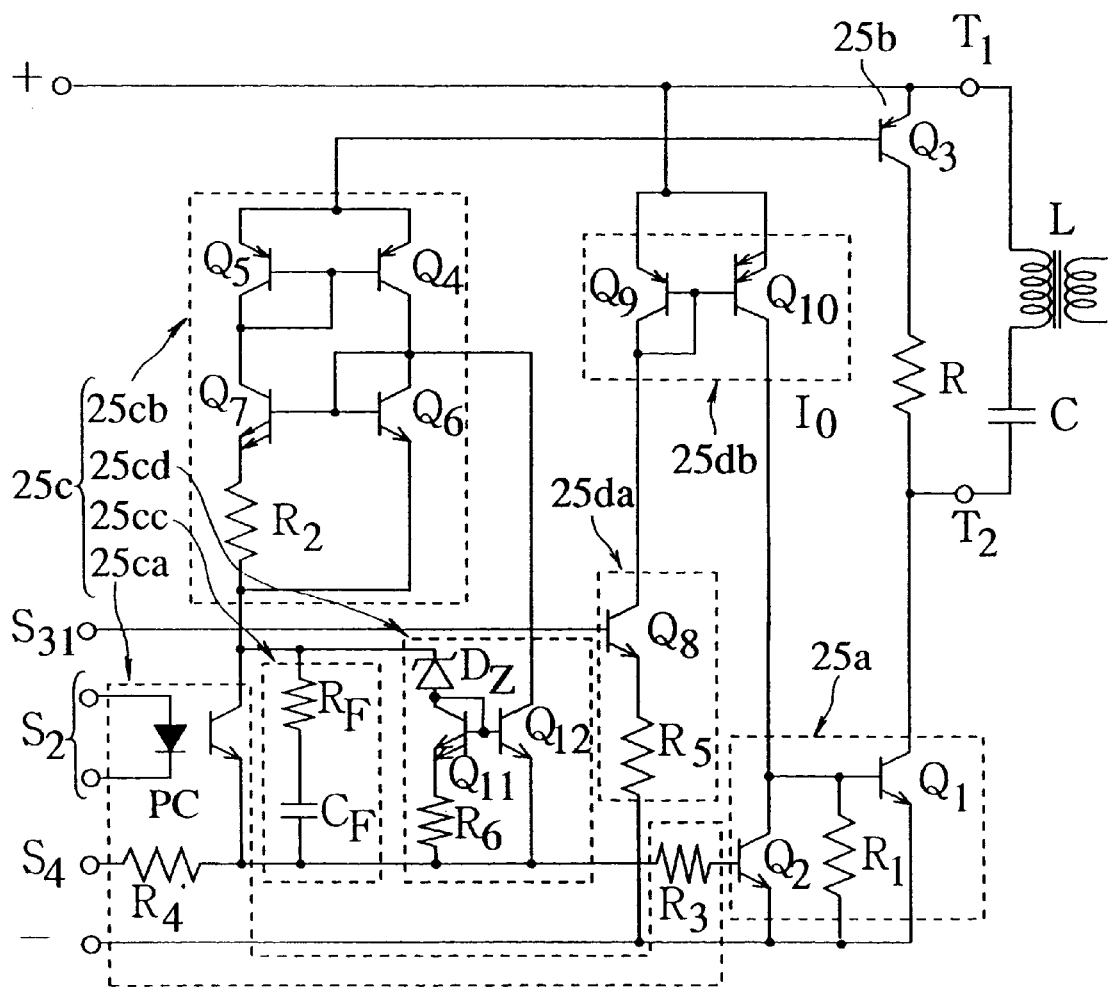
FIG. 42 shows a first circuit example belonging to a fourth example of the switch block circuit.

FIG. 42 shows a circuit diagram of a switch block circuit of a fourth example. FIG. 42 shows an example in which an idea of the fourth example is applied to the circuit shown in FIG. 33. The switch block circuit of the fourth embodiment is characterized by that a series circuit 25cc of a capacitor CF and a resistor RF, and a non-linear current amplifier 25cd with a Zener diode are respectively added between the output terminals of a photocoupler which is a switching device of the first level converting circuit 25c. Here, the non-linear current amplifier 25cd with a Zener diode is composed of a non-linear current amplifier which is composed of a resistor R6 and transistors Q11 and Q12 and in which its current gain becomes large as its input current becomes great, and a Zener diode Dz connected in series to the input side of the amplifier. The non-linear current amplifier 25cd with a Zener diode is operated only by an input voltage higher than the withstand voltage of the Zener diode Dz. The input terminal and the common terminal of the non-linear current amplifier 25cd (in detail described later) are connected between the output terminals of the photocoupler PC. And the current flowing-in (or flowing-out) output of the non-linear current amplifier 25cd is connected to an input point (here, a connecting point of Q4 and Q6 in FIG. 42) where a constant-current value of the constant-current circuit 25cb in the first level converting circuit decreases when an electric current of the constant-current circuit 25cb flows out (or flows in).

Although FIG. 42 shows an example in which the idea of the fourth example is applied to the circuit shown in FIG. 33, the idea of the fourth example can be applied to any of the circuits shown in FIGS. 26 to 37.

Since the switch block circuit of the fourth example also can slowly connect and disconnect between the input of the transformer and the line (power source) in the same way as the second and the third example, occurrence of a surge voltage can be suppressed. Furthermore, in this case, the following unique effects can be obtained.

In the above-mentioned switch block circuit of the second example or the third example, since a high voltage exceeding 200 volts at the time of a line insulation test or the like performed by the office side is also applied to a capacitor CF in a capacitor-resistor circuit connected in parallel with a photocoupler PC, the capacitor needs to have a dielectric strength capable of bearing this voltage. On the other hand, in the switch block circuit of the fourth example, since the added non-linear current amplifier 25cd has a Zener diode Ds, a Zener voltage of the Zener diode Dz can be set a little higher than a voltage ordinarily supplied from the office side.

In case that a Zener voltage of the Zener diode Dz has been set as described above, within an ordinary line voltage, since the Zener diode Dz in the non-linear current amplifier 25cd is not turned on and does not come into an operating state, the added non-linear current amplifier 25cd can be neglected. However, the added capacitor-resistor circuit is operated as specified.

On the other hand, when the line voltage rises at the time of a line insulation test performed in a waiting time, the constant-current circuit 25cb in the first level converting circuit 25c is turned on by taking the rising voltage as a trigger and charges the capacitor CF of the added capacitor-resistor circuit 25cc. When the charge voltage of the capacitor CF reaches the Zener voltage of the Zener diode Dz of the added non-linear current amplifier 25cd, the added non-linear current amplifier 25cd begins to operate and clamps the voltage between the terminals of the capacitor CF to the Zener voltage.

When the added non-linear current amplifier 25cd begins to operate, its output current operates so as to reduce a constant-current value of the constant-current circuit 25cd in the first level converting circuit 25c. That is to say, a new constant-current loop circuit which is composed by combining together the non-linear current amplifier 25cd and the constant-current circuit 25cb in the first level converting circuit 25c and is balanced by a smaller current value results in beginning to operate.

An electric current flowing through the first level converting circuit 25c (also an electric current flowing through the Zener diode Dz) decreases toward the new balancing current value with operation of the new constant-current loop circuit.

By setting the new balancing current value at a value which can clear an insulation test and also can keep the Zener voltage, it is possible both to limit a voltage applied to the added capacitor-resistor circuit to the Zener voltage and under, and to clear the insulation test.

Figure 43:
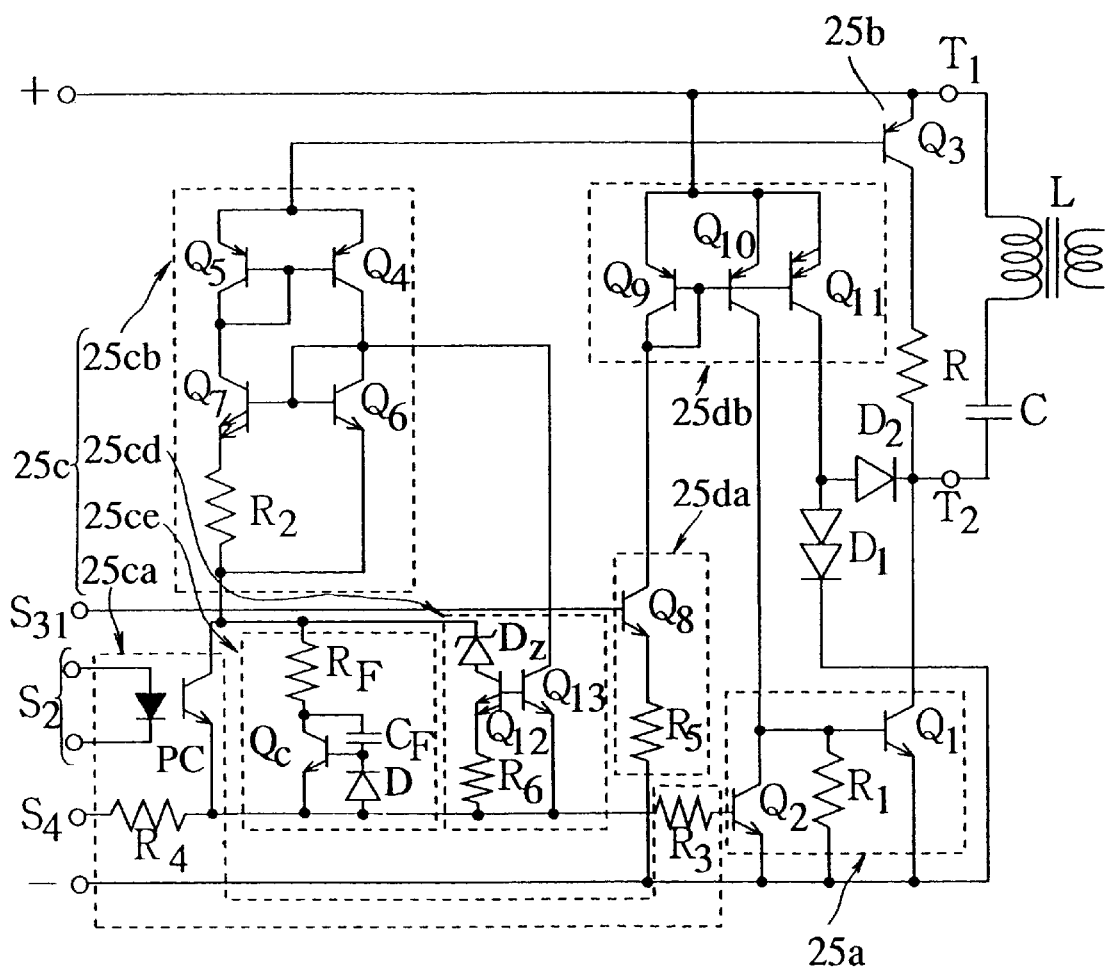
FIG. 43 shows a second circuit example belonging to the switch block circuit of the fourth example.

As shown in FIG. 43, instead of the added capacitor-resistor circuit 25cc used in FIG. 42, a series circuit 25ce composed of a Miller capacitor composed of a diode D and a capacitor CF, and a resistor RF may be used. By making a capacitor part into a Miller circuit, the capacitor CF can be reduced in capacitance to $1/\beta$. Here, $\beta$ is a grounded-emitter current amplification factor of the transistor Qc.

In addition to the effects of the switch block circuit of the second example, the switch block circuit of the fourth example brings effects that (1) the capacitor CF of the added capacitor-resistor circuit may not be so high in dielectric strength, and (2) particularly the circuit of FIG. 43 can make the capacitor CF of the added capacitor-resistor circuit small in capacitance.

In addition to the effects of the switch block circuit

2. SECOND EMBODIMENT

The off-hook signal and dial pulse generating circuit 20 of the first embodiment is provided with the filter circuit 23a which varies in its operating state according to the fourth control signal S4. However, there is a case that the office-side power feeding system is a constant-voltage constant-resistance system and the line distance is in a range where the line voltage can be kept at a certain value or more. For example, that is a circuit example of FIG. 3. In this case, the line distance is limited to a short-distance line where the negative feedback circuit or voltage clamping circuit 23d adequately operates so as to keep constant an output current Io of the voltage/current conversion circuit 23c. Under such conditions, the dial pulse circuit 23 shows a constant-current characteristic at the time of being turned on (a characteristic capable of securing a high impedance to an alternating current signal at an off-hook operation). Originally, the main purpose of providing the capacitor CF is to make it possible both to secure a direct current as an off-hook signal and to have a high impedance to an alternating current signal, by forming a low-pass filter out of the resistor R6 and the capacitor CF and further by forming a pseudo-inductance out of the voltage/current conversion circuit 23c and the capacitor CF under the condition of a long-distance line where the constant-current circuit 23ac and the negative feedback circuit or voltage clamping circuit 23d cannot operate (where the line voltage is lowered). Under the above-mentioned condition in which the line length is limited to a short length, even when the capacitor CF is removed, since the voltage/current conversion circuit 23c has a constant-current characteristic thanks to an effect of the negative feedback circuit or voltage clamping circuit 23d, it is possible both to secure a direct current as an off-hook signal and to have a high impedance to an alternating current signal. And when containing no capacitor, a high-speed switching operation can be performed at the time of sending dial pulses or the like. This off-hook signal and dial pulse generating circuit of the second embodiment is an example for that.

Figure 44:
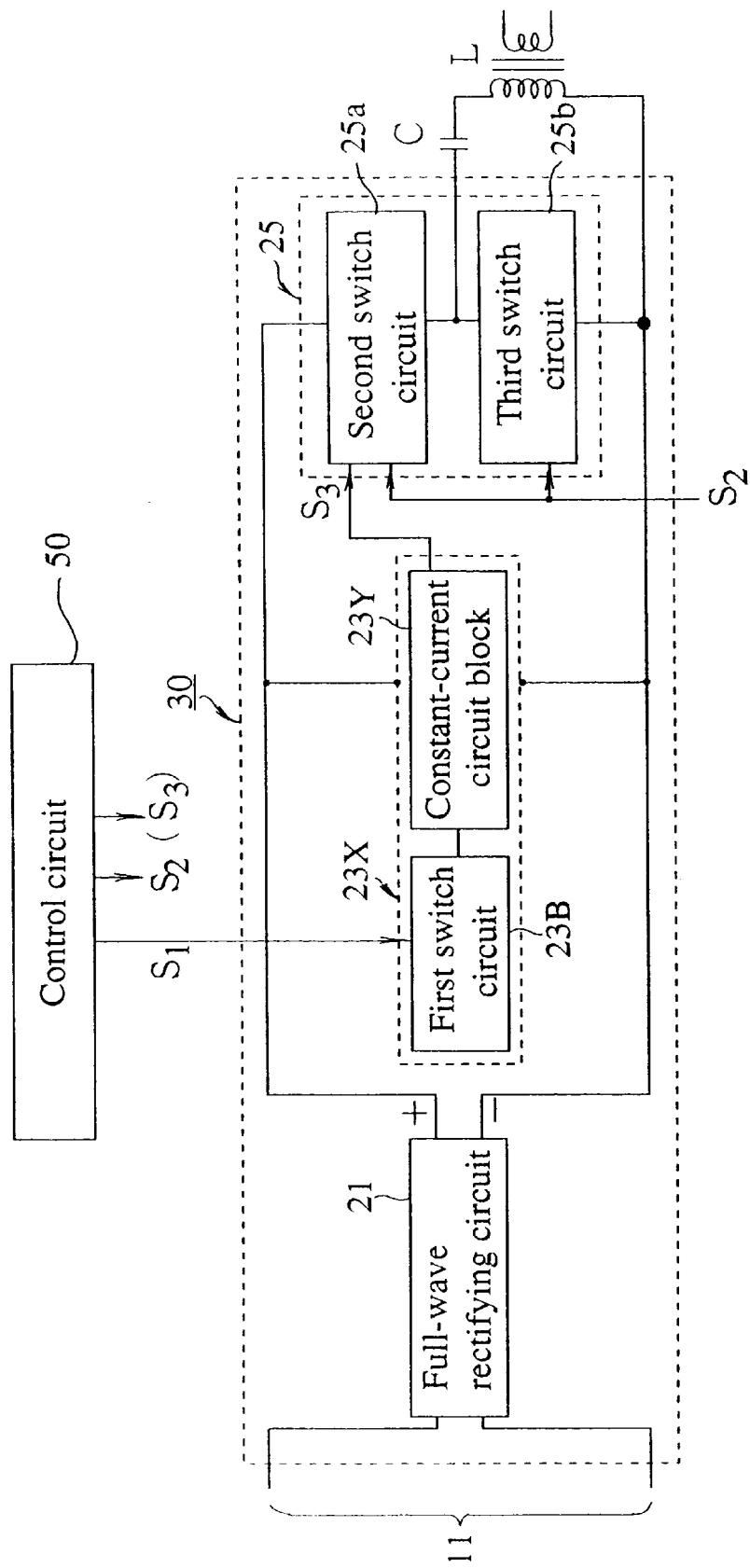
FIG. 44 is a figure for explaining a fundamental configuration of an off-hook signal and dial pulse generating circuit according to the second embodiment of the invention.

FIG. 44 is a block diagram for explaining a fundamental configuration of an off-hook signal and dial pulse generating circuit 30 of the second embodiment, and corresponds to FIG. 1.

An off-hook signal and dial pulse generating circuit 30 of the second embodiment (hereinafter also referred to as a signal generating circuit 30 of the second embodiment) is characterized by being provided with a constant-current circuit block 23Y which is connected in parallel with the output side of the full-wave rectifying circuit 21 and through which a constant current flows when applying a voltage, instead of being provided with the impedance circuit 23A used in the first embodiment. This circuit is concretely described in the following. However, in the signal generating circuit 30 of the second embodiment, since the switch block circuit 25 can use the various switch block circuits described in the first embodiment as they are, description of them is omitted. Hereupon, only some concrete circuit examples of a dial pulse circuit 23X in the signal generating circuit 30 of the second embodiment are described.

Figure 45:
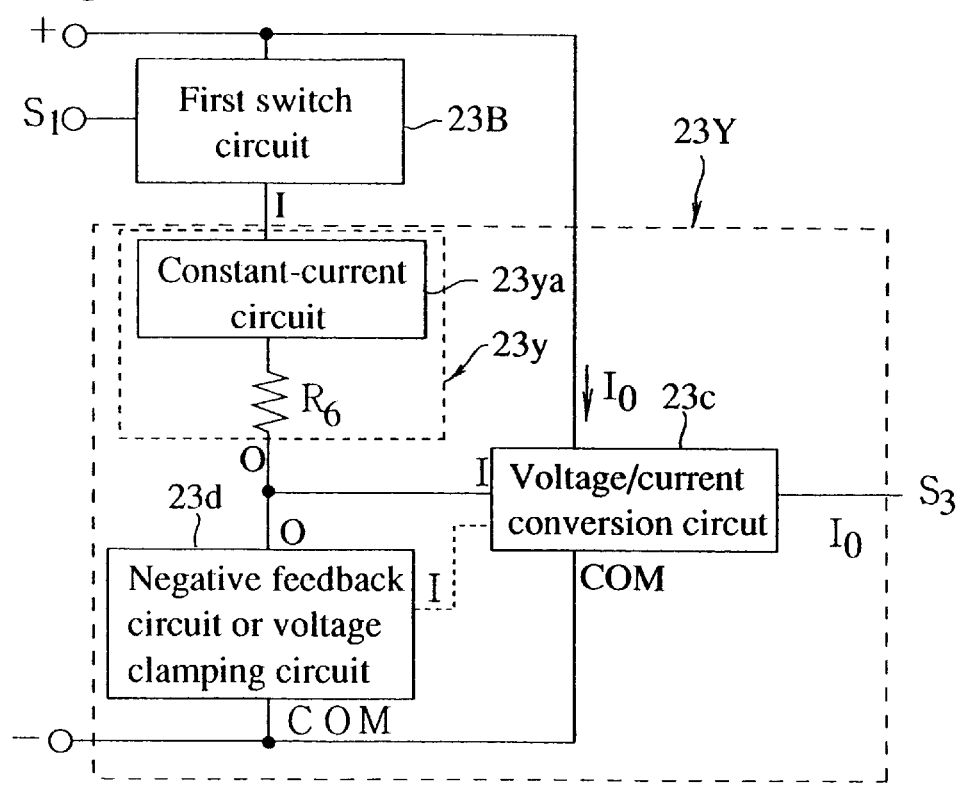
FIG. 45 shows a first circuit example of a dial pulse circuit of the second embodiment.

FIG. 45 is a block diagram showing a first circuit example of the dial pulse circuit in the signal generating circuit 30 of the second embodiment.

Figure 46A:
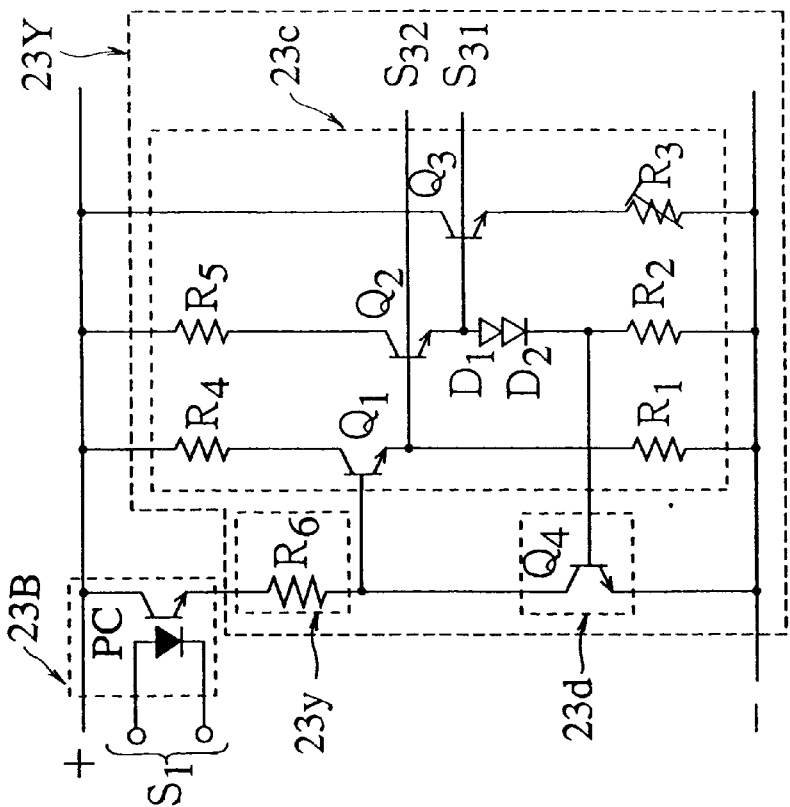
FIGS. 46(A) and 46(B) show, respectively, detailed circuit examples belonging to the first circuit example of the dial pulse circuit of the second embodiment.
Figure 46B:
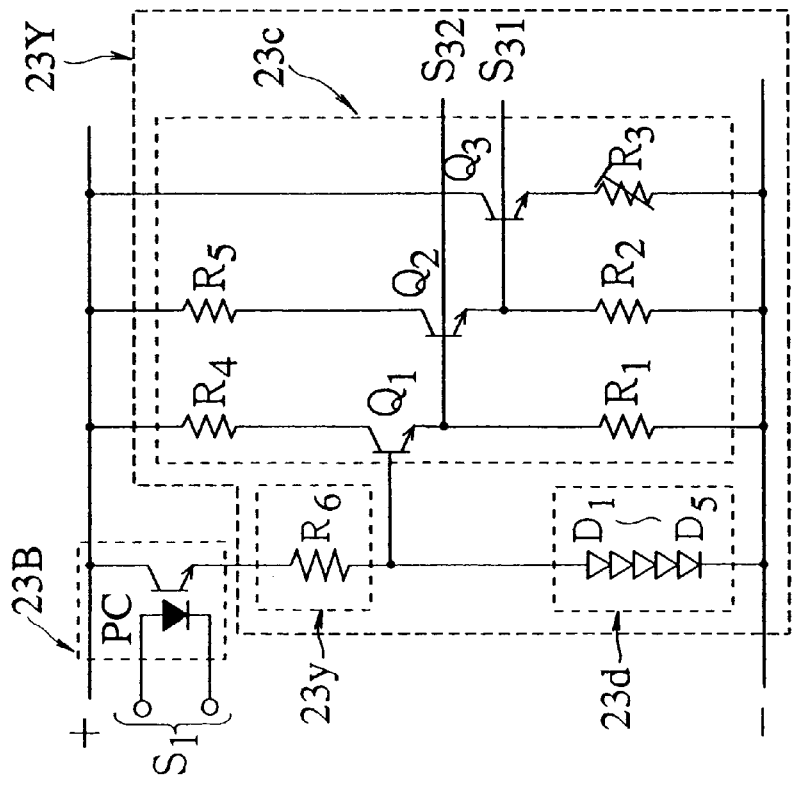
Figure 47:
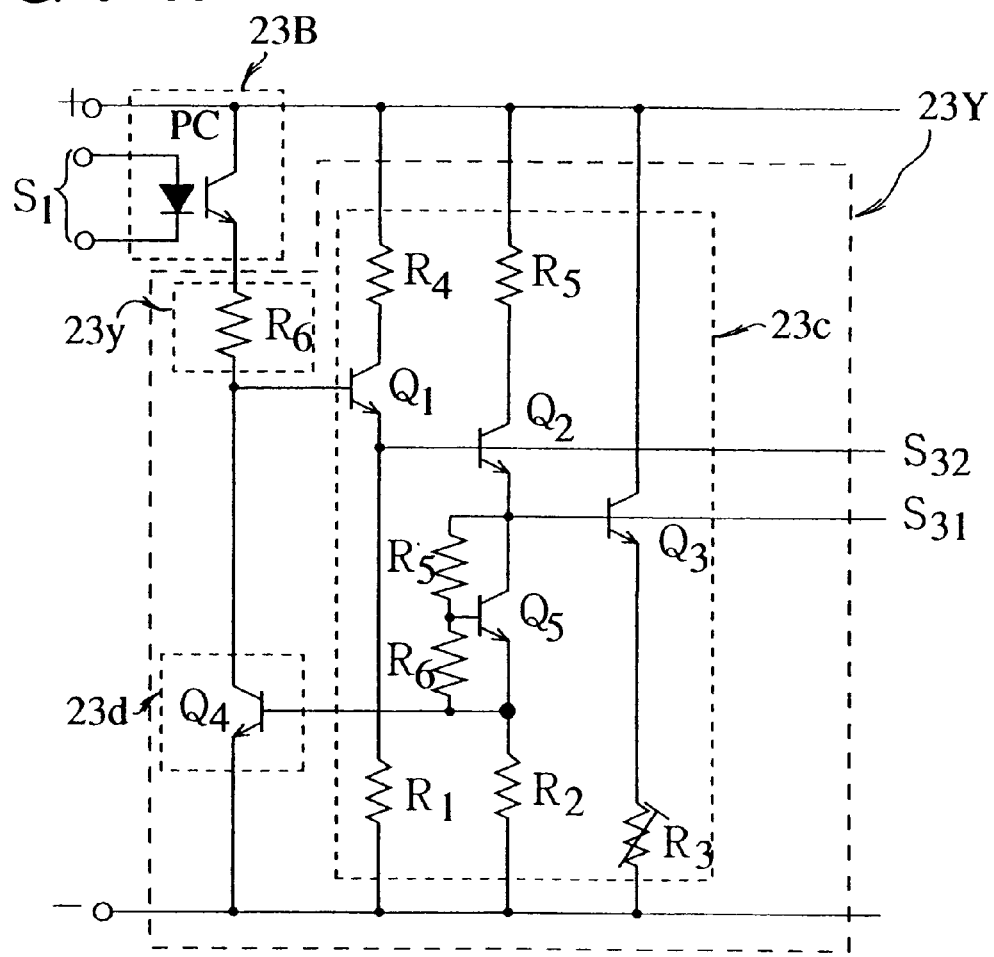
FIG. 47 shows a detailed circuit example belonging to the first circuit example of the dial pulse circuit of the second embodiment.
Figure 48A:
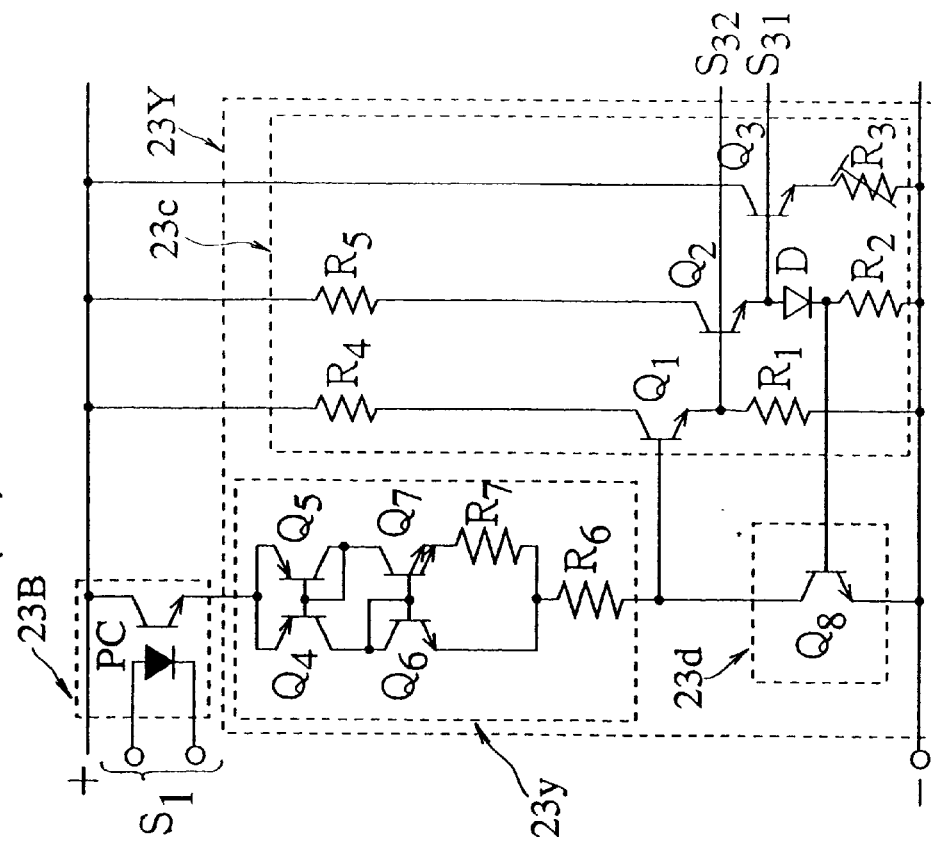
FIGS. 48(A) and 48(B) show, respectively, detailed circuit examples belonging to the first circuit example of the dial pulse circuit of the second embodiment.
Figure 48B:
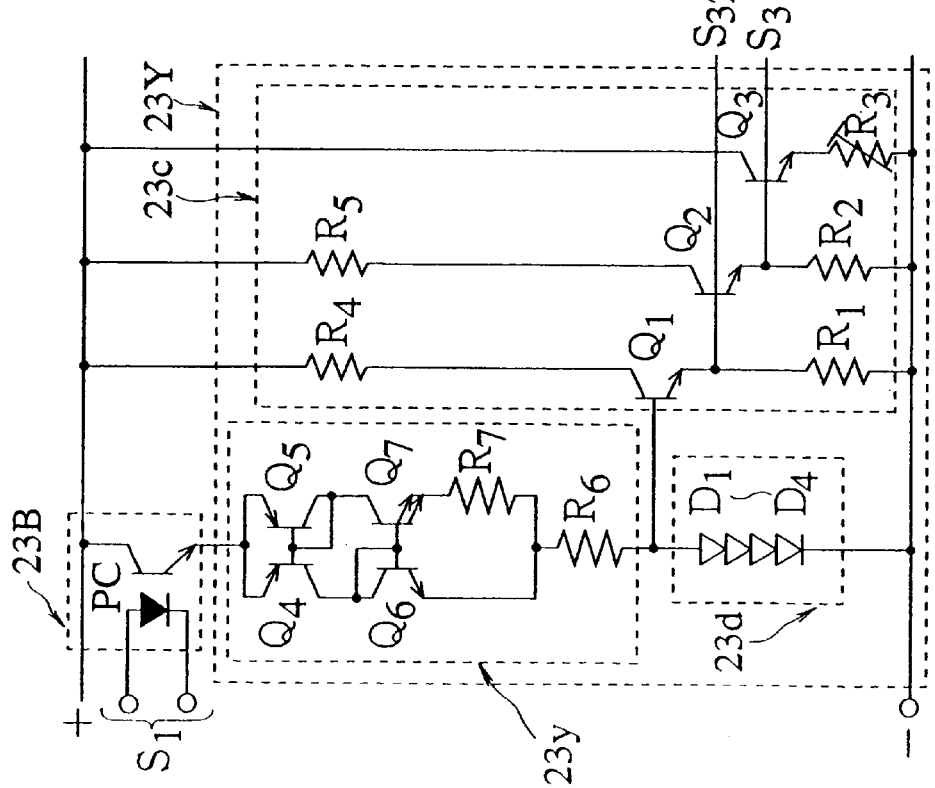

A first circuit example of the dial pulse circuit of the second embodiment is provided with a first switch circuit 23B, a constant-current circuit 23ya, and a resistor R6 which are connected in series to one another. Furthermore, this circuit example is provided with a voltage/current conversion circuit 23c to output an electric current Io corresponding to an input voltage and a negative feedback circuit or voltage clamping circuit 23d for keeping the output current of the voltage/current conversion circuit 23c at a certain value or less. In this first circuit example, a constant-current small block 23y so called in the present invention is composed of a constant-current circuit 23ya and a resistor R6. Since the resistor R6 compensates a constant-current operation of the constant-current small block 23y even when the constant-current circuit 23ya comes to be saturated, the resistor R6 is not always indispensable (the same in the following examples). Or on the contrary, the constant-current small block 23y may be sometimes composed of a resistor R6 having a large resistance for simplification (see FIG. 46 and the like in the following). Although the first switch circuit is provided between the + power source terminal and the constant-current circuit 23ya in the first circuit example of FIG. 45, the connection order of the first switch circuit 23b and the constant-current circuit 23ya can be changed. This first circuit example is exactly a circuit composed by removing the positive logic circuit 23aa, the constant-current circuit or large-resistance circuit 23ab, the diode D1, and the capacitor CF from the dial pulse circuit described with reference to FIG. 3.

Detailed circuit examples of the first circuit example of the dial pulse circuit of the second embodiment are shown, respectively, in FIGS. 46(A), 46(B), 47, 48(A), and 48(B). Since these circuit examples are composed of constant-current circuits and the like of the dial pulse circuit described in the signal generating circuit 20 of the first embodiment, detailed description of them is omitted.

Figure 49:
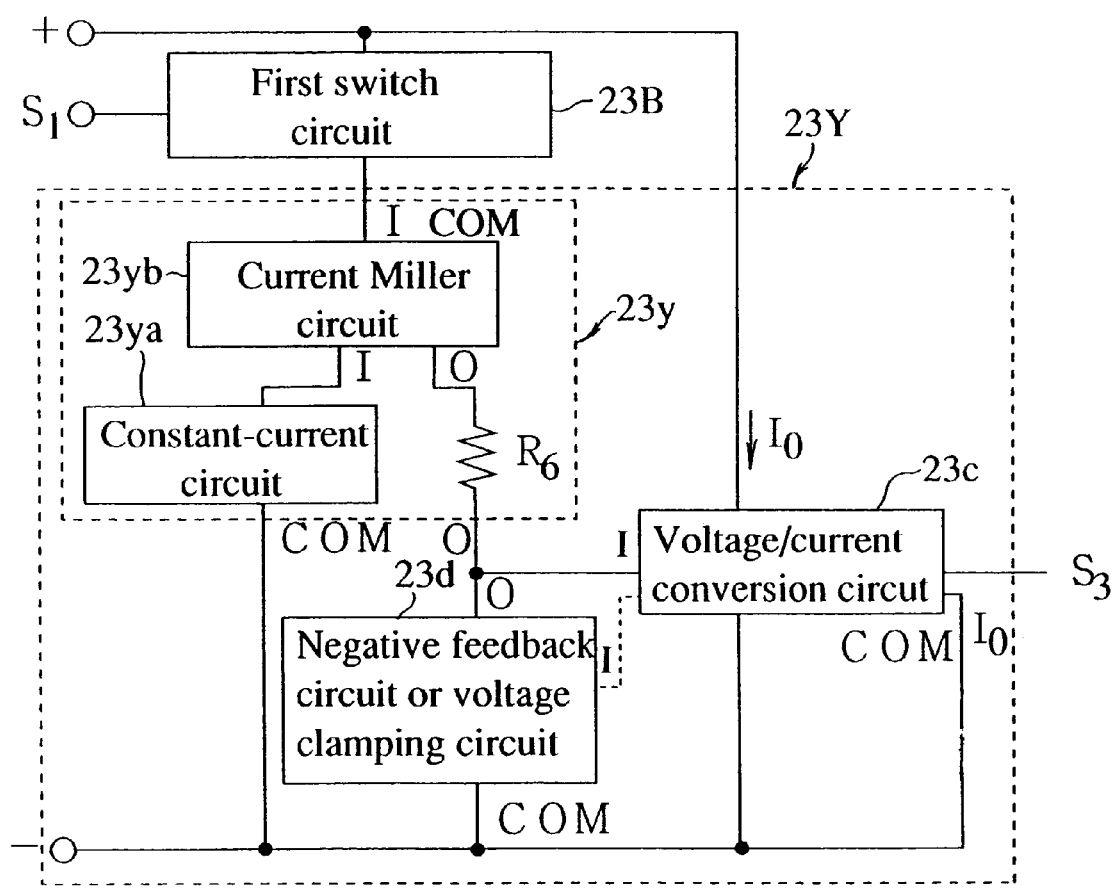
FIG. 49 shows a second circuit example belonging to the dial pulse circuit of the second embodiment.

FIG. 49 is a block diagram showing a second circuit example of a dial pulse circuit of the signal generating circuit 30 of the second embodiment.

In the dial pulse circuit example-2 of the second embodiment, a constant-current small block 23y is composed of a current Miller circuit 23yb whose common terminal is connected to the first switch circuit and which has a current input terminal and a current output terminal, a constant-current circuit 23ya connected between said current input terminal and the − power source terminal, a resistor R6 connected to the current output terminal of the current Miller circuit 23yb. Except those, in the same way as the first circuit example shown in FIG. 45, the constant-current small block 23y is provided with a voltage/current conversion circuit 23c and a negative feedback circuit or voltage clamping circuit 23d. This circuit example 2 is exactly a circuit composed by removing the positive logic circuit 23ae, the diode D1, and the capacitor CF from the dial pulse circuit described with reference to FIG. 7 in the first embodiment.

Figure 50A:
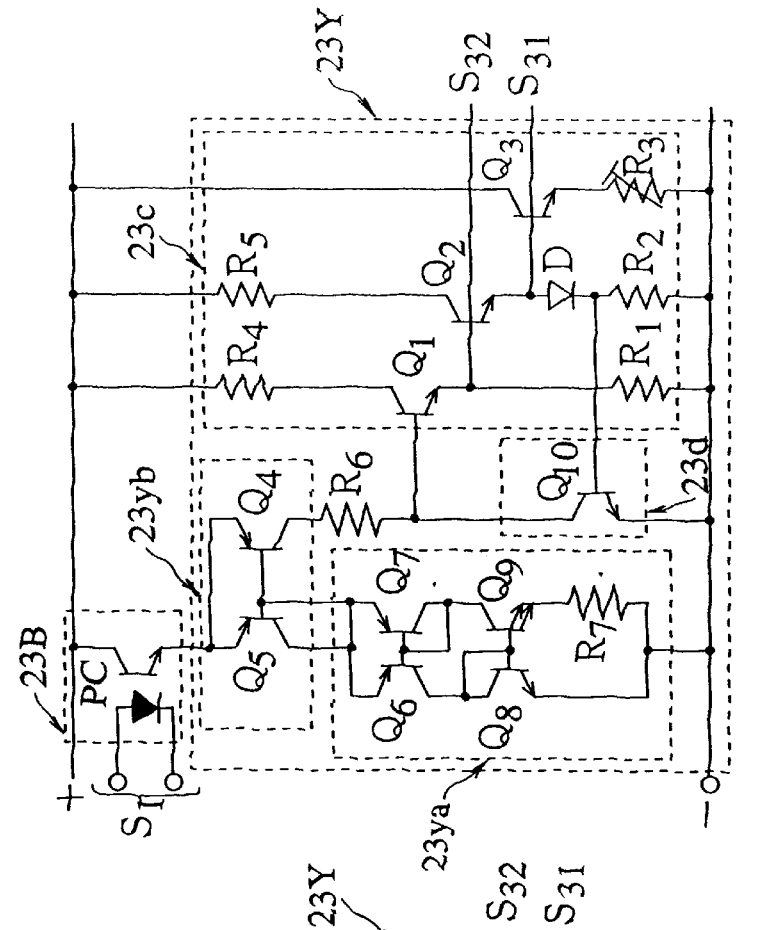
FIGS. 50(A) and 50(B) show, respectively, detailed circuit examples belonging to the second circuit example of the dial pulse circuit of the second embodiment.
Figure 50B:
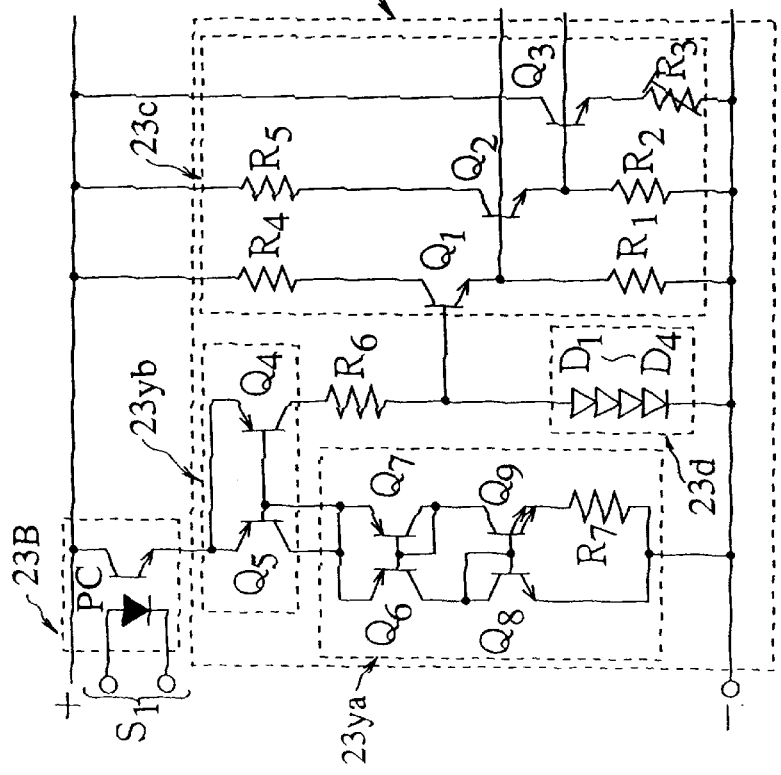

Detailed circuit examples of the second circuit example of the dial pulse circuit of the second embodiment are shown, respectively, in FIGS. 50(A) and 50(B). Since these detailed circuit examples are composed of the current Miller circuit and constant-current circuits and the like of the dial pulse circuit described in the signal generating circuit 20 of the first embodiment, detailed description of them is omitted.

Figure 51:
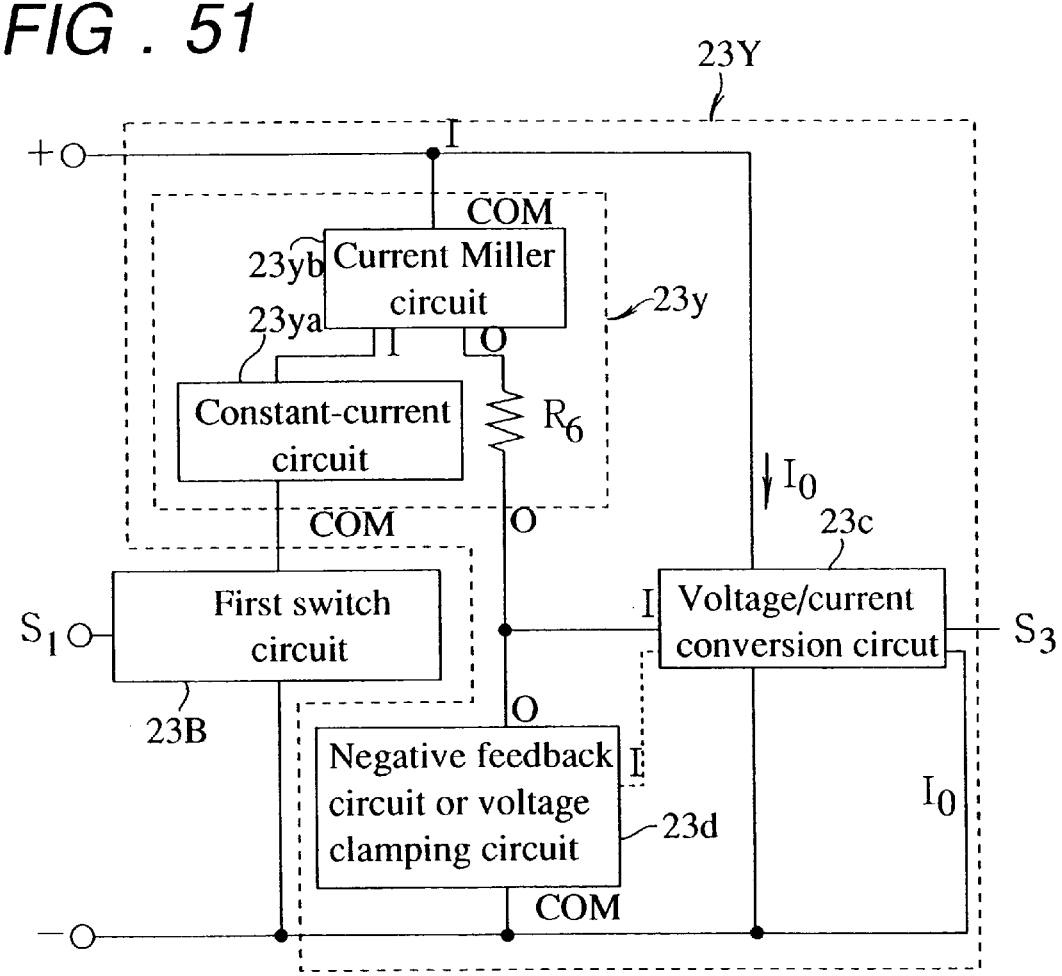
FIG. 51 shows a third circuit example belonging to the dial pulse circuit of the second embodiment.

FIG. 51 is a block diagram showing a third circuit example of a dial pulse circuit of the signal generating circuit 30 of the second embodiment.

In the third circuit example of the dial pulse circuit of the second embodiment, the first switch circuit 23B is disposed at a different position from that of the second circuit example shown in FIG. 49. That is to say, in this third circuit example, the first switch circuit 23B is provided at a specified position in a circuit system to be connected to the input terminal of the current Miller circuit and the input terminal of the constant-current small block 23y is connected to the + power source terminal. In FIG. 51, an example is shown in which the common terminal of the current Miller circuit 23yb is connected to the + power source terminal and the first switch circuit 23B is provided between the constant-current circuit 23ya and the − power source terminal. It is a matter of course that since the first switch circuit 23B and the constant-current circuit 23ya are connected in series with each other, they may be changed for each other in order of connection. Except those, in the same way as the circuits shown in FIGS. 45 and 49, this third circuit example is provided with a voltage/current conversion circuit 23c and a negative feedback circuit or voltage clamping circuit 23d. This third circuit example is exactly a circuit composed by removing the positive logic circuit 23ae, the diode D1, and the capacitor CF from the dial pulse circuit described with reference to FIG. 14 in the first embodiment.

Figure 52A:
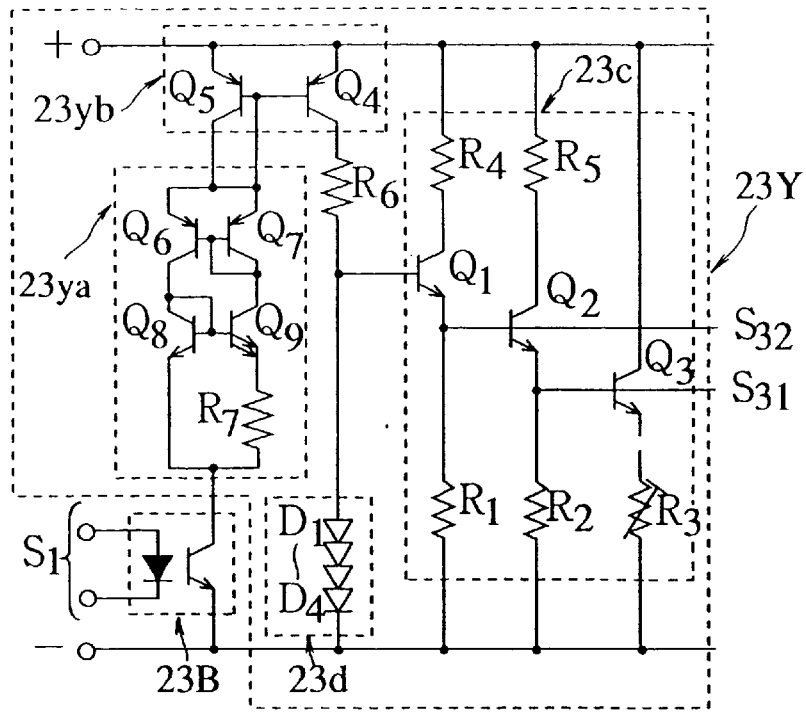
FIGS. 52(A) and 52(B) show, respectively, detailed circuit examples belonging to the third circuit example of the dial pulse circuit of the second embodiment.
Figure 52B:
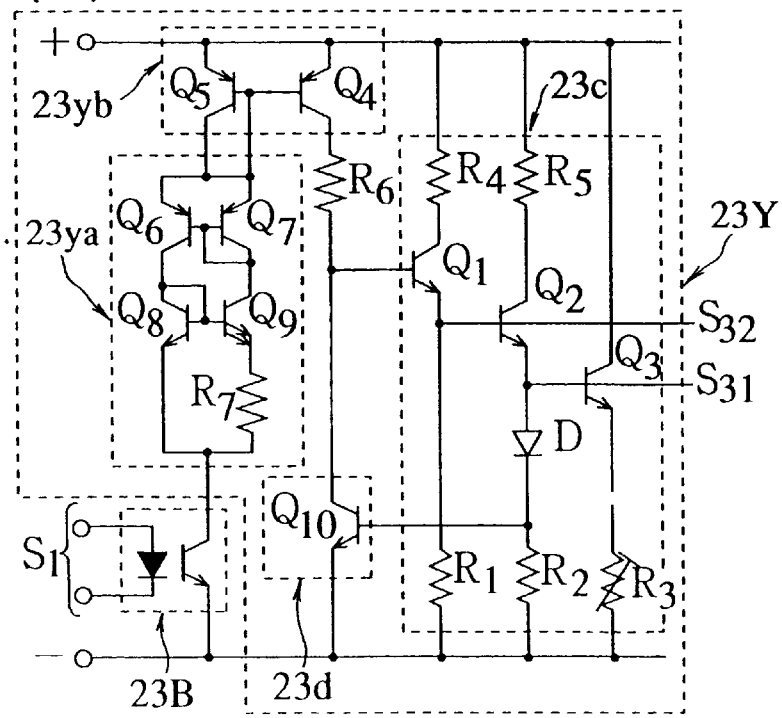
Figure 53:
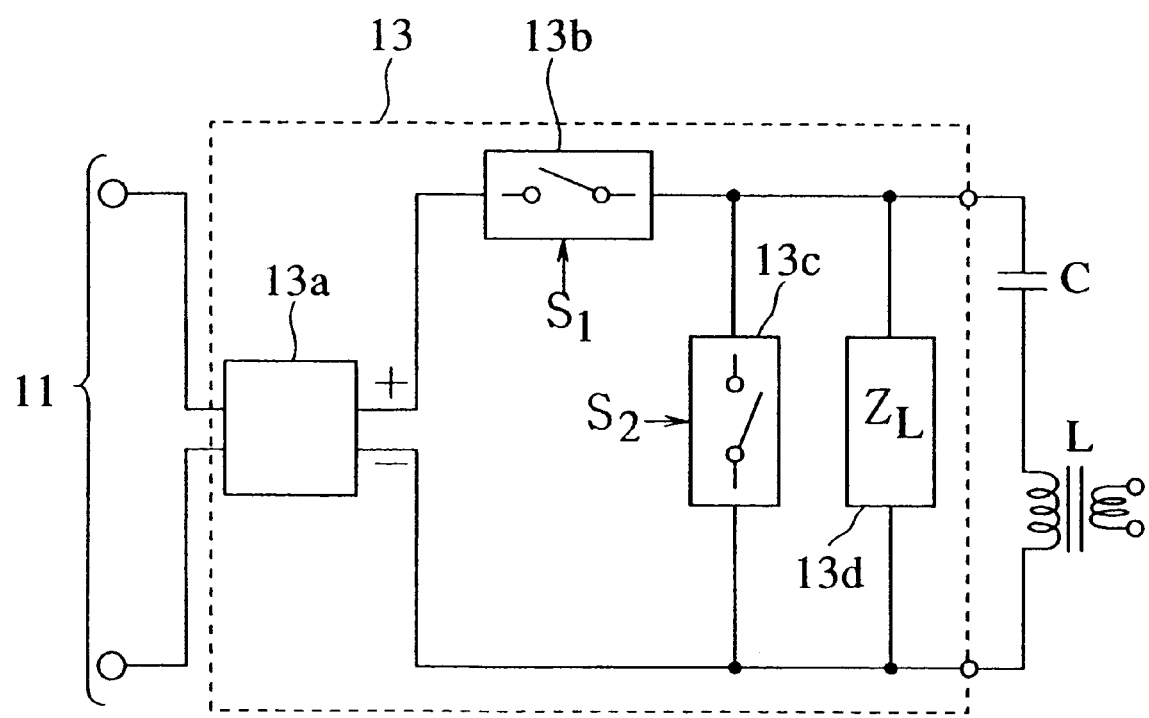
FIG. 53 is a figure for explaining the prior art.

Detailed circuit examples of the third circuit example of the dial pulse circuit of the second embodiment are shown, respectively, in FIGS. 52(A) and 52(B). Detailed description of them is omitted here.

In the signal generating circuit 30 of the second embodiment, a dial pulse circuit 23X comprises a constant-current circuit 23Y and a first switch circuit 23B. Even in such a case, when the line voltage is kept at a certain value or higher and the negative feedback circuit or voltage clamping circuit 23d is in a workable state so as to keep constant the output current Io of the voltage/current conversion circuit 23c (see FIGS. 45, 49, and 51), the terminal side of the dial pulse circuit at the time when the dial pulse circuit is turned on shows a constant-current characteristic (a high alternating current impedance can be secured at the time of an off-hook operation). Accordingly, the dial pulse circuit can be brought into a high impedance state to an alternating current signal without using the capacitor CF. And thanks to having no capacitor CF, a high-speed switching operation can be performed (at the time of sending dial pulses).

Therefore, on the assumption that the office-side power feeding system is a constant-voltage constant-resistance system and a dial pulse circuit is used as a terminal circuit connected to a short-distance line where the line voltage can be kept at a certain value or higher, the dial pulse circuit without a capacitor CF (FIG. 44) of the second embodiment can do. A capacitor CF is often used as a discrete component. According to the signal generating circuit 30 of the second embodiment, since the capacitor CF can be made unnecessary, the number of discrete components can be reduced to that extent.

3. DESCRIPTION OF THE THIRD INVENTION

Next, an embodiment of the invention (third invention) of an off-hook signal and dial pulse generating circuit capable of reducing the number of elements forming the circuit in comparison with an off-hook signal and dial pulse generating circuit of the first invention is described in the following.

Figure 54:
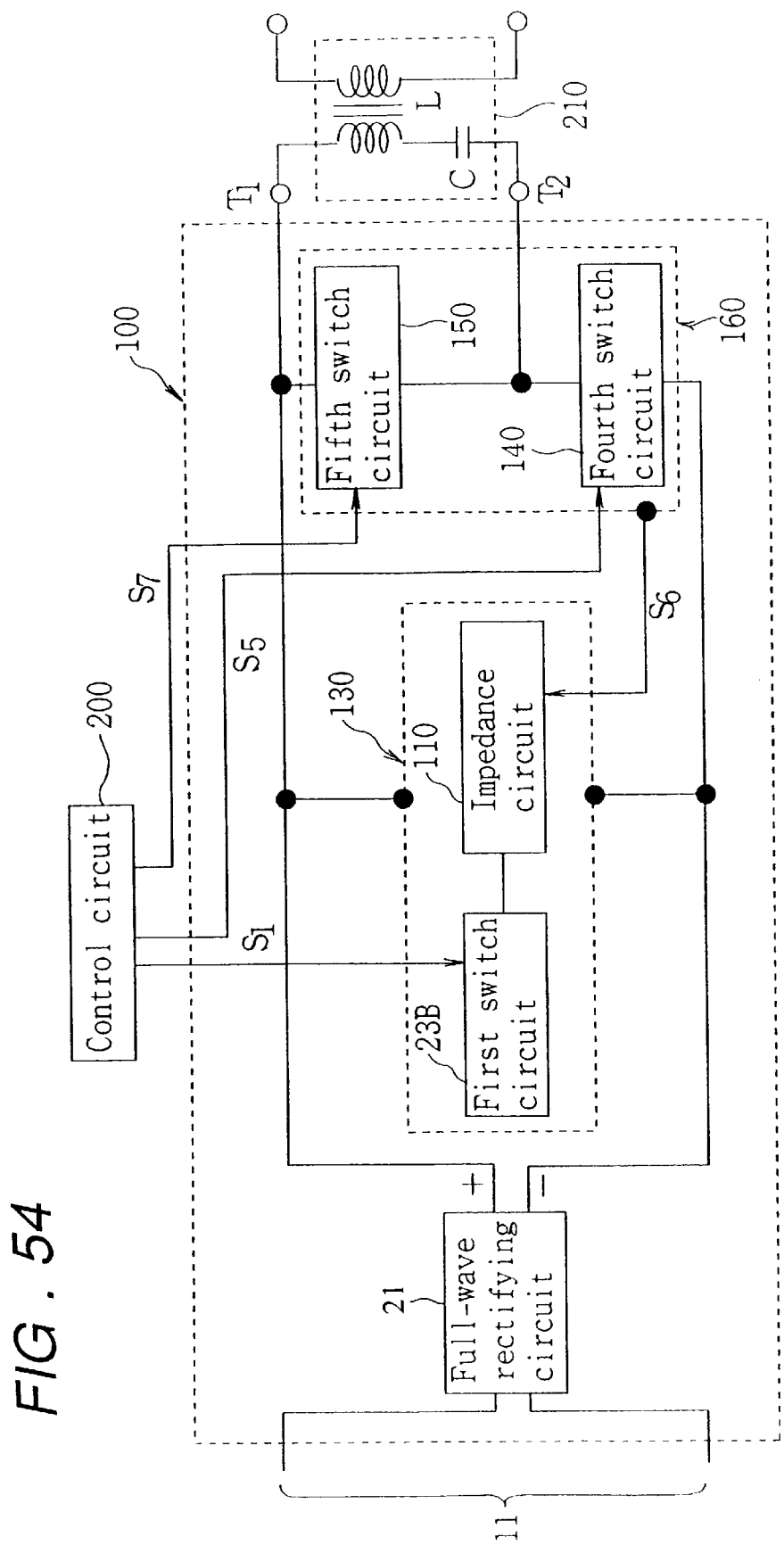
FIG. 54 is a figure for explaining an off-hook signal and dial pulse generating circuit of the third invention.

FIG. 54 is a figure for explaining the composition of an off-hook signal and dial pulse generating circuit 100 (hereinafter also referred to as a signal generating circuit 100) of the third invention. Hereupon, for explanation, a communication terminal transformer L, a capacitor C for cutting off a direct current, and a controller 200 are shown together with the dial pulse generating circuit 100.

The controller 200 is built in, for example, a telephone set or a non-ringing communication terminal unit. The controller 200 outputs a first control signal S1, a fifth control signal S5 and a seventh control signal S7 for making the signal generating circuit 100 perform a specified operation to the signal generating circuit 100. In the following embodiment, an example where a sixth control signal S6 for making the signal generating circuit 100 perform a specified operation is generated inside the signal generating circuit 100 is described. However, there may be a case where the sixth control signal S6 is generated by the controller 200.

This signal generating circuit 100 is provided between a telephone line 11 and a transformer part 210 having a communication terminal transformer L and a capacitor C which is connected in series with this transformer L and cuts off a direct current.

The signal generating circuit 100 sends an off-hook signal or dial pulses to the office side through the telephone line 11 in case that the first control signal S1 for forming an off-hook signal or dial pulses. And as features of the third invention the signal generating circuit 100 is provided with the following circuits (X) to (Z).

(X) A full-wave rectifier circuit 21 for full-wave rectifying the line voltage of a telephone line.

(Y) A dial pulse circuit 130 which is connected between the output terminals + and − of the full-wave rectifier circuit 21 and comprises an impedance circuit 110 and a first switch circuit 21B turned on/off by the first control signal S1. Here, this impedance circuit 110 operates in a state where it has an inductance component in case that the sixth control signal S6 which is synchronized with the fifth control signal S5 and is obtained by converting the signal level of this fifth control signal S5 into a level fitted for this dial pulse circuit 130, is in an on state, and operates in a state of non-inductance in case that the sixth control signal S6 is in an off state. And an electric current which flows in the impedance circuit 110 is turned on/off by the first switch circuit 23B.

(Z) A switch block circuit 160 comprising a series circuit which is connected between the output terminals + and − of the full-wave rectifier circuit and is composed of a fourth switch circuit 140 and a fifth switch circuit 150. Here, the transformer part 210 is connected in parallel with the fifth switch circuit 150. And the fourth switch circuit 140 is turned on and connects the transformer part 210 and the telephone line 11 with each other in case that the fifth control signal S5 is inputted into the fourth switch circuit 140. And the fifth switch circuit 150 makes a bias current which guarantees an alternating current operation of the communication terminal transformer L flow in the fourth switch circuit 140 in case that a seventh control signal S7 is inputted into the fifth switch circuit 150 and the fifth control signal S5 is inputted into the fourth switch circuit 140. And the fifth switch circuit 150 short-circuits the input terminals T1 and T2 of the transformer part 210 with each other in case that the seventh control signal S7 is inputted into the fifth switch circuit 150 and the fifth control signal S5 is not inputted into the fourth switch circuit 140.

This signal generating circuit 100 can be operated in the following manner. When the fifth control signal S5 is not inputted into the signal generating circuit 100 (when the logic level is low), the fourth switch circuit 140 is off. When the seventh control signal S7 is not inputted into the signal generating circuit 100 (when the logic level is low), the fifth switch circuit 150 is off. Accordingly, when any of the fifth and seventh control signals S5 and S7 is not inputted into the signal generating circuit 100, the input terminals of the transformer L are disconnected from each other, and the transformer L and the line come into a state where they are disconnected from each other. Therefore, the telephone set comes into a waiting state. The sixth control signal S6 is synchronized with the fifth control signal S5. Accordingly, since the sixth control signal S6 is also off in a waiting state, the impedance circuit 110 is in a state of non-inductance.

In order to make the signal generating circuit 100 in a waiting state generate an off-hook signal, the first control signal S1 is turned on. And in order to make the signal generating circuit 100 in a state where it generates an off-hook signal generate dial pulses, the first control signal S1 is turned off/on according to a dial number.

On the other hand, in order to make the signal generating circuit 100 handle an alternating current signal such as a speech signal, a speakable signal or the like sent from the office, the fifth control signal S5 and the seventh control signal S7 are respectively inputted (are brought into an on state, namely, a high level state). Thereupon, the fifth switch circuit 150 makes a bias current flow in the fourth switch circuit 140. And the fourth switch circuit 140 connects the transformer L and the line with each other. Therefore, it is possible to make an alternating current signal flow in the transformer L.

The signal generating circuit 100 of the third invention has made the fifth switch circuit 150 of the switch block circuit 160 have a function of short-circuiting the input terminals of the communication terminal transformer and a function of making a bias current flow in the fourth switch circuit 140. Thanks to this, the number of elements composing the switch block circuit 160 can be reduced in comparison with the first invention. Moreover, in the third invention, the dial pulse circuit 130 operates in a state of non-inductance in case that the sixth control signal S6 is off. Accordingly, a circuit for receiving the sixth control signal S6 can be implemented with a NOT circuit. On the other hand, in the first invention, the dial pulse circuit 23 (see FIG. 1) operates in a state of non-inductance in case that the fourth control signal S4 is on. Therefore, it is necessary to realize a circuit for receiving the fourth control signal S4 with a two-stage NOT circuit. Accordingly, the third invention can reduce the number of elements to compose a dial pulse circuit in comparison with the first invention. From these points, according to the third invention, the number of elements to compose an off-hook signal and dial pulse generating circuit can be reduced in comparison with the first invention.

Next, concrete compositions of the dial pulse circuit 130 and the switch block circuit 160 are described in order.

In figures used in the following description, the same numbers as used in the first invention are given to the same components as the components contained in the signal generating circuit 20 of the first invention and their duplicated descriptions may be sometimes omitted.

3-1 CONCRETE EXAMPLES OF THE DIAL PULSE CIRCUIT

3-1-1 First Example

Figure 55:
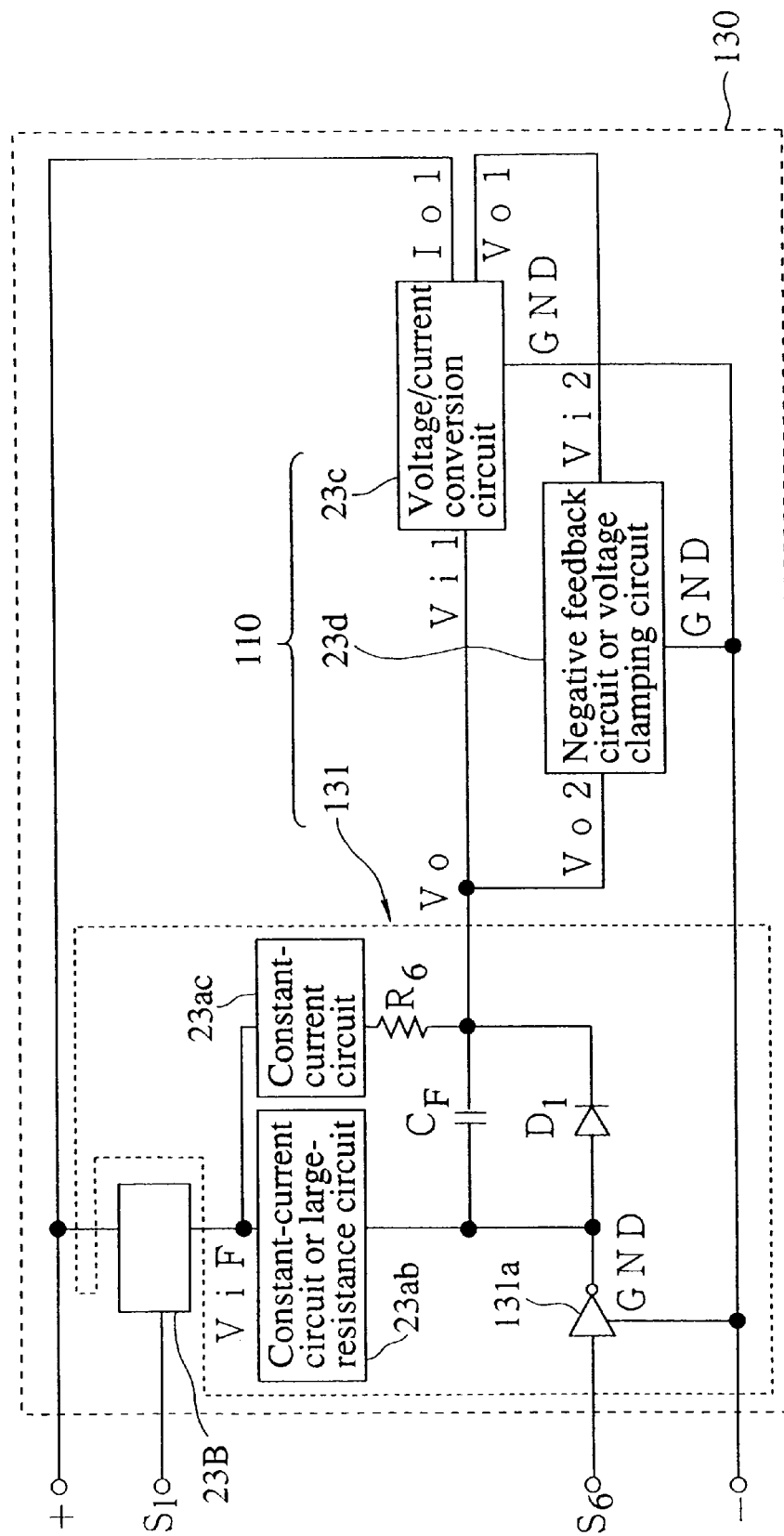
FIG. 55 shows a first example of the dial pulse circuit of the third invention.

FIG. 55 is a block diagram showing a first example of a dial pulse circuit of the third invention.

The dial pulse circuit 130 shown in FIG. 55 is a circuit obtained by partially changing the dial pulse circuit explained by means of FIG. 3. That is to say, the dial pulse circuit 130 shown in FIG. 55 is provided with a new filter circuit 131 instead of the filter circuit 23a explained by means of FIG. 3.

This new filter circuit 131 is provided with a series circuit composed of a constant-current circuit 23ac and a high-resistance resistor R6, a capacitor CF, a diode D1, a constant-current circuit or large-resistance resistor 23ab, and a NOT circuit 131a.

The series circuit composed of the constant-current circuit 23ac and a high-resistance resistor R6 is connected between the voltage input terminal ViF and the output terminal Vo of the filter circuit 131. This constant-current circuit 23ac makes a constant current flow when a voltage is applied to it. However, the constant-current circuit 23ac may be sometimes omitted (short-circuited).

The NOT circuit 131a has an input terminal, an output terminal and a ground terminal. The ground terminal of this NOT circuit 131a is connected to the ground terminal of the impedance circuit 130, and the input terminal of it is used as an input terminal for said sixth control signal.

The capacitor CF is connected between the output terminal Vo of the filter circuit 131 and the output terminal of the NOT circuit 131a.

The cathode of the diode D1 is connected to the output terminal Vo of the filter circuit 131, and the anode of it is the output terminal of the NOT circuit 131a.

Figure 60:
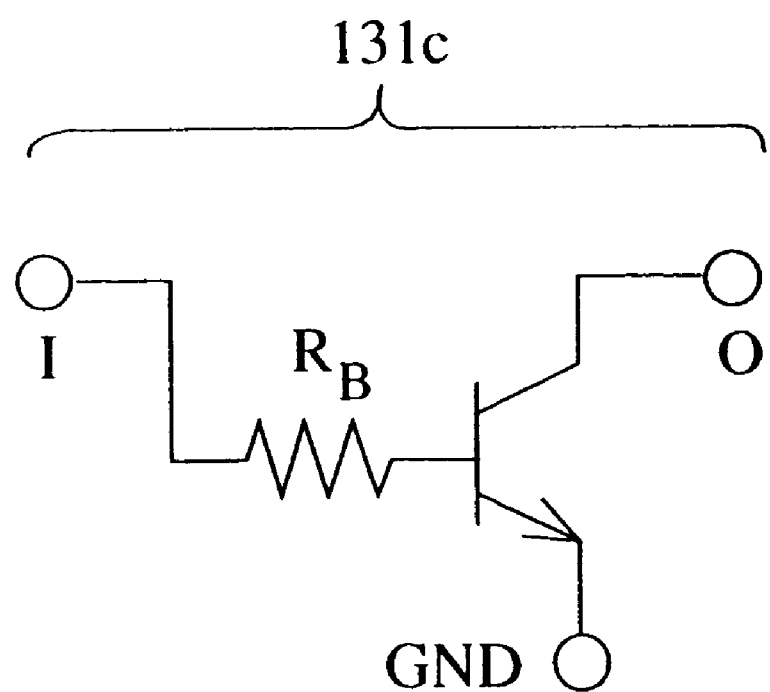
FIG. 60 is a figure for explaining a NOT circuit.

The NOT circuit 131a can be composed of an NPN transistor to whose base a resistor RB is connected, for example, as shown in FIG. 60.

3-1-2 Second Example

Figure 56:
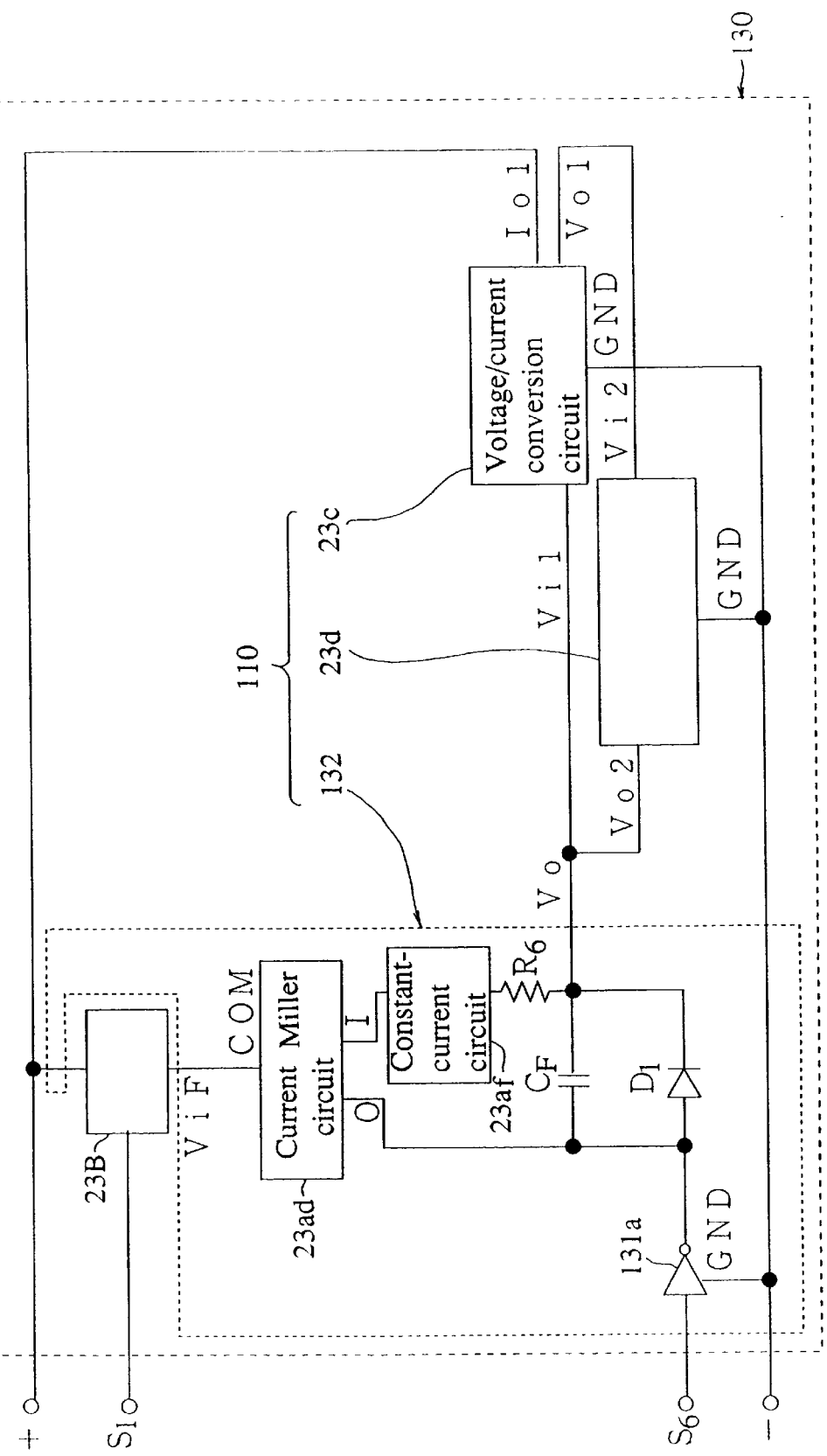
FIG. 56 shows a second example of the dial pulse circuit of the third invention.

FIG. 56 is a block diagram showing a second example of a dial pulse circuit of the third invention.

The dial pulse circuit 130 shown in FIG. 56 is a circuit obtained by partially changing the dial pulse circuit explained by means of FIG. 6. That is to say, the dial pulse circuit 130 shown in FIG. 56 is provided with a new filter circuit 132 instead of the filter circuit 23a explained by means of FIG. 6.

This new filter circuit 132 is provided with a current Miller circuit 23ad, a series circuit composed of a constant-current circuit 23af and a high-resistance resistor R6, a capacitor CF, a diode D1, and a NOT circuit 131a.

The common terminal COM of the current Miller circuit 23ad is connected to the voltage input terminal ViF of the filter circuit 132.

The series circuit composed of the constant-current circuit 23af and a resistor R6 is connected between the input terminal I of the current Miller circuit 23ad and the output terminal Vo of the filter circuit 132. This constant-current circuit 23af makes a constant current flow when a voltage is applied to it. However, the constant-current circuit 23af may be sometimes omitted (short-circuited).

The NOT circuit 131a has an input terminal, an output terminal and a ground terminal. The ground terminal of this NOT circuit 131a is connected to the ground terminal of the impedance circuit 130, and the input terminal of the NOT circuit 131a is used as an input terminal for said sixth control signal. The output terminal of the NOT circuit 131a is connected to the output terminal O of the current Miller circuit 23ad.

The capacitor CF is connected between the output terminal Vo of the filter circuit 132 and the output terminal of the NOT circuit 131a.

The cathode of the diode D1 is connected to the output terminal Vo of the filter circuit 132, and the anode of it is connected to the output terminal of the NOT circuit 131a.

3-1-3 Third Example

Figure 57:
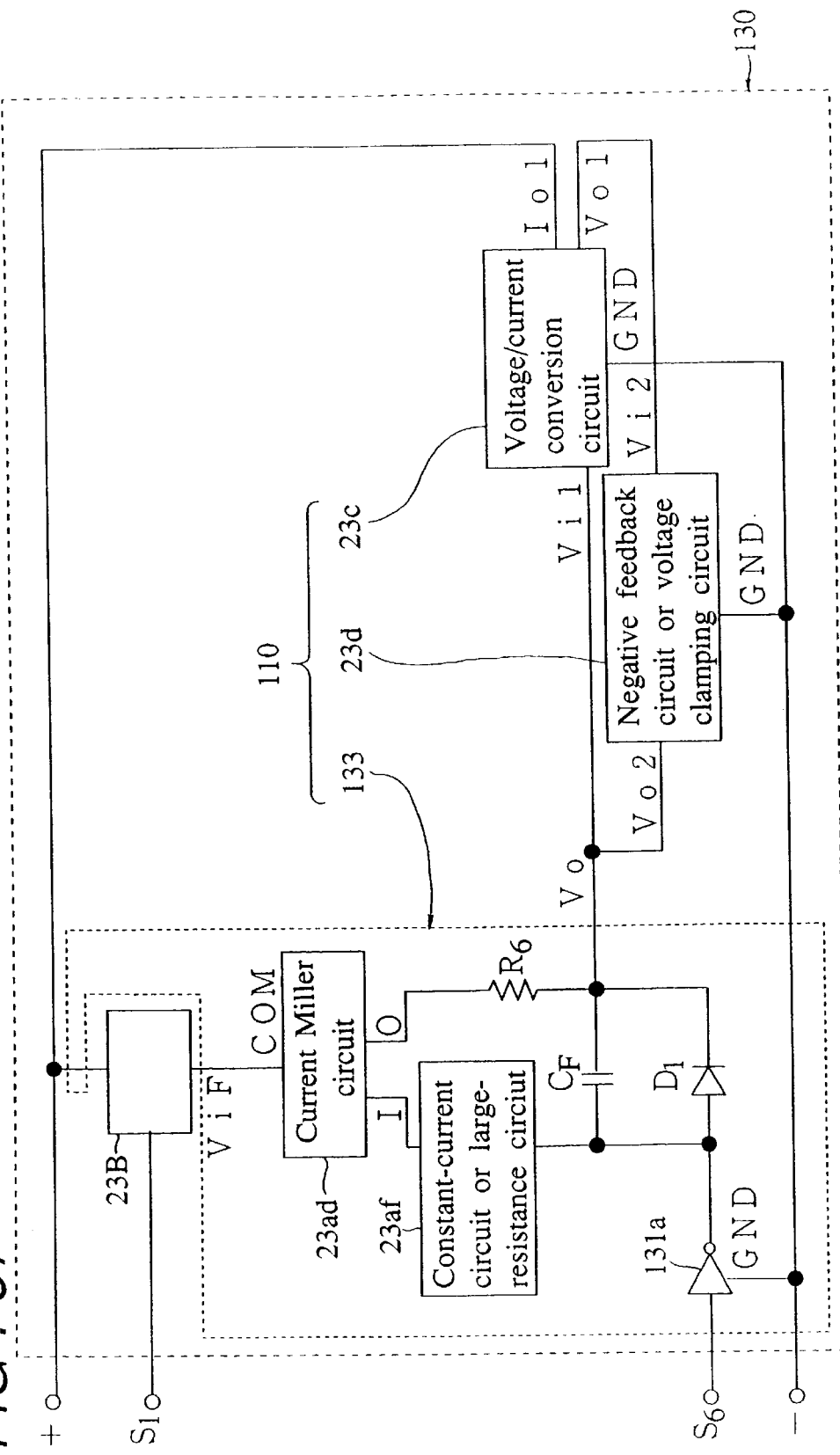
FIG. 57 shows a third example of the dial pulse circuit of the third invention.

FIG. 57 is a block diagram showing a third example of a dial pulse circuit 130 of the third invention.

The dial pulse circuit 130 shown in FIG. 57 is a circuit obtained by partially changing the dial pulse circuit explained by means of FIG. 7. That is to say, the dial pulse circuit 130 shown in FIG. 57 is provided with a new filter circuit 133 instead of the filter circuit 23a explained by means of FIG. 7.

This new filter circuit 133 is provided with a current Miller circuit 23ad, a constant-current circuit or large-resistance resistor 23af, a high-resistance resistor R6, a capacitor CF, a diode D1, and a NOT circuit 131a.

The common terminal COM of the current Miller circuit 23ad is connected to the voltage input terminal ViF of the filter circuit 133.

The high-resistance resistor R6 is connected between the output terminal O of the current Miller circuit 23ad and the output terminal Vo of the filter circuit 133.

The NOT circuit 131a has an input terminal, an output terminal and a ground terminal. The ground terminal of this NOT circuit 131a is connected to the ground terminal of the impedance circuit 130, and the input terminal of the NOT circuit 131a is used as an input terminal for the sixth control signal.

The constant-current circuit or large-resistance resistor 23af is connected between the output terminal of the NOT circuit 131a and the input terminal I of the current Miller circuit 23ad.

The capacitor CF is connected between the output terminal Vo of the filter circuit 133 and the output terminal of the NOT circuit 131*a*.

The cathode of the diode D1 is connected to the output terminal Vo of the filter circuit 133, and the anode of it is connected to the output terminal of the NOT circuit 131*a*.

3-1-4 Fourth Example

Figure 58:
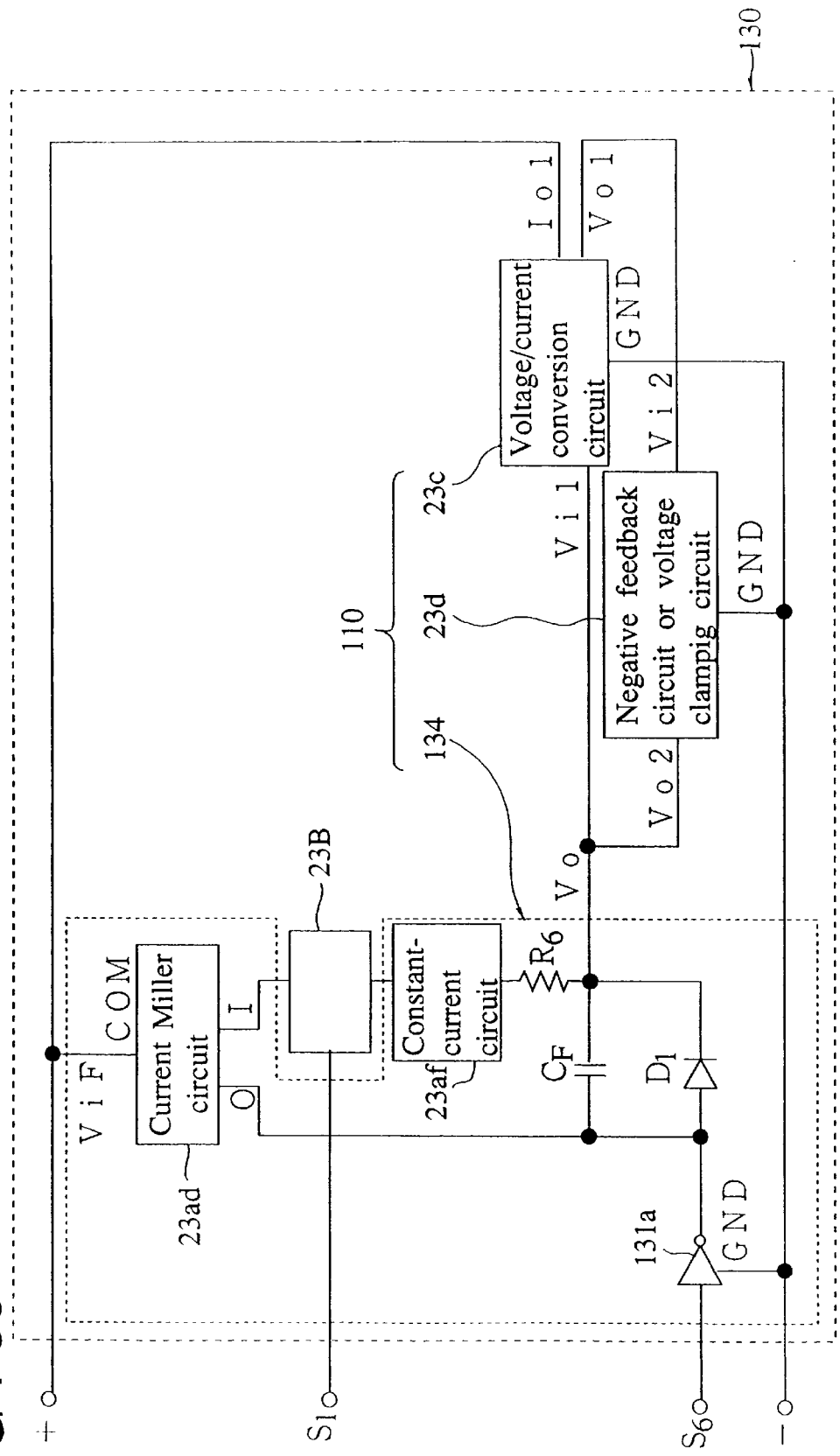
FIG. 58 shows a fourth example of the dial pulse circuit of the third invention.

FIG. 58 is a block diagram showing a fourth example of a dial pulse circuit 130 of the third invention.

The dial pulse circuit 130 shown in FIG. 58 is a circuit obtained by partially changing the dial pulse circuit of the second example explained by means of FIG. 56. That is to say, in this circuit, the first switch circuit 23B is provided at an optional position inside the circuit system where the first switch circuit 23B is connected to the input terminal I of the current Miller circuit 23*ad* and can turn on/off an electric current inputted to said input terminal, and the voltage input terminal ViF of the filter circuit 134 is connected to the + power terminal. In an example of FIG. 58, the first switch circuit 23B is connected between the input terminal I of the current Miller circuit 23*ad* and the constant-current circuit 23*af*.

3-1-5 Fifth Example

Figure 59:
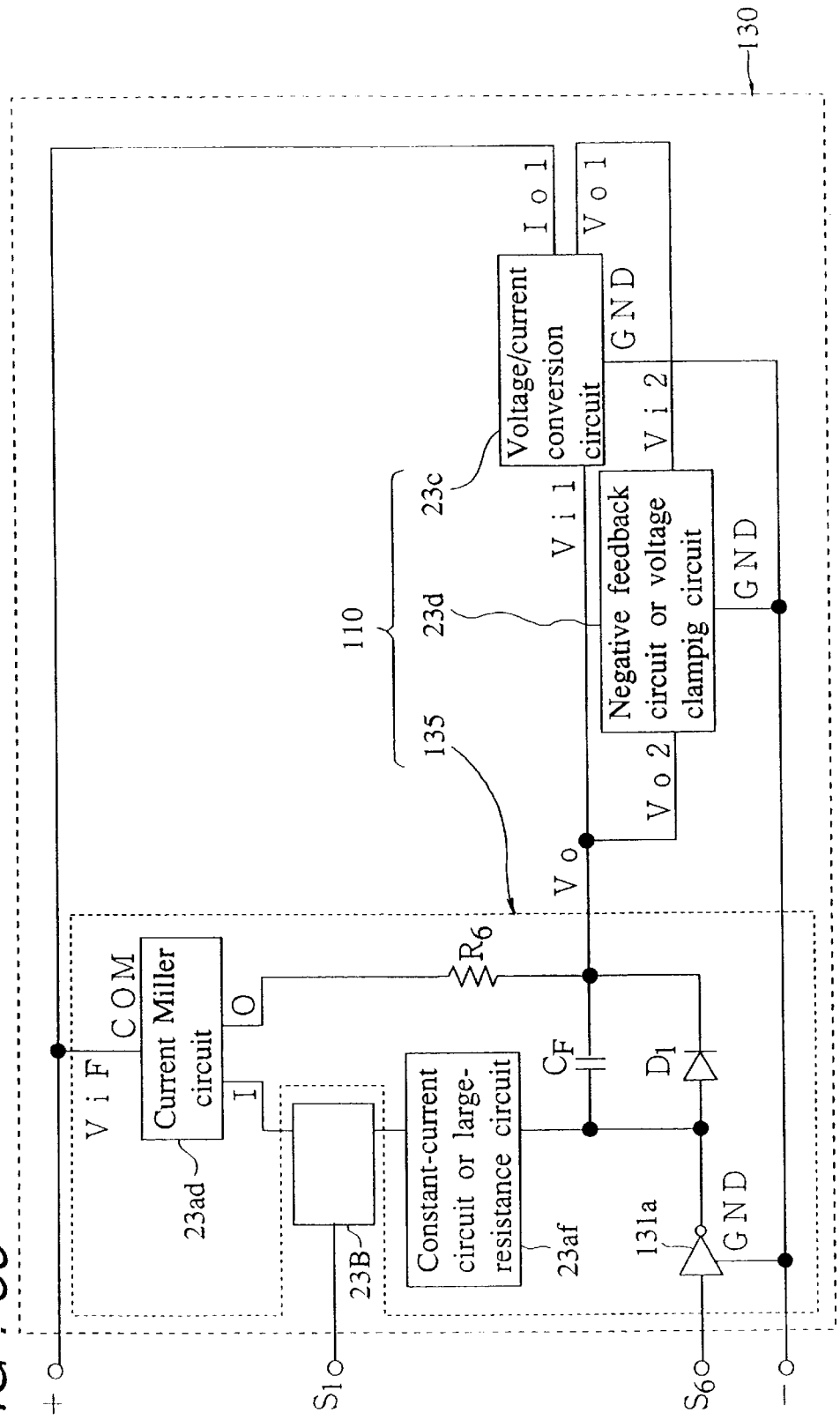
FIG. 59 shows a fifth example of the dial pulse circuit of the third invention.

FIG. 59 is a block diagram showing a fifth example of a dial pulse circuit 130 of the third invention.

The dial pulse circuit 130 shown in FIG. 59 is a circuit obtained by partially changing the dial pulse circuit of the third example explained by means of FIG. 57. That is to say, in this circuit, the first switch circuit 23B is provided at an optional position inside the circuit system where the first switch circuit 23B is connected to the input terminal I of the current Miller circuit 23*ad* and can turn on/off an electric current inputted to said input terminal, and the voltage input terminal ViF of the filter circuit 134 is connected to the + power terminal. In an example of FIG. 59, the first switch circuit 23B is connected between the input terminal I of the current Miller circuit 23*ad* and the constant-current circuit 23*af*.

The above-mentioned dial pulse circuits of the first to fifth examples of the third invention operate in the same way as the first invention except that the logic level determined by whether the ground side terminal of the capacitor CF is connected to the ground or disconnected from the ground is reverse to the first invention. That is to say, when the sixth control signal S6 is on (at a high level), the dial pulse circuit 130 of the third invention is in a state of inductance, and when the sixth control signal S6 is off (at a low level), the dial pulse circuit 130 is in a state of non-inductance.

3-2 CONCRETE EXAMPLES OF THE SWITCH BLOCK CIRCUIT

Figure 61:
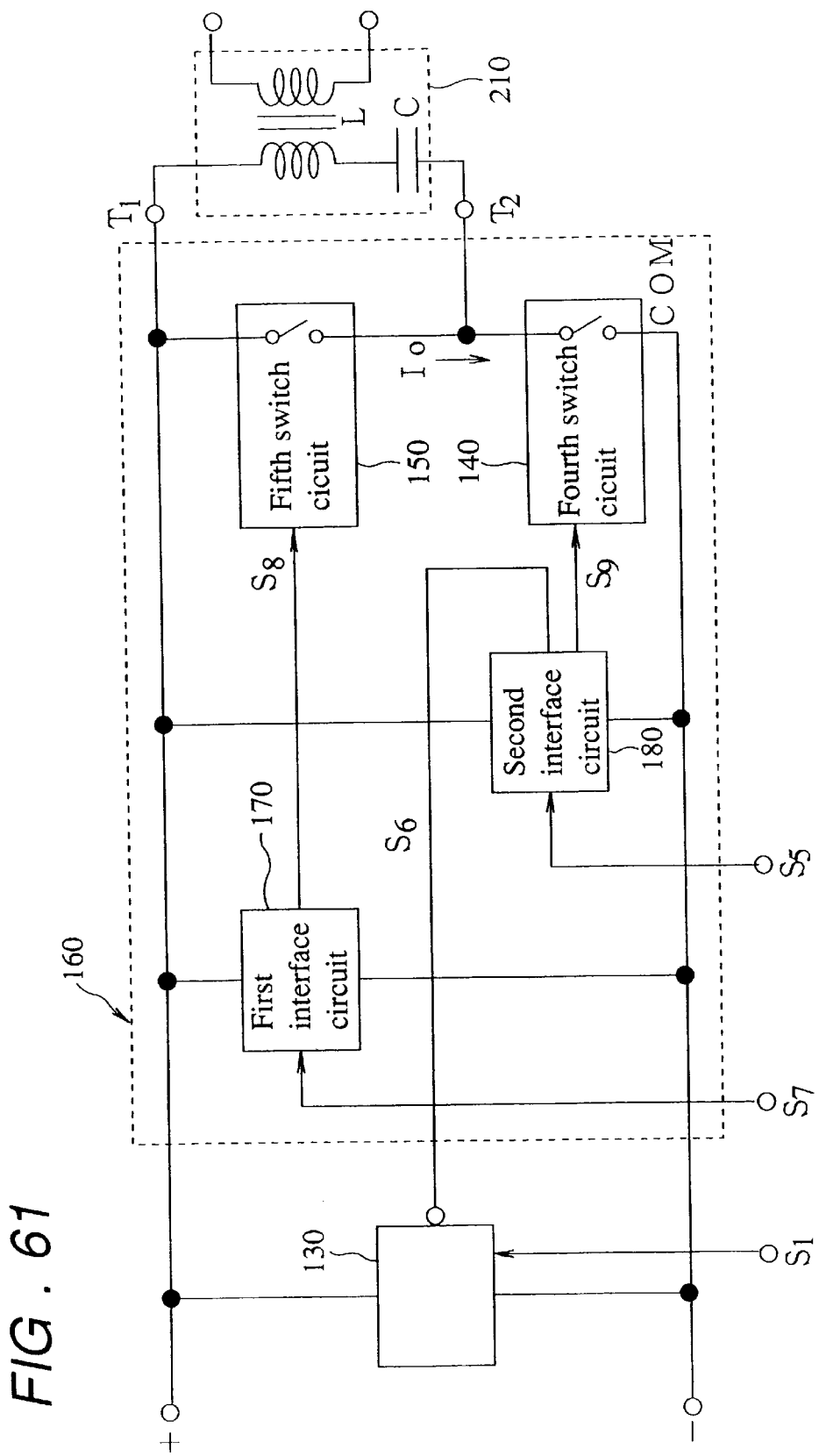
FIG. 61 shows an example of a switch block circuit of the third invention.

FIG. 61 is a block diagram showing an example of a switch block circuit 160 of the third invention. Here, the dial pulse circuit 130 and the transformer part 210 are also shown together.

The switch block circuit 160 of this example is provided with a first interface circuit 170 and a second interface circuit 180 in addition to the fourth switch circuit 140 and the fifth switch circuit 150.

The reason why the switch block circuit 160 is provided with the first interface circuit 170 and the second interface circuit 180 is to convert a control signal outputted from the controller to a signal fitted for the fourth switch circuit 140 or the fifth switch circuit 150. In detail, this is the same as the reason why the switch block circuit of the first invention is provided with the first and second level conversion circuits 25*c* and 25*d*.

The first interface circuit 170 receives the seventh control signal. And it outputs the eighth control signal S8 which is synchronized with the seventh control signal S7 and is fitted for said fifth switch circuit 150 to said fifth switch circuit 150. The second interface circuit 180 receives the fifth control signal. And it outputs the ninth control signal S9 which is synchronized with the fifth control signal S5 and is fitted for said fourth switch circuit 140 to said fourth switch circuit 140. Moreover, the second interface circuit 180 generates also the sixth control signal S6 synchronized with the fifth control signal S5.

Next, detailed circuit examples, respectively, of the fourth switch circuit 140, the fifth switch circuit 150, the first interface circuit 170 and the second interface circuit 180 are described in the following.

Figure 62:
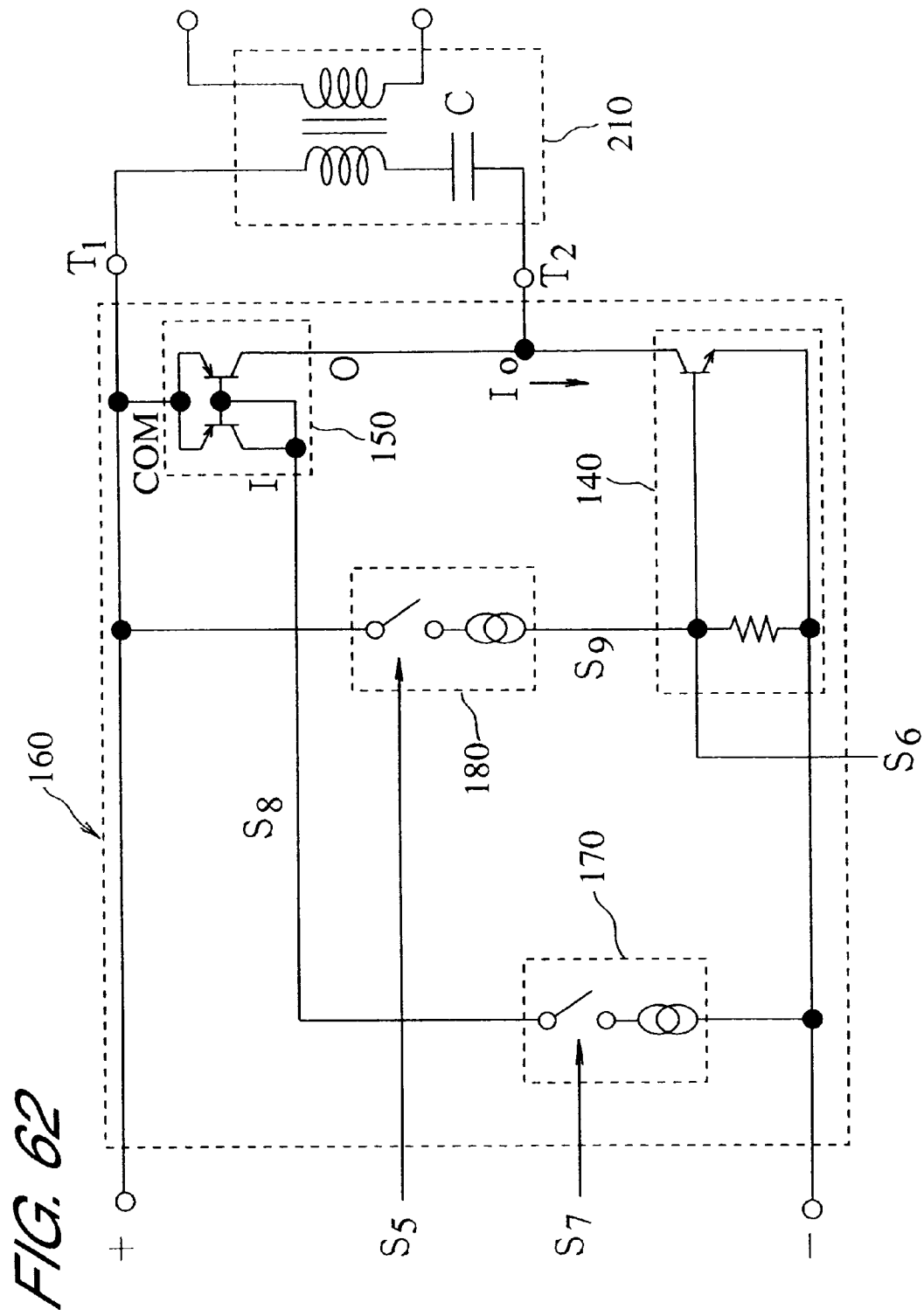
FIG. 62 shows a circuit example of the switch block circuit of the third invention.

FIG. 62 is a concrete circuit diagram of these circuits 140 to 180.

The fourth switch circuit 140 is composed of, for example, an NPN transistor Tr and a resistor R provided between its base and emitter. As the NPN transistor, a transistor group composed of plural NPN transistors which are Darlington-connected with one another may be used (see FIGS. 67 and 68).

The fifth switch circuit 150 is composed of, for example, a current Miller circuit. Here, in this current Miller circuit its common terminal COM is connected to one of the output terminals of a full-wave rectifier circuit, namely, the + power terminal in this case. And its input terminal I is connected to a constant-current circuit turned on/off by the seventh control signal, namely, the first interface circuit 170 in this case. Furthermore, its output terminal O is connected to the collector of the NPN transistor of the fourth switch circuit 140.

The first interface circuit 170 is composed of, for example, a constant-current circuit turned on/off by the seventh control signal S7.

The second interface circuit 180 is composed of, for example, a constant-current circuit turned on/off by the fifth control signal S5. The output of the constant-current circuit is connected to the base of the NPN transistor of the fourth switch circuit 140.

Operation of the circuits shown in FIG. 62 is described. When the seventh control signal S7 is inputted, since an electric current flows in the constant-current circuit composing the first interface circuit 170, an electric current flows in a transistor at the input side of the current Miller circuit composing the fifth switch circuit 150. The current Miller circuit attempts to make an electric current flow through the output terminal O in response to this. At this time, if the fourth switch circuit 140 is on, since a current path passing through the fourth switch circuit 140 is formed, an electric current flows through said output terminal O. This electric current becomes a bias current of the fourth switch circuit.

On the other hand, when the fourth switch circuit 140 is off, since the current Miller circuit which is the fifth switch circuit 150 does not have a current path at its output terminal side, the output transistor of said current Miller circuit performs a saturated operation. As a result, the input terminals of the transformer are short-circuited with each other by this output transistor. From these, it can be understood that the function of the fifth switch circuit 150 can be obtained by making the fifth switch circuit 150 of a current Miller circuit.

49

As the fifth switch circuit 150, a current-amplifier circuit whose amplification factor is rapidly lowered when the input current comes to be equal to or more than a set value may be used instead of a current Miller circuit.

3-3 OTHER EXAMPLES OF THE THIRD INVENTION 3-3-1

The idea of dial pulse circuits of the fourth and fifth examples of the first invention may be added to a dial pulse circuit provided in the signal generating circuit 100 of the third invention. That is to say, the idea of adding a capacitor discharging circuit, a voltage clamping circuit, or the like to a dial pulse circuit can be also applied to this third invention. This is described in the following.

FIG. 63 is an explanatory figure for explaining a case of adding at least one of a capacitor discharging circuit 23ag, a voltage clamping circuit 23ak, a series circuit composed of a second voltage clamping circuit 23al and a charge limiting resistor R, a reverse-current preventing diode D2, and a speed-up diode D3 which have been explained in the first invention to the dial pulse circuit explained by means of FIG. 55.

In case of the third invention, when adding a speed-up diode D3, namely, a diode for releasing electric charge accumulated in a stray capacity near the input terminal of the voltage/current conversion circuit 23c to a dial pulse circuit, it is necessary to provide a constant-current circuit or large-resistance resistor 23am for discharging the electric charge at a proper position (between the terminal ViF and the ground terminal in this case) of the filter circuit 131. Except this, namely, in case that a capacitor discharging circuit 23ag, a capacitor discharging circuit 23ah, a voltage clamping circuit 23ak, a series circuit composed of a second voltage clamping circuit 23al and a charge limiting resistor R, or a reverse-current preventing diode D2 is provided, it can do to connect them with the dial pulse circuit in the same way as explained in the first invention.

Figure 64A:
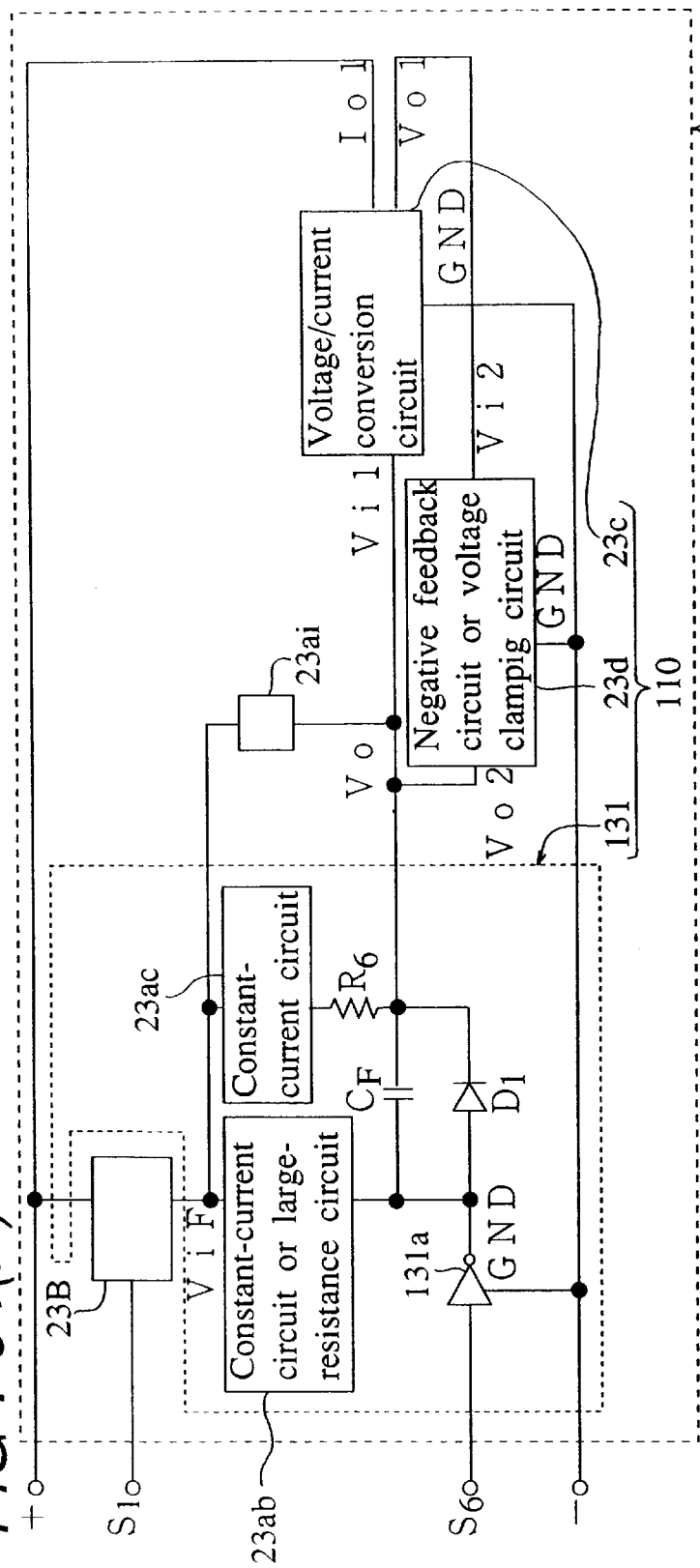
FIGS. 64(A) and 64(B), is an explanatory figure of another example of the third invention.
Figure 64B:
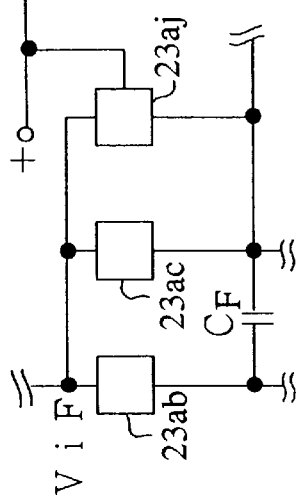

FIGS. 64(A) and 64(B) show particularly examples in which a voltage clamping circuit 23ai for improving a charging speed at the time of charging up the capacitor CF or a voltage clamping circuit 23aj having a current buffering function is provided. The reason why FIG. 64 is prepared is for the purpose of clarifying a difference between the voltage clamping circuits 23ak and 23al in FIG. 63 and the voltage clamping circuits 23ai and 23aj (for more information, refer to description of dial pulse circuits of the fifth to seventh embodiments of the first invention).

Figure 66:
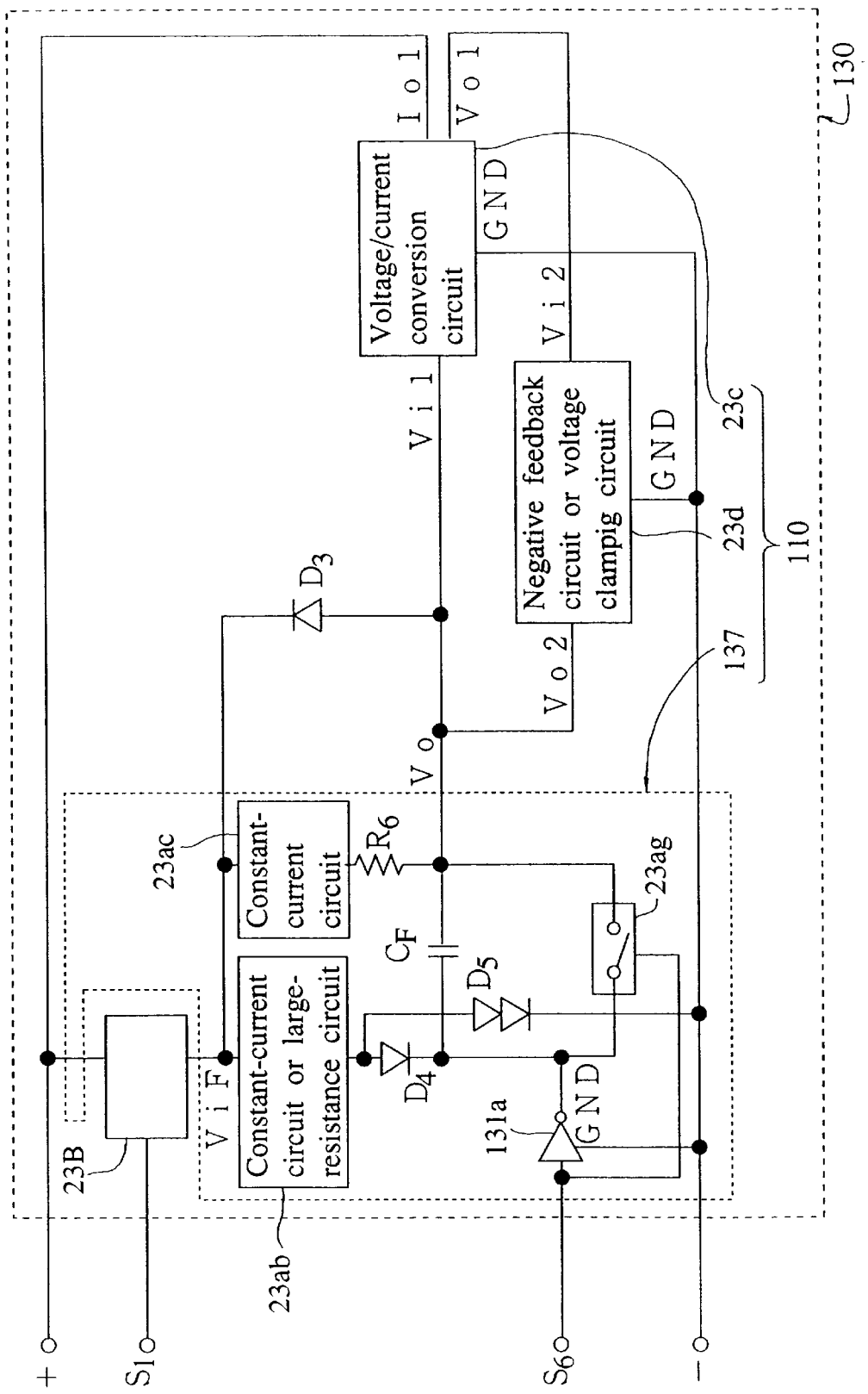
FIG. 66 is an explanatory figure of another embodiment of the third invention.

The idea of adding a capacitor discharging circuit can be also applied to dial pulse circuits shown in FIGS. 56 to 59. And the idea of adding a voltage clamping circuit and a reverse-current preventing diode D2 can be applied to a circuit in which a first switch circuit 23B is provided between the power source and the voltage input terminal of the filter circuit 23a as shown in FIGS. 56 and 57. Although an example of FIG. 63 is particularly provided with a second constant-current circuit or large-resistance resistor 23am, if there is a constant-current circuit or large-resistance resistor one end of which is connected to the ground of the filter circuit 131 and the other end of which is turned on/off by the first switch circuit 23B, a speed-up diode D3 may be connected between the input terminal Vi1 of the voltage/current conversion circuit 23c and said turned-on/off terminal of said constant-current circuit or large-resistance resistor. A preferred example is shown in FIG. 66, but operation of it is described later.

3-3-2

In the third invention, the ground side terminal of the capacitor CF inside the filter circuit 131 is grounded when the level of the output terminal of the NOT circuit 131a becomes low. And when the ground side terminal of the capacitor CF is grounded, it is necessary to make an alternating current signal flow in the capacitor CF. However, the NOT circuit 131a is typically composed of a semiconductor device. The semiconductor device can make an electric current flow in only one direction. Hereupon, while the output terminal of the NOT circuit 131a is low in level, it is necessary to make a bias current for guaranteeing an alternating current operation of the capacitor CF flow in the NOT circuit. Thereupon, the constant-current circuit or large-resistance resistor 23ab shown in FIG. 55 or the current Miller circuit 23ad shown in FIG. 56 has generated this bias current. And this bias current flows through the output terminal of this NOT circuit 131a when the output of the NOT circuit 131a is low in level. When the output of the NOT circuit 131a becomes high in level and the ground side terminal of the capacitor CF comes into a neutral state, the bias current discharges the capacitor CF, and after the discharge has finished, the bias current flows in the diode D1 and acts a role of short-circuiting the capacitor CF.

However, in case that a capacitor discharging circuit 23ag or 23ah is provided, when the output of the NOT circuit 131a is at a high level (when the sixth control signal S6 is at a low level), the capacitor CF is made discharge its accumulated positive electric charge by the capacitor discharging circuit 23ag or 23ah, and also after this, the capacitor CF is kept from accumulating the positive electric charge. Hereupon, if the bias current is zero when the output of the NOT circuit 131a is at a high level, the diode D1 can be omitted. This example is that for attaining this.

Figure 65A:
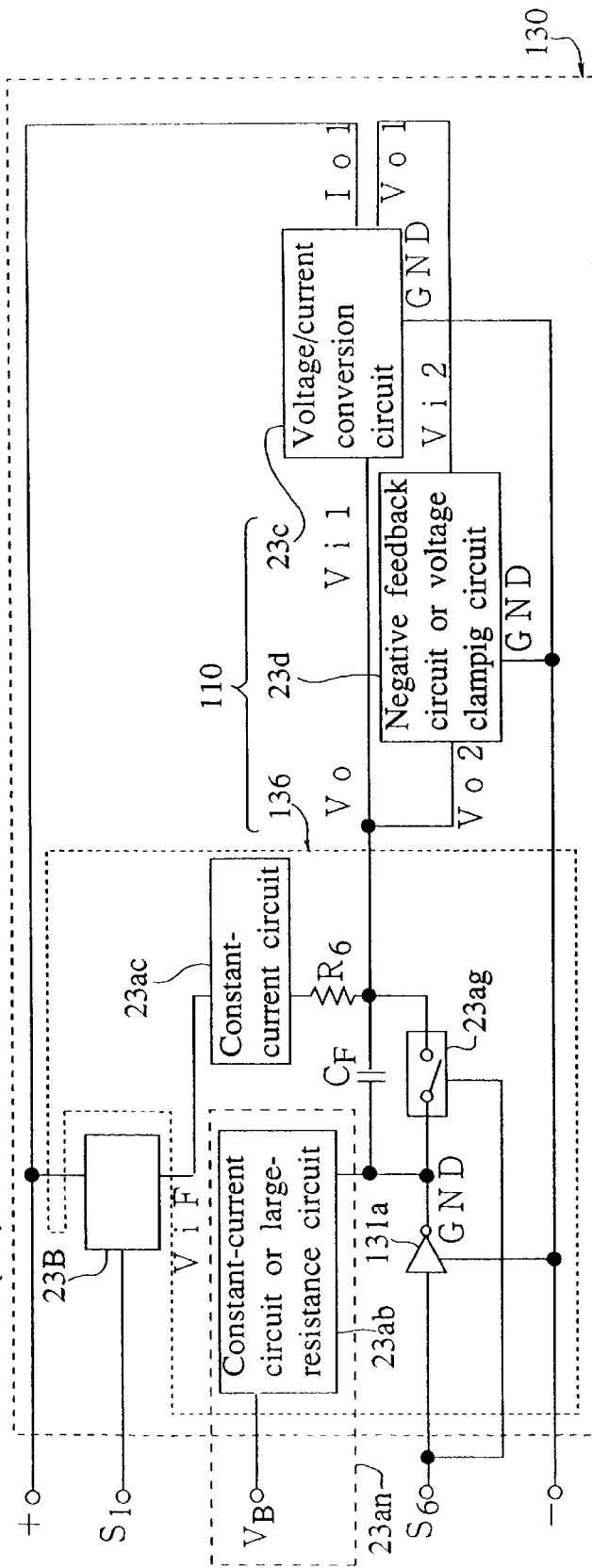
FIGS. 65(A) and 65(B), is an explanatory figure of another example of the third invention.
Figure 65B:
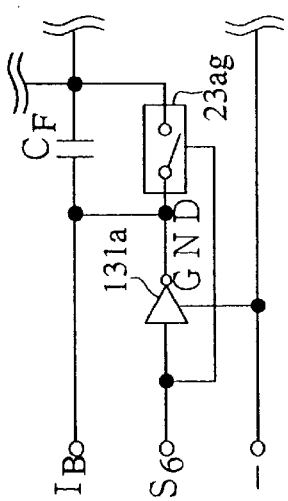

FIGS. 65(A) and 65(B) are circuit diagrams of a dial pulse circuit for implementing a signal generating circuit capable of omitting the diode D1.

This dial pulse circuit is provided with a new filter circuit 136 instead of the already-mentioned filter circuits 131 to 135.

This new filter circuit 136 is provided with a series circuit composed of a constant-current circuit 23ac and a high-resistance resistor R6, a NOT circuit 131a, a capacitor CF, a bias circuit 23an, and a capacitor discharging circuit 23ag (where a 23ah type is also usable).

The series circuit composed of the constant-current circuit 23ac and the high-resistance resistor R6 is connected between the voltage input terminal ViF and the output terminal Vo of the filter circuit 136. This constant-current circuit 23ac is a constant-current circuit which makes a constant current flow when a voltage is applied to it. However, this constant-current circuit may be omitted (short-circuited) in some cases.

The NOT circuit 131a has an input terminal, an output terminal and a ground terminal. The ground terminal of this NOT circuit 131a is connected to the ground terminal of the impedance circuit 110, and its input terminal is used as an input terminal for the sixth control signal S6.

The capacitor CF is connected between the output terminal Vo of the filter circuit 136 and the output terminal of the NOT circuit 131a.

The bias circuit 23an is a circuit which makes a bias current for guaranteeing that an alternating current signal flows in the capacitor CF flow through the output terminal of the NOT circuit 131a, only when the output of the NOT circuit 131a is at a low level. This bias circuit 23an can be composed of an optional and preferred circuit.

In the circuit shown in FIG. 65(A), the bias circuit 23an is composed of a voltage signal VB which is in-phase and synchronized with the sixth control signal S6 and a constant-current circuit or large-resistance resistor 23ab. When the output of the NOT circuit 131a is at a high level, said bias current IB is zero. Thanks to this, the diode D1 can be omitted. The circuit shown in FIG. 65(B) supplies a bias current IB to the output terminal of the NOT circuit 131a from the outside only when the sixth control signal S6 is inputted (when it is at a high level).

In case of making the NOT circuit 131a of a bipolar transistor, by using an electric current signal as the control signal S6 and setting said electric current signal at a high current level (at the same level as said bias current IB), an effect equivalent to the circuit of FIG. 65(B) can be obtained without using the bias current IB of FIG. 65(B).

3-3-3

FIG. 66 shows a preferred circuit example of a dial pulse circuit in which the diode D1 is omitted and a speedup diode D3 is provided. This circuit example is desirable to implementation of a signal generating circuit of the third invention.

In this circuit example, the bias circuit 23an is composed of a circuit comprising a series circuit composed of a constant-current circuit or large-resistance resistor 23ab and a diode D4, and a diode D5.

The series circuit composed of a constant-current circuit or large-resistance resistor 23ab and a diode D4 is connected between the voltage input terminal ViF of the filter circuit 137 and the NOT circuit 131a. Here, these are arranged so that the cathode of the diode D4 is connected to the output terminal of the NOT circuit 131a.

The diode D5 is connected between a connection point of the constant-current circuit or large-resistance resistor 23ab and the diode D4, and the ground terminal of the filter circuit 137. Here, this diode D5 is disposed so that its cathode is connected to the ground terminal of the filter circuit 137. Moreover, as the diode D5, a diode is used which is higher in the forward operation starting voltage (a starting voltage at which a conduction state happens due to a forward bias) than the diode D4. Such a diode D5 as this can be attained, for example, by connecting plural diodes D4 in series with one another.

The speed-up diode D3, namely, a diode D3 which releases electric charge accumulated in a stray capacity near the input terminal of the voltage/current conversion circuit 23c is connected between a terminal (the voltage input terminal ViF of the filter circuit 137), turned on/off by the first switch circuit 23B, of the constant-current circuit or large-resistance resistor 23ab and the input terminal Vi1 of the voltage/current conversion circuit 23c. Here, the diode D3 is connected so that its cathode is at the voltage input terminal ViF side.

The capacitor CF and the capacitor discharging circuit 23ag are in parallel with each other, and they are connected between the output terminal Vo of the filter circuit 137 and the output terminal of the NOT circuit 131a.

The circuit shown in FIG. 66 operates in the following manner. When a control signal S6 is inputted (when it is at a high level), an electric current of the constant-current circuit or large-resistance resistor 23ab flows through the diode D4 and the NOT circuit 131a. Accordingly, a bias current can flow in the NOT circuit. And when the control signal S6 is not inputted (when it is at a low level), an electric current of the constant-current circuit or large-resistance resistor 23ab flows through the diode D5. Electric charge accumulated in a stray capacity near the input terminal of the voltage/current conversion circuit 23c reaches the ground by way of the diode D3 and the constant-current circuit or large-resistance resistor 23ab. From these, it is understood that the circuit shown in FIG. 66 performs two functions of supplying a bias current to the NOT circuit 131a and speeding up its operation.

3-3-4

Figure 67:
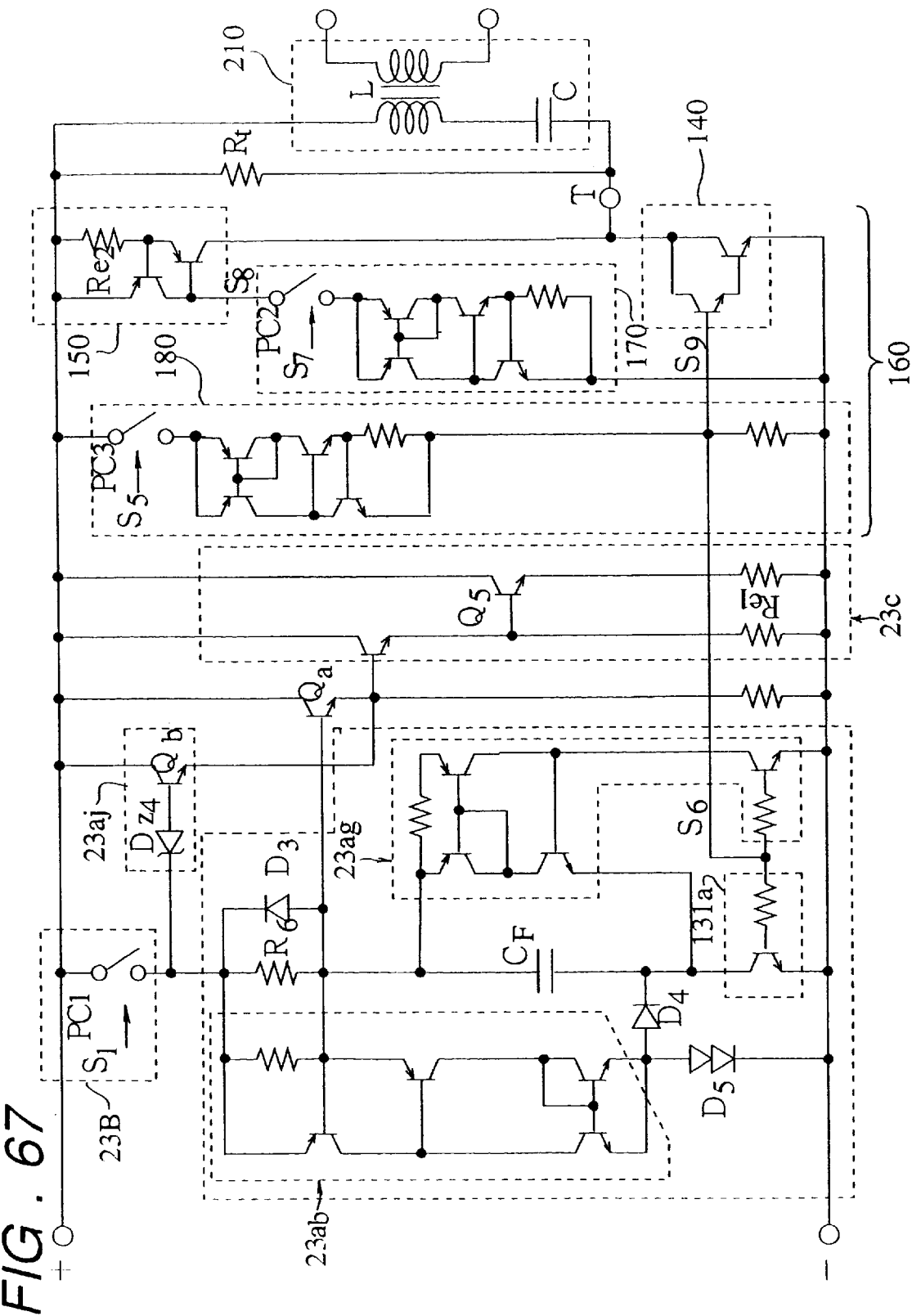
FIG. 67 is a first detailed circuit diagram of the third invention.
Figure 68:
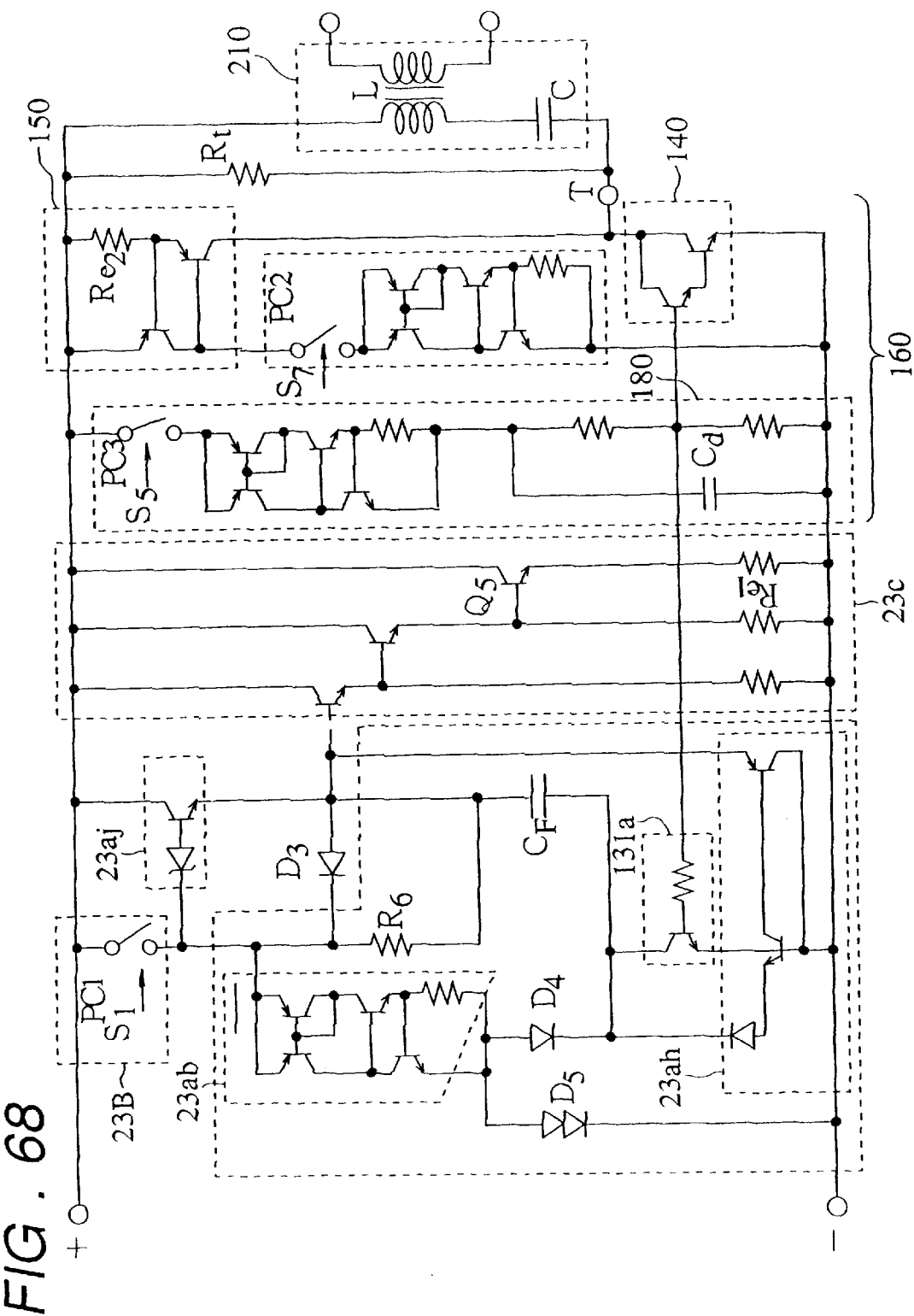
FIG. 68 is a second detailed circuit diagram of the third invention.

FIGS. 67 and 68 are more detailed circuit diagrams of signal generating circuits of the third invention.

Particularly, the circuit example of FIG. 67 is a circuit explained by means of FIG. 66, in which its capacitor discharging circuit is composed of the capacitor discharging circuit 23ag controlled by the control signal S6. Moreover, in the circuit, its reverse-current preventing diode D2 is composed of a PN junction part of a transistor. That is to say, the reverse-current preventing diode D2 is composed of the emitter-base junction of a transistor Qa in FIG. 67. In this circuit example of FIG. 67, the constant-current circuit 23ac shown in FIG. 66 is short-circuited (omitted).

The circuit example of FIG. 68 is a circuit explained by means of FIG. 66, in which its capacitor discharging circuit is composed of the capacitor discharging circuit 23ah which automatically discharges electric charge of the capacitor CF when the electric potential of the ground side terminal of the capacitor CF comes to be lower by a specified potential difference or more in comparison with the ground potential of the filter circuit 137. In this circuit example of FIG. 68, the constant-current circuit 23ac shown in FIG. 66 is short-circuited (omitted).

In FIGS. 67 and 68, the numbers used in the description up to now are given to the main circuit components in the same way. Since operation of the circuits shown in FIGS. 67 and 68 is the same as the description up to now, the description is omitted.

In FIGS. 67 and 68, a resistor Rt connected between the input terminals of the transformer L is a resistor which is connected when plural bias current levels are necessary for guaranteeing an alternating current operation of the transformer L. A constant-current circuit may be used instead of this resistor Rt. The fifth switch circuit 150 shows the following action in cooperation with this resistor Rt.

As described above, in this third invention, the fifth switch circuit 150 has a function of generating a bias current. Therefore, in the circuit examples of FIGS. 67 and 68, a first bias current by the resistor Rt is obtained as a bias current to flow in the fourth switch circuit 140. Furthermore, in case that the fifth switch circuit 150 operates as a bias circuit, a second bias current generated by adding the first bias current and a bias current formed in the fifth switch circuit 150 to each other is obtained. Accordingly, in the circuit examples of FIGS. 67 and 68, bias currents of two kinds are obtained.

That bias currents of plural levels are obtained as described above is important to a system as described below, for example. In a system in which plural communication terminal units are connected in parallel with the same telephone line and these communication terminal units are called at the same time from the office side and then one of these communication terminal units is specified and the specified terminal unit responses to the office side, for example, in a system having a non-ringing communication terminal group, reception until a response terminal is specified is performed by means of the first bias current by the resistor Rt. And the response to the specified communication terminal is performed by means of the second bias current. Therefore, an off-hook signal and dial pulse generating circuit of the third invention which can obtain bias currents of plural levels is useful also in this point.

The respective inventions of this application are never limited to the above-mentioned embodiments, and many modifications and variations can be added to them.

Although examples in which the respective circuits are composed of bipolar transistors have been described above, the circuits may be also composed of field effect transistors. In case of doing so and in case of the third invention, it is good that a NOT circuit is composed of a field effect transistor of an open drain type.

In case of implementing the third invention, it is good to use a signal of a waveform having a comparatively long time during which the signal comes into a high level state from a low level state as the sixth control signal S6 to be inputted to the input terminal of the NOT circuit 131a. That is to say, it is good to use a signal whose voltage change per unit time dV/dt is small. Thus, when connecting the ground side terminal of the capacitor CF with the ground, the connection is slowly performed. Hereupon, connection/disconnection between the transformer L and the line is slowly performed. Thanks to this, since it is possible to keep low the peak value of a transient current flowing in the transformer L at the time of said connection/disconnection, noises generated to the alternating current signal system can be reduced.

Apparently from the above-mentioned description, according to the present invention, an off-hook signal and dial pulse generating circuit which is provided between a telephone line and a communication terminal transformer, sends an off-hook signal or dial pulses to the office side through the telephone line in case that an off-hook signal or a first control signal for forming dial pulses is inputted, and forms a state where the communication terminal transformer is protected from input in case that a second control signal is inputted, the off-hook signal and dial pulse generating circuit comprises (A) a full-wave rectifying circuit which rectifies in full wave the line voltage of the telephone line, (B) a specified dial pulse circuit comprising a specified impedance circuit and a first switch circuit to be turned on/off by the first control signal, and (C) a specified switch block circuit which comprises a series circuit composed of a second switch circuit and a third switch circuit and in which the communication terminal transformer is connected with these switch circuits.

Since the dial pulse circuit is connected between the output terminals of the full-wave rectifying circuit, it is possible to make a great current necessary for generating dial pulses flow only at the dial pulse circuit side. Accordingly, since the dial pulse circuit side does with a single small power device, the present invention can make the number of small power devices less than the prior art.

Furthermore, the second switch circuit makes it possible to disconnect the line and the communication terminal transformer from each other according to demand. Therefore, connection/disconnection between the communication terminal transformer and the line can be performed through an operation of turning on or off the second switch circuit after initially turning on the dial pulse circuit and then lowering the line voltage as utilizing the line resistance and the like. When connection/disconnection between the communication terminal transformer and the line can be performed in a state where the line voltage is low, a surge voltage to enter the input side of the communication terminal transformer can be reduced to that extent.

And according to a driving method of the present invention, the first to third switch circuits are neatly turned on/off by turning on/off the first and second control signals through specified steps. Therefore, when the line and the communication terminal transformer are connected with each other and when they are disconnected from each other, since an electric current is made flow first through the dial pulse circuit, the line voltage is lowered by an influence of the line resistance to that extent. And the communication terminal transformer is connected to the line in a state where the line voltage has been lowered in such a way, or the communication terminal transformer is disconnected from the line in a state where the line voltage has been lowered in such a way. Accordingly, a surge voltage generated at the time of connection/disconnection can be reduced to the extent of lowering of the line voltage.

According to an off-hook signal and dial pulse generating circuit of the third invention, the fifth switch circuit makes it possible to short circuit the input terminals of the communication terminal transformer and to flow a bias current in the fourth switch circuit. Therefore, the number of elements forming a switch block circuit can be reduced in comparison with the first invention. Furthermore, the dial pulse circuit used in the third invention operates at a state of non-inductance when the sixth control signal is in an off state. Accordingly, a circuit receiving the sixth control signal may be formed by a NOT circuit. This results in the reduction of the number of elements forming the dial pulse circuit in comparison with the first invention. As is apparent from the above-mentioned facts, the third invention makes it possible to reduce the number of elements constituting the off-hook signal and dial pulse generating circuit as compared with the first invention.

What is claimed is:

1. An off-hook signal and dial pulse generating circuit which is provided between a telephone line and a communication terminal transformer, sends an off-hook signal or dial pulses to the office side through said telephone line in case that an off-hook signal or a first control signal for forming dial pulses is inputted, and forms a state where said communication terminal transformer is protected from input in case that a second control signal is inputted, said off-hook signal and dial pulse generating circuit comprising;

(A) a full-wave rectifying circuit for rectifying in full wave the line voltage of said telephone line, (B) a dial pulse circuit which is connected in parallel with the output side of said full-wave rectifying circuit and comprises an impedance circuit and a first switch circuit to be turned on/off by said first control signal, wherein said impedance circuit operates in a state where it has an inductance component in case that a fourth control signal which is synchronized with said second control signal and has a level converted so as to be adaptive to said dial pulse circuit is in an off state, and operates in a state where it has no inductance in case that said fourth control signal is in an on state, and wherein an electric current flowing through said impedance circuit is turned on/off by said first switch circuit, (C) a switch block circuit which comprises a series circuit which is connected in parallel with the output side of said full-wave rectifying circuit and is composed of a second switch circuit and a third switch circuit and which has said communication terminal transformer connected between a connecting point of said second and third switch circuits and one of the output terminals of said full-wave rectifying circuit, wherein said second switch circuit performs an on/off operation according to a third control signal which is synchronized with said first control signal and has a level adaptive to said switch block circuit (where it operates so as to preferentially come into an off state in case that said second control signal is in an on state), and wherein said third switch circuit performs an on/off operation according to said second control signal.

2. An off-hook signal and dial pulse generating circuit as defined in claim 1, wherein;

one end of said first switch circuit is connected with a power source of said dial pulse generating circuit, said impedance circuit comprises the following circuits (a1) to (c);

(a1) a filter circuit comprising;

a positive logic circuit which has an input terminal for said fourth control signal and an open collector output terminal, and in which its ground terminal is connected with the ground of said dial pulse circuit and its power source terminal is connected to the other end of said first switch circuit, and the impedance between said power source terminal and said ground has a constant-current characteristic or a high-resistance characteristic, a first constant-current circuit or large-resistance circuit which is connected between the power source and the output terminal of said positive logic circuit and acts as a load onto said positive logic circuit, a second constant-current circuit whose current input terminal is connected to the power source of said positive logic circuit, a resistor whose one end is connected to the current output terminal of said second constant-current circuit, a capacitor which is connected between the other end of said resistor and the output terminal of said positive logic terminal, and a diode whose cathode is connected to the connecting point of said resistor and said capacitor and whose anode is connected to the output terminal of said positive logic circuit;

said filter circuit using the terminal connected to the power source of said positive logic circuit as its input terminal and using the connecting point of said resistor and said capacitor as its output terminal, (b) a voltage/current conversion circuit in which its common terminal is connected to the ground of the dial pulse circuit, its input side is connected to the output terminal of said filter circuit, and its current output terminal is connected to the power source of said dial pulse circuit, and which outputs an electric current corresponding to an input voltage to the current output terminal and outputs said third control signal obtained by converting the input voltage in level to said switch block circuit, and (c) a negative feedback circuit for keeping the output current of said voltage/current conversion circuit at a certain value or lower, or a voltage clamping circuit for keeping the output current of said voltage/current conversion circuit at a certain value or lower by limiting the input voltage of said voltage/current conversion circuit to a certain value or lower.

3. An off-hook signal and dial pulse generating circuit as defined in claim 1, wherein;

one end of said first switch circuit is connected with a power source of said dial pulse generating circuit, said impedance circuit comprises the following circuits (a2) to (c);

(a2) a filter circuit comprising;

a current Miller circuit whose common terminal is connected to the input terminal of said filter circuit and which has an input terminal, a first current output terminal and a second current output terminal, a positive logic circuit which comprises NOT circuits of two stages and has an input terminal for said fourth control signal and in which its ground terminal is connected with the ground of said dial pulse circuit and said first and second current output terminals of said current Miller circuit are used as loads onto said two-stage NOT circuits, a constant-current circuit whose current input terminal is connected to the input terminal of said current Miller circuit, a resistor which is connected between the output terminal of said filter circuit and the current output terminal of said constant-current circuit, a capacitor which is connected between the output terminal of said filter circuit and the output side of said positive logic circuit, a diode whose cathode is connected to the output terminal of said filter circuit and whose anode is connected to the output terminal of said positive logic circuit, (b) a voltage/current conversion circuit in which its common terminal is connected to the ground of the dial pulse circuit, its input side is connected to the output terminal of said filter circuit, and its current output terminal is connected to the power source of said dial pulse circuit, and which outputs an electric current corresponding to an input voltage to the current output terminal and outputs said third control signal obtained by converting the input voltage in level to said switch block circuit, and (c) a negative feedback circuit for keeping the output current of said voltage/current conversion circuit at a certain value or lower, or a voltage clamping circuit for keeping the output current of said voltage/current conversion circuit at a certain value or lower by limiting the input voltage of said voltage/current conversion circuit to a certain value or lower.

4. An off-hook signal and dial pulse generating circuit as defined in claim 1, wherein;

one end of said first switch circuit is connected with a power source of said dial pulse generating circuit, said impedance circuit comprises the following circuits (a3) to (c);

(a3) a filter circuit comprising;

a current Miller circuit whose common terminal is connected to the input terminal of said filter circuit and which has an input terminal a first current output terminal and a second current output terminal, a constant-current circuit whose current input terminal is connected to the input terminal of said current Miller circuit, a positive logic circuit which comprises NOT circuits of two stages and has an input terminal for said fourth control signal and in which its ground terminal is connected with the ground of said dial pulse circuit and said constant-current circuit is used as a load onto said NOT circuit of the first or second stage, and said second current output terminal of said current Miller circuit is used as a load onto said NOT circuit of the second or first stage, a resistor which is connected between the output terminal of said filter circuit and the first current output terminal of said current Miller circuit, a capacitor which is connected between the output terminal of said filter circuit and the output side of said positive logic circuit, a diode whose cathode is connected to the output terminal of said filter circuit and whose anode is connected to the output terminal of said positive logic circuit, (b) a voltage/current conversion circuit in which its common terminal is connected to the ground of the dial pulse circuit, its input side is connected to the output terminal of said filter circuit, and its current output terminal is connected to the power source of said dial pulse circuit, and which outputs an electric current corresponding to an input voltage to the current output terminal and outputs said third control signal obtained by converting the input voltage in level to said switch block circuit, and (c) a negative feedback circuit for keeping the output current of said voltage/current conversion circuit at a certain value or lower, or a voltage clamping circuit for keeping the output current of said voltage/current conversion circuit at a certain value or lower by limiting the input voltage of said voltage/current conversion circuit to a certain value or lower.

5. An off-hook signal and dial pulse generating circuit as defined in claim 1, wherein;

the first switch circuit is provided at an optional position where is in a circuit system connected to an input terminal of said current Miller circuit and an electric current to be inputted to said input terminal can be turned on/off, said impedance circuit comprises the following circuits (a2) to (c);

(a2) a filter circuit comprising;

a current Miller circuit whose common terminal is connected to the input terminal of said filter circuit and which has an input terminal, a first current output terminal and a second current output terminal, a positive logic circuit which comprises NOT circuits of two stages and has an input terminal for said fourth control signal and in which its ground terminal is connected with the ground of said dial pulse circuit and said first and second current output terminals of said current Miller circuit are used as loads onto said two-stage NOT circuits, a constant-current circuit whose current input terminal is connected to the input terminal of said current Miller circuit, a resistor which is connected between the output terminal of said filter circuit and the current output terminal of said constant-current circuit, a capacitor which is connected between the output terminal of said filter circuit and the output side of said positive logic circuit, a diode whose cathode is connected to the output terminal of said filter circuit and whose anode is connected to the output terminal of said positive logic circuit, (b) a voltage/current conversion circuit in which its common terminal is connected to the ground of the dial pulse circuit, its input side is connected to the output terminal of said filter circuit, and its current output terminal is connected to the power source of said dial pulse circuit, and which outputs an electric current corresponding to an input voltage to the current output terminal and outputs said third control signal obtained by converting the input voltage in level to said switch block circuit, and (c) a negative feedback circuit for keeping the output current of said voltage/current conversion circuit at a certain value or lower, or a voltage clamping circuit for keeping the output current of said voltage/current conversion circuit at a certain value or lower by limiting the input voltage of said voltage/current conversion circuit to a certain value or lower, and the input terminal of said filter circuit is connected to the power source of said dial pulse circuit.

6. An off-hook signal and dial pulse generating circuit which is provided between a telephone line which has a constant-voltage constant-resistance system as its office-side power feeding system and has a line length where its line voltage can be kept at a certain value or higher and a communication terminal transformer, sends an off-hook signal or dial pulses to the office side through said telephone line in case that an off-hook signal or a first control signal for forming dial pulses is inputted, and forms a state where said communication terminal transformer is protected from input in case that a second control signal is inputted, said off-hook signal and dial pulse generating circuit comprising;

(a) a full-wave rectifying circuit for rectifying in full wave the line voltage of said telephone line, (b) a dial pulse circuit which is connected in parallel with the output side of said full-wave rectifying circuit and comprises a constant-current circuit block through which a constant current flows when a voltage is applied to it and a first switch circuit to be turned on/off by said first control signal, wherein an electric current flowing through said constant-current circuit block is turned on/off by said first switch circuit, and (c) a switch block circuit which comprises a series circuit which is connected in parallel with the output side of said full-wave rectifying circuit and comprises a second switch circuit and a third switch circuit and in which said communication terminal transformer is connected between the connecting point of said second and third switch circuits and one of the output terminals of said full-wave rectifying circuit, wherein said second switch circuit performs an on/off operation according to a third control signal which is synchronized with said first control signal and has a level converted so as to be adaptive to said switch block circuit (where it operates so as to preferentially come into an off state in case that said second control signal is in an on state), and said third switch circuit operates so as to come into an off state in case that said second control signal is in an off state and come into an on state in case that said second control signal is in an on state.

7. An off-hook signal and dial pulse generating circuit as defined in claim 6, wherein;

said first switch circuit is provided between the input terminal of a constant-current small block comprising a series circuit of a constant-current circuit and a resistor, and the power source of the dial pulse circuit, and said constant-current circuit block comprises;

(I) said constant-current small block, (II) a voltage/current conversion circuit in which its common terminal is connected to the ground of said dial pulse circuit, its input terminal is connected to the output terminal of said constant-current small block, and its current output terminal is connected to the power source of said dial pulse circuit, and which outputs an electric current corresponding to an input voltage to the current output terminal and outputs said third control signal to said switch block circuit, and (III) a negative feedback circuit for keeping the output current of said voltage/current conversion circuit at a certain value or lower, or a voltage clamping circuit for keeping the output current of said voltage/current conversion circuit at a certain value or lower by limiting the input voltage of said voltage/current conversion circuit to a certain value or lower.

8. An off-hook signal and dial pulse generating circuit as defined in claim 6, which comprises, a constant-current small block composing;

a current Miller circuit whose common terminal is connected to the input terminal of said constant-current small block and which has an input terminal and a current output terminal, a constant-current circuit which is connected between the input terminal of said current Miller circuit and the ground of said dial pulse circuit, and a resistor which is connected between the output terminal and the current output terminal of said current Miller circuit, said first switch circuit is provided between the input terminal of said constant-current small block and the power source of the dial pulse circuit, and said constant-current circuit block comprises;

(I) said constant-current small block, (II) a voltage/current conversion circuit in which its common terminal is connected to the ground of said dial pulse circuit, its input terminal is connected to the output terminal of said constant-current small block, and its current output terminal is connected to the power source of said dial pulse circuit, and which outputs an electric current corresponding to an input voltage to the current output terminal and outputs said third control signal to said switch block circuit, and (III) a negative feedback circuit for keeping the output current of said voltage/current conversion circuit at a certain value or lower, or a voltage clamping circuit for keeping the output current of said voltage/current conversion circuit at a certain value or lower by limiting the input voltage of said voltage/current conversion circuit to a certain value or lower.

9. An off-hook signal and dial pulse generating circuit as defined in claim 6, which comprises, a constant-current small block composing;

a current Miller circuit whose common terminal is connected to the input terminal of said constant-current small block and which has an input terminal and a current output terminal, a constant-current circuit which is connected between the input terminal of said current Miller circuit and the ground of said dial pulse circuit, and a resistor which is connected between the output terminal and the current output terminal of said current Miller circuit, wherein the first switch circuit is provided at an optional position where is in a circuit system connected to an input terminal of said current Miller circuit and an electric current to be inputted to said input terminal can be turned on/off, wherein the input terminal of said constant-current small block is connected to the power source of said dial pulse circuit, and wherein said constant-current circuit block comprises;

(I) said constant-current small block, (II) a voltage/current conversion circuit in which its common terminal is connected to the ground of said dial pulse circuit, its input terminal is connected to the output terminal of said constant-current small block, and its current output terminal is connected to the power source of said dial pulse circuit, and which outputs an electric current corresponding to an input voltage to the current output terminal and outputs said third control signal to said switch block circuit, and (III) a negative feedback circuit for keeping the output current of said voltage/current conversion circuit at a certain value or lower, or a voltage clamping circuit for keeping the output current of said voltage/current conversion circuit at a certain value or lower by limiting the input voltage of said voltage/current conversion circuit to a certain value or lower.

10. An off-hook signal and dial pulse generating circuit as defined in claim 1, wherein;

said switch block circuit is furthermore provided with;

a first level converting circuit which generates a first off signal for turning off said second switch circuit, a first on signal for turning on said third switch circuit, and said fourth control signal in case that said second control signal is on, a second level converting circuit which generates a second on signal for turning on said second switch circuit in case that said third control signal is on, a dial pulse assisting current at the time of generating dial pulses, and a bias current for compensating an alternating current operation of said communication terminal transformer L at the time of an off-hook operation, a current limiting resistor for limiting an electric current to flow through said third switch circuit, a first diode which has an anode connected to one end of the output side of said full-wave rectifying circuit and a cathode connected to an output terminal of said assisting current or said bias current of said second level converting circuit and makes said dial pulse assisting current flow, and a second diode which has an anode connected to the connecting point of said second and third switch circuits and a cathode connected to the output terminal of said assistant current or said bias current of said second level converting circuit, and has a forward operation starting voltage lower than said first diode and makes flow a bias current for compensating an alternating current operation of said communication terminal transformer.

11. An off-hook signal and dial pulse generating circuit as defined in claim 10, wherein;

a switching device in charge of an switching operation of said second switch circuit is composed of a bipolar transistor and the base of said bipolar transistor is set as an input point for turning on said second switch circuit, and furthermore a base current for turning on said bipolar transistor is made have a role as said dial pulse assisting current or said bias current for compensating an alternating operation of the communication terminal transformer, a base-collector junction of said bipolar transistor is made have a role as said second diode for letting said bias current flow, and a circuit part for turning off said bipolar transistor by short-circuiting the base and the emitter of said bipolar transistor with each other is made have a role as said first diode for letting said dial pulse assisting current flow.

12. An off-hook signal and dial pulse generating circuit as defined in claim 10, wherein;
   said first level converting circuit comprises;
      a switch means for performing an on/off operation according to said second control signal and
      a constant-current circuit to be turned on/off by said switch means.

13. An off-hook signal and dial pulse generating circuit as defined in claim 10, wherein;
   said first level converting circuit comprises;
      a switch means for performing an on/off operation according to said second control signal,
      a constant-current circuit to be turned on/off by said switch means, and
      a series circuit composed of a capacitor and a resistor which are connected between the output terminals of said switch means.

14. An off-hook signal and dial pulse generating circuit as defined in claim 10, wherein;
   said first level converting circuit comprises;
      a switch means for performing an on/off operation according to said second control signal,
      a constant-current circuit to be turned on/off by said switch means,
      a series circuit composed of a capacitor and a resistor which are connected between the output terminals of said switch means, and
      a series circuit composed of a resistor and a Miller capacitor composed of a transistor, a diode and a capacitor.

15. An off-hook signal and dial pulse generating circuit as defined in claim 13, wherein;
   a non-linear current amplifier with a Zener diode composed by connecting the Zener diode in series with the input terminal of the non-linear current amplifier whose current gain increases as the input current increases, is connected so that its input terminal and common terminal are connected between the output terminals of said switch means and its current flowing-in (flowing-out) output is connected to a point where an electric current flowing through said constant-current circuit decreases when an electric current in said constant-current circuit flows in (or flows out).

16. An off-hook signal and dial pulse generating circuit as defined in claim 14, wherein;
   a non-linear current amplifier with a Zener diode composed by connecting the Zener diode in series with the input side of the non-linear current amplifier whose current gain increases as the input current increases, is connected so that its input terminal and common terminal are connected between the output terminals of said switch means and its current flowing-in (flowing-out) output is connected to a point where an electric current flowing through said constant-current circuit decreases when an electric current in said constant-current circuit flows in (or flows out).

17. A method for driving an off-hook signal and dial pulse generating circuit, on the assumption that a signal for forming an off-hook signal or dial pulses is a first control signal and a signal for forming a state where a communication terminal transformer is protected from input is a second control signal, said method starting with a state where said circuit is in a waiting state and said first and second control signals are in an off state, and taking;

(A) in order to generate an off-hook signal, three steps of:
   a first step of turning on said second control signal and keeping it on for a specified time and then
   a second step of turning on said first control signal and keeping it on for a specified time, and then
   a third step of turning off said second control signal, (B) in order to generate dial pulses in an off-hook state, three steps of
   a first step of turning on said second control signal and keeping it on for a specified time and then
   a second step of turning off/on said first control signal according to the number of dial pulses and finally keeping it on, and then
   a third step of turning off said second control signal and keeping it in the off state for a specified time, and (C) in order to returning said circuit into a waiting state, three steps of
   a first step of turning on said second control signal and keeping it on for a specified time and then
   a second step of turning off said first control signal, and then
   a third step of turning off said second control signal at a specified time after turning off said first control signal in said second step.

18. An off-hook signal and dial pulse generating circuit as defined in claim 2, said off-hook signal and dial pulse generating circuit comprising;
   a discharging circuit for discharging the electric charge charged up in said capacitor, when said fourth control signal is in an on state.

19. An off-hook signal and dial pulse generating circuit as defined in claim 2, said off-hook signal and dial pulse generating circuit comprising;
   a discharging circuit for discharging the electric charge charged up in said capacitor, when the electric potential of the ground side terminal of said capacitor comes to be lower by a set potential difference or more in comparison with the ground potential of said filter circuit.

20. An off-hook signal and dial pulse generating circuit as defined in claim 2, said off-hook signal and dial pulse generating circuit comprising;
   a voltage clamping circuit having an input terminal and a ground terminal, wherein said input terminal is connected to an input terminal of said filter circuit and said ground terminal is connected to an input terminal of a voltage/current conversion circuit, wherein when a voltage between said input terminal and said ground terminal of said voltage clamping circuit comes to be equal to or higher than a set voltage, a conduction state happens between the input terminal and the ground terminal, and wherein moreover the voltage between the input terminal and the ground terminal is clamped to said set voltage.

21. An off-hook signal and dial pulse generating circuit as defined in claim 2, said off-hook signal and dial pulse generating circuit comprising;
   a voltage clamping circuit having an input terminal, a ground terminal and a buffer current output terminal, wherein said input terminal is connected to an input terminal I of said filter circuit, said ground terminal is connected to an input terminal of said voltage/current conversion circuit and said buffer current output terminal is connected to one end of an output terminal of said full-wave rectifier circuit, and wherein when a voltage between said input terminal and said ground terminal of said voltage clamping circuit comes to be equal to or higher than a set voltage, the voltage between the input terminal and the ground terminal is clamped to said set voltage and moreover a conduction state happens between said current output terminal and said ground terminal.

22. An off-hook signal and dial pulse generating circuit as defined in claim 20, said off-hook signal and dial pulse generating circuit comprising;
   a diode in which its anode is connected to the output terminal of said filter circuit and its cathode is connected to the input terminal of said voltage/current conversion circuit.

23. An off-hook signal and dial pulse generating circuit as defined in claim 22, said off-hook signal and dial pulse generating circuit comprising;
   a series circuit which is connected with the input terminal I and the output terminal of said filter circuit and comprises a second voltage clamping circuit and a current limiting means.

24. An off-hook signal and dial pulse generating circuit as defined in claim 22, said off-hook signal and dial pulse generating circuit comprising;
   a second voltage clamping circuit having an input terminal, a ground terminal and a buffer current terminal, wherein said input terminal is connected to an input terminal of said filter circuit, said ground terminal is connected to an input terminal of said voltage/current conversion circuit, and said buffer current terminal is connected to one of the output terminals of said full-wave rectifier circuit, and wherein when a voltage between said input terminal and said ground terminal of said second voltage clamping circuit comes to be equal to or higher than a set voltage, an electric current flows from said buffer current terminal to said ground terminal so as to clamp the voltage between the input terminal and the ground terminal to said set voltage, and
   a current limiting means connected between the ground terminal of said second voltage clamping circuit and the output terminal of said filter circuit.

25. An off-hook signal and dial pulse generating circuit as defined in claim 2, said off-hook signal and dial pulse generating circuit comprising;
   a diode in which its anode is connected to the input terminal of said voltage/current conversion circuit and its cathode is connected to the input terminal of said filter circuit.

26. An off-hook signal and dial pulse generating circuit as defined in claim 4, wherein;
   said constant-current circuit is used as a load on said first-stage NOT circuit, and
   a diode in which its anode is connected to the input terminal of said voltage/current conversion circuit and its cathode is connected to the input terminal of said current Miller circuit is provided.

27. An off-hook signal and dial pulse generating circuit which is provided between a telephone line and a transformer part having a communication terminal transformer and a capacitor which is connected in series with this transformer and cuts off a direct current, and sends an off-hook signal or dial pulses to the office side through said telephone line in case that a first control signal for forming an off-hook signal or dial pulses is inputted, said off-hook signal and dial pulse generating circuit comprising;
   (X) a full-wave rectifier circuit for full-wave rectifying the line voltage of said telephone line,
   (Y) a dial pulse circuit which is connected between the output terminals of said full-wave rectifier and comprises an impedance circuit and a first switch circuit turned on/off by said first control signal, said dial pulse circuit in which said impedance circuit operates in a state where it has an inductance component in case that a sixth control signal which is synchronized with a fifth control signal and has a level fitted for this dial pulse circuit is in an on state, and operates in a state of non-inductance in case that said sixth control signal is in an off state, and an electric current which flows in said impedance circuit is turned on/off by said first switch circuit, and
   (Z) a switch block circuit comprising a series circuit which is connected between the output terminals of said full-wave rectifier circuit and is composed of a fourth switch circuit and a fifth switch circuit, said switch block circuit in which said transformer part is connected in parallel with said fifth switch circuit, said fourth switch circuit is turned on and connects said transformer part and said telephone line with each other in case that said fifth control signal is inputted into said fourth switch circuit, and said fifth switch circuit makes a bias current which guarantees an alternating current operation of said communication terminal transformer flow in said fourth switch circuit in case that a seventh control signal is inputted into said fifth switch circuit and said fifth control signal is inputted into said fourth switch circuit, and short-circuits the input terminals of the transformer part with each other in case that said seventh control signal is inputted into the fifth switch circuit and said fifth control signal is not inputted into said fourth switch circuit.

28. An off-hook signal and dial pulse generating circuit as defined in claim 27, wherein;
   said impedance circuit comprises a filter circuit having a voltage input terminal and an output terminal, and a voltage/current conversion circuit for outputting an electric current corresponding to a voltage outputted from said filter circuit,
   said filter circuit comprises;
      a series circuit which is connected between said voltage input terminal and said output terminal of said filter circuit and comprises a constant-current circuit which makes a constant current flow when a voltage is applied to it and a high-resistance resistor (including a case where a constant-current circuit is omitted (short-circuited)),
      a NOT circuit having an input terminal, an output terminal and a ground terminal in which said ground terminal is connected to the ground terminal of said impedance circuit and said input terminal is used as an input terminal for said sixth control signal,
      a constant-current circuit for making a constant current flow when a voltage is applied to it or a large-resistance resistor which are connected between said voltage input terminal of said filter circuit and said output terminal of said NOT circuit,
      a capacitor connected between said output terminal of said filter circuit and said output terminal of said NOT circuit, and
      a diode in which its cathode is connected to said output terminal of said filter circuit and its anode is connected to said output terminal of said NOT circuit, and said first switch circuit is connected between one of the output terminals of said full-wave rectifier circuit and said voltage input terminal of said filter circuit.

29. An off-hook signal and dial pulse generating circuit as defined in claim 27, wherein;

said impedance circuit comprises a filter circuit having a voltage input terminal and an output terminal, and a voltage/current conversion circuit for outputting an electric current corresponding to a voltage outputted from said filter circuit, said filter circuit comprises;
- a current Miller circuit whose common terminal is connected to said voltage input terminal of said filter circuit,
- a series circuit which is connected between an input terminal of said current Miller circuit and said output terminal of said filter circuit and comprises a constant-current circuit which makes a constant current flow when a voltage is applied to it and a high-resistance resistor (including a case where a constant-current circuit is omitted (short-circuited)),
- a NOT circuit having an input terminal, an output terminal and a ground terminal in which said ground terminal is connected to the ground terminal of said impedance circuit and said input terminal is used as an input terminal for said sixth control signal, and said output terminal is connected to said output terminal of said current Miller circuit,
- a capacitor connected between said output terminal of said filter circuit and said output terminal of said NOT circuit, and
- a diode in which its cathode is connected to said output terminal of said filter circuit and its anode is connected to said output terminal of said NOT circuit, and said first switch circuit is connected between one of the output terminals of said full-wave rectifier circuit and said voltage input terminal of said filter circuit.

30. An off-hook signal and dial pulse generating circuit as defined in claim 27, wherein;

said impedance circuit comprises a filter circuit having a voltage input terminal and an output terminal, and a voltage/current conversion circuit for outputting an electric current corresponding to a voltage outputted from said filter circuit, said filter circuit comprises;
- a current Miller circuit whose common terminal is connected to said voltage input terminal of said filter circuit,
- a high-resistance resistor connected between an output terminal of said current Miller circuit and an output terminal of said filter circuit,
- a NOT circuit having an input terminal, an output terminal and a ground terminal in which said ground terminal is connected to the ground terminal of said impedance circuit and said input terminal is used as an input terminal for said sixth control signal,
- a constant-current circuit to make a constant current flow when a voltage is applied to it or a large-resistance resistor which are connected between said output terminal of said NOT circuit and said input terminal of said current Miller circuit,
- a capacitor connected between said output terminal of said filter circuit and said output terminal of said NOT circuit, and
- a diode in which its cathode is connected to said output terminal of said filter circuit and its anode is connected to said output terminal of said NOT circuit, and said first switch circuit is connected between one of the output terminals of said full-wave rectifier circuit and said voltage input terminal of said filter circuit.

31. An off-hook signal and dial pulse generating circuit as defined in claim 27, wherein;

said impedance circuit comprises a filter circuit having a voltage input terminal and an output terminal, and a voltage/current conversion circuit for outputting an electric current corresponding to a voltage outputted from said filter circuit, said filter circuit comprises;
- a current Miller circuit whose common terminal is connected to said voltage input terminal of said filter circuit,
- a series circuit which is connected between an input terminal of said current Miller circuit and an output terminal of said filter circuit and is composed of a constant-current circuit which makes a constant current flow when a voltage is applied to it and a high-resistance resistor (including a case where a constant-current circuit is omitted (short-circuited)),
- a NOT circuit having an input terminal, an output terminal and a ground terminal in which said ground terminal is connected to the ground terminal of said impedance circuit and said input terminal is used as an input terminal for said sixth control signal, and said output terminal is connected to an output terminal of said current Miller circuit,
- a capacitor connected between said output terminal of said filter circuit and said output terminal of said NOT circuit, and
- a diode in which its cathode is connected to said output terminal of said filter circuit and its anode is connected to said output terminal of said NOT circuit, and said voltage input terminal is connected to one of the output terminals of said full-wave rectifier circuit, and said first switch circuit is provided at an optional position between the input terminal of said current Miller circuit and the output terminal of said filter circuit.

32. An off-hook signal and dial pulse generating circuit as defined in claim 27, wherein;

said impedance circuit comprises a filter circuit having a voltage input terminal and an output terminal, and a voltage/current conversion circuit for outputting an electric current corresponding to a voltage outputted from said filter circuit, said filter circuit comprises;
- a current Miller circuit whose common terminal is connected to said voltage input terminal of said filter circuit,
- a high-resistance resistor connected between an output terminal of said current Miller circuit and the output terminal of said filter circuit,
- a NOT circuit having an input terminal, an output terminal and a ground terminal in which said ground terminal is connected to the ground terminal of said impedance circuit and said input terminal is used as an input terminal for said sixth control signal,
- a constant-current circuit to make a constant current flow when a voltage is applied to it or a large-resistance resistor which are connected between the output terminal of said NOT circuit and the input terminal of said current Miller circuit,
- a capacitor connected between said output terminal of said filter circuit and said output terminal of said NOT circuit, and
- a diode in which its cathode is connected to said output terminal of said filter circuit and its anode is connected to said output terminal of said NOT circuit, and said voltage input terminal is connected to one of the output terminals of said full-wave rectifier circuit, and said first switch circuit is provided at an optional position between the input terminal of said current Miller circuit and the output terminal of said NOT circuit.

33. An off-hook signal and dial pulse generating circuit as defined in claim 27, wherein;

said switch block circuit comprises;

a first interface circuit which outputs an eighth control signal synchronized with said seventh control signal and fitted for said fifth switch circuit to said fifth switch circuit, and a second interface circuit which outputs a ninth control signal synchronized with said fifth control signal and fitted for said fourth switch circuit to said fourth switch circuit.

34. An off-hook signal and dial pulse generating circuit as defined in claim 27, said off-hook signal and dial pulse generating circuit comprising as said fifth switch circuit;

a current Miller circuit in which its common terminal is connected to one of the output terminals of said full-wave rectifier circuit, its input terminal is connected to a constant-current circuit turned on/off by said seventh control signal, and its output terminal is connected to said fourth switch circuit, or a nonlinear current amplifier circuit whose current amplification factor is lowered when an electric current is increased.

35. An off-hook signal and dial pulse generating circuit as defined in claim 28, said off-hook signal and dial pulse generating circuit comprising;

a discharge circuit which discharges electric charge accumulated in said capacitor, when said sixth control signal is in an off state.

36. An off-hook signal and dial pulse generating circuit as defined in claim 28, said off-hook signal and dial pulse generating circuit comprising;

a discharge circuit which discharges electric charge accumulated in said capacitor, when the electric potential of the ground side terminal of said capacitor comes to be lower by a set potential difference or more in comparison with the ground potential of said filter circuit.

37. An off-hook signal and dial pulse generating circuit as defined in claim 28, said off-hook signal and dial pulse generating circuit comprising;

a voltage clamping circuit having an input terminal and a ground terminal, wherein said input terminal is connected to the voltage input terminal of said filter circuit and said ground terminal is connected to an input terminal of a voltage/current conversion circuit, wherein a conduction state happens between the input terminal and the ground terminal when a voltage between said input terminal and said ground terminal of said voltage clamping circuit comes to be equal to or higher than a set voltage, and wherein furthermore the voltage between the input terminal and the ground terminal is clamped to said set voltage.

38. An off-hook signal and dial pulse generating circuit as defined in claim 28, said off-hook signal and dial pulse generating circuit comprising;

a voltage clamping circuit having an input terminal, a ground terminal and a buffer current terminal, wherein said input terminal is connected to the voltage input terminal of said filter circuit, said ground terminal is connected to the input terminal of said voltage/current conversion circuit and said buffer current terminal is connected to one of the output terminals of said full-wave rectifier circuit, and wherein when a voltage between said input terminal and said ground terminal of said voltage clamping circuit comes to be equal to or higher than a set voltage, an electric current flows from said buffer current terminal to said ground terminal so as to clamp the voltage between the input terminal and the ground terminal to said set voltage.

39. An off-hook signal and dial pulse generating circuit as defined in claim 37, wherein;

a diode in which its anode is connected to the output terminal of said filter circuit and its cathode is connected to the input terminal of said voltage/current conversion circuit, is inserted between the output terminal of said filter circuit and the input terminal of said voltage/current conversion circuit.

40. An off-hook signal and dial pulse generating circuit as defined in claim 39, said off-hook signal and dial pulse generating circuit comprising;

a series circuit which is connected with the voltage input terminal and the output terminal of said filter circuit, and is composed of a second voltage clamping circuit and a current limiting circuit.

41. An off-hook signal and dial pulse generating circuit as defined in claim 39, said off-hook signal and dial pulse generating circuit comprising;

a second voltage clamping circuit having an input terminal, a ground terminal and a buffer current terminal, wherein said input terminal is connected to an input terminal of said filter circuit, said ground terminal is connected to an output terminal of said filter circuit, and said buffer current terminal is connected to one of the output terminals of said full-wave rectifier circuit, and wherein when a voltage between said input terminal and said ground terminal of said voltage clamping circuit comes to be equal to or higher than a set voltage, an electric current flows from said buffer current terminal to said ground terminal so as to clamp the voltage between the input terminal and the ground terminal to said set voltage, and a current limiting means connected, by insertion thereof, between the ground terminal of said second voltage clamping circuit and the output terminal of said filter circuit.

42. An off-hook signal and dial pulse generating circuit as defined in claim 28, said off-hook signal and dial pulse generating circuit comprising;

a diode in which its anode is connected to the input terminal of said voltage/current conversion circuit and its cathode is connected to the voltage input terminal of said filter circuit, and a second constant-current circuit or a large-resistance resistor which are connected between said voltage input terminal and the ground terminal of said filter circuit.

43. An off-hook signal and dial pulse generating circuit as defined in claim 27, wherein;

said impedance circuit comprises a filter circuit having a voltage input terminal and an output terminal, and a voltage/current conversion circuit for outputting an electric current corresponding to a voltage outputted from said filter circuit, said filter circuit comprises;

a series circuit which is connected between said voltage input terminal and said output terminal of said filter circuit and comprises a constant-current circuit which makes a constant current flow when a voltage is applied to it and a high-resistance resistor (including a case where a constant-current circuit is omitted (short-circuited)), a NOT circuit having an input terminal, an output terminal and a ground terminal in which said ground terminal is connected to the ground terminal of said impedance circuit and said input terminal is used as an input terminal for said sixth control signal, a capacitor connected between said output terminal of said filter circuit and said output terminal of said NOT circuit, a bias circuit which supplies to said output terminal of said NOT circuit a bias current for permitting the flow of an alternating current signal through said capacitor when the output of said NOT circuit is at a low level, and a discharge circuit which discharges electric charge accumulated in said capacitor when the output of said NOT circuit is at a high level, and said first switch circuit is connected between one of the output terminals of said full-wave rectifier circuit and said voltage input terminal of said filter circuit.

44. An off-hook signal and dial pulse generating circuit as defined in claim 43, wherein;

said bias circuit comprises;

a series circuit which is connected between the voltage input terminal of said filter circuit and the output terminal of said NOT circuit and comprises a constant-current circuit or a large-resistance resistor and a diode (a fourth diode), a diode (a fifth diode) which is connected between a connection point connecting said constant-current circuit or said large-resistance resistor and the fourth diode with each other and the ground terminal of said filter circuit, and whose forward operation starting voltage is higher in comparison with said fourth diode.

45. An off-hook signal and dial pulse generating circuit as defined in claim 44, said off-hook signal and dial pulse generating circuit comprising;

a diode in which its anode is connected to the input terminal of said voltage/current conversion circuit and its cathode is connected to the voltage input terminal of said filter circuit.

46. An off-hook signal and dial pulse generating circuit as defined in claim 2, wherein;

said switch block circuit is furthermore provided with;

a first level converting circuit which generates a first off signal for turning off said second switch circuit, a first on signal for turning on said third switch circuit, and said fourth control signal in case that said second control signal is on, a second level converting circuit which generates a second on signal for turning on said second switch circuit in case that said third control signal is on, a dial pulse assisting current at the time of generating dial pulses, and a bias current for compensating an alternating current operation of said communication terminal transformer L at the time of an off-hook operation, a current limiting resistor for limiting an electric current to flow through said third switch circuit, a first diode which has an anode connected to one end of the output side of said full-wave rectifying circuit and a cathode connected to an output terminal of said assisting current or said bias current of said second level converting circuit and makes said dial pulse assisting current flow, and a second diode which has an anode connected to the connecting point of said second and third switch circuits and a cathode connected to the output terminal of said assistant current or said bias current of said second level converting circuit, and has a forward operation starting voltage lower than said first diode and makes flow a bias current for compensating an alternating current operation of said communication terminal transformer.

47. An off-hook signal and dial pulse generating circuit as defined in claim 3, wherein;

said switch block circuit is furthermore provided with;

a first level converting circuit which generates a first off signal for turning off said second switch circuit, a first on signal for turning on said third switch circuit, and said fourth control signal in case that said second control signal is on, a second level converting circuit which generates a second on signal for turning on said second switch circuit in case that said third control signal is on, a dial pulse assisting current at the time of generating dial pulses, and a bias current for compensating an alternating current operation of said communication terminal transformer L at the time of an off-hook operation, a current limiting resistor for limiting an electric current to flow through said third switch circuit, a first diode which has an anode connected to one end of the output side of said full-wave rectifying circuit and a cathode connected to an output terminal of said assisting current or said bias current of said second level converting circuit and makes said dial pulse assisting current flow, and a second diode which has an anode connected to the connecting point of said second and third switch circuits and a cathode connected to the output terminal of said assistant current or said bias current of said second level converting circuit, and has a forward operation starting voltage lower than said first diode and makes flow a bias current for compensating an alternating current operation of said communication terminal transformer.

48. An off-hook signal and dial pulse generating circuit as defined in claim 4, wherein;

said switch block circuit is furthermore provided with;

a first level converting circuit which generates a first off signal for turning off said second switch circuit, a first on signal for turning on said third switch circuit, and said fourth control signal in case that said second control signal is on, a second level converting circuit which generates a second on signal for turning on said second switch circuit in case that said third control signal is on, a dial pulse assisting current at the time of generating dial pulses, and a bias current for compensating an alternating current operation of said communication terminal transformer L at the time of an off-hook operation, a current limiting resistor for limiting an electric current to flow through said third switch circuit, a first diode which has an anode connected to one end of the output side of said full-wave rectifying circuit and a cathode connected to an output terminal of said assisting current or said bias current of said second level converting circuit and makes said dial pulse assisting current flow, and a second diode which has an anode connected to the connecting point of said second and third switch circuits and a cathode connected to the output terminal of said assistant current or said bias current of said second level converting circuit, and has a forward operation starting voltage lower than said first diode and makes flow a bias current for compensating an alternating current operation of said communication terminal transformer.

49. An off-hook signal and dial pulse generating circuit as defined in claim 5, wherein;
said switch block circuit is furthermore provided with;
a first level converting circuit which generates a first off signal for turning off said second switch circuit, a first on signal for turning on said third switch circuit, and said fourth control signal in case that said second control signal is on,
a second level converting circuit which generates a second on signal for turning on said second switch circuit in case that said third control signal is on, a dial pulse assisting current at the time of generating dial pulses, and a bias current for compensating an alternating current operation of said communication terminal transformer L at the time of an off-hook operation,
a current limiting resistor for limiting an electric current to flow through said third switch circuit,
a first diode which has an anode connected to one end of the output side of said full-wave rectifying circuit and a cathode connected to an output terminal of said assisting current or said bias current of said second level converting circuit and makes said dial pulse assisting current flow, and
a second diode which has an anode connected to the connecting point of said second and third switch circuits and a cathode connected to the output terminal of said assistant current or said bias current of said second level converting circuit, and has a forward operation starting voltage lower than said first diode and makes flow a bias current for compensating an alternating current operation of said communication terminal transformer.

50. An off-hook signal and dial pulse generating circuit as defined in claim 6, wherein;
said switch block circuit is furthermore provided with;
a first level converting circuit which generates a first off signal for turning off said second switch circuit, a first on signal for turning on said third switch circuit, and said fourth control signal in case that said second control signal is on,
a second level converting circuit which generates a second on signal for turning on said second switch circuit in case that said third control signal is on, a dial pulse assisting current at the time of generating dial pulses, and a bias current for compensating an alternating current operation of said communication terminal transformer L at the time of an off-hook operation,
a current limiting resistor for limiting an electric current to flow through said third switch circuit,
a first diode which has an anode connected to one end of the output side of said full-wave rectifying circuit and a cathode connected to an output terminal of said assisting current or said bias current of said second level converting circuit and makes said dial pulse assisting current flow, and
a second diode which has an anode connected to the connecting point of said second and third switch circuits and a cathode connected to the output terminal of said assistant current or said bias current of said second level converting circuit, and has a forward operation starting voltage lower than said first diode and makes flow a bias current for compensating an alternating current operation of said communication terminal transformer.

51. An off-hook signal and dial pulse generating circuit as defined in claim 7, wherein;
said switch block circuit is furthermore provided with;
a first level converting circuit which generates a first off signal for turning off said second switch circuit, a first on signal for turning on said third switch circuit, and said fourth control signal in case that said second control signal is on,
a second level converting circuit which generates a second on signal for turning on said second switch circuit in case that said third control signal is on, a dial pulse assisting current at the time of generating dial pulses, and a bias current for compensating an alternating current operation of said communication terminal transformer L at the time of an off-hook operation,
a current limiting resistor for limiting an electric current to flow through said third switch circuit,
a first diode which has an anode connected to one end of the output side of said full-wave rectifying circuit and a cathode connected to an output terminal of said assisting current or said bias current of said second level converting circuit and makes said dial pulse assisting current flow, and
a second diode which has an anode connected to the connecting point of said second and third switch circuits and a cathode connected to the output terminal of said assistant current or said bias current of said second level converting circuit, and has a forward operation starting voltage lower than said first diode and makes flow a bias current for compensating an alternating current operation of said communication terminal transformer.

52. An off-hook signal and dial pulse generating circuit as defined in claim 8, wherein;
said switch block circuit is furthermore provided with;
a first level converting circuit which generates a first off signal for turning off said second switch circuit, a first on signal for turning on said third switch circuit, and said fourth control signal in case that said second control signal is on,
a second level converting circuit which generates a second on signal for turning on said second switch circuit in case that said third control signal is on, a dial pulse assisting current at the time of generating dial pulses, and a bias current for compensating an alternating current operation of said communication terminal transformer L at the time of an off-hook operation,
a current limiting resistor for limiting an electric current to flow through said third switch circuit,
a first diode which has an anode connected to one end of the output side of said full-wave rectifying circuit and a cathode connected to an output terminal of said assisting current or said bias current of said second level converting circuit and makes said dial pulse assisting current flow, and
a second diode which has an anode connected to the connecting point of said second and third switch circuits and a cathode connected to the output terminal of said assistant current or said bias current of said second level converting circuit, and has a forward operation starting voltage lower than said first diode and makes flow a bias current for compensating an alternating current operation of said communication terminal transformer.

53. An off-hook signal and dial pulse generating circuit as defined in claim 9, wherein;
said switch block circuit is furthermore provided with;
a first level converting circuit which generates a first off signal for turning off said second switch circuit, a first on signal for turning on said third switch circuit, and said fourth control signal in case that said second control signal is on,
a second level converting circuit which generates a second on signal for turning on said second switch circuit in case that said third control signal is on, a dial pulse assisting current at the time of generating dial pulses, and a bias current for compensating an alternating current operation of said communication terminal transformer L at the time of an off-hook operation,
a current limiting resistor for limiting an electric current to flow through said third switch circuit,
a first diode which has an anode connected to one end of the output side of said full-wave rectifying circuit and a cathode connected to an output terminal of said assisting current or said bias current of said second level converting circuit and makes said dial pulse assisting current flow, and
a second diode which has an anode connected to the connecting point of said second and third switch circuits and a cathode connected to the output terminal of said assistant current or said bias current of said second level converting circuit, and has a forward operation starting voltage lower than said first diode and makes flow a bias current for compensating an alternating current operation of said communication terminal transformer.

54. An off-hook signal and dial pulse generating circuit as defined in claim 11, wherein;
said first level converting circuit comprises;
a switch means for performing an on/off operation according to said second control signal and
a constant-current circuit to be turned on/off by said switch means.

55. An off-hook signal and dial pulse generating circuit as defined in claim 11, wherein;
said first level converting circuit comprises;
a switch means for performing an on/off operation according to said second control signal,
a constant-current circuit to be turned on/off by said switch means, and
a series circuit composed of a capacitor and a resistor which are connected between the output terminals of said switch means.

56. An off-hook signal and dial pulse generating circuit as defined in claim 11, wherein;
said first level converting circuit comprises;
a switch means for performing an on/off operation according to said second control signal,
a constant-current circuit to be turned on/off by said switch means,
a series circuit composed of a capacitor and a resistor which are connected between the output terminals of said switch means, and
a series circuit composed of a resistor and a Miller capacitor composed of a transistor, a diode and a capacitor.

57. An off-hook signal and dial pulse generating circuit as defined in claim 3, said off-hook signal and dial pulse generating circuit comprising;
a discharging circuit for discharging the electric charge charged up in said capacitor, when said fourth control signal is in an on state.

58. An off-hook signal and dial pulse generating circuit as defined in claim 4, said off-hook signal and dial pulse generating circuit comprising;
a discharging circuit for discharging the electric charge charged up in said capacitor, when said fourth control signal is in an on state.

59. An off-hook signal and dial pulse generating circuit as defined in claim 5, said off-hook signal and dial pulse generating circuit comprising;
a discharging circuit for discharging the electric charge charged up in said capacitor, when said fourth control signal is in an on state.

60. An off-hook signal and dial pulse generating circuit as defined in claim 3, said off-hook signal and dial pulse generating circuit comprising;
a discharging circuit for discharging the electric charge charged up in said capacitor, when the electric potential of the ground side terminal of said capacitor comes to be lower by a set potential difference or more in comparison with the ground potential of said filter circuit.

61. An off-hook signal and dial pulse generating circuit as defined in claim 4, said off-hook signal and dial pulse generating circuit comprising;
a discharging circuit for discharging the electric charge charged up in said capacitor, when the electric potential of the ground side terminal of said capacitor comes to be lower by a set potential difference or more in comparison with the ground potential of said filter circuit.

62. An off-hook signal and dial pulse generating circuit as defined in claim 5, said off-hook signal and dial pulse generating circuit comprising;
a discharging circuit for discharging the electric charge charged up in said capacitor, when the electric potential of the ground side terminal of said capacitor comes to be lower by a set potential difference or more in comparison with the ground potential of said filter circuit.

63. An off-hook signal and dial pulse generating circuit as defined in claim 3, said off-hook signal and dial pulse generating circuit comprising;
a voltage clamping circuit having an input terminal and a ground terminal, wherein said input terminal is connected to an input terminal of said filter circuit and said ground terminal is connected to an input terminal of a voltage/current conversion circuit, wherein when a voltage between said input terminal and said ground terminal of said voltage clamping circuit comes to be equal to or higher than a set voltage, a conduction state happens between the input terminal and the ground terminal, and wherein moreover the voltage between the input terminal and the ground terminal is clamped to said set voltage.

64. An off-hook signal and dial pulse generating circuit as defined in claim 4, said off-hook signal and dial pulse generating circuit comprising;
a voltage clamping circuit having an input terminal and a ground terminal, wherein said input terminal is connected to an input terminal of said filter circuit and said ground terminal is connected to an input terminal of a voltage/current conversion circuit, wherein when a voltage between said input terminal and said ground terminal of said voltage clamping circuit comes to be equal to or higher than a set voltage, a conduction state happens between the input terminal and the ground terminal, and wherein moreover the voltage between the input terminal and the ground terminal is clamped to said set voltage.

65. An off-hook signal and dial pulse generating circuit as defined in claim 3, said off-hook signal and dial pulse generating circuit comprising;

a voltage clamping circuit having an input terminal, a ground terminal and a buffer current output terminal, wherein said input terminal is connected to an input terminal I of said filter circuit, said ground terminal is connected to an input terminal of said voltage/current conversion circuit and said buffer current output terminal is connected to one end of an output terminal of said full-wave rectifier circuit, and wherein when a voltage between said input terminal and said ground terminal of said voltage clamping circuit comes to be equal to or higher than a set voltage, the voltage between the input terminal and the ground terminal is clamped to said set voltage and moreover a conduction state happens between said current output terminal and said ground terminal.

66. An off-hook signal and dial pulse generating circuit as defined in claim 4, said off-hook signal and dial pulse generating circuit comprising;

a voltage clamping circuit having an input terminal, a ground terminal and a buffer current output terminal, wherein said input terminal is connected to an input terminal I of said filter circuit, said ground terminal is connected to an input terminal of said voltage/current conversion circuit and said buffer current output terminal is connected to one end of an output terminal of said full-wave rectifier circuit, and wherein when a voltage between said input terminal and said ground terminal of said voltage clamping circuit comes to be equal to or higher than a set voltage, the voltage between the input terminal and the ground terminal is clamped to said set voltage and moreover a conduction state happens between said current output terminal and said ground terminal.

67. An off-hook signal and dial pulse generating circuit as defined in claim 21, said off-hook signal and dial pulse generating circuit comprising;

a diode in which its anode is connected to the output terminal of said filter circuit and its cathode is connected to the input terminal of said voltage/current conversion circuit.

68. An off-hook signal and dial pulse generating circuit as defined in claim 29, said off-hook signal and dial pulse generating circuit comprising;

a discharge circuit which discharges electric charge accumulated in said capacitor, when said sixth control signal is in an off state.

69. An off-hook signal and dial pulse generating circuit as defined in claim 30, said off-hook signal and dial pulse generating circuit comprising;

a discharge circuit which discharges electric charge accumulated in said capacitor, when said sixth control signal is in an off state.

70. An off-hook signal and dial pulse generating circuit as defined in claim 31, said off-hook signal and dial pulse generating circuit comprising;

a discharge circuit which discharges electric charge accumulated in said capacitor, when said sixth control signal is in an off state.

71. An off-hook signal and dial pulse generating circuit as defined in claim 32, said off-hook signal and dial pulse generating circuit comprising;

a discharge circuit which discharges electric charge accumulated in said capacitor, when said sixth control signal is in an off state.

72. An off-hook signal and dial pulse generating circuit as defined in claim 29, said off-signal and dial pulse generating circuit comprising;

a discharge circuit which discharges electric charge accumulated in said capacitor, when the electric potential of the ground side terminal of said capacitor comes to be lower by a set potential difference or more in comparison with the ground potential of said filter circuit.

73. An off-hook signal and dial pulse generating circuit as defined in claim 30, said off-signal and dial pulse generating circuit comprising;

a discharge circuit which discharges electric charge accumulated in said capacitor, when the electric potential of the ground side terminal of said capacitor comes to be lower by a set potential difference or more in comparison with the ground potential of said filter circuit.

74. An off-hook signal and dial pulse generating circuit as defined in claim 31, said off-signal and dial pulse generating circuit comprising;

a discharge circuit which discharges electric charge accumulated in said capacitor, when the electric potential of the ground side terminal of said capacitor comes to be lower by a set potential difference or more in comparison with the ground potential of said filter circuit.

75. An off-hook signal and dial pulse generating circuit as defined in claim 32, said off-signal and dial pulse generating circuit comprising;

a discharge circuit which discharges electric charge accumulated in said capacitor, when the electric potential of the ground side terminal of said capacitor comes to be lower by a set potential difference or more in comparison with the ground potential of said filter circuit.

76. An off-hook signal and dial pulse generating circuit as defined in claim 29, said off-hook signal and dial pulse generating circuit comprising;

a voltage clamping circuit having an input terminal and a ground terminal, wherein said input terminal is connected to the voltage input terminal of said filter circuit and said ground terminal is connected to an input terminal of a voltage/current conversion circuit, wherein a conduction state happens between the input terminal and said ground terminal of said voltage clamping circuit comes to be equal to or higher than a set voltage, and wherein furthermore the voltage between the input terminal and the ground terminal is clamped to said set voltage.

77. An off-hook signal and dial pulse generating circuit as defined in claim 30, said off-hook signal and dial pulse generating circuit comprising;

a voltage clamping circuit having an input terminal and a ground terminal, wherein said input terminal is connected to the voltage input terminal of said filter circuit and said ground terminal is connected to an input terminal of a voltage/current conversion circuit, wherein a conduction state happens between the input terminal and said ground terminal of said voltage clamping circuit comes to be equal to or higher than a set voltage, and wherein furthermore the voltage between the input terminal and the ground terminal is clamped to said set voltage.

78. An off-hook signal and dial pulse generating circuit as defined in claim 29, said off-hook signal and dial pulse generating circuit comprising;

a voltage clamping circuit having an input terminal, a ground terminal and a buffer current terminal, wherein said input terminal is connected to the voltage input terminal of said filter circuit, said ground terminal is connected to the input terminal of said voltage/current conversion circuit and said buffer current terminal is connected to one of the output terminals of said fullwave rectifier circuit, and wherein when a voltage between said input terminal and said ground terminal of said voltage clamping circuit comes to be equal to or higher than a set voltage, an electric current flows from said buffer current terminal to said ground terminal, so as to clamp the voltage between the input terminal and the ground terminal to said set voltage.

79. An off-hook signal and dial pulse generating circuit as defined in claim 30, said off-hook signal and dial pulse generating circuit comprising;

a voltage clamping circuit having an input terminal, a ground terminal and a buffer current terminal, wherein said input terminal is connected to the voltage input terminal of said filter circuit, said ground terminal is connected to the input terminal of said voltage/current conversion circuit and said buffer current terminal is connected to one of the output terminals of said fullwave rectifier circuit, and wherein when a voltage between said input terminal and said ground terminal of said voltage clamping circuit comes to be equal to or higher than a set voltage, an electric current flows from said buffer current terminal to said ground terminal so as to clamp the voltage between the input terminal and the ground terminal to said set voltage.

80. An off-hook signal and dial pulse generating circuit as defined in claim 38, wherein;

a diode in which its anode is connected to the output terminal of said filter circuit and its cathode is connected to the output terminal of said voltage/current conversion circuit, is inserted between the output terminal of said filter circuit and the input terminal of said voltage/current conversion circuit.

81. An off-hook signal and dial pulse generating circuit as defined in claim 29, said off-hook signal and dial pulse generating circuit comprising;

a diode in which its anode is connected to the input terminal of said voltage/current conversion circuit and its cathode is connected to the voltage input terminal of said filter circuit, and a second constant-current circuit or a large-resistance resistor which are connected between said voltage input terminal and the ground terminal of said filter circuit.

82. An off-hook signal and dial pulse generating circuit as defined in claim 30, said off-hook signal and dial pulse generating circuit comprising;

a diode in which its anode is connected to the input terminal of said voltage/current conversion circuit and its cathode is connected to the voltage input terminal of said filter circuit, and a second constant-current circuit or a large-resistance resistor which are connected between said voltage input terminal and the ground terminal of said filter circuit.

* * * * *